(12) United States Patent
Lucovsky et al.

(10) Patent No.: US 7,664,724 B2
(45) Date of Patent: Feb. 16, 2010

(54) SCHEMA-BASED SERVICES FOR IDENTITY-BASED DATA ACCESS

(75) Inventors: Mark H. Lucovsky, Sammamish, WA (US); Shaun Douglas Pierce, Sammamish, WA (US); Ramu Movva, Issaquah, WA (US); Jagadeesh Kalki, Redmond, WA (US); David Benjamin Auerbach, Seattle, WA (US); Peter Sewall Ford, Carnation, WA (US); Yun-Qi Yuan, Redmond, WA (US); Yi-Wen Guu, Bellevue, WA (US); Samuel John George, San Mateo, CA (US); William Raymond Hoffman, Berkeley, CA (US); Jay Christopher Jacobs, Danville, CA (US); Paul Andrew Steckler, Redmond, WA (US); Walter C. Hsueh, San Jose, CA (US); Kendall D. Keil, Bothell, WA (US); Burra Gopal, Redmond, WA (US); Steven D. White, Bellevue, WA (US); Paul J. Leach, Seattle, WA (US); Richard B. Ward, Redmond, WA (US); Philip Michael Smoot, San Francisco, CA (US); Lijiang Fang, Sammamish, WA (US); Michael B. Taylor, Seattle, WA (US); Suresh Kannan, Redmond, WA (US); Winnie C. Wu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 11/276,655

(22) Filed: Mar. 9, 2006

(65) Prior Publication Data

US 2006/0161554 A1  Jul. 20, 2006

Related U.S. Application Data

(62) Division of application No. 10/017,680, filed on Oct. 22, 2001, now Pat. No. 7,302,634.

(60) Provisional application No. 60/275,809, filed on Mar. 14, 2001.

(51) Int. Cl.
*G06F 17/30* (2006.01)
(52) U.S. Cl. .......................................... 707/1; 707/100
(58) Field of Classification Search .. 707/103 R–103 Z, 707/1, 3, 100
See application file for complete search history.

(56) References Cited

U.S. PATENT DOCUMENTS 5,446,880 A   8/1995   Balgeman et al.

(Continued)

OTHER PUBLICATIONS

Imamura et al., "Metadata representation in XML for Internet-based electronic XML application from business to government", IEEE, Jul. 2000, pp. 387-392.*

(Continued)

*Primary Examiner*—Cheryl Lewis
(74) *Attorney, Agent, or Firm*—L. Alan Collins

(57) ABSTRACT

A schema-based service for Internet access to per-user services data, wherein access to data is based on each user's identity. The service includes a schema that defines rules and a structure for each user's data, and also includes methods that provide access to the data in a defined way. The services schema thus corresponds to a logical document containing the data for each user. The user manipulates (e.g., reads or writes) data in the logical document by data access requests through defined methods. In one implementation, the services schemas are arranged as XML documents, and the services provide methods that control access to the data based on the requesting user's identification, defined role and scope for that role. In this way, data can be accessed by its owner, and shared to an extent determined by the owner.

3 Claims, 25 Drawing Sheets

U.S. PATENT DOCUMENTS

| | | | |
|---|---|---|---|
| 5,666,534 | A | 9/1997 | Gilbert et al. |
| 5,754,111 | A | 5/1998 | Garcia |
| 5,790,785 | A | 8/1998 | Klug et al. |
| 5,819,092 | A | 10/1998 | Ferguson et al. |
| 5,999,932 | A | 12/1999 | Paul |
| 6,023,223 | A | 2/2000 | Baxter, Jr. |
| 6,044,372 | A | 3/2000 | Rothfus et al. |
| 6,122,348 | A | 9/2000 | French-St. George et al. |
| 6,141,778 | A | 10/2000 | Kane et al. |
| 6,148,301 | A | 11/2000 | Rosenthal |
| 6,167,408 | A | 12/2000 | Cannon et al. |
| 6,185,551 | B1 | 2/2001 | Birell et al. |
| 6,266,690 | B1 | 7/2001 | Shankarappa et al. |
| 6,269,369 | B1 | 7/2001 | Robertson |
| 6,275,824 | B1 | 8/2001 | O'Flaherty et al. |
| 6,317,783 | B1 | 11/2001 | Freishtat et al. |
| 6,324,544 | B1 | 11/2001 | Alam et al. |
| 6,401,085 | B1 | 6/2002 | Gershman et al. |
| 6,414,635 | B1 | 7/2002 | Stewart et al. |
| 6,415,322 | B1 | 7/2002 | Jaye |
| 6,457,066 | B1 * | 9/2002 | Mein et al. .................. 719/330 |
| 6,480,850 | B1 | 11/2002 | Veldhuisen |
| 6,480,885 | B1 * | 11/2002 | Olivier ....................... 709/207 |
| 6,516,315 | B1 | 2/2003 | Gupta |
| 6,516,341 | B2 | 2/2003 | Shaw et al. |
| 6,556,995 | B1 | 4/2003 | Child et al. |
| 6,584,564 | B2 | 6/2003 | Olkin et al. |
| 6,643,650 | B1 * | 11/2003 | Slaughter et al. ............... 707/10 |
| 6,643,652 | B2 | 11/2003 | Helgeson et al. ............... 707/10 |
| 6,697,865 | B1 | 2/2004 | Howard et al. |
| 6,789,126 | B1 * | 9/2004 | Saulpaugh et al. .......... 709/245 |
| 6,792,466 | B1 * | 9/2004 | Saulpaugh et al. .......... 709/229 |
| 6,816,886 | B2 | 11/2004 | Elvanoglu et al. |
| 6,823,369 | B2 | 11/2004 | Leach et al. |
| 6,980,993 | B2 | 12/2005 | Horvitz et al. |
| 2001/0044827 | A1 | 11/2001 | Zhuk |
| 2002/0040369 | A1 | 4/2002 | Multer et al. |
| 2002/0069298 | A1 | 6/2002 | Birkler et al. |
| 2002/0099593 | A1 | 7/2002 | Kraft et al. |
| 2002/1009959 | * | 7/2002 | Kraft et al .................... 705/10 |
| 2002/0120685 | A1 * | 8/2002 | Srivastava et al. .......... 709/203 |
| 2002/0133535 | A1 | 9/2002 | Lucovsky et al. |
| 2002/0174125 | A1 | 11/2002 | Lucovsky et al. |
| 2002/0184214 | A1 | 12/2002 | Lucovsky et al. |
| 2002/0184344 | A1 | 12/2002 | Elvanoglu et al. |
| 2002/0184521 | A1 | 12/2002 | Lucovsky et al. |
| 2003/0023623 | A1 | 1/2003 | Horvitz et al. |
| 2003/0041065 | A1 | 2/2003 | Lucovsky et al. |
| 2003/0041076 | A1 | 2/2003 | Lucovsky et al. |
| 2003/0050911 | A1 | 3/2003 | Lucovsky et al. |
| 2003/0061365 | A1 | 3/2003 | White et al. |
| 2003/0069887 | A1 | 4/2003 | Lucovsky et al. |
| 2003/0101190 | A1 | 5/2003 | Horvitz et al. |
| 2003/0131069 | A1 | 7/2003 | Lucovsky et al. |
| 2003/0131073 | A1 | 7/2003 | Lucovsky et al. |
| 2003/0131142 | A1 | 7/2003 | Horvitz et al. |
| 2004/0002976 | A1 | 1/2004 | Lucovsky |
| 2004/0006564 | A1 | 1/2004 | Lucovsky et al. |
| 2004/0006590 | A1 | 1/2004 | Lucovsky et al. |
| 2004/0060002 | A1 | 3/2004 | Lucovsky et al. |
| 2004/0199861 | A1 | 10/2004 | Lucovsky |
| 2005/0080865 | A1 | 4/2005 | Leach et al. |
| 2005/0165773 | A1 | 7/2005 | Elvanoglu et al. |
| 2005/0273692 | A1 | 12/2005 | Horvitz et al. |
| 2005/0278344 | A1 | 12/2005 | Horvitz et al. |
| 2005/0278366 | A1 | 12/2005 | Horvitz et al. |
| 2006/0036642 | A1 | 2/2006 | Horvitz et al. |

OTHER PUBLICATIONS

Bergman, "XML technology enables redesigned deep space network operations", IEEE, Mar. 2000, pp. 493-502.*

Imamura et al., "Metadata representation in XML for Internet-based electronic XML application from business to government", IEEE, Jul. 2000, pp. 387-392.

Bergman, "XML technology enables redesigned deep space network operations", IEEE, 0312000, pp. 493-502, Copyright 2000.

Applicants' Comments: Applicants point out that for any reference listed in this IDS, should a year of publication be listed without a month, that the year of publication is sufficiently earlier than the effective U.S. filing date and any foreign priority date so that the particular month of publication is not in issue (see MPEP 609.04(a)).

* cited by examiner

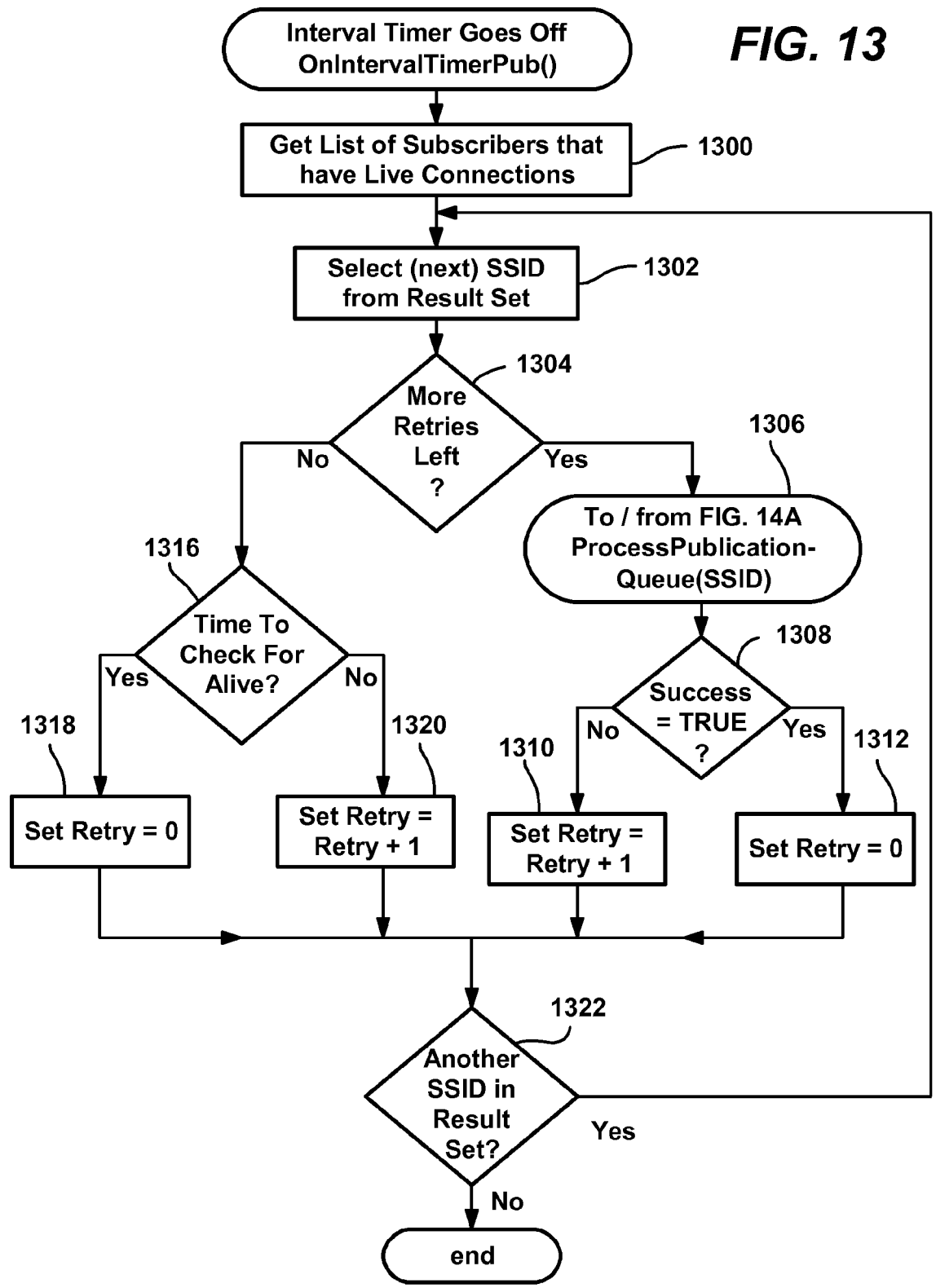

SCHEMA-BASED SERVICES FOR IDENTITY-BASED DATA ACCESS

CROSS REFERENCE TO RELATED APPLICATION(S)

This is a divisional application of utility application Ser. No. 10/017,680 now U.S. Pat. No. 7,302,634, filed Oct. 22, 2001. Utility application Ser. No. 10/017,680 claims priority to U.S. provisional application Ser. No. 60/275,809, filed Mar. 14, 2001 and entitled "Identity-Based Service Communication Using XML Messaging Interfaces". The disclosures of which are incorporated herein by reference in their entirety.

FIELD OF THE INVENTION

The invention relates generally to computer network data access, and more particularly to systems, methods and data structures for accessing data and data-related services over a network.

BACKGROUND OF THE INVENTION

There are many types of data that users need to manage and otherwise access. For example, users keep word processing documents, spreadsheet documents, calendars, telephone numbers and addresses, e-mail messages, financial information and so on. In general, users maintain this information on various personal computers, hand-held computers, pocket-sized computers, personal digital assistants, mobile phones and other electronic devices. In most cases, a user's data on one device is not accessible to another device, without some manual synchronization process or the like to exchange the data, which is cumbersome. Moreover, some devices do not readily allow for synchronization. For example, if a user leaves his cell phone at work, he has no way to get his stored phone numbers off the cell phone when at home, even if the user has a computing device or similar cell phone at his disposal. As is evident, these drawbacks result from the separate devices each containing their own data.

Corporate networks and the like can provide users with remote access to some of their data, but many users do not have access to such a network. For many of those that have access, connecting to a network with the many different types of devices, assuming such devices can even connect to a network, can be a complex or overwhelming problem.

Moreover, even if a user has centrally stored data, the user needs the correct type of device running the appropriate application program to access that data. For example, a user with a PDA that runs a simple note taking application program ordinarily will not be able to use that program to open documents stored by a full-blown word processing program at work. In general, this is because the data is formatted and accessed according to the way the application program wants it to be formatted.

What is needed is a model wherein data is centrally stored for users, with a set of services that control access to the data with defined methods, regardless of the application program and/or device. When accessed, the data for each service should be structured in a defined way that complies with defined rules for that data, regardless of the application program or device that is accessing the data.

SUMMARY OF THE INVENTION

Briefly, the present invention provides a set of services for central (e.g., Internet) access to per-user data, based on each user's identity, wherein each service includes a schema that defines rules and a structure for the data, and also includes methods that provide access to the data in a defined way. Note that while "user" is generally employed herein for simplicity, as used herein the term "user" is really a substitute for any identity, which may be a user, a group, another entity, an event, a project, and so on. Because the structure of the data is defined from the perspective of the data, not from that of an application program or a device, programs can communicate with the services to access the data, with existing knowledge of the format. In one implementation, the schemas are arranged as XML documents, and the services provide methods that control access to the data based on the requesting user's identification, defined role and scope for that role. In this way, data can be accessed by its owner, and shared to an extent determined by the owner. Extensibility is defined into the schemas.

In one implementation, core services are provided for managing access of various types of data, each service corresponding to a defined schema for the type of data it manages. In addition to defined schemas for the data, the various services implement standard methods that application programs can call in order to obtain access to the data, and also may include custom methods that facilitate access, referred to as domain-specific methods. Core services include myServices, to allow applications to find another service, myApplicationSettings, to allow a user to centrally store settings for the user's various applications, and myCalendar, which manages access to data regarding scheduled events. Other core services include myCategories, to provide a generic classification model, myContacts, to manage access to a user's list of contacts, and myDevices, to manage a user's devices. Other, core services include myDocuments, myFavoriteWebSites, myInbox, myLists, myLocation, myAlerts, myProfile, myPresence and myWallet, as described below. Note that each of these services are alternatively and interchangeably referred to herein by ".NET" followed by their name, e.g., myInbox may be referred to as .NET Inbox, or simply Inbox, myContacts as .NET Contacts, or simply Contacts, and so on. Note that this is only one exemplary set of core services, and that other core services implementations may include a different combination of these services (i.e. a subset) and/or additional services which may be considered as "core" services.

Extended (or optional) services are also allowed. The extended services need not be provided by the provider of the core services, e.g., there may be a number of users who subscribe to one companies core services but only subscribe to third party extended services. Likewise, there may be a number of services providers who provide core services or extended services but not both. Thus, it should be understood that a core services provider may also provides extended services, or providers of core or extended services, or both, may be different entities.

Other benefits and advantages will become apparent from the following detailed description when taken in conjunction with the drawings, in which:

BRIEF DESCRIPTION OF THE DRAWINGS

FIGS. 11-19B comprise flow diagrams generally representing operation of the service-to-service communication protocol in accordance with one aspect of the present invention.

DETAILED DESCRIPTION

Exemplary Operating Environment

Figure 1:
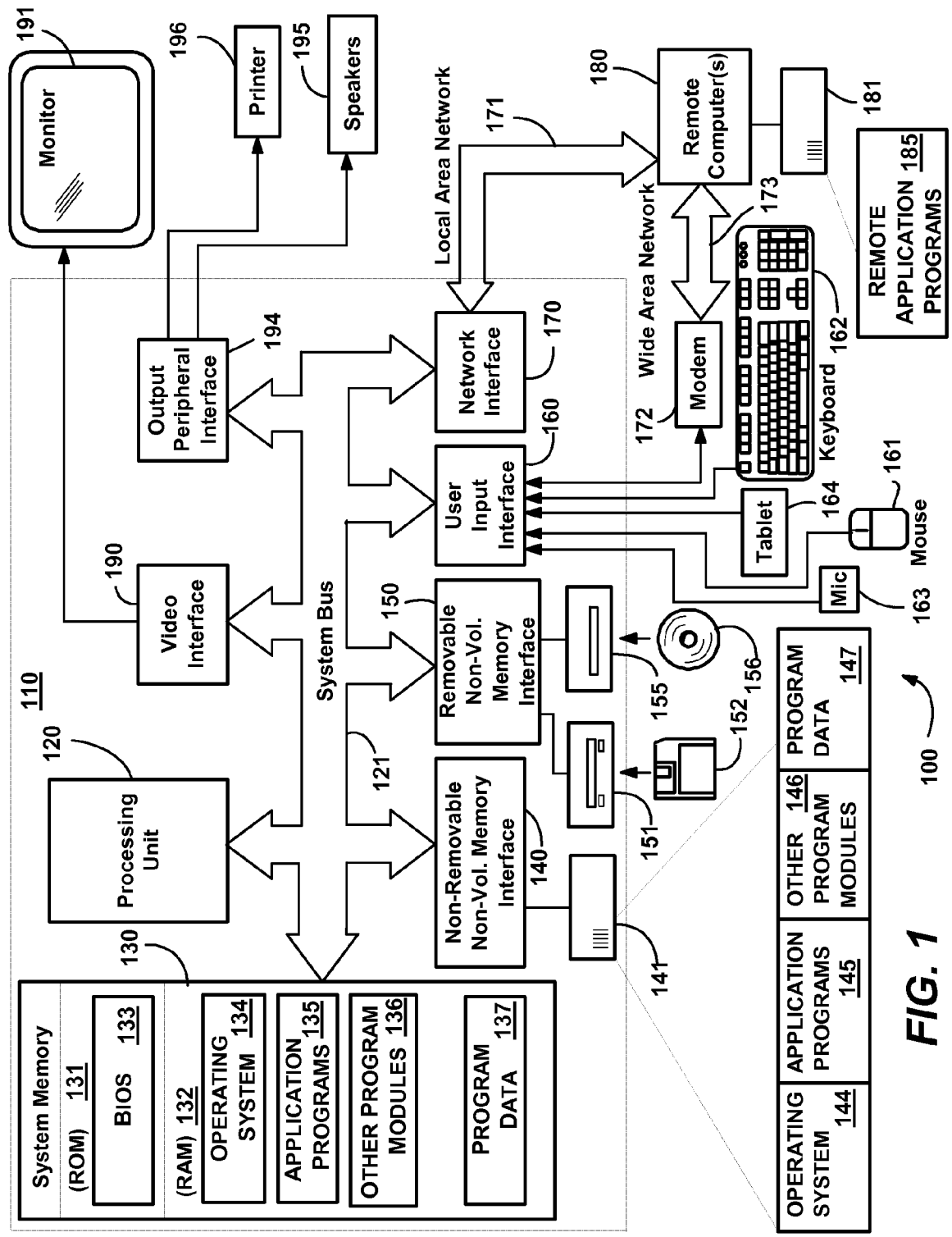
FIG. 1 is a block diagram generally representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Access Model

The present invention generally operates in an architecture/platform that connects network-based (e.g., Internet-based) applications, devices and services, and transforms them into a user's personal network which works on the user's behalf, and with permissions granted by the user. To this end, the present invention is generally directed to schema-based services that maintain user, group, corporate or other entity data in a commonly accessible virtual location, such as the Internet. The present invention is intended to scale to millions of users, and be stored reliably, and thus it is likely that a user's data will be distributed among and/or replicated to numerous storage devices, such as controlled via a server federation. As such, while the present invention will be generally described with respect to an identity-centric model that enables a user with an appropriate identity and credentials to access data by communicating with various core or other services, it is understood that the schema-based services described herein are arranged for handling the data of millions of users, sorted on a per-user-identity basis. Note that while "user" is generally employed herein for simplicity, as used herein the term "user" is really a substitute for any identity, which may be a user, a group, another entity, an event, a project, and so on.

Figure 2:
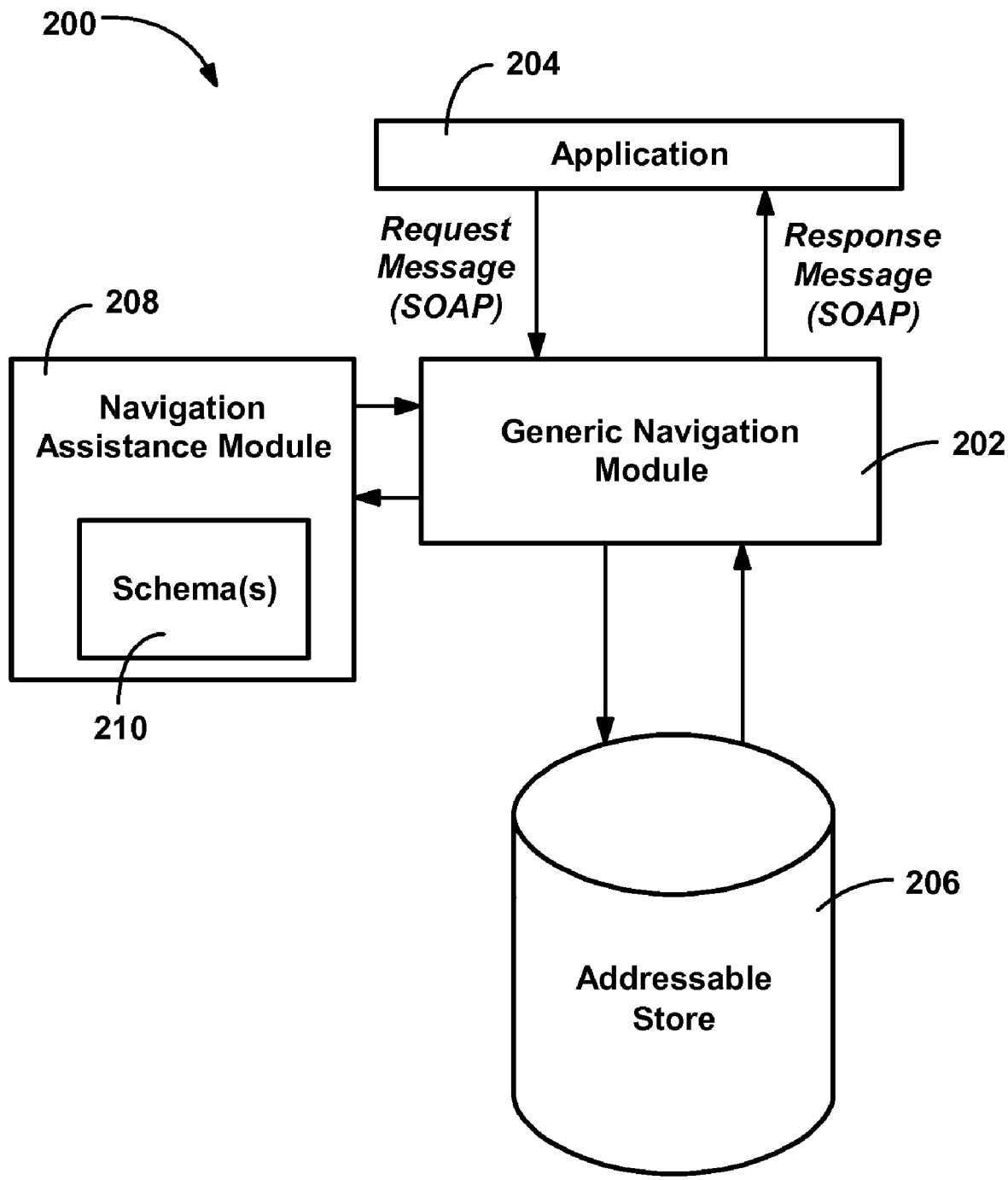
FIG. 2 is a block diagram generally representing a generic data access model in accordance with one aspect of the present invention.

As generally represented in FIG. 2, a data access model 200 includes a generic navigation module 202 through which applications 204 and the like may access a wide variety of identity-based data, such as maintained in an addressable store 206. To access the data, a common set of command methods may be used to perform operations on various data structures that are constructed from the data in the addressable store 206, even though each of those data structures may represent different data and be organized quite differently. Such command methods may describe generic operations that may be desired on a wide variety of data structures, and include, for example, insert, delete, replace, update, query or changequery methods.

In accordance with one aspect of the present invention and as described in detail below, the data is accessed according to various schemas, with the schemas corresponding to identity-based services through which users access their data. As used herein, a "schema" generally comprises a set of rules that define how a data structure may be organized, e.g., what elements are supported, in what order they appear, how many times they appear, and so on. In addition, a schema may define, via color-coding or other identification mechanisms, what portions of an XML document (that corresponds to the data structure) may be operated on. Examples of such XML-based documents are described below. The schema may also define how the structure of the XML document may be extended to include elements not expressly mentioned in the schema.

As will be understood below, the schemas vary depending on the type of data they are intended to organize, e.g., an email-inbox-related schema organizes data differently from a schema that organizes a user's favorite websites. Further, the services that employ schemas may vary. As such, the generic navigation module 202 has associated therewith a navigation assistance module 208 that includes or is otherwise associated with one or more schemas 210. As will be understood, a navigation assistance module 208 as represented in FIG. 2 corresponds to one or more services, and possesses the information that defines how to navigate through the various data structures, and may also indicate which command methods may be executed on what portions of the data structure. Although in FIG. 2 only one navigation assistance module 208 is shown coupled to the generic navigation module 202, there may be multiple navigation assistance modules that may each specialize as desired. For example, each navigation assistance module may correspond to one service. Moreover, although the navigation assistance module 208 is illustrated as a separate module, some or all of the operations of the navigation assistance module 208 may be incorporated into the generic navigation module 202, and vice versa. In one embodiment, the various data structures constructed from the schema and addressable store data may comprise XML documents of various XML classes. In that case, the navigation assistance module 208 may contain a schema associated with each of the classes of XML documents.

The present invention provides a number of schema-based services that facilitate data access based on the identity of a user. Preferably, the user need not obtain a separate identity for each service, but rather obtains a single identity via a single set of credentials, such as with the Microsoft® Passport online service. With such an identity, a user can access data via these services from virtually any network connectable device capable of running an application that can call the methods of a service.

Services and Schemas

".NET My Services" comprises identity-centric services which may be generally implemented in XML (extensible Markup Language) Message Interfaces (XMIs). While the present invention will be described with respect to XML and XMI, it can readily be appreciated that the present invention is not limited to any particular language or set of interfaces. The .NET My Services model essentially corresponds to one implementation of the generic data access model 200 of FIG. 2.

Figure 3:
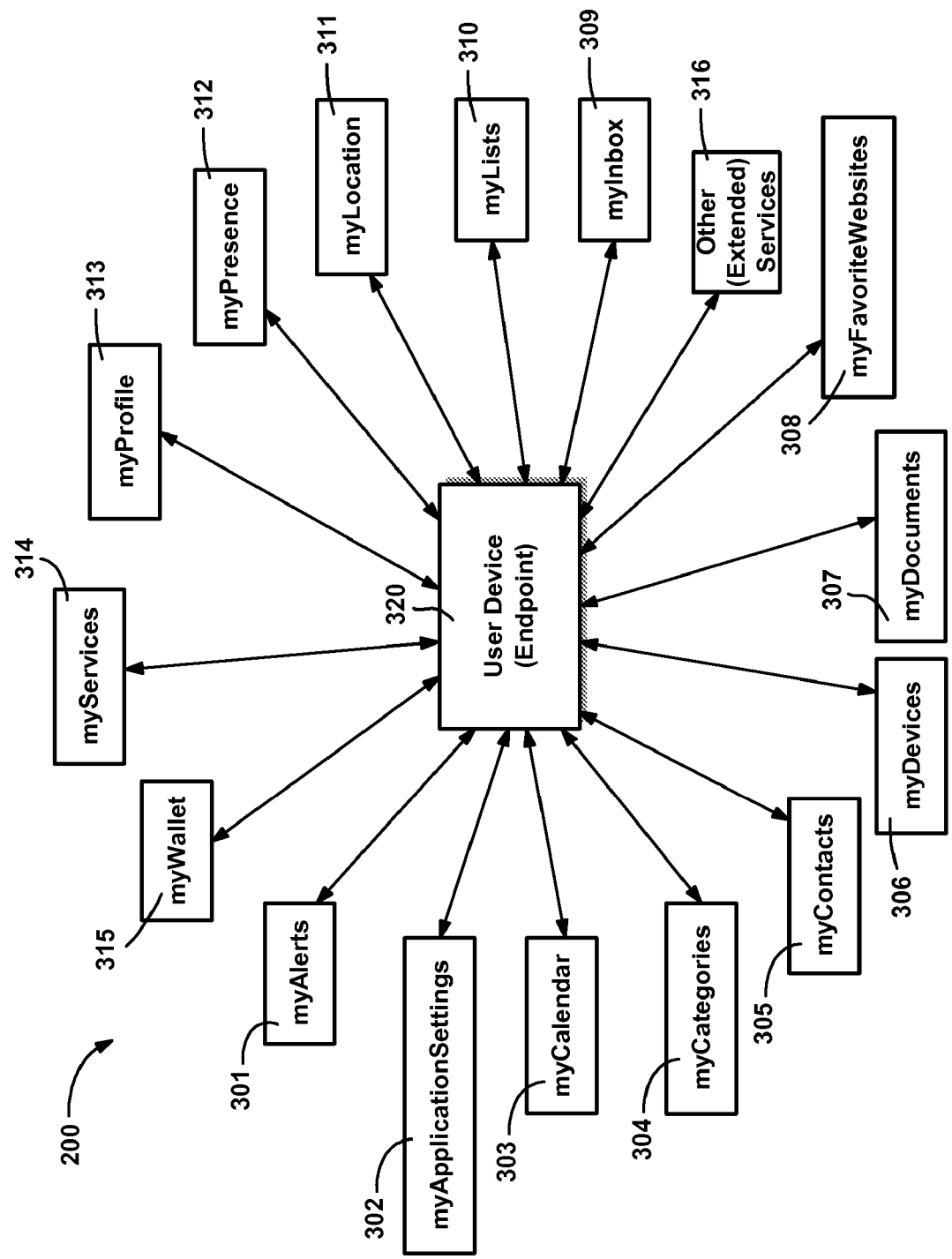
FIG. 3 is a representation of services for identity-based data access in accordance with one aspect of the present invention.

As generally represented in FIG. 3, .NET My Services 300 is implemented as a set of Web services 301-316, each bound to a .NET Identity (PUID, such as a Passport® unique identifier similar to a globally unique identifier when Passport® is the authentication service). The services 301-316 can communicate with one another via a service-to-service communications protocol (SSCP), described below. As also described below, each service presents itself as a set of XML documents that can be manipulated from an application program 202 (FIG. 2) or the like using a set of standard methods and domain-specific methods. To this end, a user device 320 (endpoint) running such application programs connects a user's applications to the services, and the data controlled by those services, such as over the Internet or an Intranet, such as over the Internet or an Intranet. Note that endpoints can be client devices, applications or services. In keeping with the present invention, virtually any device capable of executing software and connecting to a network in any means may thus give a user access to data that the user is allowed to access, such as the user's own data, or data that a friend or colleague has specified as being accessible to that particular user.

In general, a .NET Identity is an identifier assigned to an individual, a group of individuals, or some form of organization or project. Using this identifier, services bound to that identity can be located and manipulated. A general effect is that each identity (e.g., of a user, group or organization) has tied to it a set of services that are partitioned along schema boundaries and across different identities. As will be understood, the XML-document-centric architecture of .NET My Services provides a model for manipulating and communicating service state that is very different from prior data access models. The XML-document-centric approach, in conjunction with loose binding to the data exposed by the services, enables new classes of application programs. As will also be understood, the .NET My Services model 300 presents the various services 301-316 using a uniform and consistent service and method model, a uniform and consistent data access and manipulation model, and a uniform and consistent security authorization model.

In a preferred implementation, the .NET My Services model 300 is based upon open Internet standards. Services are accessed by means of SOAP (Simple Object Access Protocol) messages containing an XML payload. Service input and output is expressed as XML document outlines, and each of these document outlines conform to an XML schema document. The content is available to a user interacting with the .NET My Services service endpoint 320.

One aspect of the present invention is that a schema essentially describes a web service. More particularly, a service author begins to write a web service by defining a schema (e.g., in XML) that defines what the data model looks like, e.g., the supported elements, their relative ordering, how many times they appear, and other similar definitions, as will become apparent below. This service definition also applies to an author determining what roles and methods are supported, e.g., which operations are supported, and the extent of the data that can be returned for each method. Another way of stating this concept is that the author starts by building a complete definition of a service, such as in XML, and specifies the verbs (methods) that an application will use to talk to it.

At this point, the service author has an XML definition that has been declared, and this declarative definition may be run through a compilation process, resulting in a fully operational service. It should be noted that a general purpose interpreter-like mechanism may be fed one of these declarative XML definitions, and result in a service that is capable of operating. In a simple service (e.g., with no domain-specific methods or complex logic), no new code needs to be written to provide such an operational service. As will be understood, such authoring of a service without coding is possible due to the data driven model of the present architecture. As will be understood, however, code can also be written to influence and or work with the service generation process to add value to a service, and/or provide specific, runtime business logic that is not expressible in a declarative way.

Figure 4:
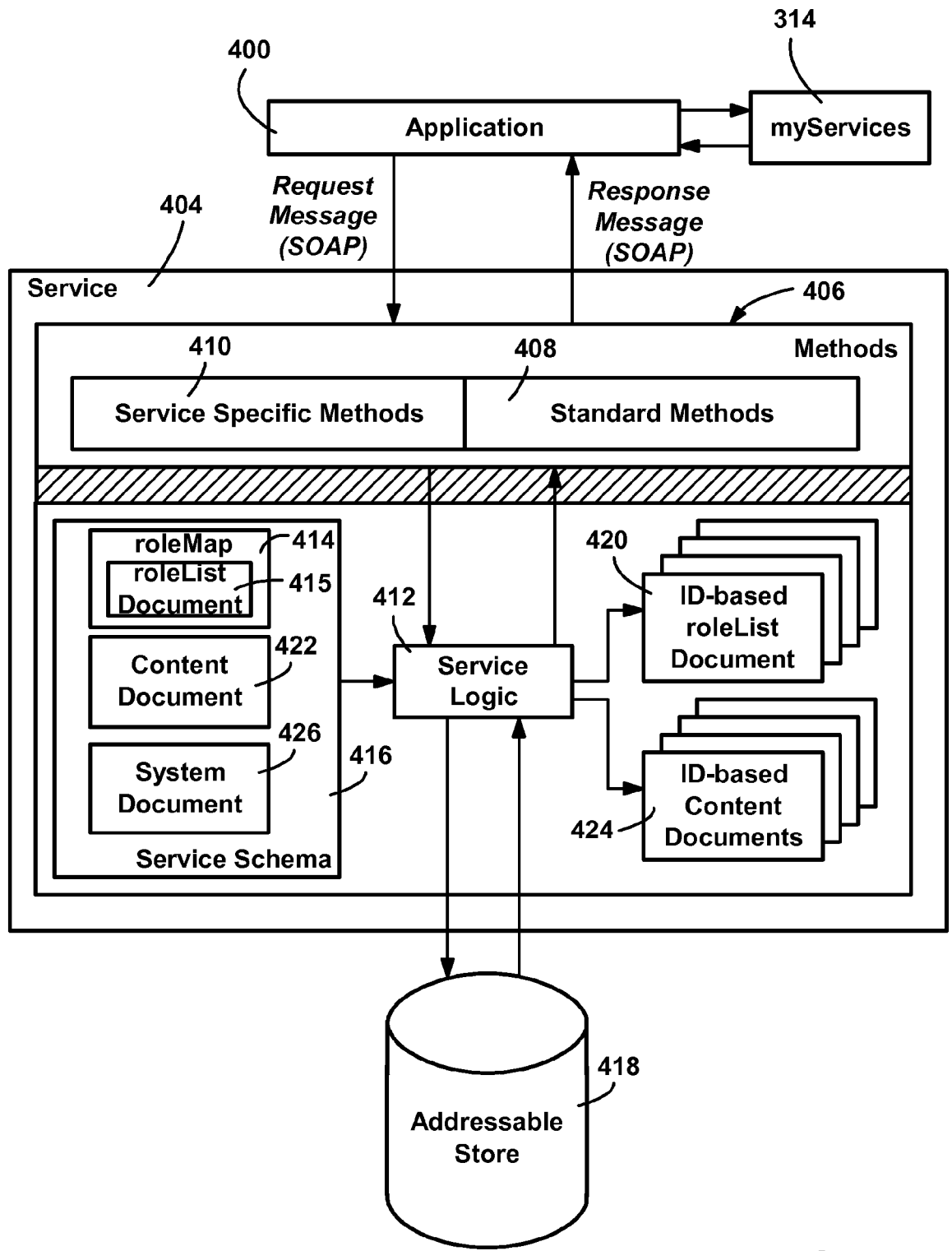
FIG. 4 is a block diagram generally representing a schema based service for accessing data arranged in a logical content document based on a defined schema for that service in accordance with one aspect of the present invention.

Turning to FIG. 4, in the .NET My Services model, an application 400 requests performance of a method that operates on data structures. The application may make a request that is generic with respect to the type of data structure being operated upon and without requiring dedicated executable code for manipulating data structures of any particular data type. To this end, the application first contacts a myServices service 314 (which may be referred to as .NET Service) to obtain the information needed to communicate with a particular service 404, through a set of methods 406 of that service 404. For example, the needed information received from the myServices service 314 includes a URI of that service 404. Note that the service 404 may correspond to essentially any of the services represented in FIG. 3. The myServices service 314 is further described below with respect to FIGS. 5A and 5B.

The service 404 includes or is otherwise associated with a set of methods 406 including standard methods 408, such as to handle requests directed to insert, delete, replace, update, query or changequery operations on the data. The set of methods of a particular service may also include service specific methods 410. In general, the only way in which an application can communicate with a service are via that service's methods.

Each service includes service logic 412 for handling requests and providing suitable responses. To this end, the service logic performs various functions such as authorization, authentication, and signature validation, and further limits valid users to only the data which they are permitted to access. The security aspect of a service is not discussed herein, except to note that in general, for otherwise valid users, the user's identity determines whether a user can access data in a requested manner. To this end, a roleMap 414 comprising service-wide roleList document templates 415 and scopes (e.g., part of the overall service's schema 416), in conjunction with user-based data maintained in an addressable store 418, determines whether a particular requested method is allowed, e.g., by forming an identity-based roleList document 420. If a method is allowed, the scope information in the roleMap 414 determines a shape of data to return, e.g., how much content is allowed to be accessed for this particular user for this particular request. The content is obtained in accordance with a content document 422 in the service's schema 416 and the actual user data corresponding to that content document in the addressable store 418. In this manner, a per-identity shaped content document 424 is essentially constructed for returning to the user, or for updating the addressable store, as appropriate for the method. Note that FIG. 4 includes a number of ID-based roleList documents and ID-based content documents, to emphasize that the service 406 is arranged to serve multiple users. Also, in FIG. 4, a system document 426 is present as part of the schema 416, as described below.

Returning to FIG. 3, in one implementation, access to .NET My Services 300 is accomplished using SOAP messages formatted with .NET My Services-specific header and body content. Each of the services will accept these messages by means of an HTTP POST operation, and generate a response by "piggy-backing" on the HTTP Response, or by issuing an HTTP POST to a .NET MyServices response-processing endpoint 320. In addition to HTTP as the message transfer protocol, .NET My Services will support raw SOAP over TCP, a transfer protocol known as Direct Internet Message Encapsulation (or DIME). Other protocols for transferring messages are feasible.

Because each of the .NET My Services services are accessed by protocol, no particular client-side binding code, object models, API layers, or equivalents are required, and are thus optional. The .NET My Services model will support Web Services Description Language (WSDL). It is not mandatory that applications wishing to interact with .NET My Services services make use of any particular bindings, and such bindings are not described herein. Instead, the present invention will be generally described in terms of messages that flow between requesters of a particular service and the service endpoints. In order to interact with .NET My Services, a service needs to format a .NET My Services message and deliver that message to a .NET My Services endpoint. In order to format a message, a client needs to manipulate XML document outlines, and typically perform some simple, known (public-domain) cryptographic operations on portions of the message.

In accordance with one aspect of the present invention, and as described in FIG. 4 and below, in one preferred implementation, each .NET My Services service presents three logical XML documents, a content document 422, roleList document 415 (of the roleMap 414), and a system document 426. These documents are addressable using .NET My Services message headers, and are manipulated using standard .NET My Services methods. In addition to these common methods, each service may include additional domain-specific methods. For example, as described below, the myCalendar service 303 might choose to expose a "getFreeBusy" method rather than expose free/busy as writeable fragments in the content document.

Each .NET My Services service thus logically includes a content document 422, which in general is the main, service-specific document. The schema for this document 422 is a function of the class of service, as will become apparent from the description of each service's schema below. For example, in the case of the myCalendar service 303, the content document presents data in the shape dictated by the myCalendar schema, whereas in the case of the myFavoriteWebSites service 308, the content document presents data in the shape dictated by a myFavoriteWebSites schema.

Each service also includes a roleList document 415 that contains roleList information, comprising information that governs access to the data and methods exported by the service 404. The roleList document is manipulated using the .NET standard data manipulation mechanisms. The shape of this document is governed by the .NET core schema's roleListType XML data type.

Each service also includes a system document 426, which contains service-specific system data such as the roleMap, schemaMap, messageMap, version information, and service specific global data. The document is manipulated using the standard .NET My Services data manipulation mechanism, although modifications are limited in a way that allows only the service itself to modify the document. The shape of this system document 426 may be governed by the system document schema for the particular service, in that each service may extend a base system document type with service specific information. For purposes of simplicity herein, the base system document is described once, rather than for each service, with only those services having extended service specific information separately described. Notwithstanding, it should be understood that each service includes at least the base system portion in its system document.

As is understood, the present invention is generally directed to schemas, which in general comprise a set of rules or standards that define how a particular type of data can be structured. Via the schemas, the meaning of data, rather than just the data itself, may be communicated between computer systems. For example, a computer device may recognize that a data structure that follows a particular address schema represents an address, enabling the computer to "understand" the component part of an address. The computer device may then perform intelligent actions based on the understanding that the data structure represents an address. Such actions may include, for example, the presentation of an action menu to the user that represents things to do with addresses. Schemas may be stored locally on a device and/or globally in a federation's "mega-store." A device can keep a locally-stored schema updated by subscribing to an event notification service (in this case, a schema update service) that automatically passes messages to the device when the schema is updated. Access to globally stored schemas is controlled by the security infrastructure.

General Schema Commonality

The .NET My Services data is defined using annotated XSD (eXtensible or XML Structure Definitions) schema files. The XSD files accurately type the data, but since XSD is a verbose and complex language, it is not a particularly efficient way to convey structure and meaning. Thus, for purposes of simplicity herein, the schemas are described below in terms of schema outlines with accompanying element/attribute descriptions. These document outlines accurately show the structure of the data contained within a service. However, because the present application is not viewable in color, the nodes, elements and/or attributes of the schema outlines (which may be described as bold blue, or blue), are represented in the schema outlines as boldface type. Those described as underlined red, or red, are represented as underlined type, while others referred to as black are represented in normal type.

The meaning of these bold (blue), underlined (red) and normal (black) items has significance with respect to the data model and to the data language that accesses and manipulates the data (e.g., via the insert, delete, replace, update, query, changequery or other methods). For example, each document described below contains a root element having an element name that matches that of the service, e.g., the myApplicationsSettings service has a root element named myApplicationsSettings. The .NET My Services name for this item is the root.

Documents contain elements that resemble first-class top-level objects, including, for example, <catDef/>, <myApplicationsSettings/> (other another name as appropriate) and <order/>. Such items are denoted in the outlines as bold (blue), and may be identified using an <xdb:blue/> tag. Bold (blue) items define major blocks of data within a service. These node sets are directly addressable by an identifier attribute, and their change status is tracked through a changeNumber attribute. Top-level bold blue items may be considered objects. As seen below, some bold (blue) objects contain nested bold blue objects. They usually contain frequently changing underlined (red) properties, which reduces the amount of synchronization traffic. Nested bold (blue) items may be considered property groups.

Each bold blue item contains one or more underlined (red) items which are elements or attributes. These items may be identified using the <xdb:red/> tag. These items are special in that they may be used within predicates (filters) to aid in xdb:bold blue selection. These items are also directly addressable and may be manipulated directly by the data manipulation language.

Each colored red element may contain one or more non-colorized elements and attributes, which are valid and semantically meaningful XML items in the service document. Such items are opaque to the data language. These uncolored (i.e., non-bold or underlined) elements and attributes may not be addressed directly, may not be selected in a node selection operation, and may not be used in a predicate node test. Note that if one of these items is in the path to an underlined red item, it may be used in a location step to the underlined red item, but may not be used as the selected node. Note that being opaque does not mean that the item is not considered during schema validation, but rather means that the item may not be used in a predicate, may not be directly addressed, and may not be inserted by itself. As can be readily appreciated, in this manner, the .NET My Services thus limits the granularity of access to nodes within the service document, since only xdb:bold blue and xdb:underlined red marked items are directly addressable, and only those elements and attributes tagged with the xdb:underlined red annotation may be used in predicates to influence node selection. Using this technique, the .NET My Services storage system can efficiently manage indexes, increase the performance of node selection, partially shred the document data, and in general (because the node selections are well defined) fine-tune the node selection logic on a per-xdb:blue basis. The primary purpose of the xdb:blue is to define a base-level XML object that is designed to be operated on as a unit. The primary purpose of the xdb:red items is to aid in the selection of xdb:bold blues. The xdb:red items may be changed by the data language primitives so some level of fine-grained manipulation of the data is available, but only in very limited ways.

Bold blue items have unique IDs, which are usually assigned by .NET My Services, and are returned from update operations within the new blueId node. In all cases, the order of xxxBold blue follows the pre-order traversal of the document XML tree. Item IDs are UUIDs in the following format (h stands for a hexadecimal digit): hhhhhhhh-hhhh-hhhh-hhhh-hhhhhhhhhhhh.

In addition to identifiers, names and change numbers, nodes and especially red nodes may include creator identifiers, category information, and {any} fields. Category information enables data to be grouped and/or distinguished in some way, such as to share certain calendar information with golf buddies, send an email to immediately family, designate things such as which telephone number is the user's primary number, e.g., if a user has a second home, and so on. Fields of type "any" may comprise fully-typed, namespace-qualified fields that contain any type of content (e.g., free-form XML) therein. Such "any" fields thus allow extensibility of the schema, yet maintain the defined structure of a schema.

In one implementation, the core data-manipulation language implemented by the .NET My Services includes an insertRequest, or insert message. This primitive inserts any schema-valid XML fragment into a selected context, thereby changing the existing state of the document. A queryRequest, or message, retrieves data, such as to retrieve a document. Multiple queries may be specified in one request, and queries that select nothing are considered successful. It is possible to assert that the number of nodes in the selection falls in a given range. This is expressed using minOccurs and maxOccurs attributes. If a minOccurs/maxOccurs test fails on any node, the request is considered unsuccessful. Note that this is different from a failure code, which would be returned, for example, for a malformed request.

A deleteRequest primitive deletes the selected nodes and all their children. Note that, just like for other requests, attributes may be selected as well as elements. Empty selections result in successful operations, similar to Query. The minOccurs/maxOccurs tests are supported wherever select is allowed.

A replaceRequest primitive (replace message) is designed to replace the content of each of the selected nodes with the specified new content. Selected nodes themselves are not affected in any way. This may be considered as an atomic delete of the content of the selected node, followed by an insert. The content (text, attributes, elements) in the selected nodes are replaced with the new item specified in this message. The node type of the selected node and of the replacement node are thus required to be the same. The changequery request essentially returns result comprising data that has changed.

As mentioned above, each of the services includes a RoleList document and scope information that describes which users have what type of access to which data. For example, a data owner will have read/write access to his or her own data, and can provide various types of rights to that data to other users based on their IDs, (e.g., read only to some users, read write to others). Each role list identifier may be associated with a scope, by which the kinds of data stored according to a given schema can be controlled per user. For example, a user can give a friend (with one identity) access via a service to a home telephone number, home address and so forth, but can give other users (with other identities) access only to a business telephone number. In general, a scope can be defined such that that it includes everything except any specifically listed items, or excludes everything except any specifically listed items.

Base System Document Items

The system document is a global document for each service, having content and meaning that is independent of the puid used to address the service. The document is read only to all users. Each system document contains a set of base items common to each .NET My Services service described herein, and is optionally extended by each service to include service-specific global information. Throughout the following examples, an "hs" as in <hs: scope . . . > represents the namespace or schematic that may be used to interpret the corresponding element. For purposes of avoiding repetition, any extended system information is separately described with respect to each service, and the following schema outline illustrates the layout and meaning of the information found in the base system document that is common among the services:

TABLE

/*actual service name*/ system

```
<sys:system changeNumber=" ..." instanceId=" ..."
   xmlns:hs=" http://schemas.microsoft.com/hs/2001/10/core"
   xmlns:sys=" http://schemas.microsoft.com/hs/2001/10The /*actual service name*/system" >_{1..1}
   <hs:systemVersion changeNumber=" ..." id=" ..." creator=" ..." >_{1..1}
      <hs:version majorVersion=" ..." minorVersion=" ..." buildNumber=" ..." qfe=" ..." >_{1..1}
         <hs:productReleaseName>_{1..1}</hs:productReleaseName>
         <hs:productImplementationName>_{1..1}</hs:productImplementationName>
      </hs:version>
      <hs:buildDate>_{1..1}</hs:buildDate>
      <hs:buildDetails machine=" ..." branch=" ..." type=" ..."official=" ..." >_{1..1}</hs:buildDetails>
   </hs:systemVersion>
   <hs:roleMap changeNumber=" ..." id=" ..." creator=" ..." >_{1..1}
      <hs:scope id=" ..." >_{0..unbounded}
         <hs:name xml:lang=" ..." dir=" ..." >_{0..unbounded}</hs:name>
         <hs:shape base=" ..." >_{1..1}
            <hs:include select=" ..." >_{0..unbounded}</hs:include>
            <hs:exclude select=" ..." >_{0..unbounded}</hs:exclude>
         </hs:shape>
      </hs:scope>
      <hs:roleTemplate name=" ..." priority=" ..." >_{0..unbounded}
         <hs:fullDescription xml:lang=" ..." dir=" ..." >_{0..1}</hs:fullDescription>
         <hs:method name=" ..." scopeRef=" ..." >_{0..unbounded}</hs:method>
      </hs:roleTemplate>
   </hs:roleMap>
   <hs:methodMap changeNumber=" ..." id=" ..." creator=" ..." >_{1..1}
      <hs:method name=" ..." >_{0..unbounded} {any}</hs:method>
   </hs:methodMap>
   <hs:schemaMap changeNumber=" ..." id=" ..." creator ..." >_{1..1}
      <hs:schema namespace=" ..."schemaLocation=" ..." alias=" ..." >_{0..unbounded} {any}</hs:schema>
   </hs:schemaMap>
   <hs:wsdlMap changeNumber=" ..." id=" ..." creator=" ..." >_{1..1}
      <hs:wsdl wsdlLocation=" ..." >_{0..unbounded} {any}</hs:wsdl>
      <hs:disco discoLocation=" ..." >_{0..unbounded} {any}</hs:disco>
      <hs:wsil wsilLocation=" ..." >_{0..unbounded} {any}</hs:wsil>
   </hs:wsdlMap>
   </any>
</sys:system>
```

The meaning of the attributes and elements shown in the preceding sample document outline follow, beginning with /system (minOccurs=1 maxOccurs=1), the element that encapsulates a system document common to the various services. Although each service has its own system document, the common system document attributes and elements are described once, for purposes of simplicity, with service-specific system document attributes and elements specified for each service, below. The /system/@changeNumber (minOccurs=0 maxOccurs=1) attribute is designed to facilitate caching of the element and its descendants. This attribute is assigned to this element by the .NET My Services system. The attribute is read-only to applications. Attempts to write this attribute are silently ignored.

The /system/@instanceId (string minOccurs=0 maxOccurs=1) attribute is a unique identifier typically assigned to the root element of a service. It is a read-only element and assigned by the .NET My Services system when a user is provisioned for a particular service.

The /system/systemVersion (minOccurs=1 maxOccurs=1) element defines version information describing this instance of the .NET My Services service. The /systemVersion/@changeNumber (minOccurs=0 maxOccurs=1) change- Number attribute is designed to facilitate caching of the element and its descendants. This attribute is assigned to this element by the .NET My Services system. The attribute is read-only to applications; attempts to write this attribute are silently ignored, (e.g., without generating an error).

The /system/systemVersion/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/systemVersion/@creator (string minOccurs=0 maxOccurs=1) attribute identifies the creator in terms of userId, appId, and platformId of the node. The /system/systemVersion/version (minOccurs=1 maxOccurs=1) element defines major, minor, and build number version information. The /system/systemVersion/version/@majorVersion (string minOccurs=0 maxOccurs=1) attribute specifies the major version number of the .NET My Services Service. The /system/systemVersion/version/@minorVersion (string minOccurs=0 maxOccurs=1) attribute specifies the minor version number of the .NET MyServices service. The /system/systemVersion/version/@buildNumber (string minOccurs=0 maxOccurs=1) attribute specifies the buildNumber of the .NET MyServices service. The /system/systemVersion/version/@qfe (string minOccurs=0 maxOccurs=1) attribute specifies the qfe version number of the .NET MyServices service. The /system/systemVersion/version/productReleaseName (string minOccurs=1 maxOccurs=1) element defines the major product release string (as in .NET My Services Beta 1, and so on). The /system/systemVersion/version/productImplementationName (anyURI minOccurs=1 maxOccurs=1) element defines the class of the service to differentiate between different implementations.

The /system/systemVersion/buildDate (dateTime minOccurs=1 maxOccurs=1) element defines the date and time that the .NET My Services system was built. The time is in UTC (Z relative) form. The /systemVersion/buildDetails (minOccurs=1 maxOccurs=1) element defines details of the build including the machine that generated the build, the branch id of the software that contributed to the build, the type of build (chk/fre), and if the build was generated by an official build release process.

The /system/systemVersion/buildDetails/@machine (string minOccurs=0 maxOccurs=1) attribute specifies the machine that generated the build. The system/systemVersion/buildDetails/@branch (string minOccurs=0 maxOccurs=1) attribute specifies the software branch id for the source code that contributed to this build. The /system/systemVersion/buildDetails/@type (string minOccurs=0 maxOccurs=1) attribute specifies the type of build. A value of chk indicates that this is a checked or debug build. A value of fre indicates that this is a retail build. The /system/systemVersion/buildDetails/@official (string minOccurs=0 maxOccurs=1) attribute indicates that the build was produced by an official build process (value of yes), or an unofficial process (value of no).

The /system/roleMap (minOccurs=1 maxOccurs=1) element encapsulates all the elements that make up a roleMap, which include document class relative roleTemplate, priority, name, method, and per-method scope. An individual roleTemplate defines the maximum scope of information, and the allowable methods used to access that information for each request mapped into the template. The /system/roleMap/ @changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /system/roleMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/roleMap/@creator (string minOccurs=0 maxOccurs=1) attribute identifies the creator in terms of userId, appId, and platformId of the node. The /system/roleMap/ scope (minOccurs=0 maxOccurs=unbounded) element defines a scope which may be referred to by roles within this roleMap to indicate what portions of the document are visible to this role for the specified method.

The /system/roleMap/scope/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/roleMap/scope/name (string minOccurs=0 maxOccurs=unbounded) node includes the /system/roleMap/scope/name/@xml:lang (minOccurs=1 maxOccurs=1) required attribute, which is used to specify an ISO 639 language code or an ISO 3166 country code as described in RFC 1766 (wherein ISO stands for International Organization for Standardization and RFC stands for Request For Comment). The value of this attribute indicates the language type of the content within this element. The /system/ roleMap/scope/name/@dir (string minOccurs=0 maxOccurs=1) optional attribute specifies the default layout direction for the localized string. Valid values are rtl (right to left), and ltr (left to right).

The /system/roleMap/scope/shape (minOccurs=1 maxOccurs=1) comprises a shape that defines the node set that is visible through the document when operating through this shape element. The /system/roleMap/scope/shape/@base (string minOccurs=0 maxOccurs=1) attribute specifies the initial set of nodes visible through the shape. A value of t indicates that the shape is initialized to include all possible nodes relative to the shape that is currently in effect. For instance, each role defines a scope containing a shape. When defining a shape for a role, the value t indicates all possible nodes available in the specified document for this role. When defining a shape in an ACL entry, a value of t means all of the nodes visible in the shape for the computed role. When using a shape in a data language (e.g., query, insert, replace and so on) operation, a value of t indicates all of the possible nodes selected by the data language operation (relative to the ACL shape which itself is relative to the role's shape). The value nil indicates the opposite of t, which is the empty node set. Nodes from this set may then be included into the shape.

The /system/roleMap/scope/shape/include (minOccurs=0 maxOccurs=unbounded) element specifies the set of nodes that should be included into the shape relative to the possible set of nodes indicated by the base attribute. The /system/ roleMap/scope/shape/include/@select (string minOccurs=0 maxOccurs=1) item specifies an XPATH expression that selects a set of nodes relative to the externally established context. The expression can never travel outside the node-set established by this externally established current context. The expression may match zero or more nodes, and the operation manipulates all selected nodes. The minOccurs and maxOccurs attributes are optional and place restrictions and limitations on the number of nodes selected.

The /system/roleMap/scope/shape/exclude (minOccurs=0 maxOccurs=unbounded) element specifies the set of nodes that should be excluded from the shape relative to the possible set of nodes indicated by the base attribute. The /system/roleMap/scope/shape/exclude/@select (string minOccurs=0 maxOccurs=1) item specifies an XPATH expression that selects a set of nodes relative to the externally established context. The expression can never travel outside the node-set established by this externally established current context. The expression may match zero (0) or more nodes, and the operation manipulates all selected nodes. The minOccurs and maxOccurs attributes are optional and place restrictions and limitations on the number of nodes selected. The /system/roleMap/roleTemplate (minOccurs=0 maxOccurs=unbounded) element encapsulates the definition of a role. The attribute set for this element includes the document class that this roleTemplate refers to, the name of the roleTemplate, and the priority of the roleTemplate.

The /system/roleMap/roleTemplate/@name (string minOccurs=0 maxOccurs=1) element specifies the name of the role. The /system/roleMap/roleTemplate/@priority (int minOccurs=0 maxOccurs=1) element specifies the priority of the roleTemplate which is used to select that actual roleTemplate when the role evaluation determines that the subject maps to multiple roleTemplates.

The /system/roleMap/roleTemplate/fullDescription (string minOccurs=0 maxOccurs=1) element contains a description of this role template which specifies the capabilities a caller will have when accessing information through this role. The /system/roleMap/roleTemplate/fullDescription/@xml:lang (minOccurs=1 maxOccurs=1) required attribute is used to specify an ISO 639 language code or an ISO 3166 country code as described in RFC 1766. The value of this attribute indicates the language type of the content within this element. The /system/roleMap/roleTemplate/fullDescription/@dir (string minOccurs=0 maxOccurs=1) optional attribute specifies the default layout direction for the localized string. Valid values are rtl (right to left), and ltr (left to right).

The /system/roleMap/roleTemplate/method (minOccurs=0 maxOccurs=unbounded) element specifies the methods available within this roleTemplate by name, and by scope. When a subject maps to a roleTemplate, the method in the request must match one of these elements for the message to continue to flow. If the method exists, the data available to the method is a function of the scope referenced by this method combined with an optional scope referenced by the role defined in the roleList.

The /system/roleMap/roleTemplate/method/@name (string minOccurs=0 maxOccurs=1) element specifies the name of the method. The /system/roleMap/roleTemplate/method/@scopeRef (string minOccurs=0 maxOccurs=1) attribute specifies the scope within this document that is in effect for this method. The /system/methodMap (minOccurs=1 maxOccurs=1) element defines the methodMap. While in most cases, the roleMap section contains a definitive list of methods, these methods are likely to be scattered about the roleMap in various templates. This section contains the definitive non-duplicated list of methods available within the service.

The /system/methodMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/methodMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/methodMap/@creator (string minOccurs=0 maxOccurs=1) attribute identifies the creator in terms of userId, appId, and platformId of the node.

The /system/methodMap/method (minOccurs=0 maxOccurs=unbounded) element defines a method that is available within this service. The /system/methodMap/method/@name (string minOccurs=0 maxOccurs=1) attribute specifies the name of a method available within the service. The /system/methodMap/method/{any} (minOccurs=0 maxOccurs=unbounded) provides for extensibility. The /system/schemaMap (minOccurs=1 maxOccurs=1) element defines the various schema's that define the data structures and shape of information managed by this service. Each schema is defined by its namespace URI, its location, and a preferred namespace alias.

The /system/schemaMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/schemaMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/schemaMap/@creator (string minOccurs=0 maxOccurs=1) attribute identifies the creator in terms of userId, appId, and platformId of the node. The /system/schemaMap/schema (minOccurs=0 maxOccurs=unbounded) element defines a schema which defines data-structures and the shape of information managed by this service. Multiple schema elements exist for each service, once for each logical grouping of information exposed by the service. The /system/schemaMap/schema/@namespace (anyURI minOccurs=0 maxOccurs=1) attribute specifies the namespace URI of this schema. The /system/schemaMap/schema/@schemaLocation (anyURI minOccurs=0 maxOccurs=1) attribute specifies the location (in the form of a URI) of the resource containing schema. When a schema is reachable through a variety of URIs, one schema element will exist for each location.

The /system/schemaMap/schema/@alias (string minOccurs=0 maxOccurs=1) attribute specifies the preferred alias that should be used if possible when manipulating information covered by this schema in the context of this service. The /system/schemaMap/schema/{any} (minOccurs=0 maxOccurs=unbounded) provides for extensibility. The /system/wsdlMap (minOccurs=1 maxOccurs=1) element defines the wsdlMap for this service. This map includes the location of WSDL documents, DISCO documents, and WSIL documents for this web service. These documents are used by applications to understand the format of messages that may be sent to the various services. The /system/wsdlMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/wsdlMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/wsdlMap/@creator (string minOccurs=0 maxOccurs=1) attribute identifies the creator in terms of userId, appId, and platformId of the node.

The /system/wsdlMap/wsdl (minOccurs=0 maxOccurs=unbounded) element is used to specify the location of a WSDL file for this service. Multiple entries may exist pointing to the same file hosted in multiple locations, or to variations on the content within the WSDL files.

The /system/wsdlMap/wsdl/@wsdlLocation (anyURI minOccurs=0 maxOccurs=1) attribute is a URI that specifies the location of the WSDL file. The /system/wsdlMap/wsdl/{any} (minOccurs=0 maxOccurs=unbounded) provides for extensibility.

The /system/wsdlMap/disco (minOccurs=0 maxOccurs=unbounded) element is used to specify the location of a DISCO (web-services discovery) file for this service. Multiple entries may exist pointing to the same file hosted in multiple locations, or to variations on the content within the DISCO files. The /system/wsdlMap/disco/@discoLocation (anyURI minOccurs=0 maxOccurs=1) attribute is a URI that specifies the location of the DISCO file. The /system/wsdlMap/disco/{any} (minOccurs=0 maxOccurs=unbounded) provides extensibility.

The /system/wsdlMap/wsil (minOccurs=0 maxOccurs=unbounded) element is used to specify the location of a WSIL file for this service. Multiple entries may exist pointing to the same file hosted in multiple locations, or to variations on the content within the WSIL files. The /system/wsdlMap/wsil/@wsilLocation (anyURI minOccurs=0 maxOccurs=1) attribute is a URI that specifies the location of the WSIL file. The /system/wsdlMap/wsil/{any} (minOccurs=0 maxOccurs=unbounded) provides extensibility.

Content Document Subscriptions

Each of the core services content documents described below (other than myServices, at present) include a subscription node that essentially takes action when items change, such as to propagate information about the change to other services. For simplicity and to avoid redundancy, the meaning of the subscription elements and attributes common to the content documents are described once, rather than for each service. The following table sets forth the subscription elements and attributes common to the core services content documents:

```
    :
    : (other service content)
    :
<m:subscription changeNumber="..." id="..." creator="...">$_{0..unbounded}$
    <hs:trigger select="..." mode="...">
```

-continued

```
        baseChangeNumber="...">$_{1..1}$</hs:trigger>
    <hs:expiresAt>$_{0..1}$</hs:expiresAt>
    <hs:context uri="...">$_{1..1}${any}</hs:context>
    <hs:to>$_{1..1}$</hs:to>
</m:subscription>
    :
    : (other service content)
    :
```

The /*actual service name*/subscription (minOccurs=0 maxOccurs=unbounded) element defines a subscription node that is designed to be an xdb:blue node which when placed in a content document causes a subscription to be registered, (wherein as used herein, the string "*actual service name*" referred to in this section can be replaced by an appropriate service name, e.g., "myApplicationSettings" or "myContacts" or "myWallet" and so forth). A subscription contains a trigger element which selects a scope of coverage. When items that are under this scope of coverage change, a subscriptionResponse message is generated and sent to the specified destination address.

The /*actual service name*/subscription/@changeNumber (minOccurs=0 maxOccurs=1) changeNumber attribute is designed to facilitate caching of the element and its descendants. This attribute is assigned to this element by the .NET My Services system, and the attribute is read-only to applications; attempts to write this attribute are silently ignored. The /*actual service name*/subscription/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /*actual service name*/subscription/@creator (string minOccurs=0 maxOccurs=1) attribute identifies the creator in terms of userId, appId, and platformId of the node. The /*actual service name*/subscription/trigger (minOccurs=1 maxOccurs=1) includes the /*actual service name*/subscription/trigger/@select (string minOccurs=0 maxOccurs=1) item, which specifies an XPATH expression that specifies the nodes that are to be selected and watched for changes. The selection may only select xdb:blue nodes, as described above. A s changes in this node set occur, they trigger the generation of a subscription message. These messages are then sent to the SOAP receiver listed in the "to" element.

The /*actual service name*/subscription/trigger/@mode (string minOccurs=0 maxOccurs=1) attribute specifies whether or not the content of the changes that triggered the subscription are delivered in the subscription message, or if the message simply indicates that something changed under the trigger. The attribute may comprise includeData, namely that the data that changed and caused the subscription to trigger is included in the subscription message. Note that deleted nodes are specified by their id, not by value. Alternatively the attribute may comprise excludeData, whereby the data that changed, causing the subscription to trigger, is not included in the subscription message.

The /*actual service name*/subscription/trigger/@baseChangeNumber (minOccurs=0 maxOccurs=1) attribute specifies the changeNumber value that the trigger is relative to. All changes between the specified change number, and the current state of the document relative to the selection are transmitted as subscription messages. This allows a client application to establish a subscription relative to some baseline. As in changeQuery, if the baseChangeNumber is way out of date relative to the current state of the document, and the service can not supply the changes in the subscription message, the subscription insert is rejected. A value of zero (0) means that the current values of the selected nodes are transmitted in the subscription message.

The /*actual service name*/subscription/expiresAt (dateTime minOccurs=0 maxOccurs=1) optional element specifies an absolute time after which the subscription is no longer active. The subscription node is automatically removed when the subscription expires. If this element is missing, the subscription does not expire. The /*actual service name*/subscription/context (minOccurs=1 maxOccurs=1) element returns the context element from the original subscription. Applications should use this element to correlate the subscription response with one of their subscriptions.

The /*actual service name*/subscription/context/@uri (anyURI minOccurs=0 maxOccurs=1) attribute specifies the URI value chosen by the subscriber that is associated with this subscription. The /*actual service name*/subscription/context/{any} (minOccurs=0 maxOccurs=unbounded) including the /*actual service name*/subscription/to (anyURI minOccurs=1 maxOccurs=1) attribute specifies the location that is to receive the subscription message. The value of this element may be hs:myAlerts, whereby this URI indicates that generated subscription messages are to be delivered inside the body of a notification and delivered to the default .NET Alerts service of the creator. Alternatively, the value may be protocol://service, whereby this URI indicates that generated subscription messages are delivered to the specified service at the domain of the creator's platformId. For example, a platformId indicating microsoft.com, and a value in this element of http://subscriptionResponse would cause delivery of the subscription message to http://subscriptionResponse.microsoft.com. If this value is not specified, then the subscription message is delivered as a notification to the "creator's" .NET Alerts service. The /*actual service name*/{any} (minOccurs=0 maxOccurs=unbounded) field allows for extensibility.

Core Service Schemas

A number of the services 301-315 (FIG. 2) are referred to as core services, which employ schemas to manage access to the data that most users will likely need. Other services, referred to as extended services 216, will also employ schemas in the same manner, but are more likely to be desirable to certain users and not others. Examples of extended schemas include services such as myPortfolio, myPhotos, myTravel, myMusic, myMovies, myTV, myWishlist, mySchool, myGroceries, myNews, mySports, myTopScores and so on. As will be understood, although the present invention will focus on the core schemas, the present invention is not limited to any schema in particular, but rather is directed to all such schemas. For purposes of organization, the various services and schemas will be described alphabetically by service name, with the one exception being that the "myServices" service will be described first, since applications typically call the myServices service first, in order to communicate with the other services. Note that this is only one exemplary set of core services, and that other core services implementations may include different services, a different combination of these services (i.e. a subset), and/or additional services which may be considered as "core" services. Also, note that the extended services need not be provided by the provider of the core services, e.g., there may be a number of users who subscribe to one companies core services but only subscribe to third party extended services. Likewise, there may be a number of services providers who provide core services or extended services but not both. Thus, it should be understood that a core services provider may also provides extended services, or providers of core or extended services, or both, may be different entities.

myServices

The myServices schema is an XML schema that describes the list of available other myServices for a given identity (i.e. person, organization, business). The myServices schema essentially serves a directory of what and where each of the myServices logically resides, as well as additional information used to identify the service in the use of general communication. Note that the myServices service that provides the URI (and other needed information) should not be confused with the general concept of ".NET My Services" as described above.

Issuing a query request to myServices is part of every application's initial responsibility to figure out where a desired service resides. More particularly, the myServices service 314 (FIG. 3) generally allows an application program to obtain the information (e.g., including a URI) needed to connect to another service. It should be noted that there are multiple instances of each such service, e.g., a provider such as MSN.com will have a different myInbox service instance than XYZ.com will have for its myInbox service, and indeed a single provider may have multiple instances of a service. Moreover, a single user may have email accounts at both MSN.com and XYZ.com, and different users may use the same application program to communicate with possibly many other instances of the myInbox service. As a result, an application program normally does not have URIs hard coded therein or initially cached for the many possible instances of the various services, so the application program contacts the myServices service 314 to determine the URI of a service for the current user. The application will of course know or otherwise be able to determine the URI of the myServices service 314. The information returned by the myServices service 314 can be cached thereafter, whereby the application can talk directly to the service desired. However, at any point in time, a given service may respond to the application with a 'not found here' type of error, which the application should respond to by again contacting the myServices service, as the user's service may have been moved.

An application program's query to myServices may result in multiple sets of information (e.g., multiple XML documents) being returned. For example, a user may have different email addresses and get information on different myInbox services returned in response to a single query. An application that can deal with such multiple sets, such as by prompting the user to select one, can use some or all of the information returned. One of the sets of information may be marked as a primary set, whereby applications that can only work with a single set may simply select the primary.

Figure 5A:
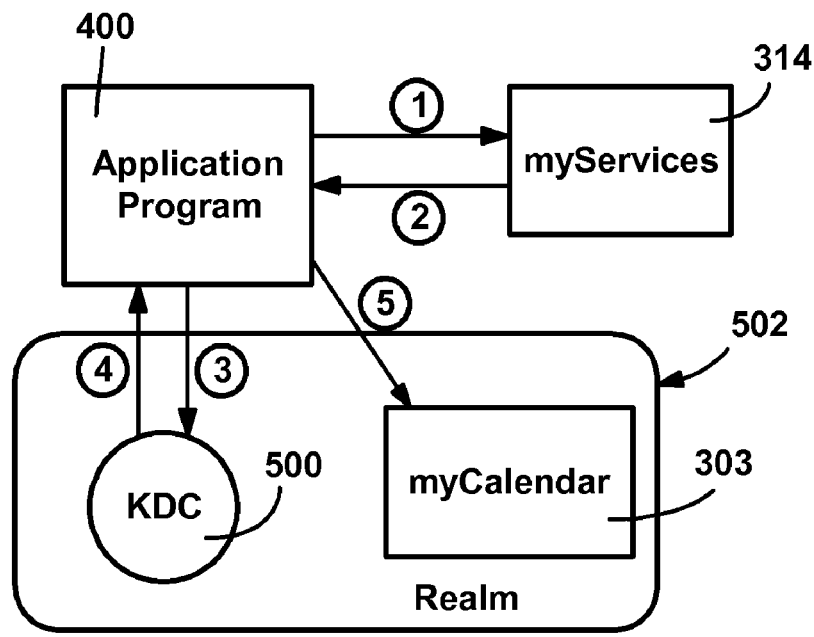
FIGS. 5A and 5B are block diagrams generally representing a mechanism for locating one service by communicating with another service in accordance with one aspect of the present invention.

Thus, the application program 400 queries the myServices service 314, represented in FIG. 5A by the arrow labeled with circled numeral one (1). In addition to the URI of the desired service instance, (e.g., the MyCalendar service 303), in order to communicate with the service 303 the application program 400 needs an identity license, for example a Kerberos ticket that identifies the user, application and credential type. To this end, the myServices service 314 returns the URI , a service principal name (spn), and realm information that corresponds to a Kerberos domain controller (KDC) 500, as represented in FIG. 5A by the arrow labeled with circled numeral two (2).

The application program 400 uses the spn to obtain the identity license from the KDC 500 based on the realm information, as represented via the arrows labeled three (3) and four (4), wherein a KDC 500 issues tickets for services in a particular realm 502. The application program 500 may then properly communicate with the myCalendar service 303 (arrow labeled five (5)).

Figure 5B:
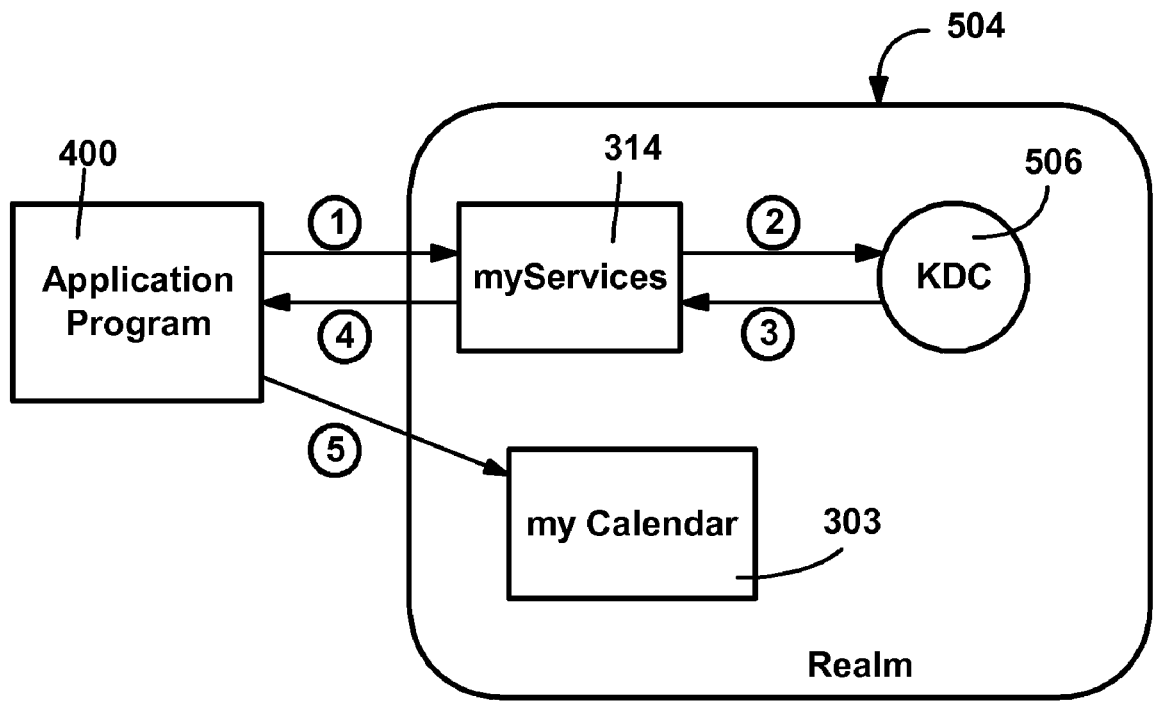

In an alternative implementation, represented in FIG. 5B, for efficiency, an instance of the myServices service 314 may be part of a realm 504 having a KDC 506. In response to the query (the arrow labeled one (1)), if the realm that the myServices service is part of is the same as the realm that would be returned to the application program 400, the myServices service 314 will instead automatically obtain the ticket for the application program 400, as represented in FIG. 5B via the arrows labeled two (2) and three (3). The license ticket is then directly returned, (arrow labeled four (4)), whereby the application program 500 may then properly communicate with the myCalendar service 303 (arrow labeled five (5)). Note that it is typically far faster for the myServices service to communicate with the KDC in its realm (e.g., in the same datacenter) than for an application program to do so over an Internet connection. It should be noted that a myServices instance can also be associated with multiple KDCs, and does not have to belong to any one realm. For example, a myServices service may be able to communicate with a Passport KDC, an MSN.com KDC, a hotmail.com KDC, and so forth. When an application program query results in a realm that corresponds to one of these KDCs, the myServices service can obtain the license ticket directly, as described above.

In most cases, the myServices entry serves as the definitive information for a given user and the service information. However, one possibility is that a myServices instance will not know the specifics of a particular user's needed information, e.g., the desired service's URI, realm and/or spn. In such an event, the myServices instance can refer the application program to another myServices instance by returning referral information (in a refer field) to the application program in response to the query. To this end, when a <refer> tag is found within a service entry, this means that the entry is a referral, and the <to> element actually points to another second tier myServices service. This capability is important for the ability to distribute the lookup information instead of having one centralized logical point of failure and updates. Ultimately the application program will obtain the address and other information of the desired .NET MyServices service. Note that it is possible for a response to include a referral and also include a license ticket, since a myServices instance may be connected to the appropriate KDC, but not have the URI of the desired service.

myServices/Roles

The myServices service controls access by using the roleTemplates, rt0, rt1, rt2, rt3, and rt99, using the following scopes:

```
scope allElements
   <hs:scope id=7215df55-e4af-449f-a8e4-72a1f7c6a987>
      <hs:shape base=t>
      </hs:shape>
   </hs:scope>
scope onlySelfElements
   <hs:scope id=a159c93d-4010-4460-bc34-5094c49c1633>
      <hs:shape base=nil>
         <hs:include select=//*[@creator='$callerId']/>
      </hs:shape>
```

-continued

```
   </hs:scope>
scope onlySelfSubscriptionElements
   <hs:scope id=b7f05a6d-75cd-4958-9dfb-f532ebb17743>
      <hs:shape base=nil>
         <hs:include select=//subscription[@creator='$callerId']/>
      </hs:shape>
   </hs:scope>
scope onlyPublicElements
   <hs:scope id=da025540-a0c0-470f-adcf-9f07e5a5ec8f>
      <hs:shape base=nil>
         <hs:include select=//*[cat/@ref='hs:public']/>
         <hs:include select=//subscription[@creator='$callerId']/>
      </hs:shape>
   </hs:scope>
```

The myServices roleTemplate rt0 role gives give complete read/write access to the information within the content document of the service being protected through this roleTemplate. The following table illustrates the available methods and the scope in effect when accessing the myServices service through that method while mapped to this roleTemplate.

TABLE

| myServices roleTemplate rt0 | |
|---|---|
| method | scope/name |
| query | allElements |
| insert | allElements |
| replace | allElements |
| delete | allElements |
| update | allElements |

The myServices roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myServices service through that method while mapped to this roleTemplate:

TABLE

| myServices roleTemplate rt1 | |
|---|---|
| method | scope/name |
| Query | allElements |
| Insert | onlySelfElements |
| Replace | onlySelfElements |
| Delete | onlySelfElements |

The myServices roleTemplate rt2 gives complete read access to all information within the content document of the service being protected through this roleTemplate. Applications mapping to this role have very limited write access and are only able to create and manipulate their own subscription nodes. The following table illustrates the available methods and the scope in effect when accessing the myServices service through that method while mapped to this roleTemplate.

TABLE

| \_\_\_myServices roleTemplate rt2\_\_\_ | |
| --- | --- |
| method | scope/name |
| query | allElements |
| insert | onlySelfSubscriptionElements |
| replace | onlySelfSubscriptionElements |
| delete | onlySelfSubscriptionElements |

The myServices roleTemplate rt3 gives limited read access to information within the content document that is categorized as "public." The following table illustrates the available methods and the scope in effect when accessing the myServices service through that method while mapped to this roleTemplate:

TABLE

| \_\_\_myServices roleTemplate rt3\_\_\_ | |
| --- | --- |
| method | scope/name |
| query | onlyPublicElements |

The myServices roleTemplate rt99 blocks access to the content document. Note that lack of a role in the roleList has the same effect as assigning someone to rt99. The following table illustrates that there are no available methods and the scope in effect when accessing the myServices service through that method while mapped to this roleTemplate (note that in other services described herein, such an empty table will not be repeated):

TABLE

| myServices roleTemplate rt99 | |
| --- | --- |
| method | scope/name | myServices/Content

The content document is an identity centric document. It's content and meaning is a function of the puid used to address the service. Accessing the document is controlled by the associated roleList document.

This schema outline illustrates the layout and meaning of the information found in the content document for the myServices service:

```
<m:.myServices changeNumber="..." instanceId="..."
  xmlns:m="http://schemas.microsoft.com/hs/2001/10/myServices"
  xmlns:hs="http://schemas.microsoft.com/hs/2001/10/core">_{1..1}
  <m:service name="..." changeNumber="..." id="..."
    creator="...">_{0..unbounded}
    <m:cat ref="...">_{0..unbounded}</m:cat>
    <m:key puid="..." instance="..." cluster="...">_{0..1}</m:key>
    <m:refer>_{0..1}</m:refer>
    <m:to>_{1..1}</m:to>
    <m:spn>_{1..1}</m:spn>
    <m:realm>_{1..1}</m:realm>
    {any}
  </m:service>
  {any}
</m:.myServices>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myServices (minOccurs=1 maxOccurs=1) element encapsulates the content document for the service. The /myServices/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myServices/@instanceId (string minOccurs=0 maxOccurs=1) attribute is a unique identifier typically assigned to the root element of a service. It is a read-only element and assigned by the .NET My Services system when a user is provisioned for a particular service.

The /myServices/service (minOccurs=0 maxOccurs=unbounded) node includes a /myServices/service/@name (string minOccurs=0 maxOccurs=1) element which contains the name of the service being accessed by this request message. For example, to access the .NET Profile service, this attribute will have the value "myProfile".

The /myServices/service/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myServices/service/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myServices/service/@creator (string minOccurs=0 maxOccurs=1) attribute identifies the creator in terms of useId, appId, and platformId of the node.

The /myServices/service/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myServices/service/cat/@ref (anyURI minOccurs=0 maxOccurs=1) attribute references a category definition (<catDef/>) element using the rules outlined below in the myCategories section of the present application.

The /myServices/service/key (minOccurs=0 maxOccurs=1) element specifies key information used to zoom in on a document being manipulated. This information includes the identifier (puid) of the entity that owns the document, the instance identifier of the document, and the cluster or partition key used to locate the machine resources that hold the document.

In certain situations, a client will want to send the same message to a number of instances of a particular service. In order to do this, the client may repeat this element multiple times. The cluster attributes in all elements must match each other, but the puid and instance attributes may differ. A unique response message is generated for each key specified. The entire contents of this element come from the myServices service 314 (FIG. 3).

The /myServices/service/key/@puid (string minOccurs=0 maxOccurs=1) element specifies the PUID of the entity that "owns" the service being accessed. In the case of a "myProfile" service, this element is equivalent to the "my". The puid may be used to automatically connect to another set of information for the user. By way of example, consider a user with a two puids, such as a work puid and a home puid. The puid field can contain the user's other puid, which allows one or more instances of a desired service to operate as if the user connected with both.

The /myServices/service/key/@instance (string minOccurs=0 maxOccurs=1) element specifies the particular instance of the service for this id being accessed. For example, if a given id is provisioned with multiple .NET Calendar documents on the same cluster and in the same data center, the documents would differ only by this value. In other words, while services are generally thought of as constructing a document per user identifier, in actuality more than one instance may exist for a given user. For example, a user, with the same puid, may have personal calendar, a work calendar, a top secret calendar, and so forth, each of which corresponds to an instance. The instance id identifies from which instance a user wants to access data.

The /myServices/service/key/@cluster (string minOccurs=0 maxOccurs=1) element specifies information used by the .NET My Services system to locate the document on a particular back-end server or database. It is used as the virtual partition key for the document being addressed. This technique is preferable to computing this partition key based on some hash of the puid/instance. If the data is later moved to another back-end server or database, the application will need to go back to myServices to obtain its new location.

The /myServices/service/refer (string minOccurs=0 maxOccurs=1) element specifies whether the fields below are for a referral, as described above.

The /myServices/service/to (string minOccurs=1 maxOccurs=1) element specifies the destination URI (typically a URL), e.g., either of the desired service or of a referral address.

The /myServices/service/spn (string minOccurs=1 maxOccurs=1) element specifies the spn needed that may be needed to obtain a license from a KDC, as described above with reference to FIG. 5A. The /myServices/service/realm (string minOccurs=1 maxOccurs=1) element specifies the authentication realm for the spn in question, as also described above.

The /myServices/service/{any} (minOccurs=0 maxOccurs=unbounded) and /myServices/{any} (minOccurs=0 maxOccurs=unbounded) fields allow extensibility of the myServices service. For example, if a license was returned directly by the myServices service as described above with respect to FIG. 5B, then the license data may be returned in an {any} field. Alternatively, a dedicated <license> field may be built into the myServices content document.

myServices/System

The myServices system document includes the set of base items common to each of the .NET My Services, as described above. At present, the myServices system document is not optionally extended. Hereinafter, only services with system documents having extended items will include such a separate system section, although it should be understood that each service has a system document corresponding to at least the base system document.

myAlerts

The Microsoft® .NET Alerts service, generally referred to as myAlerts, provides a single point where short messages can be sent to a specific user and transparently routed to that user's applications or devices. This particular service uses an XML schema to describe Alerts, and the methods by which Alerts can be sent and received. In general, the myAlerts service processes alerts (also referred to as notifications and/or events).

In keeping with the present invention, an alert is defined as embeddable XML, specifying both standard schema and extensible problem-domain schema, using the problem-domain schema as alert typing. The standard schema is generally directed to conveying alerts, regardless of what the alert is trying to convey. The problem-domain schema extension is used in a dynamically programmable Alert processing mechanism to control alert routing. Like other .NET My Services, .NET Alerts is designed to service the user instead of a particular device or application. Although alerts are posted to a single location, the messages are transparently routed to one or more of the user's applications or devices. The logic for deciding how, where, and when a message is delivered can be customized to meet the needs of a particular user, device, or application.

The myAlerts service includes mechanisms to deliver alerts, comprising a basic model mechanism that provides the baseline functionality of sending and receiving alerts. A streams model mechanism includes more robust features, such as filtering, buffering, and persistence, as well as more refined control over the routing of alerts.

As used herein, a client is any entity that can issue an XMI request to the .NET Alerts service. Clients can send or receive alerts, wherein an alert typically comprises a short XML message delivered to one or more users by .NET Alerts. A receiver is a .NET My Services user who has one or more applications that can receive alerts. Such an application is referred to herein as a userAgent. A userAgent includes any code on any device that can communicate with .NET Alerts.

Figure 7:
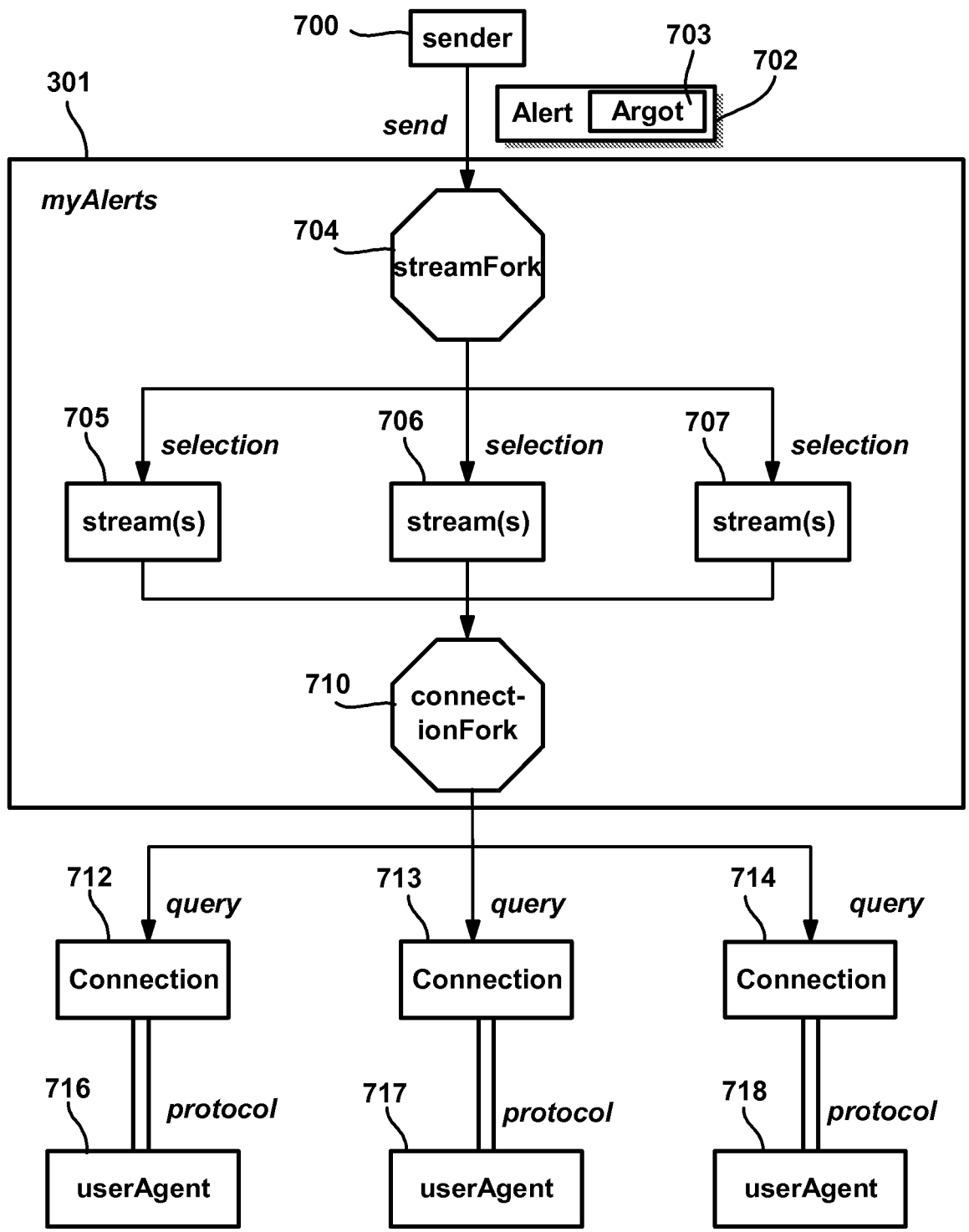
FIG. 7 is a block diagram generally representing an arrangement of an alerts service in accordance with one aspect of the present invention.

The myAlerts service provides a variety of ways to communicate with userAgents. For example, as generally represented in FIG. 7, a sender 700 may send an alert 702 by issuing an XMI request to the myAlerts service 301. The sender 700 can send alerts to the sender's own user, or to another user. Senders and most userAgents are clients because they issue XMI requests to the myAlerts service to send or receive alerts. Because myAlerts supports non-XMI protocols to deliver alerts to userAgents, some userAgents are not clients.

UserAgents 716-718 create connections 712-714, respectively, to receive alerts. Each connection (e.g., 712) has a query that selects which alerts the connection 712 will forward to its respective userAgent 716. The connection 712 will use a particular protocol to deliver alerts to the userAgent 716; different connection types may provide different protocols for a userAgent. As the .NET Alerts service receives alerts, it routes them to zero or more connections, depending on the queries for each connection.

To send an alert 702, a client sender 700 issues a notify method request to a user's myAlerts service 301. To receive alerts, a userAgent (e.g., 716) issues an insert method request to create a connection 716 in the myAlerts content document, and then processes the resulting connection protocol to receive incoming alerts. Different connection types can support different alerts and userAgent protocols (for example, SOAP/XMI over HTTP, TCP/DIME, and UDP), and can also include SIP or other non-XMI protocols. Connections generally fall into Push Connections, wherein the myAlerts service proactively pushes an alert to a userAgent, or Pull Connections, wherein the userAgent proactively pulls an alert from the myAlerts service. This requires some alert buffering.

In general, each alert 702 is a snippet of XML passed to and from the myAlerts service 301 embedded within XMI method request and response packets. The lifetime (and position) of an alert is transitory. Therefore, alerts are not part of the user content document. Alerts are proactively sent to the myAlerts service or to userAgents with the notify method, described below. Alerts are proactively pulled from the myAlerts service with the poll method, also described below.

Argots 703 are XML blobs (e.g., strongly-named {any} fields) that may be placed in an alert to convey problem domain-specific data. The outer element name defines the argot; the inner contents of the argot are opaque to general myAlerts processing. At present, argots may be represented formally and informally. An argot is formally declared through an outer argot element, and its name is specified through the argotURI attribute. The actual content of the argot is specified in sub-elements. The formal representation of argots may change to the informal representation in future versions. Informally declared argots are simply declared as an XML element. In this case, the argot name is the name of that element. Such an argot can have sub-elements, as appropriate.

The myAlerts service expects informal argots within the contents element of an alert. The xpQuery element for both streams and connections defines a query against the argot names within the contents element. For example, an xpQuery value of "humanReadable" in a connection causes that connection to get only alerts that contain the humanReadable argot in their contents. To match all argots, an asterisk ("*") may be specified in the xpQuery value.

The myAlerts service expects formal argots in some of the stream and connection document methods. For example, the push connection requires the pushConnectionParameters formal argot in insert and replace methods, and generates it for query methods.

As generally represented in FIG. 7, a streams model is also provided. Unlike the basic model, the streams model provides a mechanism to filter, buffer, persist, or intelligently control the routing of alerts. A stream of alerts is a set of alerts that match an argot query. The argot query specifies a relation of argot types; an alert is in the stream if it contains argots that match the stream query. To include alerts in a stream, an asterisk ("*") may be used, or a set of argot types (for example, "humanReadable") can be specified to include a subset.

A stream (e.g., 705) is an object inside a user's myAlerts service 301 that defines and manages a stream of alerts as they are routed to the user's connections. Clients can create and provision one or more streams to control the alert routing for a user. A user may have multiple streams 705-707 to control different streams of alerts. Multiple streams are supported because a user will often receive different types of alerts, each requiring its own filtering, buffering, and so on. For example, the myAlerts service 301 may focus on human-oriented alerts to implement a stream that controls alerts containing the humanReadable argot. Other services or applications will define their own argots, and will want to control the processing of their alerts.

Clients create, manage, and delete streams through XMI requests to a user's .NET Alerts content document. Generally, a stream operates in four steps:

1. Instantiate—the stream is instantiated from a stream class and provisioned to control its behavior.
2. Select—the stream will select the alerts to process as they arrive.
3. Process—the stream processes its selected alerts.
4. Route—the stream routes its alerts to other streams or to connections for delivery to one or more userAgents.

These steps are formalized in three objects inside the alert routing, namely streamFork 704, stream (e.g., the stream 706) and connectionFork (710). When an alert 702 is received by the myAlerts service 301, the streamFork 704 decides the order in which to invoke streams 705-707 on the alert 702. When invoked, each stream will determine whether to handle the alert and whether to continue or stop the streamFork processing. A stream (e.g., the stream 706) can handle or ignore an alert, and can also allow or inhibit later streams from handling the alert.

Each of the streams 705-707 then applies its processing algorithm and state to the alerts they handle. A stream can reroute the alert to other streams by continuing or restarting the streamFork process. A stream can deliver an alert by passing it on to the connections through the connectionFork 710.

The connectionFork 710 controls communication between streams and connections 712-714, processing and optimizing execution of the connection queries to match alerts to the appropriate connections. Conceptually, as represented in FIG. 7, alerts (e.g., the alert 702) moves forward from the sender 700, through the streamFork 704, through zero or more streams 705-707, through the connectionFork 710, through zero or more connections 712-714, to connected userAgents 716-718. Streams 705-707 can push alerts to connections 712-714 or connections 712-714 can pull alerts from streams 705-707. This will match the type of connections (that is, push or pull).

Stream types provide different alert handling algorithms. Five possible stream capabilities includes:

1. Simple Stream—selects a set of alerts and immediately passes them to any/all connections. This is the default stream for myAlerts and is always implemented by the streamFork. It provides no buffering; alerts are immediately delivered through existing connections and then discarded. When they are not connected, userAgents miss all alerts.
2. Buffering Stream—selects a subset of alerts and buffers them for some period of time. Alerts are passed to a connection when the connection can process the alert. Stream buffering allows a connection to deliver alerts received before the connection was created or across delays and failures in the connection's protocol.
3. Privacy Stream—selects and filters a subset of alerts according to a set of privacy or safety rules. The stream will choose to discard or deliver an alert based on its rules. Typically, a privacy stream will take sole possession of its subset of alerts.
4. Routing Stream—selects a subset of alerts and changes their routing, controlling which succeeding streams or connections will process the alert. Routing streams can insert or remove alerts from the alert streams.
5. External Stream—delegates the actual stream algorithm and state to an object external to the myAlerts provider. The external stream type specifies and implements an XMI application programming interface (API) for the external object.

The myAlerts architecture declares the ordering and non-ordering of alert delivery through a connection. However, alert buffering, multiple streams, and intra-user federation can make it difficult to guarantee ordering, and arbitrary rerouting of alerts by routing streams can make ordering impossible. A virtual stream is the aggregate set of alerts delivered through a particular connection. The order in a virtual stream will be defined by the set of streams contributing alerts to the virtual stream. Simple, buffering, and privacy streams are required to maintain a standard ordering of oldest to newest alerts in a virtual stream. Routing and external streams are also required to maintain that order. Alerts that are inserted into the stream need to be new; an old alert cannot be reinserted out of order or multiple times.

One implementation of myAlerts provides a streamDefault stream class, which always exists and is not reflected in the user's content document, and a streamBuffer stream class. This stream will buffer up to one-hundred of the alerts it selects in memory. Note the number one-hundred is arbitrary, and was just selected as a suitable number for this implementation.

Two connection classes are implemented in one current implementation of myAlerts, namely a pushConnection, wherein the connection will push an alert to an URL by issuing an XMI notify method request, and a pullConnection, wherein the userAgent will issue XMI poll method requests to the connection to retrieve alerts.

The alert schema contains both standard and problem-domain specific portions. The present invention types the problem-domain portions as argots and allows that typing to define the essential semantic naming shared between alert senders and receivers.

The schema for the alert processing mechanism contains both stream objects which control alert processing within our service and connection objects which control delivery and protocol to external user agents. Both types of objects select and process alerts based on the argots contained in each alert, through the argotQuery element that specifies a standing query against received and persisted alerts.

In addition, new methods are provided, described below, including:
1. Notify—to transmit one or more alerts from a sender to a receiver
2. Poll—for a user agent to pull one or more alerts through a connection from our service
3. Route—to perform complex and privileged routing within our service
4. Do—to request a stream or connection object to perform an action myAlerts/Roles The myAlerts service controls access by using the rt0, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
```

-continued

```
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myAlerts roleTemplate rt0 role gives complete read/write access to the information within the content document of the service being protected through this roleTemplate. The following table illustrates the available methods and the scope in effect when accessing the myAlerts service through that method while mapped to this roleTemplate:

TABLE

| myAlerts roleTemplate rt0 | |
| --- | --- |
| method | scope/name |
| query | allElements |
| insert | allElements |
| replace | allElements |
| delete | allElements |
| update | allElements |
| update | allElements |
| notify | allElements |
| poll | allElements |

The myAlerts roleTemplate rt3 role gives limited read access to information within the content document that is categorized as "public". Applications mapping to this role have very limited write access and are only able to create and manipulate their own subscription nodes. The following table illustrates the available methods and the scope in effect when accessing the myAlerts service through that method while mapped to this roleTemplate:

TABLE

| myAlerts roleTemplate rt3 | |
| --- | --- |
| method | scope/name |
| query | onlyPublicElements |
| Notify | allElements |

The myAlerts roleTemplate rt99 blocks access to the content document. Note that lack of a role in the roleList has the same effect as assigning someone to rt99.

myAlerts /Notification

Each alert comprises XML embedded within an XMI method packet or privately stored by the .NET Alerts service. The following is the structure of an alert:

```
<m:notification id="..."
  xmlns:m="http://schemas.microsoft.com/hs/2001/10/myAlerts"
  xmlns:hs="http://schemas.microsoft.com/hs/2001/10/core">$_{0..unbounded}$
  <m:from>$_{1..1}$
    <m:identityHeader type="...">$_{0..1}$
      <m:onBehalfOfUser>$_{1..1}$</m:onBehalfOfUser>
      <m:licenseHolder>$_{1..1}$</m:licenseHolder>
      <m:platformId>$_{1..1}$</m:platformId>
    </m:identityHeader>
    <m:expiresAt ttl="..." onDate="..." replace="...">$_{0..1}$</m:expiresAt>
    <m:acknowledge>$_{0..1}$</m:acknowledge>
```

-continued

```
    <m:category id="...">₀..₁</m:category>
  </m:from>
  <m:to>₀..₁
    <m:originalUser>₀..₁</m:originalUser>
  </m:to>
  <m:contents>₁..₁ {any}</m:contents>
  <m:routing>₁..₁
    <m:timestamp>₀..₁</m:timestamp>
    <m:hops>₀..₁</m:hops>
  </m:routing>
</m:notification>
```

The /notification (minOccurs=0 maxOccurs=unbounded) provides for zero or more alerts in the buffer of the streamBuffer stream. The /notification/@id (string minOccurs=0 maxOccurs=1) is an identifier of the alert (notification), while the /notification/from (minOccurs=1 maxOccurs=1) tag contains data from the sender, including sender authentication as well as preferences and requests from the sender.

The /notification/from/identityHeader (minOccurs=0 maxOccurs=1) includes /notification/from/identityHeader/@type (string minOccurs=0 maxOccurs=1) and /notification/from/identityHeader/on BehalfOfUser (minOccurs=1 maxOccurs=1). The uuidType is used to specify a universally unique identifier (UUID). The /notification/from/identityHeader/licenseHolder (minOccurs=1 maxOccurs=1) uuidType is used to specify a universally unique identifier (UUID).

The /notification/from/identityHeader/platformId (min Occurs=1 maxOccurs=1) uuidType is used to specify a universally unique identifier (UUID). The /notification/from/expiresAt (string minOccurs=0 maxOccurs=1) is directed to expiration time of an alert, including /notification/from/expiresAt/@ttl (string minOccurs=0 maxOccurs=1), /notification/from/expiresAt/@on Date (string minOccurs=0 maxOccurs=1) and /notification/from/expiresAt/@replace (string minOccurs=0 maxOccurs=1).

The /notification/from/acknowledge (string minOccurs=0 maxOccurs=1) field contains information related to acknowledging the alert, while /notification/from/category (minOccurs=0 maxOccurs=1) and /notification/from/category/@id (string minOccurs=0 maxOccurs=1) contains category information.

The /notification/to (minOccurs=0 maxOccurs=1) tag contains the data pertaining to the receiver. This data can be set by the sender or by any processing/routing agent between the sender and the receiver. The /notification/to/originalUser (minOccurs=0 maxOccurs=1) element defines the original receiver of the alert. A routing agent may change (forward or fan out) an alert to other receivers. If so, it should add this element to the alert.

The /notification/contents (minOccurs=1 maxOccurs=1) element contains the problem domain-specific data to be conveyed to the receiver. Each child element of the contents element is an argot, a problem domain-specific stronglytyped XML blob. Streams and connections query against the element names of these blobs when selecting alerts they will process. The /notification/contents/{any} (minOccurs=0 maxOccurs=unbounded) contains the argot data.

The /notification/routing (minOccurs=1 maxOccurs=1) tag contains any routing data inserted by the myAlerts routing process. The /notification/routing/timestamp (string minOccurs=0 maxOccurs=1) element contains the timestamp of when the alert was received by the myAlerts service. The /notification/routing/hops (string minOccurs=0 maxOccurs=1) element defines the actors that have processed the alert to date. This data can be used by the myAlerts service to recognize and stop infinite loops.

myAlerts/Content

```
<m:myAlerts changeNumber="..." instanceId="..."
  xmlns:m="http://schemas.microsoft.com/hs/2001/10/myAlerts"
  xmlns:hs="http://schemas.microsoft.com/hs/2001/10/core">₁..₁
  <m:stream changeNumber="..." id="..." creator="...">₁..unbounded
    <m:class>₁..₁</m:class>
    <m:expiration>₀..₁</m:expiration>
    <m:position>₁..₁</m:position>
    <m:argotQuery>₀..₁</m:argotQuery>
    <m:argot argotURI="...">₀..unbounded {any}</m:argot>
  </m:stream>
  <m:connection changeNumber="..." id="..." creator="...">₀..unbounded
    <m:class>₁..₁</m:class>
    <m:status>₁..₁</m:status>
    <m:characteristics>₁..₁</m:characteristics>
    <m:expiration>₁..₁</m:expiration>
    <m:argotQuery>₁..₁</m:argotQuery>
    <m:argot argotURI="...">₀..unbounded {any}</m:argot>
  </m:connection>
  <m:subscription changeNumber="..." id="..." creator="...">₀..unbounded
    <hs:trigger select="..." mode="..."
      baseChangeNumber="...">₁..₁</hs:trigger>
    <hs:expiresAt>₀..₁</hs:expiresAt>
    <hs:context uri="...">₁..₁ {any}</hs:context>
    <hs:to>₁..₁</hs:to>
  </m:subscription>
</m:myAlerts>
```

The myAlerts content document comprises the user content document for alert routing. It contains streams, connections, and preferences (general provisioning). The document does not contain a list of alerts, as alerts are transitory. NotifyRequest, route, and PollRequest are used to send and receive alerts, as described below.

The /myAlerts/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myAlerts/@instanceId (string minOccurs=0 maxOccurs=1) attribute is a unique identifier typically assigned to the root element of a service. It is a read-only element and assigned by the .NET My Services system when a particular service is provisioned for a user.

The /myAlerts/stream (minOccurs=1 maxOccurs=unbounded) is directed to a stream, which comprises an internal object that processes alerts before they are routed to connections. Streams can buffer or reroute. The /myAlerts/stream/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored. The /myAlerts/stream/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myAlerts/stream/@creator (minOccurs=1 maxOccurs=1) attribute identifies the creator in terms of userId, appId, and platformId of the node. The /myAlerts/stream/ class (string minOccurs=1 maxOccurs=1) defines what kind of stream this is. The /myAlerts/stream/expiration (dateType minOccurs=0 maxOccurs=1) specifies the lifetime of a connection in absolute time (GMT). This can be used to clean up the content document. The /myAlerts/stream/position (string minOccurs=1 maxOccurs=1) defines where the stream fits into the streamFork processing.

The /myAlerts/stream/argotQuery (string minOccurs=0 maxOccurs=1) field maintains the stream's query against incoming alerts. The query specifies the argot name(s) that enable selection (a logical OR of the named argots). This is optional based on the streamClass (e.g., a stream may do its own selection processing instead of or in addition to the standard stream alert query). If not present, the query defaults to all alert argots ("*").

The /myAlerts/stream/argot (minOccurs=0 maxOccurs=unbounded) field comprises an optional provisioning argot for the stream, and is dependent on the stream class. The /myAlerts/stream/argot/@argotURI (anyURI minOccurs=1 maxOccurs=1) URI uniquely identifies the type of argot and points to a location containing the XSD for this argot. The /myAlerts/stream/argot/{any} (minOccurs=0 maxOccurs=unbounded) field contains argot data.

The /myAlerts/connection (minOccurs=0 maxOccurs=unbounded) uses the following abbreviations: CXN (for a connection, which exists inside of the .NET Alerts service as described above with reference to FIG. 7), and UA (for a UserAgent, which exists outside of the .NET Alerts service). There are two primary types of connections, namely push, wherein alerts are pushed by CXN to UA, and pull, wherein alerts are downloaded by the UA by issuing a request to CXN. The response contains the alerts. A CXN is created (added to the .NET Alerts content document) either by the UA directly or by some entity acting on behalf of the UA. In order to transfer the alerts, a session, either persistent or transient, is established between CXN and UA. In cases in which sessions are transient, the CXN persists. Establishment of a session can be initiated by a CXN or the UA, when the CXN is created or based on, for example, a timer or some signaling mechanism between CXN and UA. The session can be closed by either entity after a period of time (including 0). The following are different models of UA-CXN interaction: 1) UA establishes a session with a CXN and pulls alerts from CXN; 2) UA establishes a session with a CXN and the CXN pushes alerts to the UA; 3) CXN establishes a session with a UA and the UA pulls alerts; 4) CXN establishes a session with a UA and pushes alerts to UA; 5) UA polls the CXN periodically on a timer and UA will initiate process 1) or 2); and 6) CXN polls the UA when alerts arrive or periodically on a timer. When there are pending alerts in the queue, UA will initiate process 1) or 2).

The /myAlerts/connection/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myAlerts/connection/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myAlerts/connection/@creator (minOccurs=1 maxOccurs=1) attribute identifies the creator in terms of useId, appId, and platformId of the node. The /myAlerts/connection/class (string minOccurs=1 maxOccurs=1) element specifies the class of a connection (for example, Push over Soap-RP or Pull over Soap-RP).

The /myAlerts/connection/status (string minOccurs=1 maxOccurs=1) contains flags indicating the current status of the connection. This can be used by the Stream modules to do traffic management, buffering, generate non-delivery and delayed delivery reports for the sender. The /myAlerts/connection/characteristics (string minOccurs=1 maxOccurs=1) field contains information about the nature of the connection, used mainly by the Stream modules. Reliable can mean it supports ACKs, while unreliable means it is fire-and-forget. Characteristics may include the type of polling used (Connection vs. UserAgent).

The /myAlerts/connection/expiration (dateType minOccurs=1 maxOccurs=1) field contains the lifetime of a connection in absolute time (GMT). This can be used to clean up the content document. The /myAlerts/connection/argotQuery (string minOccurs=1 maxOccurs=1) field maintains the connection's query against incoming alerts. The query specifies the argot name(s) that enable selection (a logical OR of the named argots).

The /myAlerts/connection/argot (minOccurs=0 maxOccurs=unbounded) contains an optional provisioning argot for the connection. This is dependent on the connection class. The /myAlerts/connection/argot/@argotURI (anyURI minOccurs=1 maxOccurs=1) URI uniquely identifies the type of argot and points to a location containing the XSD for this argot. The /myAlerts/connection/argot/{any} (minOccurs=0 maxOccurs=unbounded) contains the argot data.

myAlerts—Domain-Specific Methods

The myAlerts service uses the standard methods, and domain-specific methods notify and poll. The notify method allows a client to send an alert to the userAgents connected for the user. The poll method allows a userAgent to proactively pull an alert through a connection.

The myAlerts/notify Method sends one or more alerts to the receiver. If the receiver is the .NET Alerts service, the alert(s) will be delivered to the appropriate set of connected userAgents. The myAlerts/notifyRequest method is accessed using a request message, and in response may generate a response message or a SOAP Fault message. The following sample document fragments illustrate the structure and meaning of the elements and attributes in the request and response messages.

The following table and accompanying description thereafter describes the request message for this method:

```
<m:notifyRequest
    xmlns:m="http://schemas.microsoft.com/hs/2001/10/myAlerts"
    xmlns:hs="http://schemas.microsoft.com/hs/2001/10/core">$_{1..1}$
    <m:notification id="...">$_{0..unbounded}$
        <m:from>$_{1..1}$
            <m:identityHeader type="...">$_{0..1}$
                <m:onBehalfOfUser>$_{1..1}$</m:onBehalfOfUser>
                <m:licenseHolder>$_{1..1}$</m:licenseHolder>
                <m:platformId>$_{1..1}$</m:platformId>
            </m:identityHeader>
            <m:expiresAt ttl="..." onDate="..."
                replace="...">$_{0..1}$</m:expiresAt>
            <m:acknowledge>$_{0..1}$</m:acknowledge>
            <m:category id="...">$_{0..1}$</m:category>
        </m:from>
```

-continued

```
      <m:to>₀..₁
         <m:originalUser>₀..₁</m:originalUser>
      </m:to>
      <m:contents>₁..₁ {any}</m:contents>
      <m:routing>₁..₁
         <m:timestamp>₀..₁</m:timestamp>
         <m:hops>₀..₁</m:hops>
      </m:routing>
   </m:notification>
</m:notifyRequest>
```

The /notifyRequest (minOccurs=1 maxOccurs=1) method attempts to send the enclosed alerts using standard routing by .NET Alerts. There can be one or more notification elements specified. If none is specified, the notify request should be interpreted as a query about whether the receiver is willing to accept alerts from this sender. The /notifyRequest/notification (minOccurs=0 maxOccurs=unbounded) specifies an alert to be delivered. The /notifyRequest/notification/@id (string minOccurs=0 maxOccurs=1) and /notifyRequest/notification/from (minOccurs=1 maxOccurs=1) tag contains all data from the sender, including sender authentication as well as preferences and requests from the sender.

The /notifyRequest/from/identityHeader (minOccurs=0 maxOccurs=1) includes /notifyRequest/from/identityHeader/@type (string minOccurs=0 maxOccurs=1) and /notifyRequest/from/identityHeader/on BehalfOfUser (minOccurs=1 maxOccurs=1). The uuidType is used to specify a universally unique identifier (UUID). The /notifyRequest/from/identityHeader/licenseHolder (minOccurs=1 maxOccurs=1) uuidType is used to specify a universally unique identifier (UUID).

The /notifyRequest/from/identityHeader/platformId (minOccurs=1 maxOccurs=1) uuidType is used to specify a universally unique identifier (UUID). The /notifyRequest/from/expiresAt (string minOccurs=0 maxOccurs=1) is directed to expiration time of an alert, including /notifyRequest/from/expiresAt/@ttl (string minOccurs=0 maxOccurs=1), /notifyRequest/from/expiresAt/@on Date (string minOccurs=0 maxOccurs=1) and /notifyRequest/from/expiresAt/@replace (string minOccurs=0 maxOccurs=1).

The /notifyRequest/from/acknowledge (string minOccurs=0 maxOccurs=1) field contains information related to acknowledging the alert, while /notifyRequest/from/category (minOccurs=0 maxOccurs=1) and /notifyRequest/from/category/@id (string minOccurs=0 maxOccurs=1) contains category information.

The /notifyRequest/to (minOccurs=0 maxOccurs=1) tag contains the data pertaining to the receiver. This data can be set by the sender or by any processing/routing agent between the sender and the receiver. The /notifyRequest/to/originalUser (minOccurs=0 maxOccurs=1) element defines the original receiver of the alert. A routing agent may change (forward or fan out) an alert to other receivers. If so, it should add this element to the alert.

The /notifyRequest/contents (minOccurs=1 maxOccurs=1) element contains the problem domain-specific data to be conveyed to the receiver. Each child element of the contents element is an argot, a problem domain-specific strongly-typed XML blob. Streams and connections query against the element names of these blobs when selecting alerts they will process. The /notifyRequest/contents/{any} (minOccurs=0 maxOccurs=unbounded) contains the argot data.

The /notifyRequest/routing (minOccurs=1 maxOccurs=1) tag contains any routing data inserted by the myAlerts routing process. The /notifyRequest/routing/timestamp (string minOccurs=0 maxOccurs=1) element contains the timestamp of when the alert was received by the myAlerts service. The /notifyRequest/routing/hops (string minOccurs=0 maxOccurs=1) element defines the actors that have processed the alert to date. This data can be used by the myAlerts service to recognize and stop infinite loops.

If the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

The myAlerts/poll Method poll method can be used on a connection in .NET Alerts to retrieve alerts that satisfy the xpQuery specified for the connection. Succeeding poll methods on a connection will return alerts in a first-in (received), first-out (delivered) order for that connection. Alerts will be buffered (that is, stored in the .NET Alerts service after receipt and later delivered by a poll method invocation) only if a suitable buffering stream has been configured.

The myAlerts/pollRequest method is accessed using a request message, and in response may generate a response message or a SOAP Fault message. The following table and accompanying description thereafter describes the request message for this method:

```
m:pollRequest
   xmlns:m="http://schemas.microsoft.com/hs/2001/10/myAlerts"
   xmlns:hs="http://schemas.microsoft.com/hs/2001/10/core">₁..₁
   <m:parkInterval>₀..₁</m:parkInterval>
</m:pollRequest>
```

The /pollRequest (minOccurs=1 maxOccurs=1) method can be invoked on a connection. If there is a new alert in the buffer stream, it will be returned in the pollResponse message. The pollRequest will immediately return a response about whether there is a pending alert. However, if the optional parkInterval element is specified, then the response can take up to parkInterval milliseconds before returning when there are no new alerts in the buffer stream. The /pollRequest/parkInterval (string minOccurs=0 maxOccurs=1) field specifies the time, wherein the unit of time for parkInterval is milliseconds.

Upon successful completion of this method, a response message, myAlerts/pollResponse, is generated. The format of the response message is described below, wherein the number of alerts returned in the response can be zero or one:

```
<m:pollResponse
   xmlns:m="http://schemas.microsoft.com/hs/2001/10/myAlerts"
   xmlns:hs="http://schemas.microsoft.com/hs/2001/10/core">₁..₁
   <m:notification id="...">₀..₁
      <m:from>₁..₁
         <m:identityHeader type="...">₀..₁
            <m:onBehalfOfUser>₁..₁</m:onBehalfOfUser>
            <m:licenseHolder>₁..₁</m:licenseHolder>
            <m:platformId>₁..₁</m:platformId>
         </m:identityHeader>
         <m:expiresAt ttl="..." onDate="..."
            replace="...">₀..₁</m:expiresAt>
         <m:acknowledge>₀..₁</m:acknowledge>
         <m:category id="...">₀..₁</m:category>
      </m:from>
      <m:to>₀..₁
         <m:originalUser>₀..₁</m:originalUser>
```

```
            </m:to>
            <m:contents>_{0..1} {any}</m:contents>
            <m:routing>_{1..1}
                <m:timestamp>_{0..1}</m:timestamp>
                <m:hops>_{0..1}</m:hops>
            </m:routing>
        </m:notification>
    </m:pollResponse>
```

The /pollResponse (minOccurs=1 maxOccurs=1) response contains zero or one new alerts in the buffer stream. The /pollResponse/notification (minOccurs=0 maxOccurs=1) comprises a new alert contained in the buffer stream. The /pollResponse/notification/@id (string minOccurs=0 maxOccurs=1) contains an identifier The /pollResponse/notification/from (minOccurs=1 maxOccurs=1) tag contains data from the sender, including sender authentication as well as preferences and requests from the sender. The /pollResponse/from/identityHeader (minOccurs=0 maxOccurs=1) includes /pollResponse/from/identityHeader/@type (string minOccurs=0 maxOccurs=1) and /pollResponse/from/identityHeader/onBehalfOfUser (minOccurs=1 maxOccurs=1). The uuidType is used to specify a universally unique identifier (UUID). The /pollResponse/from/identityHeader/licenseHolder (minOccurs=1 maxOccurs=1) uuidType is used to specify a universally unique identifier (UUID).

The /pollResponse/from/identityHeader/platformId (minOccurs=1 maxOccurs=1) uuidType is used to specify a universally unique identifier (UUID). The /pollResponse/from/expiresAt (string minOccurs=0 maxOccurs=1) is directed to expiration time of an alert, including /pollResponse/from/expiresAt/@ttl (string minOccurs=0 maxOccurs=1), /pollResponse/from/expiresAt/@on Date (string minOccurs=0 maxOccurs=1) and /pollResponse/from/expiresAt/@replace (string minOccurs=0 maxOccurs=1).

The /pollResponse/from/acknowledge (string minOccurs=0 maxOccurs=1) field contains information related to acknowledging the alert, while /pollResponse/from/category (minOccurs=0 maxOccurs=1) and /pollResponse/from/category/@id (string minOccurs=0 maxOccurs=1) contains category information.

The /pollResponse/to (minOccurs=0 maxOccurs=1) tag contains the data pertaining to the receiver. This data can be set by the sender or by any processing/routing agent between the sender and the receiver. The /pollResponse/to/originalUser (minOccurs=0 maxOccurs=1) element defines the original receiver of the alert. A routing agent may change (forward or fan out) an alert to other receivers. If so, it should add this element to the alert.

The /pollResponse/contents (minOccurs=1 maxOccurs=1) element contains the problem domain-specific data to be conveyed to the receiver. Each child element of the contents element is an argot, a problem domain-specific strongly-typed XML blob. Streams and connections query against the element names of these blobs when selecting alerts they will process. The /pollResponse/contents/{any} (minOccurs=0 maxOccurs=unbounded) contains the argot data.

The /pollResponse/routing (minOccurs=1 maxOccurs=1) tag contains any routing data inserted by the myAlerts routing process. The /pollResponse/routing/timestamp (string minOccurs=0 maxOccurs=1) element contains the timestamp of when the alert was received by the myAlerts service. The /pollResponse/routing/hops (string minOccurs=0 maxOccurs=1) element defines the actors that have processed the alert to date. This data can be used by the myAlerts service to recognize and stop infinite loops.

The myAlerts/humanReadable Notification Argot (the humanReadable argot) defines the standard XML schema to convey alert data that should be displayed to human beings to the userAgents:

```
<m:humanReadable
    xmlns:m="http://schemas.microsoft.com/hs/2001/10/myAlerts"
    xmlns:hs="http://schemas.microsoft.com/hs/2001/10/core">_{1..1}
    <m:baseUrl>_{1..1}</m:baseUrl>
    <m:actionUrl>_{1..1}</m:actionUrl>
    <m:subscriptionUrl>_{1..1}</m:subscriptionUrl>
    <m:language xml:lang="..." iconUrl="...">_{1..unbounded}
        <m:text>_{1..1}</m:text>
    </m:language>
</m:humanReadable>
```

The /humanReadable (minOccurs=1 maxOccurs=1) element is an argot used to convey human readable information in an alert. The receiver of a human readable alert should be able, at a minimum, to display the text element data to a human in either textual or speech form. The /humanReadable/baseUrl (anyURI minOccurs=1 maxOccurs=1) comprises a base URL to which all other URLs are relative.

The /humanReadable/actionUrl (anyURI minOccurs=1 maxOccurs=1) comprises a URL that links to an action page from the sender. This URL can be relative to the baseURL element. The /humanReadable/subscriptionUrl (anyURI minOccurs=1 maxOccurs=1) comprises a URL that links to the sender's page to allow the receiver to view and change the way the alert was sent. This URL can be relative to the baseURL element.

The /humanReadable/language (minOccurs=1 maxOccurs=unbounded) element contains text specific to a language. As many language elements as desired can be included to convey the same information in different languages. The /humanReadable/language/@xml:lang (minOccurs=1 maxOccurs=1) required attribute is used to specify an ISO 639 language code or an ISO 3166 country code as described in RFC 1766. The value of this attribute indicates the language type of the content within this element. The /humanReadable/language/@iconUrl (anyURI minOccurs=0 maxOccurs=1) attribute contains an optional URL from the sender for an icon in a Portable Network Graphics (PNG) file that can be used when the userAgent displays the content to the user. The /humanReadable/language/text (string minOccurs=1 maxOccurs=1) element contains the text to be conveyed to the human. This text is in the language specified by the xml:lang attribute.

The myAlerts/bufferStreamParameters provisioning argot (the bufferStreamParameters argot) defines the data returned by a query from a streamBuffer:

```
<m:bufferStreamParameters
    xmlns:m="http://schemas.microsoft.com/hs/2001/10/myAlerts"
    xmlns:hs="http://schemas.microsoft.com/hs/2001/10/core">_{1..1}
    <m:notification id="...">_{0..unbounded}
        <m:from>_{1..1}
            <m:identityHeader type="...">_{0..1}
                <m:onBehalfOfUser>_{1..1}</m:onBehalfOfUser>
                <m:licenseHolder>_{1..1}</m:licenseHolder>
                <m:platformId>_{1..1}</m:platformId>
            </m:identityHeader>
            <m:expiresAt ttl="..." onDate="..."
                replace="...">_{0..1}</m:expiresAt>
```

```
    <m:acknowledge>_{0..1}</m:acknowledge>
    <m:category id="...">_{0..1}</m:category>
  </m:from>
  <m:to>_{0..1}
    <m:originalUser>_{0..1}</m:originalUser>
  </m:to>
  <m:contents>_{1..1} {any}</m:contents>
  <m:routing>_{1..1}
    <m:timestamp>_{0..1}</m:timestamp>
    <m:hops>_{0..1}</m:hops>
  </m:routing>
  </m:notification>
</m:bufferStreamParameters>
```

The /bufferStreamParameters (minOccurs=1 maxOccurs=1) element comprises an argot specifying the read and write parameters for a bufferStream stream. For one current implementation of .NET My Services, the bufferStream takes no input parameters; it returns the current set of buffered alerts through this argot. A query on a bufferStream is a transient, read-only operation. The /bufferStreamParameters/notification (minOccurs=0 maxOccurs=unbounded) is directed to zero or more alerts in the buffer of the streamBuffer stream.

The /bufferStreamParameters/notification (minOccurs=0 maxOccurs=1) comprises a new alert contained in the buffer stream. The /bufferStreamParameters/notification/@id (string minOccurs=0 maxOccurs=1) contains an identifier The /bufferStreamParameters/notification/from (minOccurs=1 maxOccurs=1) tag contains data from the sender, including sender authentication as well as preferences and requests from the sender. The /bufferStreamParameters/from/identityHeader (minOccurs=0 maxOccurs=1) includes /bufferStreamParameters/from/identityHeader/@type (string minOccurs=0 maxOccurs=1) and /bufferStreamParameters/from/identityHeader/on BehalfOfUser (minOccurs=1 maxOccurs=1). The uuidType is used to specify a universally unique identifier (UUID). The /bufferStreamParameters/from/identityHeader/licenseHolder (minOccurs=1 maxOccurs=1) uuidType is used to specify a universally unique identifier (UUID).

The /bufferStreamParameters/from/identityHeader/platformId (minOccurs=1 maxOccurs=1) uuidType is used to specify a universally unique identifier (UUID). The /bufferStreamParameters/from/expiresAt (string minOccurs=0 maxOccurs=1) is directed to expiration time of an alert, including /bufferStreamParameters/from/expiresAt/@ttl (string minOccurs=0 maxOccurs=1), /bufferStreamParameters/from/expiresAt/@on Date (string minOccurs=0 maxOccurs=1) and /bufferStreamParameters/from/expiresAt/@replace (string minOccurs=0 maxOccurs=1).

The /bufferStreamParameters/from/acknowledge (string minOccurs=0 maxOccurs=1) field contains information related to acknowledging the alert, while /bufferStreamParameters/from/category (minOccurs=0 maxOccurs=1) and /bufferStreamParameters/from/category/@id (string minOccurs=0 maxOccurs=1) contains category information.

The /bufferStreamParameters/to (minOccurs=0 maxOccurs=1) tag contains the data pertaining to the receiver. This data can be set by the sender or by any processing/routing agent between the sender and the receiver. The /bufferStreamParameters/to/originalUser (minOccurs=0 maxOccurs=1) element defines the original receiver of the alert. A routing agent may change (forward or fan out) an alert to other receivers. If so, it should add this element to the alert.

The /bufferStreamParameters/contents (minOccurs=1 maxOccurs=1) element contains the problem domain-specific data to be conveyed to the receiver. Each child element of the contents element is an argot, a problem domain-specific strongly-typed XML blob. Streams and connections query against the element names of these blobs when selecting alerts they will process. The /bufferStreamParameters/contents/{any} (minOccurs=0 maxOccurs=unbounded) contains the argot data.

The /bufferStreamParameters/routing (minOccurs=1 maxOccurs=1) tag contains any routing data inserted by the myAlerts routing process. The /bufferStreamParameters/routing/timestamp (string minOccurs=0 maxOccurs=1) element contains the timestamp of when the alert was received by the myAlerts service. The /bufferStreamParameters/routing/hops (string minOccurs=0 maxOccurs=1) element defines the actors that have processed the alert to date. This data can be used by the myAlerts service to recognize and stop infinite loops.

The myAlerts/pushConnectionParameters Provisioning Argot (pushConnectionParameters argot) defines the data passed to and returned from connectionPush:

```
<m:pushConnectionParameters
    xmlns:m="http://schemas.microsoft.com/hs/2001/10/myAlerts"
    xmlns:hs="http://schemas.microsoft.com/hs/2001/10/core">_{1..1}
    <m:targetUrl>_{1..1}</m:targetUrl>
</m:pushConnectionParameters>
```

The /pushConnectionParameters (minOccurs=1 maxOccurs=1) element comprises an argot specifying the read and write parameters for a connectionPush connection. The /pushConnectionParameters/targetUrl (string minOccurs=1 maxOccurs=1) contains a target URL; the push connection will issue notifyRequest packets to this target URL.

myApplicationSettings

The myApplicationSettings service 302 is designed to store application settings for applications and for groups of applications. The service is structured around the applicationSetting element. This element is a .NET My Services blue item, as described above, meaning that it may be cached and replicated using standard .NET My Services caching and replication techniques. This element is designed to store and manage a categorized set of named application settings. Categorization is done using standard .NET My Services categorization. The applicationSettings are named using the name element which is a URI. An applicationSetting may have multiple names meaning that the setting is used by a number of applications. The settings themselves are represented using free-form, namespace qualified XML. For example, a setting might look something like in the following table:

```
<m:applicationSetting
    xmlns:m="http://schemas.microsoft.com/hs/2001/10/
    myApplicationSettings"
>
    <m:name>http://schemas.microsoft.com/hs/2001/10/sdkSamples/
    xslcal</m:name>
    <!--
    //
    // xcal settings
    //
    -->
    <xcal:settings
        xmlns:xcal="http://schemas.microsoft.com/hs/2001/10/sdkSamples/
```

```
    xslcal"
    >
    <xcal:initialPuid>6108</xcal:initialPuid>
    <xcal:defaultView>weekView</xcal:defaultView>
  </xcal:settings>
</m:applicationSetting>
```

It is expected that applications will use names in either the uuid: URI scheme, or a hierarchical and distributed management scheme like http:.

myApplicationSettings/Roles

The myApplicationSettings service controls access by using the roleTemplates, rt0, rt1, rt2, rt3, and rt99, using the following scopes:

```
scope allElements
<hs:scope id=7215df55-e4af-449f-a8e4-72a1f7c6a987>
  <hs:shape base=t>
  </hs:shape>
</hs:scope>
scope onlySelfElements
<hs:scope id=a159c93d-4010-4460-bc34-5094c49c1633>
  <hs:shape base=nil>
    <hs:include select=//*[@creator='$callerId']/>
  </hs:shape>
</hs:scope>
scope onlySelfSubscriptionElements
<hs:scope id=b7f05a6d-75cd-4958-9dfb-f532ebb17743>
  <hs:shape base=nil>
    <hs:include select=//subscription[@creator='$callerId']/>
  </hs:shape>
</hs:scope>
scope onlyPublicElements
<hs:scope id=da025540-a0c0-470f-adcf-9f07e5a5ec8f>
  <hs:shape base=nil>
    <hs:include select=//*[cat/@ref='hs:public']/>
    <hs:include select=//subscription[@creator='$callerId']/>
  </hs:shape>
</hs:scope>
```

The myApplicationSettings roleTemplate rt0 role gives give complete read/write access to the information within the content document of the service being protected through this roleTemplate. The following table illustrates the available methods and the scope in effect when accessing the myApplicationSettings service through that method while mapped to this roleTemplate.

TABLE

| myApplicationSettings roleTemplate rt0 | |
|---|---|
| method | scope/name |
| query | allElements |
| insert | allElements |
| replace | allElements |
| delete | allElements |
| update | allElements |

The myApplicationSettings roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myApplicationSettings service through that method while mapped to this roleTemplate:

TABLE

| myApplicationSettings roleTemplate rt1 | |
|---|---|
| method | scope/name |
| Query | allElements |
| Insert | onlySelfElements |
| Replace | onlySelfElements |
| Delete | onlySelfElements |

The myApplicationSettings roleTemplate rt2 gives complete read access to all information within the content document of the service being protected through this roleTemplate. Applications mapping to this role have very limited write access and are only able to create and manipulate their own subscription nodes. The following table illustrates the available methods and the scope in effect when accessing the myApplicationSettings service through that method while mapped to this roleTemplate.

TABLE

| myApplicationSettings roleTemplate rt2 | |
|---|---|
| method | scope/name |
| query | allElements |
| insert | onlySelfSubscriptionElements |
| replace | onlySelfSubscriptionElements |
| delete | onlySelfSubscriptionElements |

The myApplicationSettings roleTemplate rt3 gives limited read access to information within the content document that is categorized as "public." The following table illustrates the available methods and the scope in effect when accessing the myApplicationSettings service through that method while mapped to this roleTemplate:

TABLE

| myApplicationSettings roleTemplate rt3 | |
|---|---|
| method | scope/name |
| query | onlyPublicElements |

The myApplicationSettings roleTemplate rt99 blocks access to the content document. Note that lack of a role in the roleList has the same effect as assigning someone to rt99. The following table illustrates that there are no available methods and the scope in effect when accessing the myApplicationSettings service through that method while mapped to this roleTemplate (note that in other services described herein, such an empty table will not be repeated):

TABLE

| myApplicationSettings roleTemplate rt99 | |
|---|---|
| method | scope/name | myApplicationSettings/Content

The content document is an identity centric document, with its content and meaning being a function of the puid used to address the service. Accessing the content document is controlled by the associated roleList document. This schema outline in the following table illustrates the layout and meaning of the information found in the content document for the myApplicationSettings service:

```
<m:myApplicationSettings changeNumber="..."instanceId="..."
    xmlns:m="http://schemas.microsoft.com/hs/2001/10/
    myApplicationSettings"
    xmlns:hs="http://schemas.microsoft.com/hs/2001/10/core">_{1..1}
    <m:applicationSetting changeNumber="..."
    id="..."creator="...">_{0..unbounded}
        <m:catref="...">_{0..unbounded}</m:cat>
        <m:name>_{0..unbounded}</m:name>
        {any}
    </m:applicationSetting>
    <m:subscription changeNumber="..."id="..."creator="...">_{0..unbounded}
        <hs:trigger select="..."mode="..."
        baseChangeNumber="...">_{1..1}</hs:trigger>
        <hs:expiresAt>_{0..1}</hs:expiresAt>
        <hs:context uri="...">_{1..1}{any}</hs:context>
        <hs:to>_{1..1}</hs:to>
    </m:subscription>
    {any}
</m:myApplicationSettings>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myApplicationSettings (minOccurs=1 maxOccurs=1) element encapsulates the content document for the service. The service is designed to store and manage application settings that are described via well formed, namespace qualified XML. The /myApplicationSettings/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored, e.g., without an error being generated.

The /myApplicationSettings/@instanceId (string minOccurs=0 maxOccurs=1) attribute is a unique identifier typically assigned to the root element of a service. It is a read-only element and assigned by the .NET My Services system when a user is provisioned for a particular service. The /myApplicationSettings/applicationSetting (minOccurs=0 maxOccurs=unbounded) element defines the basic unit of storage within this service which is the applicationSetting. An applicationSetting is cacheable and replicable through normal .NET My Services caching and replication techniques. An applicationSetting is identified by a single and stable id (the @id) attribute. An applicationSetting may also be known by a number of applicationSettingNames which are defined as URIs. The substance part of an application setting is represented by an {any} entry, which essentially is a shorthand notation for any, free-form, namespace qualified XML.

The /myApplicationSettings/applicationSetting/ @changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The myApplicationSettings/applicationSetting/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myApplicationSettings/ applicationSetting/@creator (string minOccurs=0 maxOccurs=1) attribute identifies the creator in terms of userId, appId, and platformId of the node.

The /myApplicationSettings/applicationSetting/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myApplicationSettings/ applicationSetting/cat/@ref (anyURI minOccurs=0 maxOccurs=1) attribute references a category definition (<catDef/>) element using the rules outlined in the myCategories section of the present application, described below.

The /myApplicationSettings/applicationSetting/name (anyURI minOccurs=0 maxOccurs=unbounded) element defines a unique name for the applicationSetting that programmers will code to. It is a stable name defined by the applications vs. the @id attribute which is a stable and unique name defined by .NET My Services. The format of this name is a URI. It is expected that applications will name their applicationSettings using URIs with the uuid: scheme, or an http: scheme which allows a delegated hierarchical namespace, e.g., uuid:56c3da65-a6d6-4f78-bbbd-e8c5eac98aae. The http://schemas.microsoft.com/office/ 2002/08/outlook#coolTools http://schemas.microsoft.com/ vs/2002/03/studio#codeLayout element may be repeated any number of times to indicate that this applicationSetting is used by a number of applications.

The /myApplicationSettings/applicationSetting/{any} (minOccurs=0 maxOccurs=unbounded) field allows the schema to be extended to specify other types of application setting-related data.

The subscription elements and attributes are common to other services, and are described above.

myCalendar

The .NET Calendar service, alternatively referred to herein as myCalendar 303, provides calendars for users. This particular service uses an XML schema to describe a typical calendar, a user's calendar store, and the methods by which calendar data is sent and received from the store.

The .NET Calendar service stores and manages the scheduling of individual and group events and appointments that are associated with an identity. This service supplies scheduling information on demand to other .NET My Services, applications, and devices. .NET Calendar can be used for regular scheduling or group collaboration. Group collaborative features include meeting delegates and role-based access to another identity's calendar.

The .NET Calendar service is designed to work with the .NET Alerts service to perform reminder alerts and meeting acceptance/decline alerts, with .NET Contacts for service distribution lists, and with .NET Inbox to send and retrieve meeting requests. .NET Inbox will forward meeting invitations to be direct booked (tentative) on attendee calendars which have the correct permissions for this behavior and will forward meeting responses that attendees send back to the organizer to update the organizer's calendar.

.NET Calendar will support calendar publishing. This feature that allows users to open their calendars to other users such as friends, family members, and group lists. The .NET Calendar service uses .NET My Services to support a rich sharing model based upon the access control list, role map, and identity header.

The .NET Calendar schema format improves established existing calendar properties and standards. In addition, .NET Calendar establishes a platform for non-Gregorian calendars and additional features such as traveling time allowances for meetings. The schema is designed to be extensible to accommodate new calendar properties or additional recurrence patterns.

myCalendar/Roles

The myCalendar service controls access by using the rt0, rt1, rt2, rt3 and rt99 roleTemplates, using the following scopes:

```
scope allElements
<hs:scope id=7215df55-e4af-449f-a8e4-72a1f7c6a987>
    </hs:shape base=t>
    </hs:shape>
</hs:scope>
scope onlySelfElements
<hs:scope id=a159c93d-4010-4460-bc34-5094c49c1633>
    <hs:shape base=nil>
        <hs:include select=//*[@creator='$callerId']/>
    </hs:shape>
</hs:scope>
scope onlySelfSubscriptionElements
<hs:scope id=b7f05a6d-75cd-4958-9dfb-f532ebb17743>
    <hs:shape base=nil>
        <hs:include select=//subscription[@creator='$callerId']/>
    </hs:shape>
</hs:scope>
scope onlyPublicElements
<hs:scope id=da025540-a0c0-470f-adcf-9f07e5a5ec8f>
    <hs:shape base=nil>
        <hs:include select=//*[cat/@ref='hs:public']/>
        <hs:include select=//subscription[@creator='$callerId']/>
    </hs:shape>
</hs:scope>
```

The myCalendar roleTemplate rt0 role gives complete read/write access to the information within the content document of the service being protected through this roleTemplate. The following table illustrates the available methods and the scope in effect when accessing the myCalendar service through that method while mapped to this roleTemplate:

TABLE

| myCalendar roleTemplate rt0 | |
|---|---|
| method | scope/name |
| query | allElements |
| insert | allElements |
| replace | allElements |
| delete | allElements |
| update | allElements |
| getCalendarDays | allElements |
| getFreeBusyDays | allElements |
| getQuickView | allElements |
| sendMeeting | allElements |
| respond | allElements |
| updateReminder | allElements |

The myCalendar roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myCalendar service through that method while mapped to this roleTemplate:

TABLE

| myCalendar roleTemplate rt1 | |
|---|---|
| method | scope/name |
| query | allElements |
| insert | onlySelfElements |
| replace | onlySelfElements |
| delete | onlySelfElements |
| update | allElements |
| getCalendarDays | allElements |
| getFreeBusyDays | allElements |
| getQuickView | onlySelfElements |
| sendMeeting | onlySelfElements |
| respond | onlySelfElements |

The myCalendar roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myCalendar service through that method while mapped to this roleTemplate:

TABLE

| myCalendar roleTemplate rt2 | |
|---|---|
| method | scope/name |
| query | allElements |
| insert | onlySelfSubscriptionElements |
| replace | onlySelfSubscriptionElements |
| delete | onlySelfSubscriptionElements |
| getCalendarDays | allElements |
| getFreeBusyDays | allElements |
| getQuickView | allElements |

The myCalendar roleTemplate rt3 role gives limited read access to information within the content document that is categorized as "public." The following table illustrates the available methods and the scope in effect when accessing the myCalendar service through that method while mapped to this roleTemplate:

TABLE

| myCalendar roleTemplate rt3 | |
|---|---|
| method | scope/name |
| query | onlyPublicElements |
| getCalendarDays | onlyPublicElements |
| getFreeBusyDays | onlyPublicElements |
| getQuickView | onlyPublicElements |

The myCalendar roleTemplate rt99 blocks access to the content document. Note that lack of a role in the roleList has the same effect as assigning someone to rt99.

myCalendar/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myCalendar service:

```
<m:myCalendar changeNumber="..." instanceId="..."
   xmlns:m="http://schemas.microsoft.com/hs/2001/10/myCalendar"
   xmlns:hs="http://schemas.microsoft.com/hs/2001/10/core">_{1..1}
   <m:event calendarType="..." advanceHijriValue="..." changeNumber="..." id="..."
 creator="...">_{0..unbounded}
      <m:body changeNumber="...">_{1..1}
         <m:catref="...">_{0..unbounded}</m:cat>
         <m:title xml:lang="..." dir="...">_{1..1}</m:title>
         <m:fullDescription xml:lang="..." dir="...">_{0..1}</m:fullDescription>
         <m:location xml:lang="..." dir="...">_{0..1}</m:location>
         <m:meetingStatus>_{0..1}</m:meetingStatus>
         <m:recurrenceId>_{0..1}</m:recurrenceId>
         <m:lastUpdateTime>_{0..1}</m:lastUpdateTime>
         <m:startTime>_{1..1}</m:startTime>
         <m:endTime>_{1..1}</m:endTime>
         <m:allDay>_{0..1}</m:allDay>
         <m:floating>_{0..1}</m:floating>
         <m:travelTimeTo>_{0..1}</m:travelTimeTo>
         <m:travelTimeFrom>_{0..1}</m:travelTimeFrom>
         <m:freeBusyStatus>_{0..1}</m:freeBusyStatus>
         <m:cuid>_{0..1}</m:cuid>
         <m:organizer>_{0..1}
            <hs:name xml:lang="..." dir="...">_{0..1}</hs:name>
            <hs:puid>_{0..1}</hs:puid>
            <hs:email>_{0..1}</hs:email>
         </m:organizer>
         {any}
      </m:body>
      <m:attendeeEventExtra changeNumber="...">_{0..1}
         <m:intendedFreeBusy>_{0..1}</m:intendedFreeBusy>
         <m:responseTime>_{0..1}</m:responseTime>
         <m:responseType>_{0..1}</m:responseType>
         <m:counterProposeStartTime>_{0..1}</m:counterProposeStartTime>
         <m:counterProposeEndTime>_{0..1}</m:counterProposeEndTime>
         <m:counterProposeLocation>_{0..1}</m:counterProposeLocation>
         <m:responseBody xml:lang="..." dir="...">_{0..1}</m:responseBody>
         <m:delegateResponder>_{0..1}
            <hs:name xml:lang="..." dir="...">_{0..1}</hs:name>
            <hs:puid>_{0..1}</hs:puid>
            <hs:email>_{0..1}</hs:email>
         </m:delegateResponder>
         {any}
      </m:attendeeEventExtra>
      <m:attachment changeNumber="..." id="..." creator="...">_{0..unbounded}
         <m:name xml:lang="..." dir="...">_{1..1}</m:name>
         <m:contentType>_{1..1}</m:contentType>
         <m:contentTransferEncoding>_{1..1}</m:contentTransferEncoding>
         <m:size>_{1..1}</m:size>
         <m:attachmentBody>_{1..1}</m:attachmentBody>
      </m:attachment>
      <m:reminder changeNumber="..." id="..." creator="...">_{0..1}
         <m:set>_{1..1}</m:set>
         <m:to xml:lang="..." dir="...">_{1..1}</m:to>
         <m:offset>_{1..1}</m:offset>
         <m:interruptability>_{0..1}</m:interruptability>
         <m:lastSentTime>_{1..1}</m:lastSentTime>
         <m:nextTriggerTime>_{1..1}</m:nextTriggerTime>
      </m:reminder>
      <m:attendee changeNumber="..." id="..." creator="...">_{0..unbounded}
         <hs:name xml:lang="..." dir="...">_{0..1}</hs:name>
         <hs:puid>_{0..1}</hs:puid>
         <hs:email>_{0..1}</hs:email>
         <m:inviteType>_{1..1}</m:inviteType>
         <m:responseTime>_{0..1}</m:responseTime>
         <m:responseType>_{0..1}</m:responseType>
         <m:counterProposeStartTime>_{0..1}</m:counterProposeStartTime>
         <m:counterProposeEndTime>_{0..1}</m:counterProposeEndTime>
         <m:counterProposeLocation>_{0..1}</m:counterProposeLocation>
         <m:responseBody xml:lang="..." dir="...">_{0..1}</m:responseBody>
         {any}
      </m:attendee>
      <m:recurrence changeNumber="...">_{0..1}
         <m:rule changeNumber="...">_{1..1}
            <m:creationDate>_{1..1}</m:creationDate>
            <m:firstDayOfWeek>_{1..1}</m:firstDayOfWeek>
```

-continued

```
        <m:tzid>_{0..1}</m:tzid>
        <m:isLeapYear>_{0..1}</m:isLeapYear>
        <m:leapMonthValue>_{0..1}</m:leapMonthValue>
        <m:repeat>_{1..1}
            <m:daily dayFrequency="...">_{0..1}</m:daily>
            <m:weekly su="..." mo="..." tu="..." we="..." th="..." fr="..." sa="..."
weekFrequency="...">_{0..1}</m:weekly>
            <m:monthlyByDay su="..." mo="..." tu="..." we="..." th="..." fr="..." sa="..."
monthFrequency="..." weekdayOfMonth="...">_{0..1}</m:monthlyByDay>
            <m:monthly monthFrequency="..." day="..." forceExact="...">_{0..1}</m:monthly>
            <m:yearlyByDay su="..." mo="..." tu="..." we="..." th="..." fr="..." sa="..."
yearFrequency="..." weekdayOfMonth="..." month="...">_{0..1}</m:yearlyByDay>
            <m:yearly yearFrequency="..." month="..." day="..."
forceExact="...">_{0..1}</m:yearly>
            {any}
        </m:repeat>
        <m:windowEnd>_{0..1}</m:windowEnd>
        <m:repeatForever>_{0..1}</m:repeatForever>
        <m:repeatInstances>_{0..1}</m:repeatInstances>
        <m:deletedExceptionDate>_{0..unbounded}</m:deletedExceptionDate>
        {any}
    </m:rule>
    <m:exception changeNumber="..." id="..." creator="...">_{0..unbounded}
        <m:recurrenceId>_{1..1}</m:recurrenceId>
        <m:body>_{0..1}
            <m:title xml:lang="..." dir="...">_{0..1}</m:title>
            <m:fullDescription xml:lang="..." dir="...">_{0..1}</m:fullDescription>
            <m:location xml:lang="..." dir="...">_{0..1}</m:location>
            <m:startTime>_{0..1}</m:startTime>
            <m:endTime>_{0..1}</m:endTime>
            <m:allDay>_{0..1}</m:allDay>
            <m:travelTimeTo>_{0..1}</m:travelTimeTo>
            <m:travelTimeFrom>_{0..1}</m:travelTimeFrom>
            <m:freeBusyStatus>_{0..1}</m:freeBusyStatus>
            <m:organizer>_{0..1}
                <hs:name xml:lang="..." dir="...">_{0..1}</hs:name>
                <hs:puid>_{0..1}</hs:puid>
                <hs:email>_{0..1}</hs:email>
            </m:organizer>
        </m:body>
        <m:attendeeEventExtra>_{0..1}
            <m:intendedFreeBusy>_{0..1}</m:intendedFreeBusy>
            <m:responseTime>_{0..1}</m:responseTime>
            <m:responseType>_{0..1}</m:responseType>
            <m:counterProposeStartTime>_{0..1}</m:counterProposeStartTime>
            <m:counterProposeEndTime>_{0..1}</m:counterProposeEndTime>
            <m:counterProposeLocation>_{0..1}</m:counterProposeLocation>
            <m:responseBody xml:lang="..." dir="...">_{0..1}</m:responseBody>
            <m:delegateResponder>_{0..1}
                <hs:name xml:lang="..." dir="...">_{0..1}</hs:name>
                <hs:puid>_{0..1}</hs:puid>
                <hs:email>_{0..1}</hs:email>
            </m:delegateResponder>
            {any}
        </m:attendeeEventExtra>
        <m:deletedAttendee>_{0..unbounded}</m:deletedAttendee>
        <m:deletedAttachment>_{0..unbounded}</m:deletedAttachment>
        <m:attachment>_{0..unbounded}
            <m:name xml:lang="..." dir="...">_{1..1}</m:name>
            <m:contentType>_{1..1}</m:contentType>
            <m:contentTransferEncoding>_{1..1}</m:contentTransferEncoding>
            <m:size>_{1..1}</m:size>
            <m:attachmentBody>_{1..1}</m:attachmentBody>
        </m:attachment>
        <m:attendee>_{0..unbounded}
            <hs:name xml:lang="..." dir="...">_{0..1}</hs:name>
            <hs:puid>_{0..1}</hs:puid>
            <hs:email>_{0..1}</hs:email>
            <m:inviteType>_{1..1}</m:inviteType>
            <m:responseTime>_{0..1}</m:responseTime>
            <m:responseType>_{0..1}</m:responseType>
            <m:counterProposeStartTime>_{0..1}</m:counterProposeStartTime>
            <m:counterProposeEndTime>_{0..1}</m:counterProposeEndTime>
            <m:counterProposeLocation>_{0..1}</m:counterProposeLocation>
            <m:responseBody xml:lang="..." dir="...">_{0..1}</m:responseBody>
            {any}
        </m:attendee>
        <m:reminder>_{0..1}
            <m:set>_{0..1}</m:set>
```

-continued

```
        <m:offset>₀‗₁</m:offset>
        <m:interruptability>₀‗₁</m:interruptability>
      </m:reminder>
      {any}
    </m:exception>
    {any}
  </m:recurrence>
</m:event>
<m:subscription changeNumber="..." id="..." creator="...">₀‗ᵤₙᵦₒᵤₙ𝒹ₑ𝒹
  <hs:trigger select="..." mode="..." baseChangeNumber="...">₁‗₁</hs:trigger>
  <hs:expiresAt>₀‗₁</hs:expiresAt>
  <hs:context uri="...">₁‗₁{any}</hs:context>
  <hs:to>₁‗₁</hs:to>
</m:subscription>
{any}
</m:myCalendar>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myCalendar (minOccurs=1 maxOccurs=1) element encapsulates the content document for this service. This element establishes a global cache scope for the service and contains other root level system attributes for this instance of the service. The /myCalendar/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored. The /myCalendar/@instanceId (string minOccurs=0 maxOccurs=1) attribute is a unique identifier typically assigned to the root element of a service. It is a read-only element and assigned by the .NET My Services system when a particular service is provisioned for a user.

The /myCalendar/event (minOccurs=0 maxOccurs=unbounded) event is the myCalendar root object for calendar events, appointments, and meetings.

The /myCalendar/event/@calendarType (string minOccurs=0 maxOccurs=1) field identifies an enumeration which determines the kind of calendar event this is.

| Value | Enumeration Constant | Description |
|---|---|---|
| −1 | HSCAL_ALL_CALENDARS | Unknown Calendar; system default (HSCAL_GREGORIAN_US) |
| 1 | HSCAL_GREGORIAN | Gregorian (localized) calendar |
| 2 | HSCAL_GREGORIAN_US | Gregorian (U.S.) calendar |
| 3 | HSCAL_JAPAN | Japanese Emperor Era calendar |
| 4 | HSCAL_TAIWAN | Taiwan Era calendar |
| 5 | HSCAL_KOREA | Korean Tangun Era calendar |
| 6 | HSCAL_HIJRI | Hijri (Arabic Lunar) calendar |
| 7 | HSCAL_THAI | Thai calendar |
| 8 | HSCAL_HEBREW | Hebrew (Lunar) calendar |
| 9 | HSCAL_GREGORIAN_ME_FRENCH | Gregorian Middle East French calendar |
| 10 | HSCAL_GREGORIAN_ARABIC | Gregorian Arabic calendar |
| 11 | HSCAL_GREGORIAN_XLIT_ENGLISH | Gregorian Transliterated English calendar |
| 12 | HSCAL_GREGORIAN_XLIT_FRENCH | Gregorian Transliterated French calendar |
| 13 | HSCAL_KOREA_LUNAR | Default Korea Lunar calendar |
| 14 | HSCAL_JAPAN_LUNAR | Default Japanese Lunar calendar |
| 15 | HSCAL_CHINESE_LUNAR | Chinese Lunar calendar |
| 16 | HSCAL_SAKA | Indian Saka calendar |
| 17 | HSCAL_LUNAR_ETO_CHN | Chinese Zodiac calendar |
| 18 | HSCAL_LUNAR_ETO_KOR | Korean Zodiac calendar |
| 19 | HSCAL_LUNAR_ROKUYOU | Japanese Lucky days calendar |

The /myCalendar/event/@advanceHijriValue (int minOccurs=0 maxOccurs=1) field is required for Hijri calendar support. @advanceHijriValue ranges from {−3, −2, −1, 1, 2, 3} and is added to the current date, but the day of the week stays the same. For example, if today is the 24th and @advanceHijriValue is set to be +2, then the user sees the date as being the 26th. Typically @advanceHijriValue is +/−1, and this suffices in most cases. Theoretically it can be any number, but the worst case scenario is +/−3.

The /myCalendar/event/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myCalendar/event/@creator (minOccurs=1 maxOccurs=1) attribute identifies the creator in terms of userId, appId, and platformId of the node.

The /myCalendar/event/body (minOccurs=1 maxOccurs=1) includes the /myCalendar/event/body/@changeNumber (minOccurs=1 maxOccurs=1) changeNumber attribute, which is designed to facilitate caching of the element and its descendants. This attribute is assigned to this element by the .NET My Services system. The attribute is read only to applications. Attempts to write this attribute are silently ignored.

The /myCalendar/event/body/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /myCalendar/event/body/cat/@ref (anyURI minOccurs=1 maxOccurs=1) attribute references a category definition (catDef) element using the rules outlined in the .NET Categories section, described above.

The /myCalendar/event/body/title (string minOccurs=1 maxOccurs=1) includes the /myCalendar/event/body/title/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/body/title/@dir (string minOccurs=0 maxOccurs=1) optional attribute specifies the default layout direction for the localized string. Valid values are rtl (right to left) and ltr (left to right).

The /myCalendar/event/body/fullDescription (string minOccurs=0 maxOccurs=1) element contains a free form, full description of the event. The /myCalendar/event/body/fullDescription/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/body/fullDescription/@dir (string minOccurs=0 maxOccurs=1) optional attribute specifies the base direction of directionally neutral text. Possible values include rtl (right to left) and ltr (left to right).

The /myCalendar/event/body/location (string minOccurs=0 maxOccurs=1) optional element contains the event's location. The /myCalendar/event/body/location/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/body/location/@dir (string minOccurs=0 maxOccurs=1) optional attribute specifies the default layout direction for the localized string. Valid values are rtl (right to left) and ltr (left to right).

The /myCalendar/event/body/meetingStatus (string minOccurs=0 maxOccurs=1) tracks the status of this meeting {not-sent, sent, cancelled}. A regular appointment will not have this element. If <meetingStatus> exists, this event should be rendered as a meeting, not as an appointment.

The /myCalendar/event/body/recurrenceId (dateTime minOccurs=0 maxOccurs=1) recurrence id indicates the original start time of an occurrence of a recurring master appointment. It is required to identify what instance an exception is modifying, since users are allowed to change the start time on an orphan, (wherein an exception is a modification of an instance and an orphan is an exception that is sent as a meeting request on its own). The recurrenceId method is stored in UTC. It does not appear in the master schema, except in the specific case that an attendee is invited to an instance of a recurring event. Otherwise, <recurrenceId> is usually only a part of getCalendarDays.

The /myCalendar/event/body/lastUpdateTime (dateTime minOccurs=0 maxOccurs=1) field is updated by the organizer whenever s/he creates and sends a new meeting request. This helps the attendee to identify which meeting request is the most recent one. It is stored in coordinated universal time (UTC). This property is not modifiable by clients and is assigned by the server on modification and by the sendMeetingRequest.

The /myCalendar/event/body/startTime (dateTime minOccurs=1 maxOccurs=1) startTime method defines the start time of the event. An all-day event by convention starts at 12:00:00 AM of the day of the event. This is stored in UTC. Maximum range is Jan. 1, 1753 to Dec. 31, 9999 to an accuracy of 3.33 milliseconds. If this event is a recurring event, <startTime> defines the dateTime when the recurrence window starts. The recurring master does not have to be an instance of the recurring event itself. An event in March set to recur every April will only appear in April.

The /myCalendar/event/body/endTime (dateTime minOccurs=1 maxOccurs=1) endTime method defines the end time of the event. An all-day event by convention ends at 11:59:59 PM of the ending day. This is stored in UTC. Maximum range is Jan. 1, 1753 to Dec. 31, 9999 to an accuracy of 3.33 milliseconds. The duration of the event is inferred from endTime−startTime.

The /myCalendar/event/body/allDay (boolean minOccurs=0 maxOccurs=1) element indicates a regular event by being false or being absent. Otherwise, this attribute indicates that the event is an all-day event. All day events may span multiple days. By convention, all day events start at 12:00:00 am of the day of startTime, regardless of what time it actually is, and it will end at 11:59:59 pm of the endTime date. In other words, if the allDay element is present and has value=true, .NET Calendar will ignore the actual times of the events and consider only the date part of the field.

The allDay tag is meant to operate as a hint to UI renders to display specialized icons indicating an all-day event. allDay events are distinguishable between 24-hr events starting at 12 am. In the case of a meeting request, an allDay event will not appear in the local user's time zone, but rather in the organizer's time zone.

The /myCalendar/event/body/floating (boolean minOccurs=0 maxOccurs=1) floating attribute indicates that this event is to occur in the current local time zone no matter what time zone the system is currently in (that is, it floats). For example, holidays are floating events. As another example, it may be useful to schedule medication regardless of an actual time zone, whereby a floating attribute is used with such an event. Floating values are stored as-is: no time-zone translations are needed to convert them to UTC or any local time zone.

The /myCalendar/event/body/travelTimeTo (int minOccurs=0 maxOccurs=1) field contains the amount of time (in minutes) that it takes to travel to the meeting location. The /myCalendar/event/body/travelTimeFrom (int minOccurs=0 maxOccurs=1) field contains the amount of time (in minutes) that it takes to return from the meeting location. These optional elements show in free/busy calculations.

The /myCalendar/event/body/freeBusyStatus (string minOccurs=0 maxOccurs=1) optional element annotates the freeBusy behavior of this event. Events by default appear as "busy". The user may explicitly define this event to be annotated by setting .NET Calendar values to free, tentative, busy or away.

The /myCalendar/event/body/cuid (string minOccurs=0 maxOccurs=1) cuid (CorrelationUID) links an organizer's event to an attendee's event. It identifies which response from an attendee is for which request from an organizer, and which meeting request update from the organizer is for which previously accepted meeting by the attendee. The "cuid" is the same on both the attendee's and the organizer's copy of the appointment. It is also identical on the exception and the recurring master, wherein an exception is a modification of an instance. This value is assigned by the .NET Calendar server and is non-modifiable.

The /myCalendar/event/body/organizer (minOccurs=0 maxOccurs=1) field contains the email address of the event organizer. The /myCalendar/event/body/organizer/name (string minOccurs=0 maxOccurs=1) optional element specifies the name for the enclosing element. The /myCalendar/event/body/organizer/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/body/organizer/name/@dir (string minOccurs=0 maxOccurs=1) optional attribute specifies the default layout direction for the localized string. Valid values are rtl (right to left) and ltr (left to right).

The /myCalendar/event/body/organizer/puid (string minOccurs=0 maxOccurs=1) optional element specifies the PUID for the enclosing element. The /myCalendar/event/body/organizer/email (string minOccurs=0 maxOccurs=1) optional name specifies an e-mail address for the enclosing element.

The /myCalendar/event/body/{any} (minOccurs=0 maxOccurs=unbounded) provides for additional body elements.

The /myCalendar/event/attendeeEventExtra (minOccurs=0 maxOccurs=1) field contains additional information about an event, found only in an event invitee's schema. The /myCalendar/event/attendeeEventExtra/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/attendeeEventExtra/intendedFreeBusy (string minOccurs=0 maxOccurs=1) element is the event organizer's freeBusy information and is thus equal to event/freeBusyStatus. Invitees may overwrite event/freeBusyStatus with a new value, and intendedFreeBusy is intended to store the organizer's original freeBusyStatus.

The /myCalendar/event/attendeeEventExtra/responseTime (dateTime minOccurs=0 maxOccurs=1) field contains the reply time on each attendee is set to the current time (Now) when the organizer sends a meeting invitation. When the attendee responds, they update their responseTime. When the organizer receives responses, they will honor only those that have a higher responseTime than what is maintained in his/her own copy of the event for each attendee. While processing the response, the organizer will update their responseTime. This guarantees that the organizer honors only the most recent response from the attendee. This is stored in UTC.

The /myCalendar/event/attendeeEventExtra/responseType (string minOccurs=0 maxOccurs=1) accept status indicates the valid types of responses that an attendee can reply with {accept, decline, tentative, counterpropose}. The absence of this field indicates that no response has been recorded.

The /myCalendar/event/attendeeEventExtra/counterProposeStartTime (dateTime minOccurs=0 maxOccurs=1) field contains the counter proposal start time information. If responseType=[counterPropose], then either the startTime, endTime, or location, or all three can be present. This is the invitee's counterproposal for a new start time for the meeting. This is stored in UTC.

The /myCalendar/event/attendeeEventExtra/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /myCalendar/event/attendeeEventExtra/counterProposeLocation (string minOccurs=0 maxOccurs=1) field contains the counter proposal location information. field contains the counter proposal start time information. If responseType= [counterPropose], then either the {startTime, endTime}, or location, or both can be present. This is the invitee's counterproposal for a location for the meeting.

The /myCalendar/event/attendeeEventExtra/responseBody (string minOccurs=0 maxOccurs=1) field contains an optional message for invitees to include along with the response. The /myCalendar/event/attendeeEventExtra/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/attendeeEventExtra/responseBody/@dir (string minOccurs=0 maxOccurs=1) optional attribute specifies the base direction of directionally neutral text. Possible values include rtl (right to left) and ltr (left to right).

The /myCalendar/event/attendeeEventExtra/delegateResponder (minOccurs=0 maxOccurs=1) field stores information of a delegate who responds on behalf of an invitee. The /myCalendar/event/attendeeEventExtra/delegateResponder/name (string minOccurs=0 maxOccurs=1) optional element specifies the name for the enclosing element. The /myCalendar/event/attendeeEventExtra/delegateResponder/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/attendeeEventExtra/delegateResponder/name/@dir (string minOccurs=0 maxOccurs=1) optional attribute specifies the default layout direction for the localized string. Valid values are rtl (right to left) and ltr (left to right).

The /myCalendar/event/attendeeEventExtra/delegateResponder/puid (string minOccurs=0 maxOccurs=1) optional element specifies the PUID for the enclosing element. The /myCalendar/event/attendeeEventExtra/delegateResponder/email (string minOccurs=0 maxOccurs=1) optional name specifies an e-mail address for the enclosing element. The /myCalendar/event/attendeeEventExtra/{any} (minOccurs=0 maxOccurs=unbounded) provides for additional attendee extra properties.

The /myCalendar/event/attachment (minOccurs=0 maxOccurs=unbounded) element contains attachment metadata, name, content-type and id's, and may also contain the attachmentBody. The /myCalendar/event/attachment/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/attachment/@id (minOccurs=1 maxOccurs=1) attribute is a globally unique ID assigned to this element by .NET My Services. Normally, .NET My Services generates and assigns this ID during an insertRequest operation, or possibly during a replaceRequest. Application software can override this ID generation by specifying the useClientIds attribute in the request message. After an ID has been assigned, the attribute is read only and attempts to write it are silently ignored.

The /myCalendar/event/attachment/@creator (minOccurs=1 maxOccurs=1) attribute identifies the creator in terms of userId, appId, and platformId of the node. The /myCalendar/event/attachment/name (string minOccurs=1 maxOccurs=1) element contains information about an individual attachment in a mail message. The /myCalendar/event/attachment/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/attachment/name/@dir (string minOccurs=0 maxOccurs=1) optional attribute specifies the default layout direction for the localized string. Valid values are rtl (right to left) and ltr (left to right).

The /myCalendar/event/attachment/contentType (string minOccurs=1 maxOccurs=1) element contains the content type of the attachment. The /myCalendar/event/attachment/contentTransferEncoding (string minOccurs=1 maxOccurs=1) element contains the encoding of the attachment. This information is necessary for decoding the attachment. The /myCalendar/event/attachment/size (unsignedLong minOccurs=1 maxOccurs=1) element contains the size of the attachment in bytes. The /myCalendar/event/attachment/attachmentBody (base64Binary minOccurs=1 maxOccurs=1) element contains the contents of the attachment.

The /myCalendar/event/reminder (minOccurs=0 maxOccurs=1) is directed to reminders. A user may optionally define a reminder for this appointment. Reminders for recurring appointments will be sent periodically before the appointment, as per the rules defined in the reminder subschema below. A non-recurring event may define no reminders, define a reminder with <set>="true" or define a reminder with <set>="false".

A recurring meeting may have no reminders defined, or a recurring reminder defined with all instances receiving reminders. To define no reminders by default, but to define reminders for particular meeting instances in the exception body, a reminder <set>="false" is created, and turned on and/or modified for particular instances. To define a recurring reminder, but turn it off for particular meeting instances, a reminder <set>="true" is created, and turned off for particular instances.

If the event's reminder subschema is non-existent, yet the exception body has a reminder blob, then the exception reminder is ignored. An alternative is to require this.

The /myCalendar/event/reminder/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/reminder/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myCalendar/event/reminder/@creator (minOccurs=1 maxOccurs=1) attribute identifies the creator in terms of userId, appId, and platformId of the node. The /myCalendar/event/reminder/set (boolean minOccurs=1 maxOccurs=1) field maintains a Boolean flag that indicates whether the reminder is active for this event. In most cases, this will be true, but in the case of a recurring appointment, this flag may default to true with specific instances not to be reminded, or default to false, with specific instances to be reminded.

The /myCalendar/event/reminder/to (string minOccurs=1 maxOccurs=1) stores a friendly name that this reminder is being sent to. The /myCalendar/event/reminder/to/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/reminder/to/@dir (string minOccurs=0 maxOccurs=1) optional attribute specifies the default layout direction for the localized string. Valid values are rtl (right to left) and ltr (left to right).

The /myCalendar/event/reminder/offset (int minOccurs=1 maxOccurs=1) field specifies the offset, in minutes, of how long before the event the user should be reminded. Recommended values are set forth in the following table:

| Value | Description |
| --- | --- |
| 5, 10, 20, 30, 45 | 5, 10, 20, 30, 45 minutes before the event |
| 60, 120, 180, | 1, 2, 3 hours before the event |
| startTime − startDay | The day of the event (reminder sent at 12:00 am) |
| startTime − (startDay − (1440 * x)) | "x" days before the event (reminder sent at 12:00 am "x" days before) |

The /myCalendar/event/reminder/interruptability (int minOccurs=0 maxOccurs=1) optional element defines how interruptible this event is and it is used by notification routing software to make decisions about the relay and deferral of notifications that might occur while this meeting is active. The value contained in this element is a numeric value between one and ten. Low values represent a high cost of disruption, high values represent a low cost of disruption.

The /myCalendar/event/reminder/lastSentTime (dateTime minOccurs=1 maxOccurs=1) field is required by the reminder engine. The /myCalendar/event/reminder/nextTriggerTime (dateTime minOccurs=1 maxOccurs=1) determines the next time to trigger reminder.

The /myCalendar/event/attendee (minOccurs=0 maxOccurs=unbounded) includes the attendeeType, which contains the information about an attendee, including the display, email, puid, and the attendee's response.

The /myCalendar/event/attendee/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/attendee/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myCalendar/event/attendee/@creator (minOccurs=1 maxOccurs=1) attribute identifies the creator in terms of userId, appId, and platformId of the node. The /myCalendar/event/attendee/name (string minOccurs=0 maxOccurs=1) optional element specifies the name for the enclosing element. The /myCalendar/event/attendee/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/attendee/name/@dir (string minOccurs=0 maxOccurs=1) optional attribute specifies the default layout direction for the localized string. Valid values are rtl (right to left) and ltr (left to right).

The /myCalendar/event/attendee/puid (string minOccurs=0 maxOccurs=1) optional element specifies the PUID for the enclosing element. The /myCalendar/event/attendee/email (string minOccurs=0 maxOccurs=1) optional name specifies an e-mail address for the enclosing element. The /myCalendar/event/attendee/inviteType (string minOccurs=1 maxOccurs=1) is used by a meeting organizer to define the kind of invitee. e.g., as required, optional, or a resource (e.g., meeting room).

The /myCalendar/event/attendee/responseTime (dateTime minOccurs=0 maxOccurs=1) reply time on each attendee is set to the current time (Now) when the organizer sends a meeting invitation. When the attendee responds, they update their responseTime. When the organizer receives responses, they will honor only those that have a higher responseTime than what s/he maintains in his/her own copy of the event for each attendee. While processing the response, the organizer will update their responseTime. This guarantees that the organizer honors only the most recent response from the attendee. This is stored in UTC.

The /myCalendar/event/attendee/counterProposeStartTime (dateTime minOccurs=0 maxOccurs=1) field contains the counter proposal start time information. If responseType=[counterPropose], then either the {startTime, endTime}, or location, or both can be present. This is the invitee's counterproposal for a new start time for the meeting. This is stored in UTC.

The /myCalendar/event/attendee/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /myCalendar/event/attendee/counterProposeLocation (string minOccurs=0 maxOccurs=1) field contains the counter proposal location information. field contains the counter proposal start time information. If responseType=[counterPropose], then either the {startTime, endTime}, or location, or both can be present. This is the invitee's counterproposal for a location for the meeting.

The /myCalendar/event/attendee/responseBody (string minOccurs=0 maxOccurs=1) field contains an optional message for invitees to include along with the response. The /myCalendar/event/attendee/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/attendee/responseBody/@dir (string minOccurs=0 maxOccurs=1) optional attribute specifies the base direction of directionally neutral text. Possible values include rtl (right to left) and ltr (left to right).

The /myCalendar/event/attendee/{any} (minOccurs=0 maxOccurs=unbounded) allows for extensibility.

The /myCalendar/event/recurrence (minOccurs=0 maxOccurs=1) includes /myCalendar/event/recurrence/@changeNumber (minOccurs=1 maxOccurs=1) changeNumber attribute, designed to facilitate caching of the element and its descendants. This attribute is assigned to this element by the .NET My Services system. The attribute is read only to applications. Attempts to write this attribute are silently ignored.

The /myCalendar/event/recurrence/rule (minOccurs=1 maxOccurs=1) includes the /myCalendar/event/recurrence/rule/@changeNumber (minOccurs=1 maxOccurs=1) changeNumber attribute, designed to facilitate caching of the element and its descendants. This attribute is assigned to this element by the .NET My Services system. The attribute is read only to applications. Attempts to write this attribute are silently ignored.

The /myCalendar/event/recurrence/rule/creationDate (dateTime minOccurs=1 maxOccurs=1) is required in order to exactly determine which timezone recurrence rule to use. The startTime of the event is not used because of the ability to create events in the past and in the future.

The /myCalendar/event/recurrence/rule/firstDayOfWeek (string minOccurs=1 maxOccurs=1) stores what the first day of the week (DOW) is for this user. Typical values are (su) Sunday or (mo) Monday. This maintains a recurrence rule's specified FirstDOW (for calculating the recurrence expansion. Allows recurring meetings to be expanded in the organizer's FirstDOW instead of the invitee's FirstDOW.

The /myCalendar/event/recurrence/rule/tzid (int minOccurs=0 maxOccurs=1) identifies the time zone for this recurring event. The dateTime information in this event is stored in UTC (converted from the local time zone defined by the time zone sub-schema). If this field is absent, the recurring event is assumed to be recurring in UTC time. However, it is only a floating recurring event if the <floating> attribute is set, as described above. @afterDay is currently used, but is optional.

The /myCalendar/event/recurrence/rule/is LeapYear (boolean minOccurs=0 maxOccurs=1) provides International calendar support. It is possible to derive is LeapYear from leapMonthValue, but .NET Calendar stores both separately. The /myCalendar/event/recurrence/rule/leapMonthValue (int minOccurs=0 maxOccurs=1) <leapMonthValue> cannot be derived from a particular year and thus must be stored. For example, a user creates a recurrence on a Hebrew Lunar calendar. The year is a leap year and it has 13 months. In that year, the leapMonthValue is 7.

The /myCalendar/event/recurrence/rule/repeat (minOccurs=1 maxOccurs=1) may includes the /myCalendar/event/recurrence/rule/repeat/daily (minOccurs=0 maxOccurs=1), field, which specifies the number of days to repeat, e.g., repeat every [ . . . ] days. The /myCalendar/event/recurrence/rule/ repeat/daily/@dayFrequency (int minOccurs=1 maxOccurs=1) specifies the periodicity of days over which repetition occurs, for example, repeat every 3 days.

The /myCalendar/event/recurrence/rule/repeat/weekly (minOccurs=0 maxOccurs=1) field, if present, is directed to repeating weekly, e.g., repeat every [ . . . ] week(s) on {su, mo,tu,we,th,fr,sa}. The presence of a weekday attribute means to repeat on this particular day. Any combination of the seven days is valid.

The /myCalendar/event/recurrence/rule/repeat/weekly/ @weekFrequency (int minOccurs=0 maxOccurs=1) repeat-Weekly recurrence occurs every period of weeks. If the attribute is not present, it defaults to 1 (every week).

The /myCalendar/event/recurrence/rule/repeat/monthly-ByDay (minOccurs=0 maxOccurs=1) specifies to repeat on the [First, Second, Third, Fourth, Last] {su, mo, tu, we, th, fr, sa} of every [ . . . ] month(s). Any combination of the {weekday} attributes are valid, including user-defined combinations for weekdays and weekend days.

The /myCalendar/event/recurrence/rule/repeat/monthly-ByDay/@monthFrequency (int minOccurs=0 maxOccurs=1) specifies the month periodicity to recur on. If this attribute is not present, it defaults to 1 (every month).

The /myCalendar/event/recurrence/rule/repeat/monthly-ByDay/@weekdayOfMonth (string minOccurs=1 maxOccurs=1) specifies which week in a month [first, second, third, fourth, last].

The /myCalendar/event/recurrence/rule/repeat/monthly (minOccurs=0 maxOccurs=1) repeats the occurrence every month on a particular day. The very first occurrence is created from the parent event's startTime and endTime, but the recurrence occurs as follows: Repeat every month on [day] of [month]. Repeat every [monthFrequency] month(s) on [day] of [month]. Typically, the first occurrence is also an instance of the recurrence, but this need not be the case.

The /myCalendar/event/recurrence/rule/repeat/ @monthly/@monthFrequency (int minOccurs=0 maxOccurs=1) optional attribute indicates the month periodicity. By default, it is 1, periodic every month. The start of the periodicity is determined from event startTime. The /myCalendar/event/recurrence/rule/repeat/monthly/@day (int minOccurs=1 maxOccurs=1) specifies the day of the month to recur on. Value is between one and 31.

A forceExact rule handles invalid day-month combinations. The proper recurrence pattern for repeating on the last day of the month is to use repeatMonthlyByDay. "Repeat on the [last] [day, weekday, weekend day] of . . . ". By default, an invalid day-month combination will cause .NET Calendar to search backwards to find a valid day-month combination. If /myCalendar/event/recurrence/rule/repeat/monthly/@forceExact (boolean minOccurs=0 maxOccurs=1) is true, an invalid starting [month, day] combination such as [6, 31] is ignored and will not be included as an instance of the recurrence. With forceExact, day=31 will only pick up months that have 31 days, day=30 will pick up all months except February, day=29 will pick up all months except February, except on leap years. February 29 is included on leap years.

The /myCalendar/event/recurrence/rule/repeat/yearlyByDay (minOccurs=0 maxOccurs=1) specifies how to repeat on the [First, Second, Third, Fourth, Last] {su, mo, tu, we, th, fr, sa} of [Jan, Feb, Mar, Apr, May, Jun, Jul, Aug, Sep, Oct, Nov, Dec] every [yearFrequency] years.

Any combination of the {weekday} attributes are valid, including user-defined combinations denoting weekdays and weekend days. This element's attributes contain whether a given day is or is not considered by the user as part of the work week. If this element has no attributes, it is assumed that the user has a Monday to Friday work week.

The /myCalendar/event/recurrence/rule/repeat/yearlyBy-Day/@yearFrequency (int minOccurs=0 maxOccurs=1) optional attribute indicates the year periodicity. By default, it is 1 (repeat every year).

The /myCalendar/event/recurrence/rule/repeat/yearlyBy-Day/@weekdayOfMonth (string minOccurs=1 maxOccurs=1) Specifies which week in a month [first, second, third, fourth, last] to repeat.

The /myCalendar/event/recurrence/rule/repeat/yearlyBy-Day/@month (int minOccurs=1 maxOccurs=1) contains a value between one and thirteen (some calendars have thirteen months).

The /myCalendar/event/recurrence/rule/repeat/yearly (minOccurs=0 maxOccurs=1) specifies to repeat every year on a particular date. The very first occurrence is created from the parent event's startTime and endTime, but the recurrence occurs as follows: Repeat yearly on [day] of [month]. Repeat every [yearFrequency] years on [day] of [month]. Typically, the first occurrence is also an instance of the recurrence, but this need not be the case.

The /myCalendar/event/recurrence/rule/repeat/yearly/ @yearFrequency (int minOccurs=0 maxOccurs=1) optional attribute indicates the year periodicity. By default, it is 1 (repeat every year). The /myCalendar/event/recurrence/rule/ repeat/yearly/@month (int minOccurs=1 maxOccurs=1) specifies the month to recur on.

The /myCalendar/event/recurrence/rule/repeat/yearly/ @day (int minOccurs=1 maxOccurs=1) specifies the day of the month to recur on. The value is between 1-31, and forceExact, applies for invalid day-month combinations. Thus, by default, an invalid day-month-year combination will cause .NET Calendar to search backwards to find a valid day for a particular month, year. If /myCalendar/event/recurrence/rule/ repeat/yearly/@forceExact (boolean minOccurs=0 maxOccurs=1) is true, an invalid starting [month, day] combination such as [6, 31] is ignored and will not be included as an instance of the recurrence. With forceExact, .NET Calendar, day=31 will only pick up months that have 31 days, day=30 will pick up all months except February, day=29 will pick up all months except February, except on leap years. February 29 is included on leap years.

The /myCalendar/event/recurrence/rule/repeat/{any} (minOccurs=0 maxOccurs=unbounded) allows for any additional repeat rules.

The /myCalendar/event/recurrence/rule/windowEnd (dateTime minOccurs=0 maxOccurs=1) field indicates the end of the window over which the recurrence occurs. This is stored in UTC. The Maximum range is Jan. 1, 1753 to Dec. 31, 9999 to an accuracy of 3.33 milliseconds. Note that windowEnd, repeatForever, repeatInstances may be selectable.

The /myCalendar/event/recurrence/rule/repeatForever (boolean minOccurs=0 maxOccurs=1) overrides the windowend date and specifies that this recurrence repeats forever. Client implementations cannot depend on date values repeating forever, like 23:59:59 pm Dec. 31, 9999 or 23:59 Aug. 31, 4500.

The /myCalendar/event/recurrence/rule/repeatInstances (int minOccurs=0 maxOccurs=1) overrides the windowend date and specifies that this recurrence repeats for the specified number of instances. As is apparent, repeatInstances and repeatForever are mutually exclusive, but repeatInstances will override repeatForever for errant schemas.

The /myCalendar/event/recurrence/rule/deletedExceptionDate (dateTime minOccurs=0 maxOccurs=unbounded) allows exceptions to a recurrence rule, which are added as an element list of dates. In general, the purpose of deletedExceptionDate is to prevent an instance/occurrence from being generated during expansion of the series. The myCalendar service logic ignores the hh:mm:ss of the dateTime and merely blocks out the particular day. Any days can be added to an exception rule, including days where no occurrences of a recurrence rule would fall in the first place. This is stored in UTC.

The /myCalendar/event/recurrence/rule/{any} (minOccurs=0 maxOccurs=unbounded) provides for additional recurrence rule logic that cannot be expressed in .NET Calendar logic.

The /myCalendar/event/recurrence/exception (minOccurs=0 maxOccurs=unbounded) field contains a list of modified event properties for this particular orphan event. The properties that are not modified are inherited from the original event upon recurrence expansion (client-side). A recurrenceId is always present, and is used to determine which instance of the original rule this modifiedException applies to.

The /myCalendar/event/recurrence/exception/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myCalendar/event/recurrence/exception/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myCalendar/event/recurrence/exception/@creator (minOccurs=1 maxOccurs=1) attribute identifies the creator in terms of userId, appId, and platformId of the node. The /myCalendar/event/recurrence/exception/recurrenceId (dateTime minOccurs=1 maxOccurs=1) field contains the original start time (recurrenceId) of the occurrence that is being modified by this exception. ModifiedExceptions with recurrenceIds that do not match the recurrenceId of any occurrence are ignored. This is stored in UTC. Note that modifiedException does not expose the id attribute; the recurrenceId should be used to predicate instead, as it functions as the id of modifiedException.

The /myCalendar/event/recurrence/exception/body (minOccurs=0 maxOccurs=1) field contains the modifiable properties of the eventBody. The /myCalendar/event/recurrence/exception/body/title (string minOccurs=0 maxOccurs=1) allows for title changes. The /myCalendar/event/recurrence/exception/body/title/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/body/title/@dir (string minOccurs=0 maxOccurs=1) optional attribute specifies the default layout direction for the localized string. Valid values are rtl (right to left) and ltr (left to right).

The /myCalendar/event/recurrence/exception/body/fullDescription (string minOccurs=0 maxOccurs=1) provides for a revised description. The /myCalendar/event/recurrence/exception/body/fullDescription/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/body/fullDescription/@dir (string minOccurs=0 maxOccurs=1) optional attribute specifies the base direction of directionally neutral text. Possible values include rtl (right to left) and ltr (left to right).

The /myCalendar/event/recurrence/exception/body/location (string minOccurs=0 maxOccurs=1) allows for a meeting location to be switched, for this instance only (not recurring instances). The /myCalendar/event/recurrence/exception/body/location/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/body/location/@dir (string minOccurs=0 maxOccurs=1) optional attribute specifies the default layout direction for the localized string. Valid values are rtl (right to left) and ltr (left to right).

The /myCalendar/event/recurrence/exception/body/startTime (dateTime minOccurs=0 maxOccurs=1), if present, switches the start time, again for this instance only. The /myCalendar/event/recurrence/exception/body/endTime (dateTime minOccurs=0 maxOccurs=1) switches the end time for this instance only.

The /myCalendar/event/recurrence/exception/body/allDay (boolean minOccurs=0 maxOccurs=1) specifies that this particular instance is allDay. The /myCalendar/event/recurrence/exception/body/travelTimeTo (int minOccurs=0 maxOccurs=1) can adjust the travel to time for this instance, such as if traffic is a problem. The /myCalendar/event/recurrence/exception/body/travelTimeFrom (int minOccurs=0 maxOccurs=1) can adjust the travel from time for this instance.

The /myCalendar/event/recurrence/exception/body/freeBusyStatus (string minOccurs=0 maxOccurs=1) handles a priority is changed for this meeting instance.

The /myCalendar/event/recurrence/exception/body/organizer (minOccurs=0 maxOccurs=1) field will be present when the original organizer is replaced by another organizer.

The /myCalendar/event/recurrence/exception/body/organizer/name (string minOccurs=0 maxOccurs=1) optional element specifies the name for the enclosing element. The /myCalendar/event/recurrence/exception/body/organizer/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/body/organizer/name/@dir (string minOccurs=0 maxOccurs=1) optional attribute specifies the default layout direction for the localized string. Valid values are rtl (right to left) and ltr (left to right).

The /myCalendar/event/recurrence/exception/body/organizer/puid (string minOccurs=0 maxOccurs=1) optional element specifies the PUID for the enclosing element. The /myCalendar/event/recurrence/exception/body/organizer/email (string minOccurs=0 maxOccurs=1) optional name specifies an e-mail address for the enclosing element. The /myCalendar/event/recurrence/exception/attendeeEventExtra (minOccurs=0 maxOccurs=1) provides for additional information about an event, found only in an event invitee's schema.

The /myCalendar/event/recurrence/exception/attendeeEventExtra/intendedFreeBusy (string minOccurs=0 maxOccurs=1) intendedFreeBusy element is the event organizer's freeBusy information, and is thus equal to event/ freeBusyStatus. Invitees may overwrite event/freeBusyStatus with a new value, and intendedFreeBusy is intended to store the organizer's original freeBusyStatus.

The /myCalendar/event/recurrence/exception/attendeeEventExtra/responseTime (dateTime minOccurs=0 maxOccurs=1) reply time on each attendee is set to the current time (Now) when the organizer sends a meeting invitation. When the attendee responds, they update their responseTime. When the organizer receives responses, they will honor only those that have a higher responseTime than what is maintained in his/her own copy of the event for each attendee. While processing the response, the organizer will update their responseTime. This guarantees that the organizer honors only the most recent response from the attendee. This is stored in UTC.

The /myCalendar/event/recurrence/exception/attendeeEventExtra/responseType (string minOccurs=0 maxOccurs=1) accept status indicates the valid types of responses that an attendee can reply with {accept, decline, tentative, counterpropose}. The absence of this field indicates that no response has been recorded.

The /myCalendar/event/recurrence/exception/attendeeEventExtra/counterProposeStartTime (dateTime minOccurs=0 maxOccurs=1) field contains the counter proposal start time information. If responseType=[counterPropose], then either the {startTime, endTime}, or location, or both can be present. This is the invitee's counterproposal for a new start time for the meeting. This is stored in UTC.

The /myCalendar/event/recurrence/exception/attendeeEventExtra/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /myCalendar/event/recurrence/exception/attendeeEventExtra/counterProposeLocation (string minOccurs=0 maxOccurs=1) field contains the counter proposal location information. field contains the counter proposal start time information. If responseType=[counterPropose], then either the {startTime, endTime}, or location, or both can be present. This is the invitee's counterproposal for a location for the meeting.

The /myCalendar/event/recurrence/exception/attendeeEventExtra/responseBody (string minOccurs=0 maxOccurs=1) field contains an optional message for invitees to include along with the response. The /myCalendar/event/recurrence/exception/attendeeEventExtra/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception attendeeEventExtra/responseBody/@dir (string minOccurs=0 maxOccurs=1) optional attribute specifies the base direction of directionally neutral text. Possible values include rtl (right to left) and ltr (left to right).

The /myCalendar/event/recurrence/exception/attendeeEventExtra/delegateResponder (minOccurs=0 maxOccurs=1), when present, is for a delegate who responds on behalf of an invitee; the delegate will have their information stored here.

The /myCalendar/event/recurrence/exception/attendeeEventExtra/delegateResponder/name (string minOccurs=0 maxOccurs=1) optional element specifies the name for the enclosing element. The /myCalendar/event/recurrence/exception/attendeeEventExtra/delegateResponder/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/attendeeEventExtra/delegateResponder/name/@dir (string minOccurs=0 maxOccurs=1) optional attribute specifies the default layout direction for the localized string. Valid values are rtl (right to left) and ltr (left to right).

The /myCalendar/event/recurrence/exception/attendeeEventExtra/delegateResponder/puid (string minOccurs=0 maxOccurs=1) optional element specifies the PUID for the enclosing element. The /myCalendar/event/recurrence/exception/attendeeEventExtra/delegateResponder/email (string minOccurs=0 maxOccurs=1) optional name specifies an e-mail address for the enclosing element. The /myCalendar/event/recurrence/exception/attendeeEventExtra/{any} (minOccurs=0 maxOccurs=unbounded) allows for additional attendee extra properties.

The meeting organizer of a recurring meeting may wish to exclude a particular attendee for an instance of the meeting. This idRefType (puid) indicates which attendee, (from the list of attendees at the event level) are not invited to this particular meeting instance, as specified in /myCalendar/event/recurrence/exception/deletedAttendee (string minOccurs=0 maxOccurs=unbounded). The /myCalendar/event/recurrence/exception/deletedAttachment (string minOccurs=0 maxOccurs=unbounded) is used when the meeting organizer of a recurring meeting may wish to exclude a particular attachment for an instance of the meeting.

The /myCalendar/event/recurrence/exception/attachment (minOccurs=0 maxOccurs=unbounded) specifies the scheme the message contents were encoded in. Examples of this are '7 bit', '8 bit' and 'base64'.

The /myCalendar/event/recurrence/exception/attachment/name (string minOccurs=1 maxOccurs=1) element contains information about an individual attachment in a mail message. The /myCalendar/event/recurrence/exception/attachment/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/attachment/name/@dir (string minOccurs=0 maxOccurs=1) optional attribute specifies the default layout direction for the localized string. Valid values are rtl (right to left) and ltr (left to right).

The /myCalendar/event/recurrence/exception/attachment/contentType (string minOccurs=1 maxOccurs=1) element contains the content type of the attachment.

The /myCalendar/event/recurrence/exception/attachment/contentTransferEncoding (string minOccurs=1 maxOccurs=1) element contains the encoding of the attachment. This information is necessary for decoding the attachment.

The /myCalendar/event/recurrence/exception/attachment/size (unsignedLong minOccurs=1 maxOccurs=1) element contains the size of the attachment in bytes.

The /myCalendar/event/recurrence/exception/attachment/attachmentBody (base64Binary minOccurs=1 maxOccurs=1) element contains the contents of the attachment.

The /myCalendar/event/recurrence/exception/attendee (minOccurs=0 maxOccurs=unbounded) attendeeType contains the information about an attendee, including the display, email, puid, and the attendee's response.

The /myCalendar/event/recurrence/exception/attendee/name (string minOccurs=0 maxOccurs=1) optional element specifies the name for the enclosing element. The /myCalendar/event/recurrence/exception/attendee/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/attendee/ name/@dir (string minOccurs=0 maxOccurs=1) optional attribute specifies the default layout direction for the localized string. Valid values are rtl (right to left) and ltr (left to right).

The /myCalendar/event/recurrence/exception/attendee/ puid (string minOccurs=0 maxOccurs=1) optional element specifies the PUID for the enclosing element.

The /myCalendar/event/recurrence/exception/attendee/ email (string minOccurs=0 maxOccurs=1) optional name specifies an e-mail address for the enclosing element.

The /myCalendar/event/recurrence/exception/attendee/inviteType (string minOccurs=1 maxOccurs=1) is used by the meeting organizer to define the kind of invitee {required, optional, resource}.

The /myCalendar/event/recurrence/exception/attendee/responseTime (dateTime minOccurs=0 maxOccurs=1) is for the reply time. The reply time on each attendee is set to the current time (Now) when the organizer sends a meeting invitation. When the attendee responds, they always update their responseTime. When the organizer receives responses, they will honor only those that have a higher responseTime than what s/he maintains in his/her own copy of the event for each attendee. While processing the response, the organizer will update their responseTime. This guarantees that the organizer honors only the most recent response from the attendee. This is stored in UTC.

The /myCalendar/event/recurrence/exception/attendee/responseType (string minOccurs=0 maxOccurs=1) accept status indicates the valid types of responses that an attendee can reply with {accept, decline, tentative, counterpropose}. The absence of this field indicates that no response has been recorded (either the invitation has not been sent, or that a reply has not been received).

The /myCalendar/event/recurrence/exception/attendee/counterProposeStartTime (dateTime minOccurs=0 maxOccurs=1) is like other counter proposal data. Thus, If responseType=[counterPropose], then either the {startTime, endTime}, or location, or both can be present. This is the invitee's counterproposal for a new start time for the meeting. This is stored in UTC. The /myCalendar/event/recurrence/ exception/attendee/counterProposeEndTime (dateTime minOccurs=0 maxOccurs=1) is for the counter-proposed end time, and if responseType=[counterPropose], then either the {startTime, endTime}, or location, or both can be present. This is the invitee's counterproposal for a new end time for the meeting. This is stored in UTC. The /myCalendar/event/ recurrence/exception/attendee/counterProposeLocation (string minOccurs=0 maxOccurs=1) field is for the counter-proposed location. If responseType=[counterPropose], then either the {startTime, endTime}, or location, or both can be present. This is the invitee's counterproposal for a location for the meeting.

The /myCalendar/event/recurrence/exception/attendee/responseBody (string minOccurs=0 maxOccurs=1) provides for an optional message for invitees to include along with the response. The /myCalendar/event/recurrence/exception/attendee/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /myCalendar/event/recurrence/exception/attendee/responseBody/@dir (string minOccurs=0 maxOccurs=1) optional attribute specifies the base direction of directionally neutral text. Possible values include rtl (right to left) and ltr (left to right).

The /myCalendar/event/recurrence/exception/attendee/ {any} (minOccurs=0 maxOccurs=unbounded) field provides extensibility.

The /myCalendar/event/recurrence/exception/reminder (minOccurs=0 maxOccurs=1) are the properties of the reminder that may be modified. If there is no reminder sub-schema in the event body, exception reminders are ignored.

The /myCalendar/event/recurrence/exception/reminder/ set (boolean minOccurs=0 maxOccurs=1), /myCalendar/ event/recurrence/exception/reminder/offset (int minOccurs=0 maxOccurs=1) and /myCalendar/event/recurrence/ exception/reminder/interruptability (int minOccurs=0 maxOccurs=1), are generally as described above, however note that these fields are for exceptions.

The /myCalendar/event/recurrence/exception/{any} (minOccurs=0 maxOccurs=unbounded) provides for additional properties of the myCalendar/BaseEventType schema.

The /myCalendar/event/recurrence/{any} (minOccurs=0 maxOccurs=unbounded) provides for additional recurrence rule elements.

The /myCalendar/subscription (minOccurs=0 maxOccurs=unbounded) element defines a subscription node as described above in the subscription section.

myCalendar/Domain Specific Methods

In addition to the standard methods, the myCalendar service supports the domain-specific methods, getCalendarDays, getFreeBusyDays, getQuickView, sendMeeting, respond and updateReminder.

The myCalendar/getCalendarDaysRequest is a calendar date range event generator. This method is accessed using a request message, and in response may generate a response message or a SOAP Fault message. The following sample document fragments illustrate the structure and meaning of the elements and attributes in the request and response messages. The following is a request message XML fragment for getCalendarDays; it takes a startDate and an endDate to define the duration over which calendar events are returned:

```
<m:getCalendarDaysRequest
    xmlns:m="http://schemas.microsoft.com/hs/2001/10/myCalendar"
    xmlns:hs="http://schemas.microsoft.com/hs/2001/10/core">$_{1..1}$
    <m:calendarType>$_{0..1}$</m:calendarType>
    <m:startTime>$_{1..1}$</m:startTime>
    <m:endTime>$_{1..1}$</m:endTime>
    <m:removeRecurrence>$_{0..1}$</m:removeRecurrence>
</m:getCalendarDaysRequest>
```

The /getCalendarDaysRequest (minOccurs=1 maxOccurs=1) function returns an XML stream of calendar appointments/events between two dates. Recurrence rules are expanded to create individual calendar items. Holidays are represented as all-day events, and these are returned as well. The getCalendarDays method is a query-retrieval of data, but the behavior expands recurrence rules into individual (aliased) events, adds in holidays, and adds regular events and sorts the entire list based on start time. No merging of event blocks occurs. Any object which overlaps the method parameters {startTime, endTime} will be returned. For example, if an event crosses midnight and the startTime is 12 am, that event will be returned. In case the startDate, endDate is one day, the events are sorted in the following order: holidays, all-day events, and regular events (based on startTime). The {startTime, endTime} time window can define any interval: 24 hr period, week, month, or any other user-defined period.

The getCalendarDays method returns the calendaring info of any puid that is specified for which the caller has sufficient privileges. The user's own puid must be specified to retrieve their own information. The getCalendarDays method may be used to retrieve multiple calendar data from other users using <h:key instance="0" cluster="0" puid="xyz"/> in the SOAP headers provided that puid "xyz" is provisioned on the .NET Calendar server, and provided that the user has been granted access in puid "xyz"'s rolelist.

The /getCalendarDaysRequest/calendarType (string minOccurs=0 maxOccurs=1) optionally specifies the calendar type to return, as set forth in the calendar-types table above. The system defaults to Gregorian if not specified.

The /getCalendarDaysRequest/startTime (dateTime minOccurs=1 maxOccurs=1) specifies the starting time window of calendar objects to retrieve. This dateTime also contains the timeZone to retrieve the calendar information in.

The /getCalendarDaysRequest/endTime (dateTime minOccurs=1 maxOccurs=1) field contains the ending time window to retrieve calendar objects. This dateTime also contains the timeZone to retrieve the calendar information in, and needs to be the same timeZone as startTime.

Normally, the recurrence sub-schema, (minus modifiedException and minus deletedExceptionDate components) is returned with each instance of a recurring event, like "recurring-instance" and "recurring-exception". This allows clients to properly render the recurrence pattern without having to explicitly query the recurring-master. However, because it is heavy on bandwidth, .NET Calendar includes the option to not return this data, via /getCalendarDaysRequest/removeRecurrence (boolean minOccurs=0 maxOccurs=1).

Upon successful completion of the above method, a response message, myCalendar/getCalendarDaysResponse, is generated. In the response, calendar events are returned with their recurrence rules expanded into first-class events. These events have aliased PUIDs, logically as part of the same event. Recurrence information is stripped from the original event. The following is a response schema outline:

```
<m:getCalendarDaysResponse selectedNodeCount="..." status="..."
    xmlns:m="http://schemas.microsoft.com/hs/2001/10/myCalendar"
    xmlns:hs="http://schemas.microsoft.com/hs/2001/10/core">$_{1..1}$
    <m:event instanceType="..." calendarType="..."
    advanceHijriValue="..." changeNumber="..."
id="..." creator="...">$_{0..unbounded}$
        <m:body changeNumber="...">$_{1..1}$
            <m:cat ref="...">$_{0..unbounded}$</m:cat>
            <m:title xml:lang="..." dir="...">$_{1..1}$</m:title>
            <m:fullDescription xml:lang="..."
            dir="...">$_{0..1}$</m:fullDescription>
            <m:location xml:lang="..." dir="...">$_{0..1}$</m:location>
            <m:meetingStatus>$_{0..1}$</m:meetingStatus>
            <m:recurrenceId>$_{0..1}$</m:recurrenceId>
            <m:lastUpdateTime>$_{0..1}$</m:lastUpdateTime>
            <m:startTime>$_{1..1}$</m:startTime>
            <m:endTime>$_{1..1}$</m:endTime>
            <m:allDay>$_{0..1}$</m:allDay>
            <m:floating>$_{0..1}$</m:floating>
            <m:travelTimeTo>$_{0..1}$</m:travelTimeTo>
            <m:travelTimeFrom>$_{0..1}$</m:travelTimeFrom>
            <m:freeBusyStatus>$_{0..1}$</m:freeBusyStatus>
            <m:cuid>$_{0..1}$</m:cuid>
            <m:organizer>$_{0..1}$
                <hs:name xml:lang="..." dir="...">$_{0..1}$</hs:name>
                <hs:puid>$_{0..1}$</hs:puid>
                <hs:email>$_{0..1}$</hs:email>
            </m:organizer>
            {any}
```

-continued

```
        </m:body>
        <m:attachment>$_{0..unbounded}$
            <m:name xml:lang="..." dir="...">$_{1..1}$</m:name>
            <m:contentType>$_{1..1}$</m:contentType>
            <m:contentTransferEncoding>$_{1..1}$</m:contentTransferEncoding>
            <m:size>$_{1..1}$</m:size>
            <m:attachmentBody>$_{1..1}$</m:attachmentBody>
        </m:attachment>
        <m:reminder>$_{0..1}$
            <m:set>$_{1..1}$</m:set>
            <m:to xml:lang="..." dir="...">$_{1..1}$</m:to>
            <m:offset>$_{1..1}$</m:offset>
            <m:interruptability>$_{0..1}$</m:interruptability>
            <m:lastSentTime>$_{1..1}$</m:lastSentTime>
            <m:nextTriggerTime>$_{1..1}$</m:nextTriggerTime>
        </m:reminder>
        <m:attendee>$_{0..unbounded}$
            <hs:name xml:lang="..." dir="...">$_{0..1}$</hs:name>
            <hs:puid>$_{0..1}$</hs:puid>
            <hs:email>$_{0..1}$</hs:email>
            <m:inviteType>$_{1..1}$</m:inviteType>
            <m:responseTime>$_{0..1}$</m:responseTime>
            <m:responseType>$_{0..1}$</m:responseType>
            <m:counterProposeStartTime>$_{0..1}$</m:counterProposeStartTime>
            <m:counterProposeEndTime>$_{0..1}$</m:counterProposeEndTime>
            <m:counterProposeLocation>$_{0..1}$</m:counterProposeLocation>
            <m:responseBody xml:lang="..." dir="...">$_{0..1}$</m:responseBody>
            {any}
        </m:attendee>
        <m:recurrence>$_{0..1}$
            <m:rule>$_{1..1}$
                <m:creationDate>$_{1..1}$</m:creationDate>
                <m:firstDayOfWeek>$_{1..1}$</m:firstDayOfWeek>
                <m:tzid>$_{0..1}$</m:tzid>
                <m:isLeapYear>$_{0..1}$</m:isLeapYear>
                <m:leapMonthValue>$_{0..1}$</m:leapMonthValue>
                <m:repeat>$_{1..1}$
                    <m:daily dayFrequency="...">$_{0..1}$</m:daily>
                    <m:weekly su="..." mo="..." tu="..." we="..." th="..."
                    fr="..." sa="..."
weekFrequency="...">$_{0..1}$</m:weekly>
                    <m:monthlyByDay su="..." mo="..." tu="..."
                    we="..." th="..."
                    fr="..." sa="..."
monthFrequency="..." weekdayOfMonth="...">$_{0..1}$</m:monthlyByDay>
                    <m:monthly monthFrequency="..." day="..."
                    forceExact="...">$_{0..1}$</m:monthly>
                    <m:yearlyByDay su="..." mo="..." tu="..." we="..." th="..."
                    fr="..." sa="..."
yearFrequency="..." weekdayOfMonth="..." month="...">$_{0..1}$</m:yearlyByDay>
                    <m:yearly yearFrequency="..." month="..."
                    day="..." forceExact="...">$_{0..1}$</m:yearly>
                    {any}
                </m:repeat>
                <m:windowEnd>$_{0..1}$</m:windowEnd>
                <m:repeatForever>$_{0..1}$</m:repeatForever>
                <m:repeatInstances>$_{0..1}$</m:repeatInstances>
            </m:rule>
        </m:recurrence>
    </m:event>
</m:getCalendarDaysResponse>
```

The /getCalendarDaysResponse (minOccurs=1 maxOccurs=1) response XML blob format, comprises the base event type minus recurrence. The /getCalendarDaysResponse/@selectedNodeCount (int minOccurs=0 maxOccurs=1) This attribute is used to return the number of selected nodes, selected by the corresponding data language operation. The /getCalendarDaysResponse/@status (string minOccurs=1 maxOccurs=1) attribute indicates the status of the method.

If the status is success, the corresponding method was completed successfully. If the status is failure, the corresponding method was not completed successfully. If the status is rollback, the method failed, but was rolled back to its pre-updateBlock status. If the status is notAttempted, the corresponding method was not attempted. This occurs when a previous operation failed.

The /getCalendarDaysResponse/event (minOccurs=0 maxOccurs=unbounded), if present, may have a /getCalendarDaysResponse/event/@instanceType (string minOccurs=0 maxOccurs=1) field which distinguishes between a single instance of an event or an instance of a recurring event. The recurring instance is a modified exception if eventBody/recurrenceId is present: single, recurring-master, recurring-instance, recurring-exception. The /getCalendarDaysResponse/event/@calendarType (string minOccurs=0 maxOccurs=1) field identifies an enumeration which determines the kind of calendar event this is, as set forth in the above calendar type table.

The /getCalendarDaysResponse/event/@advanceHijriValue (int minOccurs=0 maxOccurs=1) field is required for Hijri calendar support. @advanceHijriValue ranges from {−3, −2, −1, 1, 2, 3} and is added to the current date, but the day of the week stays the same. For example, if today is the 24th and @advanceHijriValue is set to be +2, then the user sees the date as being the 26th. Typically @advanceHijriValue is +/−1, and this suffices in most cases. Theoretically it can be any number, but the worst case scenario is +/−3.

The /getCalendarDaysResponse/event/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /getCalendarDaysResponse/event/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /getCalendarDaysResponse/event/@creator (minOccurs=1 maxOccurs=1) attribute identifies the creator in terms of userId, appId, and platformId of the node.

The /getCalendarDaysResponse/event/body (minOccurs=1 maxOccurs=1) includes the /getCalendarDaysResponse/event/body/@changeNumber (minOccurs=1 maxOccurs=1) changeNumber attribute, which is designed to facilitate caching of the element and its descendants. This attribute is assigned to this element by the .NET My Services system. The attribute is read only to applications. Attempts to write this attribute are silently ignored.

The /getCalendarDaysResponse/event/body/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /getCalendarDaysResponse/event/body/cat/@ref (anyURI minOccurs=1 maxOccurs=1) attribute references a category definition (catDef) element using the rules outlined in the .NET Categories section, described above.

The /getCalendarDaysResponse/event/body/title (string minOccurs=1 maxOccurs=1) includes the /getCalendarDaysResponse/event/body/title/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/body/title/@dir (string minOccurs=0 maxOccurs=1) optional attribute specifies the default layout direction for the localized string. Valid values are rtl (right to left) and ltr (left to right).

The /getCalendarDaysResponse/event/body/fullDescription (string minOccurs=0 maxOccurs=1) element contains a free form, full description of the event. The /getCalendarDaysResponse/event/body/fullDescription/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/body/fullDescription/@dir (string minOccurs=0 maxOccurs=1) optional attribute specifies the base direction of directionally neutral text. Possible values include rtl (right to left) and ltr (left to right).

The /getCalendarDaysResponse/event/body/location (string minOccurs=0 maxOccurs=1) optional element contains the event's location. The /getCalendarDaysResponse/event/body/location/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/body/location/@dir (string minOccurs=0 maxOccurs=1) optional attribute specifies the default layout direction for the localized string. Valid values are rtl (right to left) and ltr (left to right).

The /getCalendarDaysResponse/event/body/meetingStatus (string minOccurs=0 maxOccurs=1) tracks the status of this meeting {not-sent, sent, cancelled}. A regular appointment will not have this element. If <meetingStatus> exists, this event should be rendered as a meeting, not as an appointment.

The /getCalendarDaysResponse/event/body/recurrenceId (dateTime minOccurs=0 maxOccurs=1) recurrence id indicates the original start time of an occurrence of a recurring master appointment. It is required to identify what instance an exception is modifying, since users are allowed to change the start time on the orphan. The recurrenceId method is stored in UTC. It does not appear in the master schema, except in the specific case that an attendee is invited to an instance of a recurring event. Otherwise, <recurrenceId> is usually only a part of getCalendarDays.

The /getCalendarDaysResponse/event/body/lastUpdateTime (dateTime minOccurs=0 maxOccurs=1) field is updated by the organizer whenever s/he creates and sends a new meeting request. This helps the attendee to identify which meeting request is the most recent one. It is stored in coordinated universal time (UTC). This property is not modifiable by clients and is assigned by the server on modification and by the sendMeetingRequest.

The /getCalendarDaysResponse/event/body/startTime (dateTime minOccurs=1 maxOccurs=1) startTime method defines the start time of the event. An all-day event by convention starts at 12:00:00 AM of the day of the event. This is stored in UTC. Maximum range is Jan. 1, 1753 to Dec. 31, 9999 to an accuracy of 3.33 milliseconds. If this event is a recurring event, <startTime> defines the dateTime when the recurrence window starts. The recurring master does not have to be an instance of the recurring event itself. An event in March set to recur every April will only appear in April.

The /getCalendarDaysResponse/event/body/endTime (dateTime minOccurs=1 maxOccurs=1) endTime method defines the end time of the event. An all-day event by convention ends at 11:59:59 PM of the ending day. This is stored in UTC. Maximum range is Jan. 1, 1753 to Dec. 31, 9999 to an accuracy of 3.33 milliseconds. The duration of the event is inferred from endTime−startTime.

The /getCalendarDaysResponse/event/body/allDay (boolean minOccurs=0 maxOccurs=1) element indicates a regular event by being false or being absent. Otherwise, this attribute indicates that the event is an all-day event. All day events may span multiple days. By convention, all day events start at 12:00:00 am of the day of startTime, regardless of what time it actually is, and it will end at 11:59:59 pm of the endTime date. In other words, if the allDay element is present and has value=true, .NET Calendar will ignore the actual times of the events and consider only the date part of the field.

The allDay tag is meant to operate as a hint to UI renders to display specialized icons indicating an all-day event. allDay events are distinguishable between 24-hr events starting at 12 am. In the case of a meeting request, an allDay event will not appear in the local user's time zone, but rather in the organizer's time zone.

The /getCalendarDaysResponse/event/body/floating (boolean minOccurs=0 maxOccurs=1) floating attribute indicates that this event is to occur in the current local time zone no matter what time zone the system is currently in (that is, it floats). For example, holidays are floating events. As another example, it may be useful to schedule medication regardless of an actual time zone, whereby a floating attribute is used with such an event. Floating values are stored as-is: no time-zone translations are needed to convert them to UTC or any local time zone.

The /getCalendarDaysResponse/event/body/travelTimeTo (int minOccurs=0 maxOccurs=1) field contains the amount of time (in minutes) that it takes to travel to the meeting location. The /getCalendarDaysResponse/event/body/travelTimeFrom (int minOccurs=0 maxOccurs=1) field contains the amount of time (in minutes) that it takes to return from the meeting location. These optional elements show in free/busy calculations.

The /getCalendarDaysResponse/event/body/freeBusyStatus (string minOccurs=0 maxOccurs=1) optional element annotates the freeBusy behavior of this event. Events by default appear as "busy". The user may explicitly define this event to be annotated by setting .NET Calendar values to free, tentative, busy or away.

The /getCalendarDaysResponse/event/body/cuid (string minOccurs=0 maxOccurs=1) cuid (CorrelationUID) links an organizer's event to an attendee's event. It identifies which response from an attendee is for which request from an organizer, and which meeting request update from the organizer is for which previously accepted meeting by the attendee. The "cuid" is the same on both the attendee's and the organizer's copy of the appointment. It is also identical on the exception and the recurring master. This value is assigned by the .NET Calendar server and is non-modifiable.

The /getCalendarDaysResponse/event/body/organizer (minOccurs=0 maxOccurs=1) field contains the email address of the event organizer.

The /getCalendarDaysResponse/event/body/organizer/name (string minOccurs=0 maxOccurs=1) optional element specifies the name for the enclosing element. The /getCalendarDaysResponse/event/body/organizer/name/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/body/organizer/name/@dir (string minOccurs=0 maxOccurs=1) optional attribute specifies the default layout direction for the localized string. Valid values are rtl (right to left) and ltr (left to right).

The /getCalendarDaysResponse/event/body/organizer/puid (string minOccurs=0 maxOccurs=1) optional element specifies the PUID for the enclosing element. The /getCalendarDaysResponse/event/body/organizer/email (string minOccurs=0 maxOccurs=1) optional name specifies an e-mail address for the enclosing element.

The /getCalendarDaysResponse/event/body/{any} (minOccurs=0 maxOccurs=unbounded) provides for additional body elements.

The /getCalendarDaysResponse/event/attendeeEventExtra (minOccurs=0 maxOccurs=1) field contains additional information about an event, found only in an event invitee's schema. The /getCalendarDaysResponse/event/attendeeEventExtra/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /getCalendarDaysResponse/event/attendeeEventExtra/intendedFreeBusy (string minOccurs=0 maxOccurs=1) element is the event organizer's freeBusy information and is thus equal to event/freeBusyStatus. Invitees may overwrite event/freeBusyStatus with a new value, and intendedFreeBusy is intended to store the organizer's original freeBusyStatus.

The /getCalendarDaysResponse/event/attendeeEventExtra/responseTime (dateTime minOccurs=0 maxOccurs=1) field contains the reply time on each attendee is set to the current time (Now) when the organizer sends a meeting invitation. When the attendee responds, they update their responseTime. When the organizer receives responses, they will honor only those that have a higher responseTime than what is maintained in his/her own copy of the event for each attendee. While processing the response, the organizer will update their responseTime. This guarantees that the organizer honors only the most recent response from the attendee. This is stored in UTC.

The /getCalendarDaysResponse/event/attendeeEventExtra/responseType (string minOccurs=0 maxOccurs=1) accept status indicates the valid types of responses that an attendee can reply with {accept, decline, tentative, counterpropose}. The absence of this field indicates that no response has been recorded (either the invitation has not been sent, or that a reply has not been received).

The /getCalendarDaysResponse/event/attendeeEventExtra/counterProposeStartTime (dateTime minOccurs=0 maxOccurs=1) field contains the counter proposal start time information. If responseType=[counterPropose], then either the {startTime, endTime}, or location, or both can be present. This is the invitee's counterproposal for a new start time for the meeting. This is stored in UTC.

The /getCalendarDaysResponse/event/attendeeEventExtra/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /getCalendarDaysResponse/event/attendeeEventExtra/counterProposeLocation (string minOccurs=0 maxOccurs=1) field contains the counter proposal location information. field contains the counter proposal start time information. If responseType=[counterPropose], then either the {startTime, endTime}, or location, or both can be present. This is the invitee's counterproposal for a location for the meeting.

The /getCalendarDaysResponse/event/attendeeEventExtra/responseBody (string minOccurs=0 maxOccurs=1) field contains an optional message for invitees to include along with the response. The /getCalendarDaysResponse/event/attendeeEventExtra/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/attendeeEventExtra/responseBody/@dir (string minOccurs=0 maxOccurs=1) optional attribute specifies the base direction of directionally neutral text. Possible values include rtl (right to left) and ltr (left to right).

The /getCalendarDaysResponse/event/attendeeEventExtra/delegateResponder (minOccurs=0 maxOccurs=1) field stores information of a delegate who responds on behalf of an invitee. The /getCalendarDaysResponse/event/attendeeEventExtra/delegateResponder/name (string minOccurs=0 maxOccurs=1) optional element specifies the name for the enclosing element. The /getCalendarDaysResponse/event/attendeeEventExtra/delegateResponder/name/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/attendeeEventExtra/delegateResponder/name/@dir (string minOccurs=0 maxOccurs=1) optional attribute specifies the default layout direction for the localized string. Valid values are rtl (right to left) and ltr (left to right).

The /getCalendarDaysResponse/event/attendeeEventExtra/delegateResponder/puid (string minOccurs=0 maxOccurs=1) optional element specifies the PUID for the enclosing element. The /getCalendarDaysResponse/event/attendeeEventExtra/delegateResponder/email (string minOccurs=0 maxOccurs=1) optional name specifies an e-mail address for the enclosing element. The /getCalendarDaysResponse/event/attendeeEventExtra/{any} (minOccurs=0 maxOccurs=unbounded) provides for additional attendee extra properties.

The /getCalendarDaysResponse/event/attachment (minOccurs=0 maxOccurs=unbounded) element contains attachment metadata, name, content-type and id's, and may also contain the attachmentBody. The /getCalendarDaysResponse/event/attachment/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /getCalendarDaysResponse/event/attachment/@id (minOccurs=1 maxOccurs=1) attribute is a globally unique ID assigned to this element by .NET My Services. Normally, .NET My Services generates and assigns this ID during an insertRequest operation, or possibly during a replaceRequest. Application software can override this ID generation by specifying the useClientIds attribute in the request message. After an ID has been assigned, the attribute is read only and attempts to write it are silently ignored.

The /getCalendarDaysResponse/event/attachment/@creator (minOccurs=1 maxOccurs=1) attribute identifies the creator in terms of userId, appId, and platformId of the node. The /getCalendarDaysResponse/event/attachment/name (string minOccurs=1 maxOccurs=1) element contains information about an individual attachment in a mail message. The /getCalendarDaysResponse/event/attachment/name/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/attachment/name/@dir (string minOccurs=0 maxOccurs=1) optional attribute specifies the default layout direction for the localized string. Valid values are rtl (right to left) and ltr (left to right).

The /getCalendarDaysResponse/event/attachment/contentType (string minOccurs=1 maxOccurs=1) element contains the content type of the attachment. The /getCalendarDaysResponse/event/attachment/contentTransferEncoding (string minOccurs=1 maxOccurs=1) element contains the encoding of the attachment. This information is necessary for decoding the attachment. The /getCalendarDaysResponse/event/attachment/size (unsignedLong minOccurs=1 maxOccurs=1) element contains the size of the attachment in bytes. The /getCalendarDaysResponse/event/attachment/attachmentBody (base64Binary minOccurs=1 maxOccurs=1) element contains the contents of the attachment.

The /getCalendarDaysResponse/event/reminder (minOccurs=0 maxOccurs=1) is directed to reminders. A user may optionally define a reminder for this appointment. Reminders for recurring appointments will be sent periodically before the appointment, as per the rules defined in the reminder subschema below. A non-recurring event may define no reminders, define a reminder with <set>="true" or define a reminder with <set>="false".

A recurring meeting may have no reminders defined, or a recurring reminder defined with all instances receiving reminders. To define no reminders by default, but to define reminders for particular meeting instances in the exception body, a reminder <set>="false" is created, and turned on and/or modified for particular instances. To define a recurring reminder, but turn it off for particular meeting instances, a reminder <set>="true" is created, and turned off for particular instances.

If the event's reminder subschema is non-existent, yet the exception body has a reminder blob, then the exception reminder is ignored. An alternative is to require this.

The /getCalendarDaysResponse/event/reminder/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /getCalendarDaysResponse/event/reminder/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /getCalendarDaysResponse/event/reminder/@creator (minOccurs=1 maxOccurs=1) attribute identifies the creator in terms of userId, appId, and platformId of the node. The /getCalendarDaysResponse/event/reminder/set (boolean minOccurs=1 maxOccurs=1) field maintains a Boolean flag that indicates whether the reminder is active for this event. In most cases, this will be true, but in the case of a recurring appointment, this flag may default to true with specific instances not to be reminded, or default to false, with specific instances to be reminded.

The /getCalendarDaysResponse/event/reminder/to (string minOccurs=1 maxOccurs=1) stores a friendly name that this reminder is being sent to. The /getCalendarDaysResponse/event/reminder/to/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/reminder/to/@dir (string minOccurs=0 maxOccurs=1) optional attribute specifies the default layout direction for the localized string. Valid values are rtl (right to left) and ltr (left to right).

The /getCalendarDaysResponse/event/reminder/offset (int minOccurs=1 maxOccurs=1) field specifies the offset, in minutes, of how long before the event the user should be reminded. Recommended values are set forth in the following table:

| Value | Description |
| --- | --- |
| 5, 10, 20, 30, 45 | 5, 10, 20, 30, 45 minutes before the event |
| 60, 120, 180, | 1, 2, 3 hours before the event |
| startTime – startDay | The day of the event (reminder sent at 12:00 am) |
| startTime – (startDay – (1440 * x)) | "x" days before the event (reminder sent at 12:00 am "x" days before) |

The /getCalendarDaysResponse/event/reminder/interruptability (int minOccurs=0 maxOccurs=1) optional element defines how interruptible this event is and it is used by notification routing software to make decisions about the relay and deferral of notifications that might occur while this meeting is active. The value contained in this element is a numeric value between one and ten. Low values represent a high cost of disruption, high values represent a low cost of disruption.

The /getCalendarDaysResponse/event/reminder/lastSentTime (dateTime minOccurs=1 maxOccurs=1) field is required by the reminder engine. The /getCalendarDaysResponse/event/reminder/nextTriggerTime (dateTime minOccurs=1 maxOccurs=1) determines the next time to trigger reminder.

The /getCalendarDaysResponse/event/attendee (minOccurs=0 maxOccurs=unbounded) includes the attendeeType, which contains the information about an attendee, including the display, email, puid, and the attendee's response.

The /getCalendarDaysResponse/event/attendee/name (string minOccurs=0 maxOccurs=1) optional element specifies the name for the enclosing element. The /getCalendarDaysResponse/event/attendee/name/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/attendee/name/@dir (string minOccurs=0 maxOccurs=1) optional attribute specifies the default layout direction for the localized string. Valid values are rtl (right to left) and ltr (left to right).

The /getCalendarDaysResponse/event/attendee/puid (string minOccurs=0 maxOccurs=1) optional element specifies the PUID for the enclosing element. The /getCalendarDaysResponse/event/attendee/email (string minOccurs=0 maxOccurs=1) optional name specifies an e-mail address for the enclosing element. The /getCalendarDaysResponse/event/attendee/inviteType (string minOccurs=1 maxOccurs=1) is used by a meeting organizer to define the kind of invitee, e.g., as required, optional, or a resource (e.g., meeting room).

The /getCalendarDaysResponse/event/attendee/responseTime (dateTime minOccurs=0 maxOccurs=1) reply time on each attendee is set to the current time (Now) when the organizer sends a meeting invitation. When the attendee responds, they update their responseTime. When the organizer receives responses, they will honor only those that have a higher responseTime than what s/he maintains in his/her own copy of the event for each attendee. While processing the response, the organizer will update their responseTime. This guarantees that the organizer honors only the most recent response from the attendee. This is stored in UTC.

The /getCalendarDaysResponse/event/attendee/counterProposeStartTime (dateTime minOccurs=0 maxOccurs=1) field contains the counter proposal start time information. If responseType=[counterPropose], then either the {startTime, endTime}, or location, or both can be present. This is the invitee's counterproposal for a new start time for the meeting. This is stored in UTC.

The /getCalendarDaysResponse/event/attendee/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /getCalendarDaysResponse/event/attendee/counterProposeLocation (string minOccurs=0 maxOccurs=1) field contains the counter proposal location information. field contains the counter proposal start time information. If responseType=[counterPropose], then either the {startTime, endTime}, or location, or both can be present. This is the invitee's counterproposal for a location for the meeting.

The /getCalendarDaysResponse/event/attendee/responseBody (string minOccurs=0 maxOccurs=1) field contains an optional message for invitees to include along with the response. The /getCalendarDaysResponse/event/attendee/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /getCalendarDaysResponse/event/attendee/responseBody/@dir (string minOccurs=0 maxOccurs=1) optional attribute specifies the base direction of directionally neutral text. Possible values include rtl (right to left) and ltr (left to right).

The /getCalendarDaysResponse/event/attendee/{any} (minOccurs=0 maxOccurs=unbounded) allows for extensibility.

The /getCalendarDaysResponse/event/recurrence/rule (minOccurs=1 maxOccurs=1) includes /getCalendarDaysResponse/event/recurrence/rule/creationDate (dateTime minOccurs=1 maxOccurs=1), which is required to determine which timezone recurrence rule to use. The startTime of the event is not used because of the ability to create events in the past and in the future.

The /getCalendarDaysResponse/event/recurrence/rule/firstDayOfWeek (string minOccurs=1 maxOccurs=1) stores what the first day of the week is for this user. Typical values are (su) Sunday or (mo) Monday. This is used for calculating the recurrence expansion, and allows recurring meetings to be expanded in the organizer's FirstDOW instead of the invitee's FirstDOW.

The /getCalendarDaysResponse/event/recurrence/rule/tzid (int minOccurs=0 maxOccurs=1) field identifies the time zone for this recurring event. All dateTime information in this event is stored in UTC (converted from the local time zone defined by the time zone sub-schema). If this field is absent, the recurring event is assumed to be recurring in UTC time. However, it is only a floating recurring event if the <floating> attribute is set:

```
<timeZone floating="..."
  id
="...">1..1
    <standardBias>1..1
    </standardBias>
      <additionalDaylightBias>0..1
    </additionalDaylightBias>
      <standardDate>0..1
        <transitionRule weekdayOfMonth="..." day=
"..." dayOfMonth="..." month="..." afterDay="...">1..1
      </transitionRule>
        <transitionTime>1..1
      </transitionTime>
      </standardDate>
      <daylightDate>0..1
        <transitionRule weekdayOfMonth="..." day=
"..." dayOfMonth="..." month="..." afterDay="...">1..1
      </transitionRule>
        <transitionTime>1..1
      </transitionTime>
      </daylightDate>
    </timeZone>
```

The /getCalendarDaysResponse/event/recurrence/rule/isLeapYear (boolean minOccurs=0 maxOccurs=1) provides International calendar support. It is possible to derive is LeapYear from leapMonthValue, but .NET Calendar stores both separately. The 5/getCalendarDaysResponse/event/recurrence/rule/leapMonthValue (int minOccurs=0 maxOccurs=1) <leapMonthValue> cannot be derived from a particular year and thus must be stored. For example, a user creates a recurrence on a Hebrew Lunar calendar. The year is a leap year and it has 13 months. In that year, the leapMonthValue is 7.

The /getCalendarDaysResponse/event/recurrence/rule/repeat (minOccurs=1 maxOccurs=1) may includes the /getCalendarDaysResponse/event/recurrence/rule/repeat/daily (minOccurs=0 maxOccurs=1), field, which specifies the number of days to repeat, e.g., repeat every [ . . . ] days. The /getCalendarDaysResponse/event/recurrence/rule/repeat/daily/@dayFrequency (int minOccurs=1 maxOccurs=1) specifies the periodicity of days over which repetition occurs, for example, repeat every 3 days.

The /getCalendarDaysResponse/event/recurrence/rule/repeat/weekly (minOccurs=0 maxOccurs=1) field, if present, is directed to repeating weekly, e.g., repeat every [ . . . ] week(s) on {su, mo, tu, we, th, fr, sa}. The presence of a weekday attribute means to repeat on this particular day. Any combination of the seven days is valid.

The /getCalendarDaysResponse/event/recurrence/rule/repeat/weekly/@weekfrequency (int minOccurs=0 maxOccurs=1) repeatWeekly recurrence occurs every period of weeks. If the attribute is not present, it defaults to 1 (every week).

The /getCalendarDaysResponse/event/recurrence/rule/repeat/monthlyByDay (minOccurs=0 maxOccurs=1) specifies to repeat on the [First, Second, Third, Fourth, Last] {su, mo, tu, we, th, fr, sa} of every [ . . . ] month(s). Any combination of the {weekday} attributes are valid, including user-defined combinations for weekdays and weekend days.

The /getCalendarDaysResponse/event/recurrence/rule/repeat/monthlyByDay/@monthFrequency (int minOccurs=0 maxOccurs=1) specifies the month periodicity to recur on. If this attribute is not present, it defaults to 1 (every month).

The /getCalendarDaysResponse/event/recurrence/rule/repeat/monthlyByDay/@weekdayOfMonth (string minOccurs=1 maxOccurs=1) specifies which week in a month [first, second, third, fourth, last].

The /getCalendarDaysResponse/event/recurrence/rule/repeat/monthly (minOccurs=0 maxOccurs=1) repeats the occurrence every month on a particular day. The very first occurrence is created from the parent event's startTime and endTime, but the recurrence occurs as follows: Repeat every month on [day] of [month]. Repeat every [monthFrequency] month(s) on [day] of [month]. Typically, the first occurrence is also an instance of the recurrence, but this need not be the case.

The /getCalendarDaysResponse/event/recurrence/rule/repeat/monthly/@monthFrequency (int minOccurs=0 maxOccurs=1) optional attribute indicates the month periodicity. By default, it is 1, periodic every month. The start of the periodicity is determined from event startTime. The /getCalendarDaysResponse/event/recurrence/rule/repeat/monthly/@day (int minOccurs=1 maxOccurs=1) specifies the day of the month to recur on. Value is between one and 31.

A forceExact rule handles invalid day-month combinations. The proper recurrence pattern for repeating on the last day of the month is to use repeatMonthlyByDay. "Repeat on the [last] [day, weekday, weekend day] of . . . ". By default, an invalid day-month combination will cause .NET Calendar to search backwards to find a valid day-month combination. If /getCalendarDaysResponse/event/recurrence/rule/repeat/monthly/@forceExact (boolean minOccurs=0 maxOccurs=1) is true, an invalid starting [month, day] combination such as [6, 31] is ignored and will not be included as an instance of the recurrence. With forceExact, day=31 will only pick up months that have 31 days, day=30 will pick up all months except February, day=29 will pick up all months except February, except on leap years. February 29 is included on leap years.

The /getCalendarDaysResponse/event/recurrence/rule/repeat/yearlyByDay (minOccurs=0 maxOccurs=1) specifies how to repeat on the [First, Second, Third, Fourth, Last] {su, mo, tu, we, th, fr, sa} of [Jan, Feb, Mar, Apr, May, Jun, Jul, Aug, Sep, Oct, Nov, Dec] every [yearFrequency] years.

Any combination of the {weekday} attributes are valid, including user-defined combinations denoting weekdays and weekend days. This element's attributes contain whether a given day is or is not considered by the user as part of the work week. If this element has no attributes, it is assumed that the user has a Monday to Friday work week.

The /getCalendarDaysResponse/event/recurrence/rule/repeat/yearlyByDay/@yearFrequency (int minOccurs=0 maxOccurs=1) optional attribute indicates the year periodicity. By default, it is 1 (repeat every year).

The /getCalendarDaysResponse/event/recurrence/rule/repeat/yearlyByDay/@weekdayOfMonth (string minOccurs=1 maxOccurs=1) Specifies which week in a month [first, second, third, fourth, last] to repeat.

The /getCalendarDaysResponse/event/recurrence/rule/repeat/yearlyByDay/@month (int minOccurs=1 maxOccurs=1) contains a value between one and thirteen (some calendars have thirteen months).

The /getCalendarDaysResponse/event/recurrence/rule/repeat/yearly (minOccurs=0 maxOccurs=1) specifies to repeat every year on a particular date. The very first occurrence is created from the parent event's startTime and endTime, but the recurrence occurs as follows: Repeat yearly on [day] of [month]. Repeat every [yearFrequency] years on [day] of [month]. Typically, the first occurrence is also an instance of the recurrence, but this need not be the case.

The /getCalendarDaysResponse/event/recurrence/rule/repeat/yearly/@yearFrequency (int minOccurs=0 maxOccurs=1) optional attribute indicates the year periodicity. By default, it is 1 (repeat every year). The /getCalendarDaysResponse/event/recurrence/rule/repeat/yearly/@month (int minOccurs=1 maxOccurs=1) specifies the month to recur on.

The /getCalendarDaysResponse/event/recurrence/rule/repeat/yearly/@day (int minOccurs=1 maxOccurs=1) specifies the day of the month to recur on. The value is between 1-31, and forceExact, applies for invalid day-month combinations. Thus, by default, an invalid day-month-year combination will cause .NET Calendar to search backwards to find a valid day for a particular month, year. If /getCalendarDaysResponse/event/recurrence/rule/repeat/yearly/@forceExact (boolean minOccurs=0 maxOccurs=1) is true, an invalid starting [month, day] combination such as [6, 31] is ignored and will not be included as an instance of the recurrence. With forceExact, .NET Calendar, day=31 will only pick up months that have 31 days, day=30 will pick up all months except February, day=29 will pick up all months except February, except on leap years. February 29 is included on leap years.

The /getCalendarDaysResponse/event/recurrence/rule/repeat/{any} (minOccurs=0 maxOccurs=unbounded) allows for any additional repeat rules.

The /getCalendarDaysResponse/event/recurrence/rule/windowEnd (dateTime minOccurs=0 maxOccurs=1) field indicates the end of the window over which the recurrence occurs. This is stored in UTC. The Maximum range is Jan. 1, 1753 to Dec. 31, 9999 to an accuracy of 3.33 milliseconds. Note that windowend, repeatForever, repeatInstances may be selectable.

The /getCalendarDaysResponse/event/recurrence/rule/repeatForever (boolean minOccurs=0 maxOccurs=1) overrides the windowend date and specifies that this recurrence repeats forever. Client implementations cannot depend on date values repeating forever, like 23:59:59 pm Dec. 31, 9999 or 23:59 Aug. 31, 4500.

The /getCalendarDaysResponse/event/recurrence/rule/repeatInstances (int minOccurs=0 maxOccurs=1) overrides the windowend date and specifies that this recurrence repeats for the specified number of instances. As is apparent, repeatInstances and repeatForever are mutually exclusive, but repeatInstances will override repeatForever for errant schemas.

Note that if the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

The myCalendar/getFreeBusyDays Method is accessed using a request message, and in response may generate a response message or a SOAP Fault message. The following sample document outlines and descriptions below illustrate the structure and meaning of the elements and attributes in the request and response messages:

```
<m:getFreeBusyDaysRequest
    xmlns:m="http://schemas.microsoft.com/hs/2001/10/myCalendar"
    xmlns:hs="http://schemas.microsoft.com/hs/2001/10/core">$_{1..1}$
    <m:calendarType>$_{0..1}$</m:calendarType>
    <m:startTime>$_{1..1}$</m:startTime>
```

-continued

```
    <m:endTime>$_{1..1}$</m:endTime>
    <m:getFreeBlocks>$_{0..1}$</m:getFreeBlocks>
    <m:returnIndividualBlocks>$_{0..1}$</m:returnIndividualBlocks>
</m:getFreeBusyDaysRequest>
```

The /getFreeBusyDaysRequest (minOccurs=1 maxOccurs=1) function returns a stream of xml fragments defining the user's freeBusy information between two dates. Single events and recurring events within the time window are translated into blocks of free/busy time.

The getFreeBusyDays only returns the blocks and their associated type. There is no explicit method to return unmerged freeBusy info, as that kind of behavior is fully contained within getCalendarDays.

This method follows the precedence order: Away(OOF), Busy, Tentative, Free. Overlapping blocks of the same freeOrBusyStatus kind are coalesced to form larger blocks. Overlapping blocks of different freeOrBusyStatus are overlaid. The events with higher precedence overlay on top (not by starting time). For example, Busy from 8 to 9, Tentative from 8:30 to 10, OOF from 9:30 to 1, Free from 10:30 to 12, is merged as Busy from 8 to 9, Tentative from 9 to 9:30, OOF from 9:30 to 11, Free from 11 to 12.

The freeBusy information of multiple users is retrieved by specifying a puid for each user in question. The caller of this function needs to specify their own puid, no implicit assumptions are made.

The calling method takes a startDate and an endDate to define the duration over which freebusy information is returned. A third parameter determines if free blocks are explicitly returned. Free blocks are intervals where no calendar object exists. The getFreeBusyDays method may be used to retrieve multiple calendar data from other users using <h:key instance="0" cluster="0" puid="xyz"/> in the SOAP headers provided that puid "xyz" is provisioned on the .NET Calendar server, and provided that the user has been granted access in puid "xyz" s rolelist.

The /getFreeBusyDaysRequest/calendarType (string minOccurs=0 maxOccurs=1) contains the optional calendar type to return, with the default being Gregorian. The /getFreeBusyDaysRequest/startTime (dateTime minOccurs=1 maxOccurs=1) field contains the starting time window of calendar objects to retrieve. This dateTime also contains the timeZone to retrieve the calendar information in.

The /getFreeBusyDaysRequest/endTime (dateTime minOccurs=1 maxOccurs=1) field contains the ending time window to retrieve calendar objects. This dateTime also contains the timeZone to retrieve the calendar information in, and needs to be the same timeZone as startTime.

The /getFreeBusyDaysRequest/getFreeBlocks (boolean minOccurs=0 maxOccurs=1) boolean causes .NET Calendar to explicitly return free time as freeBusy blocks. By default, free blocks are not returned. The /getFreeBusyDaysRequest/returnIndividualBlocks (boolean minOccurs=0 maxOccurs=1) boolean causes .NET Calendar not to coalesce/merge freeBusy information. By default, freeBusy information is merged.

Upon successful completion of the getFreeBusyDays method, a myCalendar/getFreeBusyDaysResponse response message is generated. The format of the response message is described below:

```
<m:getFreeBusyDaysResponse selectedNodeCount="..." status="..."
    xmlns:m="http://schemas.microsoft.com/hs/2001/10/myCalendar"
    xmlns:hs="http://schemas.microsoft.com/hs/2001/10/core">_{1..1}
  <m:freeOrBusyEvent>_{0..unbounded}
    <m:startTime>_{1..1}</m:startTime>
    <m:endTime>_{1..1}</m:endTime>
    <m:type>_{1..1}</m:type>
  </m:freeOrBusyEvent>
</m:getFreeBusyDaysResponse>
```

The /getFreeBusyDaysResponse (minOccurs=1 maxOccurs=1) response XML blob format, comprises freebusy xml fragments. The /getFreeBusyDaysResponse/@selectedNodeCount (int minOccurs=0 maxOccurs=1) attribute is used to return the number of selected nodes, selected by the corresponding data language operation.

The /getFreeBusyDaysResponse/@status (string minOccurs=1 maxOccurs=1) attribute indicates the status of the method, e.g., success when the corresponding method was completed successfully, failure when the corresponding method was not completed successfully, rollback when the method failed, but was rolled back to its pre-updateBlock status, or notAttempted when the corresponding method was not attempted. This occurs when a previous operation failed.

The /getFreeBusyDaysResponse/freeOrBusyEvent (minOccurs=0 maxOccurs=unbounded) includes /getFreeBusyDaysResponse/freeOrBusyEvent/startTime (dateTime minOccurs=1 maxOccurs=1) which specifies the start time, /getFreeBusyDaysResponse/freeOrBusyEvent/endTime (dateTime minOccurs=1 maxOccurs=1) which specifies the end time, and /getFreeBusyDaysResponse/freeOrBusyEvent/type (string minOccurs=1 maxOccurs=1) which specifies the type, including free, tentative, busy or away.

The myCalendar/getQuickView Method provides a QuickView/DatePicker service function. The following table and description below describes the request message for this method:

```
<m:getQuickViewRequest
    xmlns:m="http://schemas.microsoft.com/hs/2001/10/myCalendar"
    xmlns:hs="http://schemas.microsoft.com/hs/2001/10/core">_{1..1}
  <m:calendarType>_{0..1}</m:calendarType>
  <m:startTime>_{1..1}</m:startTime>
  <m:endTime>_{1..1}</m:endTime>
  <m:tzid>_{0..1}</m:tzid>
  <m:biasOffset>_{0..1}</m:biasOffset>
</m:getQuickViewRequest>
```

The /getQuickViewRequest (minOccurs=1 maxOccurs=1) function provides an efficient, lightweight means to query a date range to indicate days that have 1 or more appointments (1) and days without appointments (0). Outlook® and OWA® (Outlook® Web Access) use this for their datepicker functionality. The date range takes timeZone-specific start and end times, using just the year, month, and day. The time zone can be a simple bias, since this is merely a request for data. startTime and endTime are required to have the same timezone bias. In effect, the method "overlays" the incoming time zone onto the user's calendar to define the dayblocks for which the QuickView returns data.

The /getQuickViewRequest/calendarType (string minOccurs=0 maxOccurs=1) provides a field for the Optional calendar type to return, with the default being Gregorian. The /getQuickViewRequest/startTime (dateTime minOccurs=1 maxOccurs=1) field contains the starting time window of calendar objects to retrieve. This dateTime also contains the timeZone to retrieve the calendar information in.

The /getQuickViewRequest/endTime (dateTime minOccurs=1 maxOccurs=1) specifies the ending time window to retrieve calendar objects. This dateTime also contains the timeZone to retrieve the calendar information in. It must be the same timeZone as startTime.

The /getQuickViewRequest/tzid (int minOccurs=0 maxOccurs=1) field optionally specifies a timezone to retrieve the quickView in. If this or biasOffset are both missing, TZ_UTC is assumed. The /getQuickViewRequest/biasOffset (int minOccurs=0 maxOccurs=1) field optionally specifies a numeric integer offset timezone bias to retrieve the quickView in tzid takes precedence over biasOffset (pending xsd:choice).

Upon successful completion of the myCalendar/getQuickViewmethod, a myCalendar/getQuickViewResponse response message is generated. The format of the response message is described in the table and description below:

```
<m:getQuickViewResponse selectedNodeCount="..." status="..."
    xmlns:m="http://schemas.microsoft.com/hs/2001/10/myCalendar"
    xmlns:hs="http://schemas.microsoft.com/hs/2001/10/core">_{1..1}
  <m:month m="..." year="...">_{1..unbounded}
    <m:day d="...">_{1..31}</m:day>
  </m:month>
</m:getQuickViewResponse>
```

The /getQuickViewResponse (minOccurs=1 maxOccurs=1) return value of getQuickView is a list of calendar days grouped into months. The /getQuickViewResponse/@selectedNodeCount (int minOccurs=0 maxOccurs=1) attribute is used to return the number of selected nodes, selected by the corresponding data language operation. The /getQuickViewResponse/@status (string minOccurs=1 maxOccurs=1) attribute indicates the status of the method, e.g., success when the corresponding method was completed successfully, failure when the corresponding method was not completed successfully, rollback when the method failed, but was rolled back to its pre-updateBlock status, or notAttempted when the corresponding method was not attempted. This occurs when a previous operation failed.

The /getQuickViewResponse/month (minOccurs=1 maxOccurs=unbounded) field specifies the month block for the grouping of calendar days. The /getQuickViewResponse/month/m (int minOccurs=0 maxOccurs=1) provide a month number, restrict to between one and thirteen, (as some calendars have thirteen months).

The /getQuickViewResponse/month/@year (int minOccurs=0 maxOccurs=1), provides the year, while the /getQuickViewResponse/month/day (boolean minOccurs=1 maxOccurs=31) field specifies whether this day is free (0) or has at least one event on it or overlapping (1). The /getQuickViewResponse/month/day/@d (int minOccurs=0 maxOccurs=1) field specifies a day in this month.

The myCalendar/sendMeeting method is directed to the organizer meeting request, is accessed using a request message, and in response may generate a response message or a SOAP Fault message. The following sample document fragments illustrate the structure and meaning of the elements and attributes in the request and response messages. The following table and description below describes the request message for this method:

```
<m:sendMeetingRequest eventId="..." criticalChange=
"..." recurrenceId="..."
continueOnFailure="..." deleteOnCompletion="..."
    xmlns:m="http://schemas.microsoft.com/hs/2001/10/myCalendar"
    xmlns:hs="http://schemas.microsoft.com/hs/2001/10/core">_{1..1}
    <m:uninvite behavior="...">_{1..1}
        <m:attendee deleteAttendee="...">_{0..unbounded}
            <hs:name xml:lang="..." dir="...">_{0..1}</hs:name>
            <hs:puid>_{0..1}</hs:puid>
            <hs:email>_{0..1}</hs:email>
        </m:attendee>
    </m:uninvite>
    <m:replaceRequest select="..." useClientIds="..." minOccurs=
"..." maxOccurs="...">_{0..1}
        <hs:options>_{0..1} {any}</hs:options>
        <hs:attributes {any}="...">_{0..unbounded}</hs:attributes>
        {any}
    </m:replaceRequest>
    <m:invite behavior="...">_{1..1}
        <m:attendee>_{0..unbounded}
            <hs:name xml:lang="..." dir="...">_{0..1}</hs:name>
            <hs:puid>_{0..1}</hs:puid>
            <hs:email>_{0..1}</hs:email>
        </m:attendee>
    </m:invite>
</m:sendMeetingRequest>
```

The purpose of this method is for a meeting organizer to invite and uninvite (cancel) attendees to this event. The /sendMeetingRequest (minOccurs=1 maxOccurs=1) sendMeeting also sends updated invitations to existing invitees. Inviting a user to a single instance of a recurring event will cause only that instance to be sent. However, future updates to that event will overwrite the existing instance, including the case where an update is the full recurring event. Meeting requests will be sent out as attachments from an SMTP server. When inviting or uninviting, .NET Calendar searches for these existing attendees by puid first, and then by email address such that the puid receives precedence in the search predication. .NET Calendar will not allow multiple meeting requests/cancellations to the same puid or email address within the scope of the same invite or uninvite block. However, an organizer may uninvite an attendee and then reinvite again (non-standard behavior).

The /sendMeetingRequest/@eventId (string minOccurs=1 maxOccurs=1) field contains the puid of the event which to send meeting invitations or cancellations to. This event must already exist within the .NET Calendar service. Additional server constraints are implemented which verify that potential updates to the attendee tables occur for this event only. This is a required field.

The /sendMeetingRequest/@criticalChange (boolean minOccurs=0 maxOccurs=1) attribute, when set to "true", causes <lastUpdateTime> to be updated when invitations are sent to the attendees. If "false", <lastUpdateTime> remains untouched.

The /sendMeetingRequest/@recurrenceId (dateTime minOccurs=0 maxOccurs=1) optional recurrenceId allows the meeting organizer to send invitations for only a particular instance of a recurring event. If the event is not a recurring event, or if recurrenceId does not correspond to a valid instance/exception, sendMeetingRequest will fail with an error.

The /sendMeetingRequest/@continueOnFailure (boolean minOccurs=1 maxOccurs=1) field specifies to .NET Calendar to continue performing the sendMeetingRequest even on a failure. Points of failure: <uninvite> may delete attendees, and the data language delete may encounter errors <updateRequest> may encounter data language errors. The optional final delete of the event may encounter errors.

The /sendMeetingRequest/@deleteOnCompletion (boolean minOccurs=0 maxOccurs=1) event will be deleted upon completion of this sendMeetingRequest. This behavior is intended for deleting a meeting and sending cancellations. If recurrenceId is present (and valid), only this particular recurring instance or exception is deleted, in which case a new <deletedExceptionDate> is added to the recurrence rule.

The /sendMeetingRequest/uninvite (minOccurs=1 maxOccurs=1) includes The /sendMeetingRequest/uninvite/@behavior (string minOccurs=0 maxOccurs=1), an attribute that gives the option to either choose to send cancellations to "all" attendees in the event's attendee table, or send to "none" of them. A third value of "default" would give the default behavior of sending cancellations to all attendees who are replaced in the <replaceRequest> block. When this attribute is set, .NET Calendar will ignore anything within the <uninvite> node.

The /sendMeetingRequest/uninvite/attendee (minOccurs=0 maxOccurs=unbounded) field contains a list of people to uninvite. Uninvited attendees must already exist in the organizer's attendee table, or else these users are ignored.

The /sendMeetingRequest/uninvite/attendee/@deleteAttendee (boolean minOccurs=0 maxOccurs=1) field optionally specifies whether or not to delete this attendee from the organizer's attendee table. If the attendee is not deleted, .NET Calendar will not know the status of this attendee because the status {not-sent, sent, cancelled} is not stored per-attendee.

The /sendMeetingRequest/uninvite/attendee/name (string minOccurs=0 maxOccurs=1) optional element specifies the name for the enclosing element. The /sendMeetingRequest/uninvite/attendee/name/@xml:lang (minOccurs=1 maxOccurs=1) required attribute is used to specify an ISO 639 language code or an ISO 3166 country code as described in RFC 1766. The value of this attribute indicates the language type of the content within this element. The /sendMeetingRequest/uninvite/attendee/name/@dir (string minOccurs=0 maxOccurs=1) optional attribute specifies the default layout direction for the localized string. Valid values are rtl (right to left) and ltr (left to right).

The /sendMeetingRequest/uninvite/attendee/puid (string minOccurs=0 maxOccurs=1) optional element specifies the PUID for the enclosing element. The /sendMeetingRequest/uninvite/attendee/email (string minOccurs=0 maxOccurs=1) optional name specifies an e-mail address for the enclosing element.

The /sendMeetingRequest/replaceRequest (minOccurs=0 maxOccurs=1) replace request can only affect the meeting invitation in question, and is thus constrained to be only @select="/m:myCalendar/m:event[id=@eventId]/ . . . ". It will not be allowed to replace-on-null so that event creation cannot be a side-effect. The /sendMeetingRequest/replaceRequest/@select (string minOccurs=1 maxOccurs=1) attribute selects an xdb:blue or an xdb:red.

The /sendMeetingRequest/replaceRequest/@useClientIds (string minOccurs=0 maxOccurs=1) attribute specifies that, if an xdb:blue item is created during an insert or replace operation, and an ID would normally be generated, the ID specified in the request content should be used instead of having .NET My Services generate an ID. Applications using this option must ensure that they are properly generating unique IDs in the form of UUIDs. They must also ensure that they do not assign the same ID to multiple xdb:blue items; this can happen if the insert select attribute selects multiple nodes.

The /sendMeetingRequest/replaceRequest/@minOccurs (int minOccurs=0 maxOccurs=1) optional attribute specifies the minimum number of nodes that must be selected by the select operation in order for this operation to be successfully attempted. The default value is zero, meaning that if no nodes are selected, the operation silently succeeds as a no operation ("NOP"). A value of one means that a minimum of one node must be selected. In that case, if no nodes are selected, the operation fails with an error.

The /sendMeetingRequest/replaceRequest/@maxOccurs (int minOccurs=0 maxOccurs=1) optional attribute specifies the maximum number of nodes that may be selected by the select operation in order for this operation to be successfully attempted. The default value is unbounded. If the number of nodes selected by the select attribute is greater than this value, an error condition occurs. The /sendMeetingRequest/replaceRequest/options (minOccurs=0 maxOccurs=1) provide for options.

The /sendMeetingRequest/replaceRequest/options/{any} (minOccurs=0 maxOccurs=unbounded) includes /sendMeetingRequest/replaceRequest/attributes (minOccurs=0 maxOccurs=unbounded). This element is used to specify a single attribute to be manipulated by the .NET My Services data-manipulation primitives. For example, when used in an insertRequest, this element specifies an attribute to be inserted at the specified node.

The /sendMeetingRequest/replaceRequest/attributes/@{any} (minOccurs=0 maxOccurs=1) and /sendMeetingRequest/replaceRequest/{any} (minOccurs=0 maxOccurs=unbounded) fields provide for extensibility. This element is a placeholder that indicates where the content of the item being replaced is to be specified.

The /sendMeetingRequest/invite (minOccurs=1 maxOccurs=1) includes the /sendMeetingRequest/invite/@behavior (string minOccurs=0 maxOccurs=1) attribute. This attribute will give the option to either choose to send invitations to "all" attendees in the event's attendee table, or send to "none" of them. A third value of "default" would give the default behavior of sending invitations to only the new attendees in the <replaceRequest> block. When this attribute is set, .NET Calendar will ignore anything within the <invite> node.

The /sendMeetingRequest/invite/attendee (minOccurs=0 maxOccurs=unbounded) field contains information about this attendee to be invited. An invited attendee must already exist in the organizer's attendee table. This attendee may originally be there prior to the sendMeetingRequest method, or be the result of the update operation to this meeting. To change the attendee's inviteType, the update operation should be used.

When invitations are sent, the attendee's <responseTime> is set to the current time (now) as a side-effect. The /sendMeetingRequest/invite/attendee/name (string minOccurs=0 maxOccurs=1) optional element specifies the name for the enclosing element. The /sendMeetingRequest/invite/attendee/name/@xml:lang (minOccurs=1 maxOccurs=1) required attribute is used to specify an ISO 639 language code or an ISO 3166 country code as described in RFC 1766. The value of this attribute indicates the language type of the content within this element. The /sendMeetingRequest/invite/attendee/name/@dir (string minOccurs=0 maxOccurs=1) optional attribute specifies the default layout direction for the localized string. Valid values are rtl (right to left) and ltr (left to right).

The /sendMeetingRequest/invite/attendee/puid (string minOccurs=0 maxOccurs=1) optional element specifies the PUID for the enclosing element. The /sendMeetingRequest/invite/attendee/email (string minOccurs=0 maxOccurs=1) optional name specifies an e-mail address for the enclosing element.

The myCalendar/respond method provides a method for invitees to respond to an invite. The following table and accompanying description below illustrate the structure and meaning of the elements and attributes in the request and response messages:

```
xmlns:m="http://schemas.microsoft.com/hs/2001/10/myCalendar"
    xmlns:hs="http://schemas.microsoft.com/hs/2001/10/core">$_{1..1}$
    <m:responseTime>$_{0..1}$</m:responseTime>
    <m:responseType>$_{0..1}$</m:responseType>
    <m:counterProposeStartTime>$_{0..1}$</m:counterProposeStartTime>
    <m:counterProposeEndTime>$_{0..1}$</m:counterProposeEndTime>
    <m:counterProposeLocation>$_{0..1}$</m:counterProposeLocation>
    <m:responseBody xml:lang="..." dir="...">$_{0..1}$</m:responseBody>
    <m:eventId>$_{1..1}$</m:eventId>
    <m:puid>$_{1..1}$</m:puid>
</m:respondRequest>
```

The purpose of this method is for a meeting invitee to respond to an invitation. Invitees may accept, decline, accept tentatively, or counterpropose in some means. Currently, allow the counterproposing of time and location, but we may consider future additions.

The /respondRequest (minOccurs=1 maxOccurs=1) includes /respondRequest/responseTime (dateTime minOccurs=0 maxOccurs=1), field is the reply time on each attendee, set to the current time (Now) when the organizer sends a meeting invitation. When the attendee responds, they update their responseTime. When the organizer receives responses, they will honor only those that have a higher responseTime than what he or she maintains in his or her own copy of the event for each attendee. While processing the response, the organizer will update their responseTime. This guarantees that the organizer honors only the most recent response from the attendee. This is stored in UTC.

The /respondRequest/responseType (string minOccurs=0 maxOccurs=1) accept status indicates the valid types of responses that an attendee can reply with {accept, decline, tentative, counterpropose}. The absence of this field indicates that no response has been recorded (either the invitation has not been sent, or that a reply has not been received).

The /respondRequest/counterProposeStartTime (dateTime minOccurs=0 maxOccurs=1) field contains the counter proposal start time information. If responseType=[counterPropose], then either the startTime, endTime, or location, or all three can be present. This is the invitee's counterproposal for a new start time for the meeting. This is stored in UTC.

The /respondRequest/counterProposeEndTime (dateTime minOccurs=0 maxOccurs=1) field contains the counter proposal end time information. If responseType=[counterPropose], then either the {startTime, endTime}, or location, or both can be present. This is the invitee's counterproposal for a new end time for the meeting. This is stored in UTC.

The /respondRequest/counterProposeLocation (string minOccurs=0 maxOccurs=1) field contains the counter proposal location information. field contains the counter proposal start time information. If responseType=[counterPropose], then either the {startTime, endTime}, or location, or both can be present. This is the invitee's counterproposal for a location for the meeting.

The /respondRequest/responseBody (string minOccurs=0 maxOccurs=1) field contains an optional message for invitees to include along with the response. The /respondRequest/responseBody/@xml:lang (minOccurs=1 maxOccurs=1) required attribute is used to specify an ISO 639 language code or an ISO 3166 country code as described in RFC 1766. The value of this attribute indicates the language type of the content within this element. The /respondRequest/responseBody/@dir (string minOccurs=0 maxOccurs=1) optional attribute specifies the base direction of directionally neutral text. Possible values include rtl (right to left) and ltr (left to right).

The /respondRequest/eventId (string minOccurs=1 maxOccurs=1) field contains the eventId for the meeting, and the /respondRequest/puid (string minOccurs=1 maxOccurs=1) field identifies the invitee.

The myCalendar/updateReminder Method provides a Delegate function to the .NET Alerts service for creating or modifying calendar meeting reminders. The following sample document in the table and accompanying description below illustrate the structure and meaning of the elements and attributes in the request and response messages:

```
<m:updateReminderRequest
    xmlns:m="http://schemas.microsoft.com/hs/2001/10/myCalendar"
    xmlns:hs="http://schemas.microsoft.com/hs/2001/10/core">1..1
    <m:reminder>1..1
        <m:set>1..1</m:set>
        <m:to xml:lang="..." dir="...">1..1</m:to>
        <m:offset>1..1</m:offset>
        <m:interruptability>0..1</m:interruptability>
        <m:lastSentTime>1..1</m:lastSentTime>
        <m:nextTriggerTime>1..1</m:nextTriggerTime>
    </m:reminder>
    <m:id>1..1</m:id>
</m:updateReminderRequest>
```

The /updateReminderRequest (minOccurs=1 maxOccurs=1) function is used to update the status of a reminder once the user has received the notification. It also may be exposed as an HTTP API so that non-.NET My Services clients have a means to dismiss, snooze, or be reminded again at a different time. The /updateReminderRequest/reminder (minOccurs=1 maxOccurs=1) includes the /updateReminderRequest/reminder/set (boolean minOccurs=1 maxOccurs=1) Boolean flag that indicates whether the reminder is active for this event. In most cases, this will be true, but in the case of a recurring appointment, this flag may default to true with specific instances not to be reminded, or default to false, with specific instances to be reminded.

The /updateReminderRequest/reminder/to (string minOccurs=1 maxOccurs=1) field contains the friendly name that this reminder is being sent to. The /updateReminderRequest/reminder/to/@xml:lang (minOccurs=1 maxOccurs=1) required attribute is used to specify an ISO 639 language code or an ISO 3166 country code as described in RFC 1766. The value of this attribute indicates the language type of the content within this element. The /updateReminderRequest/reminder/to/@dir (string minOccurs=0 maxOccurs=1) optional attribute specifies the default layout direction for the localized string. Valid values are rtl (right to left) and ltr (left to right).

The /updateReminderRequest/reminder/offset (int minOccurs=1 maxOccurs=1) field specifies the offset, in minutes, of how long before the event the user should be reminded. Recommended values are the following:

| Value | Description |
|---|---|
| 5, 10, 20, 30, 45 | 5, 10, 20, 30, 45 minutes before the event |
| 60, 120, 180, | 1, 2, 3 hours before the event |
| startTime − startDay | The day of the event (reminder sent at 12:00 am) |
| startTime − (startDay − (1440 * x)) | "x" days before the event (reminder sent at 12:00 am "x" days before) |

The /updateReminderRequest/reminder/interruptability (int minOccurs=0 maxOccurs=1) optional element defines how interruptible this event is and it is used by notification routing software to make decisions about the relay and deferral of notifications that might occur while this meeting is active. The value contained in this element is a numeric value between one and ten. Low values represent a high cost of disruption, high values represent a low cost of disruption.

The /updateReminderRequest/reminder/lastSentTime (dateTime minOccurs=1 maxOccurs=1) is used by the reminder engine. The /updateReminderRequest/reminder/nextTriggerTime (dateTime minOccurs=1 maxOccurs=1) field determines the next time to trigger reminder. The /updateReminderRequest/id (string minOccurs=1 maxOccurs=1) attribute contains a reference to another .NET My Services item by its item ID. The uuidType is used to specify a universally unique identifier (UUID).

Upon successful completion of this method, a Standard .NET My Services response message is generated as the myCalendar/updateReminderResponse.

myCalendar/Examples

By way of example, consider this stripped-down view of a sample user's calendar:

```
<myCalendar>
    <event>
        <body>
            <cat ref="hs:public"/>
            <title xml:lang="en" dir="ltr">Meet with attorneys</title>
            <startTime>2001-09-14T19:00:00Z</startTime>
            <endTime>2001-09-14T20:00:00Z</endTime>
            <organizer>
                <name>John Doe</name>
                <email>johndoe@microsoft.com</email>
            </organizer>
        </body>
    </event>
</myCalendar>
```

As can be seen from the various descriptions above, when interpreted by a calendar application, this would result in a single meeting on the calendar that takes place at noon Pacific Standard Time and lasts one hour.

As a more complex example, consider the following table:

```
<m:myCalendar
    xmlns:m="http://schemas.microsoft.com/hs/2001/10/myCalendar"
    xmlns:hs="http://schemas.microsoft.com/hs/2001/10/core">
    <m:event
        calendarType="2">
        <m:body>
            <m:title xml:lang="en" dir="ltr">Meet for coffee</m:title>
```

-continued

```
        <m:fullDescription xml:lang="en" dir="ltr">
            Meet at the local coffee place to discuss
            our meeting this Monday.
            It takes about 30 minutes to get there.
        <m:fullDescription>
        <m:location>Joe's coffee shop</m:location>
        <startTime>2001-09-14T13:20:00-8:00</startTime>
        <endTime>2001-09-14T14:20:00-8:00</endTime>
        <allDay>False</allDay>
        <travelTimeTo>30</travelTimeTo>
        <travelTimeFrom>30</travelTimeFrom>
        <freeBusyStatus>away</freeBusyStatus>
        <m:organizer>
            <hs:name xml:lang="en" dir="rtl">Bob Smith</hs:name>
            <hs:email>bobsmith@company.com</hs:email>
        </m:organizer>
    </m:body>
    <m:attachment>
        <m:name xml:lang="en" dir="rtl">
            Meeting Agenda.doc
        </m:name>
        <m:contentType>application/msword</m:contentType>
        <m:contentTransferEncoding>
            base64
        </m:contentTransferEncoding>
            <m:size>14324</m:size>
            <m:content>4234234##32423423423423</m:content>
        </m:attachment>
        <m:reminder>
            <m:set>true</m:set>
            <m:to xml:lang="en" dir="rtl"></m:to>
            <m:offset>30</m:offset>
            <m:lastSentTime>0000-00-00T00:00:00</m:lastSentTime>
            <m:nextTriggerTime>
                2001-09-14T12:50:00-8:00
            </m:nextTriggerTime>
        </m:reminder>
    </m:event>
    <m:event>
<m:body>
    <m:cat ref="hs:public"/>
    <m:title xml:lang="en" dir="...">Monday morning meeting</m:title>
    <m:fullDescription xml:lang="en" dir="rtl">
        Meet to talk about tasks for the upcoming week.
    </m:fullDescription>
    <m:location xml:lang="en" dir="rtl">Joe's coffee shop</m:location>
    <m:recurrenceId>2001-09-01T08:00-8:00</m:recurrenceId>
    <m:startTime>2001-09-01T08:00-8:00</m:startTime>
    <m:endTime>2001-09-01T09:00-8:00</m:endTime>
    <m:allDay>false</m:allDay>
    <m:floating>false</m:floating>
    <m:travelTimeTo>30</m:travelTimeTo>
    <m:travelTimeFrom>30</m:travelTimeFrom>
    <m:freeBusyStatus>busy</m:freeBusyStatus>
</m:body>
<m:recurrence>
    <m:rule>
        <m:creationDate>2001-09-01T08:00-8:00</m:creationDate>
        <m:firstDayOfWeek>su</m:firstDayOfWeek>
        <m:isLeapYear>false</m:isLeapYear>
        <m:repeat>
            <m:weekly su="..." mo="true" tu="..." we="..."
                    th="..." fr="..." sa="..." weekFrequency="..."/>
            <m:monthlyByDay su="..." mo="..." tu="..." we="..."
                    th="..." fr="..." sa="..."
                    monthFrequency="..." weekdayOfMonth="..."/>
            <m:monthly monthFrequency="..." day="..."
                    forceExact="..."/>
            <m:yearlyByDay su="..." mo="..." tu="..." we="..."
                    th="..." fr="..." sa="..." yearFrequency="..."
                    weekdayOfMonth="..." month="..."/>
            <m:yearly yearFrequency="..." month="..." day="..."
                    forceExact="..."/>
        </m:repeat>
        <m:windowEnd>2002-01-01T12:00</m:windowEnd>
        <m:repeatForever>false</m:repeatForever>
        <m:repeatInstances/>
    </m:rule>
</m:recurrence>
```

```
    </m:event>
</m:myCalendar>
```

As can be seen from the descriptions above, this user has two events in a calendar. One event is recurring every Monday at 8:00 am, and the other is an upcoming event at 1:20 pm.

myCategories

The .NET myCategories service is designed to support a classification model for data within the .NET My Services universe. The classification model is generic and makes very few assumptions about application usage. As a result, the design is minimal and open. This model of categorization will be used by a wide spectrum of applications, without burdening the developer of the service.

The .NET myCategories service manages a list of category definitions. Examples of category definitions include child, anniversary, and employee. Each category definition has a human readable name and a description which contains hints about the meaning of that category. For example, one given category may imply a more general category, while "friends" implies acquaintances. A category may be classified by using other categories. For example, anniversary and birthday are categorized as specialDate.

Like other .NET My Services, the .NET Categories service exposes a global system document, and an identity centric content document. The global system document is an extension of the standard system document which contains global category definitions available to all .NET My Services applications. The identity-centric content document contains category definitions local to the identity.

Within other .NET My Services, category references are used to mark an XML element as belonging to the group represented by the category definition. The schema of each service defines which nodes (if any) can be categorized. For example, .NET Contacts/contacts/address can be categorized, but .NET Calendar/event/eventBody cannot. The roleList and system schemas also define nodes that can be categorized. For example, roleList/role can be categorized.

Categories use a declarative syntax for encoding relationships that an application deems as important. .NET My Services neither provides nor requires any consistency checks or enforcements implied by the semantics of these relationships.

There are two primary elements used to define and reference categories. The catDef element is used to define a category, and the cat element is used to refer to a category. .NET My Services allows the catDef element to appear in the system document of the .NET Categories service, the content document of the .NET Categories service and/or an arbitrary XML file located by a URI.

The cat element refers to a category definition by absolute or relative URI. The linkage between the two is through the catDef/@idName attribute and the cat/@ref attribute. The catDef/@idName attribute specifies the local id for the category definition, and the cat/@ref attribute is the value of that reference.

The value of the cat/@ref attribute may take the following form:

system#name-of-category

The category definition being referenced is located in the system document of the .NET Categories service, and its catDef/@idName attribute is "name-of-category". For example, the category reference of <cat ref="system#public"/> is a reference to the category definition whose catDef/@idName value is "public", and that this category definition is located in the system document of the .NET Categories service i.e. <catDef idName="public"/>.

The value of the cat/@ref attribute may also take the form:

content[?puid=puid-value]#name-of-category

The category definition being referenced is located in the content document of the .NET Categories service, and its catDef/@idName attribute is "name-of-category". The instance of the .NET Categories service (i.e., the puid of the service) is implied by the context of the reference. This may be made explicit by inserting ?puid=puid-value to the URI, and when this is done, it means the content document of the .NET Categories service whose puid is "puid-value" holds the category definition. For example, the category reference of <cat ref="content#LaQuintaHouse"/> is a reference to the category definition whose catDef/@idName value is "LaQuintaHouse", and that this category definition is located in the content document of the .NET Categories service for the current puid i.e. <catDef idName="LaQuintaHouse"/>.

The value of the cat/@ref attribute may also take the form:

any-uri#name-of-category

The category definition being referenced is located in an external (to .NET My Services) resource. The "any-uri" portion of the reference refers to a resource containing the catDef element whose @idName attribute matches the "name-of-category". The mapping between the "any-uri" portion of the reference and an XML document containing the catDef elements is a function of the "any-uri". By convention, this uri is the name of an XML document containing those elements. The purpose of this reference form is to allow and support a free form set of extended categorizations that are global and available to all. For example, the category reference of <cat ref="http://schemas.cpandl.com/im/globalCategories.xml#imBuddy"/> is a reference to the category definition whose catDef/@idName value is "imBuddy", and that this category definition is located in an external resource located at "http://schemas.cpandl.com/im/globalCategories.xml". Note that it is expected that category definitions will exist in the appropriate locations, but there is no requirement or enforcement of this.

In the various cases, the mapping between a category reference and the category definition is very simple.

1. Locate the document containing the category definition by taking the name prior to the "#".
2. If the document is "system", then the document containing the category definition is the system document of the .NET Categories service and is addressed using request/{fourth root}service="myCategories" and request/@document="system".
3. If the document is "content", then the document containing the category definition is the content document of the .NET Categories service and is addressed using request/@service="myCategories" and request/@document="content". If the ?puid=puid-value argument is present, the request is further qualified by request/key/{fourth root}puid="puid-value". Otherwise, this attribute contains the puid of the document containing the reference.
4. For any other document, the value is the uri of the XML document containing the category definition.

5. Locate the category id which is the portion of the reference after the "#".
6. With the document in hand, the xpath expression //catDef[@idName='category-id'] selects the category definition.

myCategories/Roles

The myCategories service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myCategories roleTemplate rt0 role gives complete read/write access to the information within the content document of the service being protected through this roleTemplate. The following table illustrates the available methods and the scope in effect when accessing the myCategories service through that method while mapped to this roleTemplate:

TABLE

| myCategories roleTemplate rt0 | |
|---|---|
| method | scope/name |
| Query | allElements |
| Insert | allElements |
| Replace | allElements |
| Delete | allElements |
| Update | allElements |

The myCategories roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myCategories service through that method while mapped to this roleTemplate:

TABLE

| myCategories roleTemplate rt1 | |
|---|---|
| method | scope/name |
| Query | allElements |
| Insert | onlySelfElements |
| Replace | onlySelfElements |
| Delete | onlySelfElements |

The myCategories roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myCategories service through that method while mapped to this roleTemplate:

TABLE

| myCategories roleTemplate rt2 | |
|---|---|
| method | scope/name |
| Query | allElements |
| Insert | onlySelfSubscriptionElements |
| replace | onlySelfSubscriptionElements |
| Delete | onlySelfSubscriptionElements |

The myCategories roleTemplate rt3 role gives limited read access to information within the content document that is categorized as "public." The following table illustrates the available methods and the scope in effect when accessing the myCategories service through that method while mapped to this roleTemplate:

TABLE

| myCategories roleTemplate rt3 | |
|---|---|
| method | scope/name |
| Query | onlyPublicElements |

The myCategories roleTemplate rt99 blocks access to the content document. Note that lack of a role in the roleList has the same effect as assigning someone to rt99.

myCategories/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myCategories service:

```
<m:myCategories changeNumber="..." instanceId="..."
  xmlns:m="http://schemas.microsoft.com/hs/2001/10/myCategories"
  xmlns:hs="http://schemas.microsoft.com/hs/2001/10/core">1..1
  <m:catDef idName="..." changeNumber="..." id="..." creator="...">0..unbounded
```

-continued

```
<hs:name xml:lang="..." dir="...">0...unbounded</hs:name>
<hs:description xml:lang="..." dir="...">0..1</hs:description>
<hs:implies ref="...">0...unbounded</hs:implies>
<hs:cat ref="...">0...unbounded</hs:cat>
{any}
</m:catDef>
<m:subscription changeNumber="..." id="..." creator="...">0...unbounded
  <hs:trigger select="..." mode="..." baseChangeNumber="...">1..1</hs:trigger>
  <hs:expiresAt>0..1</hs:expiresAt>
  <hs:context uri="...">1..1 {any}</hs:context>
  <hs:to>1..1</hs:to>
</m:subscription>
{any}
</m:myCategories>
```

The meaning of the attributes and elements shown in the table are set forth below, wherein in the syntax used in the table, boldface type corresponds to a blue node, and underlined type to a red node, as described above, and the minimum and maximum occurrence information (0, 1, unbounded) indicates whether an element or attribute is required or optional, and how many are possible.

The /myCategories (minOccurs=1 maxOccurs=1) element encapsulates the content document for the .NET Categories service. The service is designed to store identity centric category definitions that may be referred to using the content [?puid=puid-value]#name-of-category relative URI scheme. The /myCategories/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myCategories/@instanceId (string minOccurs=0 maxOccurs=1) attribute is a unique identifier typically assigned to the root element of a service. It is a read-only element and assigned by the .NET My Services system when a user is provisioned for a particular service.

The /myCategories/catDef (minOccurs=0 maxOccurs=unbounded) element encapsulates the definition of a category and may appear in the system or content document of the .NET Categories service, or may appear in an external resource.

The /myCategories/catDef/@idName (string minOccurs=0 maxOccurs=1) attribute specifies the name of the category definition in the form of the category name. The relationship between this value, and references to this value, are defined using the rules outlined above.

The /myCategories/catDef/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myCategories/catDef/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myCategories/catDef/@creator (string minOccurs=0 maxOccurs=1) attribute identifies the creator in terms of useRId, appId, and platformId of the node. The /myCategories/catDef/name (string minOccurs=0 maxOccurs=unbounded) element specifies the localized name of the category. The /myCategories/catDef/name/@xml:lang (minOccurs=1 maxOccurs=1) required attribute is used to specify an ISO 639 language code or an ISO 3166 country code as described in RFC 1766. The value of this attribute indicates the language type of the content within this element. The /myCategories/catDef/name/@dir (string minOccurs=0 maxOccurs=1) optional attribute specifies the default layout direction for the localized string. Valid values are rtl (right to left), and ltr (left to right).

The /myCategories/catDef/description (string minOccurs=0 maxOccurs=1) element specifies a full description of the category definition. The /myCategories/catDef/description/@xml:lang (minOccurs=1 maxOccurs=1) required attribute is used to specify an ISO 639 language code or an ISO 3166 country code as described in RFC 1766. The value of this attribute indicates the language type of the content within this element. The /myCategories/catDef/description/@dir (string minOccurs=0 maxOccurs=1) optional attribute specifies the base direction of directionally neutral text. Possible values include rtl (right to left), or ltr (left to right).

The /myCategories/catDef/implies (minOccurs=0 maxOccurs=unbounded) element specifies that this category definition also implies that another category (designated by the ref attribute) also applies. The /myCategories/catDef/implies/@ref (anyURI minOccurs=0 maxOccurs=1) attribute references a category definition (<catDef/>) element using the rules outlined above.

The /myCategories/catDef/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myCategories/catDef/cat/@ref (anyURI minOccurs=0 maxOccurs=1) attribute references a category definition (<catDef/>) element using the rules outlined above.

The /myCategories/catDef/{any} (minOccurs=0 maxOccurs=unbounded) and /myCategories/{any} (minOccurs=0 maxOccurs=unbounded) fields allow for extensibility, like other "any" fields.

myCategories/System

The system document is a global document for the service, having a content and meaning that are independent of the puid used to address the service. The document is read only to all users. The system document contains a set of base items common to other services in the .NET MyServices model, as described above in the common system section of the present application, (with myCategories as the *actual service name* to insert) and is extended to include service-specific global information by the following:

This schema outline in the table below illustrates the layout and meaning of the information for the myCategories service, wherein the category definitions may be referenced by using the system#name-of-category notation in the cat/@ref attribute as described above.

TABLE myCategories/system

```
:
: see common system
:
<sys:catDef idName="..." changeNumber="..." id="..." creator="...">0..unbounded
    <hs:name xml:lang="..." dir="...">0..unbounded</hs:name>
    <hs:description xml:lang="..." dir="...">0..1</hs:description>
    <hs:implies ref="...">0..unbounded</hs:implies>
    <hs:cat ref="...">0..unbounded</hs:cat>
    {any}
</sys:catDef>
{any}
</sys:system>
```

The meaning of the attributes and elements shown in the preceding sample document outline are listed below, using the syntax described above for blue (bold) and red nodes (underlined). The common system items are described in the common system documents section above.

The /system/catDef (minOccurs=0 maxOccurs=unbounded) element encapsulates category definitions global and accessible to all .NET My Services applications. Category references of the form system#name-of-category may be used to refer to these category definitions. The /system/catDef/@idName (string minOccurs=0 maxOccurs=1) attribute specifies the name of the category definition in the form of the category name. The relationship between this value, and references to this value, are defined using the rules outlined above.

The /system/catDef/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/catDef/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/catDef/@creator (string minOccurs=0 maxOccurs=1) attribute identifies the creator in terms of useRId, appId, and platformId of the node. The system/catDef/name (string minOccurs=0 maxOccurs=unbounded) element specifies the localized name of the category. The /system/catDef/name/@xml:lang (minOccurs=1 maxOccurs=1) required attribute is used to specify an ISO 639 language code or an ISO 3166 country code as described in RFC 1766. The value of this attribute indicates the language type of the content within this element. The /system/catDef/name/@dir (string minOccurs=0 maxOccurs=1) optional attribute specifies the default layout direction for the localized string. Valid values are rtl (right to left), and ltr (left to right).

The /system/catDef/description (string minOccurs=0 maxOccurs=1) element specifies a full description of the category definition. The /system/catDef/description/@xml:lang (minOccurs=1 maxOccurs=1) required attribute is used to specify an ISO 639 language code or an ISO 3166 country code as described in RFC 1766. The value of this attribute indicates the language type of the content within this element.

The /system/catDef/description/@dir (string minOccurs=0 maxOccurs=1) optional attribute specifies the base direction of directionally neutral text. Possible values include rtl (right to left), or ltr (left to right).

The /system/catDef/implies (minOccurs=0 maxOccurs=unbounded) element specifies that this category definition also implies that another category (designated by the ref attribute) also applies. The /system/catDef/implies/@ref (anyURI minOccurs=0 maxOccurs=1) attribute references a category definition (<catDef/>) element using the rules outlined above. The /system/catDef/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /system/catDef/cat/@ref (anyURI minOccurs=0 maxOccurs=1) attribute references a category definition (<catDef/>) element using the rules outlined above. The /system/catDef/{any} (minOccurs=0 maxOccurs=unbounded) and /system/{any} (minOccurs=0 maxOccurs=unbounded) fields provide for extensibility.

myContacts

The .NET Contacts service comprises a repository for a user to store and track contact information and relationships for the various people and organizations that the user interacts with. To this end, each .NET My Services user has access to a logical contacts document which may contain multiple contact records. In general, the .NET Contacts service thus forms the foundation for an electronic address book, or a set of electronic relationships. This service contains a list of contacts, organized by category, wherein a contact is a schema element containing an identifier (id) for the contact in the .NET My Services id space. A contact has a local name for that contact, a set of categories that the contact belongs to, (distribution list's, groups, and classifications), an address, as defined by the .NET Address schema, and a set of profile information (as defined by a corresponding NET Profile schema). To this end, the .NET Contacts schema includes at least some of the .NET Profile service information including, but not limited to, name, addresses, phone numbers and email addresses, as well as allowing the owner to control how the contacts are categorized.

Contact information stored within .NET Contacts can be derived from the owner's .NET Address and .NET Profile services. For example, if a user X wishes to add someone named Y as a contact in the user's .NET Contacts service, the information used to populate this contact can be queried from user Y's .NET Address and .NET Profile services. User Y's access control mechanisms determine how much information from his or her .NET Address and .NET Profile services are allowed to be seen. From the user's perspective, the user can similarly control visibility of individual contacts and grant various levels access to their list of contacts to applications and other users based on the role templates with respect to each user's relative role. Thus, for example, with the user's consent, an application could populate a selection box with the user's contacts. From this box, the user could select a contact and the application could fill out the "Ship To:" fields (name, address, city, state and zip) for the contact automatically, such as when making a gift purchase.

The .NET Contacts service is designed to support live contacts. In this mode of operation, the queries described above that populate a contact happen automatically each time a change occurs in a subscribed-to to contact. This synchronization can be enabled or suppressed on a contact-by-contact basis. Users and applications can negotiate a subscription to another user's Profile document via the LiveContacts mechanism. When subscribed, the informational nodes become read-only for that contact and automatically update when changed by the Profile owner. The user can still control categorization, and notes for the LiveContact entry. The service-to-service communications protocol (SSCP) provides a highly efficient, robust mechanism for such automatic updates, as described below.

myContacts/Roles

The myContacts service controls access by using the roleTemplates rt0, rt1, rt2, rt3 and rt99, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myContacts roleTemplate rt0 role gives complete read/write access to the information within the content document of the service being protected through this roleTemplate.

The following table illustrates the available methods and the scope in effect when accessing the myContacts service through that method while mapped to this roleTemplate:

TABLE

| myContacts roleTemplate rt0 | |
|---|---|
| method | scope/name |
| query | allElements |
| insert | allElements |
| replace | allElements |
| delete | allElements |
| update | allElements |
| updateContactData | allElements |
| serviceOnline | allElements |
| serviceOffline | allElements |

The myContacts roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myContacts service through that method while mapped to this roleTemplate:

TABLE

| myContacts roleTemplate rt1 | |
|---|---|
| method | scope/name |
| query | allElements |
| insert | onlySelfElements |
| replace | onlySelfElements |
| delete | onlySelfElements |
| updateContactData | allElements |
| serviceOnline | allElements |
| serviceOffline | allElements |

The myContacts roleTemplate rt2 role gives complete read access to all information within the content document of the service being protected through this roleTemplate. Applications mapping to this role have very limited write access and are only able to create and manipulate their own subscription nodes. The following table illustrates the available methods and the scope in effect when accessing the myContacts service through that method while mapped to this roleTemplate.

TABLE

| myContacts roleTemplate rt2 | |
|---|---|
| method | scope/name |
| query | allElements |
| insert | onlySelfSubscriptionElements |
| replace | onlySelfSubscriptionElements |
| delete | onlySelfSubscriptionElements |
| updateContactData | allElements |
| serviceOnline | allElements |
| serviceOffline | allElements |

The myContacts roleTemplate rt3 role gives limited read access to information within the content document that is categorized as "public." The following table illustrates the available methods and the scope in effect when accessing the myContacts service through that method while mapped to this roleTemplate:

TABLE

| myContacts roleTemplate rt3 | |
|---|---|
| method | scope/name |
| Query | onlyPublicElements |
| updateContactData | allElements |
| serviceOnline | allElements |
| serviceOffline | allElements |

The myContacts roleTemplate rt99 blocks access to the content document. Note that lack of a role in the roleList has the same effect as assigning someone to rt99. No methods/scope are in effect when accessing the myContacts service while mapped to this rt99 roleTemplate.

myContacts/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myContacts service.

```
<m:myContacts changeNumber=" ..." instanceId=" ..."
    xmlns:m=" http://schemas.microsoft.com/hs/2001/10/myContacts"
    xmlns:mp=" http://schemas.microsoft.com/hs/2001/10/myProfile"
    xmlns:mc=" http://schemas.microsoft.com/hs/2001/10/myCalendar"
    xmlns:hs=" http://schemas.microsoft.com/hs/2001/10/core" >₁..₁
    <m:contact synchronize=" ..." changeNumber=" ..." id=" ..." creator=" ..."
>₀..unbounded
        <m:catref=" ..." >₀..unbounded</m:cat>
        <m:name changeNumber=" ..." id=" ..." creator=" ..." >₀..unbounded
            <mp:cat ref=" ..." >₀..unbounded</mp:cat>
            <mp:title xml:lang=" ..." dir=" ..." >₀..₁</mp:title>
            <mp:givenName xml:lang=" ..." dir=" ..." >₀..₁</mp:givenName>
            <mp:middleName xml:lang=" ..." dir=" ..." >₀..₁</mp:middleName>
            <mp:surname xml:lang=" ..." dir=" ..." >₀..₁</mp:surname>
            <mp:suffix xml:lang=" ..." dir=" ..." >₀..₁</mp:suffix>
            <mp:fileAsName xml:lang=" ..." dir=" ..." >₀..₁</mp:fileAsName>
            {any}
        </m:name>
        <m:puid>₀..₁</m:puid>
        <m:specialDate calendarType=" ..." >₀..unbounded
            <mp:cat ref=" ..." >₀..₁</mp:cat>
            <mp:date>₁..₁</mp:date>
            {any}
        </m:specialDate>
        <m:picture>₀..unbounded
            <mp:cat ref=" ..." >₀..₁</mp:cat>
            <mp:url>₁..₁</mp:url>
            {any}
        </m:picture>
        <m:gender>₀..₁</m:gender>
        <m:notes xml:lang=" ..." dir=" ..." >₀..₁</m:notes>
        <m:address changeNumber=" ..." id=" ..." creator=" ..." >₀..unbounded
            <hs:cat ref=" ..." >₀..unbounded</hs:cat>
            <hs:officialAddressLine xml:lang=" ..." dir=" ..." >₀..₁</hs:officialAddressLine>
            <hs:internalAddressLine xml:lang=" ..." dir=" ..." >₀..₁</hs:internalAddressLine>
            <hs:primaryCity xml:lang=" ..." dir=" ..." >₀..₁</hs:primaryCity>
            <hs:secondaryCity xml:lang=" ..." dir=" ..." >₀..₁</hs:secondaryCity>
            <hs:subdivision xml:lang=" ..." dir=" ..." >₀..₁</hs:subdivision>
            <hs:postalCode>₀..₁</hs:postalCode>
            <hs:countryCode>₀..₁</hs:countryCode>
            <hs:latitude>₀..₁</hs:latitude>
            <hs:longitude>₀..₁</hs:longitude>
            <hs:elevation>₀..₁</hs:elevation>
            <hs:velocity>₀..₁
                <hs:speed>₀..₁</hs:speed>
                <hs:direction>₀..₁</hs:direction>
            </hs:velocity>
            <hs:confidence>₀..₁</hs:confidence>
            <hs:precision>₀..₁</hs:precision>
            {any}
        </m:address>
        <m:emailAddress changeNumber=" ..." id=" ..." creator=" ..." >₀..unbounded
            <mp:cat ref=" ..." >₀..unbounded</mp:cat>
            <mp:email>₁..₁</mp:email>
            <mp:name xml:lang=" ..." dir=" ..." >₀..₁</mp:name>
            {any}
        </m:emailAddress>
        <m:webSite changeNumber=" ..." id=" ..." creator=" ..." >₀..unbounded
            <mp:cat ref=" ..." >₀..₁</mp:cat>
```

-continued

```
    <mp:url>_{1..1}</mp:url>
    {any}
</m:webSite>
<m:screenName>_{0..unbounded}
    <mp:cat ref="..." >_{0..1}</mp:cat>
    <mp:name xml:lang="..." dir="..." >_{1..1}</mp:name>
    {any}
</m:screenName>
<m:telephoneNumber changeNumber="..." id="..." creator="..." >_{0..unbounded}
    <hs:cat ref="..." >_{0..unbounded}</hs:cat>
    <hs:countryCode>_{0..1}</hs:countryCode>
    <hs:nationalCode>_{1..1}</hs:nationalCode>
    <hs:number>_{1..1}</hs:number>
    <hs:numberExtension>_{0..1}</hs:numberExtension>
    <hs:pin>_{0..1}</hs:pin>
    {any}
</m:telephoneNumber>
<m:identificationNumber>_{0..unbounded}
    <mp:cat ref="..." >_{0..1}</mp:cat>
    <mp:number>_{1..1}</mp:number>
    {any}
</m:identificationNumber>
<m:workInformation changeNumber="..." id="..." creator="..." >_{0..unbounded}
    <mp:cat ref="..." >_{0..unbounded}</mp:cat>
    <mp:profession xml:lang="..." dir="..." >_{0..1}</mp:profession>
    <mp:jobTitle xml:lang="..." dir="..." >_{0..1}</mp:jobTitle>
    <mp:officeLocation xml:lang="..." dir="..." >_{0..1}</mp:officeLocation>
    <mp:coworkerOrDepartment>_{0..unbounded}
        <hs:name xml:lang="..." dir="..." >_{0..1}</hs:name>
        <hs:puid>_{0..1}</hs:puid>
        <hs:email>_{0..1}</hs:email>
        <hs:cat ref="..." >_{1..1}</hs:cat>
    </mp:coworkerOrDepartment>
    {any}
</m:workInformation>
<m:userReference>_{0..unbounded}
    <hs:name xml:lang="..." dir="..." >_{0..1}</hs:name>
    <hs:puid>_{0..1}</hs:puid>
    <hs:email>_{0..1}</hs:email>
    <hs:cat ref="..." >_{1..1}</hs:cat>
</m:userReference>
<m:securityCertificate>_{0..unbounded}
    <mp:cat ref="..." >_{0..unbounded}</mp:cat>
    <mp:certificate>_{1..1}</mp:certificate>
</m:securityCertificate>
{any}
</m:contact>
<m:subscription changeNumber="..." id="..." creator="..." >_{0..unbounded}
    <hs:trigger select="..." mode="..." baseChangeNumber="..." >_{1..1}</hs:trigger>
    <hs:expiresAt>_{0..1}</hs:expiresAt>
    <hs:context uri="..." >_{1..1} {any}</hs:context>
    <hs:to>_{1..1}</hs:to>
</m:subscription>
{any}
</m:myContacts>
```

The meaning of the attributes and elements shown in the table are set forth below, wherein in the syntax used in the table, boldface type corresponds to a blue node, and underlined type to a red node, as described above, and the minimum and maximum occurrence information (0, 1, unbounded) indicates whether an element or attribute is required or optional, and how many are possible.

The /myContacts (minOccurs=1 maxOccurs=1) element encapsulates the content document for this service. This element establishes a global cache scope for the service and contains other root-level system attributes for this instance of the service.

The /myContacts/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored, e.g., without generating an error.

The /myContacts/@instanceId (string minOccurs=0 maxOccurs=1) attribute is a unique identifier typically assigned to the root element of a service. It is a read-only element and assigned by the .NET My Services system when a user is provisioned for a particular service.

The /myContacts/contact (minOccurs=0 maxOccurs=unbounded) identifies a particular contact. The /myContacts/contact/@synchronize (string minOccurs=0 maxOccurs=1) attribute controls and/or enables synchronization of this contact node. When enabled, (e.g., value of "yes"), .NET My Services will attempt to keep the contact nodes synchronized with the reference data stored in the referenced PUID's myProfile default store, subject to permission. A value of "no" indicates that the system should not attempt to keep this contact node synchronized.

The /myContacts/contact/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myContacts/contact/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/@creator (string minOccurs=0 maxOccurs=1) attribute identifies the creator in terms of userId, appId, and platformId of the node.

The /myContacts/contact/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/cat/@ref (anyURI minOccurs=0 maxOccurs=1) attribute references a category definition (<catDef/>) element using the rules outlined in the myCategories section of the present application.

The /myContacts/contact/name (minOccurs=0 maxOccurs=unbounded) element encapsulates a name associated with the identity. An identity can have multiple names associated with it. These name nodes are not intended to be used for storing screen names or other electronic names, but rather to store a commonly used name for the entity. Names contain five parts and are meant to be combined in proper order, with spaces separating the parts and empty content parts excluded.

The /myContacts/contact/name/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myContacts/contact/name/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/name/@creator (string minOccurs=0 maxOccurs=1) attribute identifies the creator in terms of userId, appId, and platformId of the node. The /myContacts/contact/name/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/name/cat/@ref (anyURI minOccurs=0 maxOccurs=1) attribute references a category definition (<catDef/>) element using the rules outlined in the myCategories section of the present application.

The /myContacts/contact/name/title (string minOccurs=0 maxOccurs=1) optional element is designed to store a title or prefix associated with the name. Examples are 'Mr.', 'Mrs.', 'Dr.', or any other commonly used name title or prefix. The /myContacts/contact/name/title/@xml:lang (minOccurs=1 maxOccurs=1) is a required attribute used to specify an ISO 639 language code or an ISO 3166 country code as described in RFC 1766. The value of this attribute indicates the language type of the content within this element.

The /myContacts/contact/name/title/@dir (string minOccurs=0 maxOccurs=1) optional attribute specifies the default layout direction for the localized string. Valid values are rtl (right to left), and ltr (left to right).

The /myContacts/contact/name/givenName (string minOccurs=0 maxOccurs=1) optional element is meant to store the first portion of a name. The /myContacts/contact/name/givenName/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/name/givenName/@dir (string minOccurs=0 maxOccurs=1) optional attribute specifies the default layout direction for the localized string. Valid values are rtl (right to left), and ltr (left to right).

The /myContacts/contact/name/middleName (string minOccurs=0 maxOccurs=1) optional element is meant to store the middle portion or initial of a name. The /myContacts/contact/name/middleName/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/name/middleName/@dir (string minOccurs=0 maxOccurs=1) optional attribute specifies the default layout direction for the localized string. Valid values are rtl (right to left), and ltr (left to right).

The /myContacts/contact/name/surname (string minOccurs=0 maxOccurs=1) optional element is meant to store the last portion of a name. The /myContacts/contact/name/surname/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/name/surname/@dir (string minOccurs=0 maxOccurs=1) optional attribute specifies the default layout direction for the localized string. Valid values are rtl (right to left), and ltr (left to right).

The /myContacts/contact/name/suffix (string minOccurs=0 maxOccurs=1) optional element is designed to store a suffix associated with the name. Examples include 'Jr.', 'Sr.', 'III', or any other commonly used name suffix. The /myContacts/contact/name/suffix/@xml:lang (minOccurs=1 maxOccurs=1) required attribute is used to specify an ISO 639 language code or an ISO 3166 country code as described in RFC 1766. The value of this attribute indicates the language type of the content within this element.

The /myContacts/contact/name/suffix/@dir (string minOccurs=0 maxOccurs=1) optional attribute specifies the default layout direction for the localized string. Valid values are rtl (right to left), and ltr (left to right).

A complete name is usually a combination of title, givenName, middleName, surname, and suffix. The /myContacts/contact/name/fileAsName (string minOccurs=0 maxOccurs=1) optional element is present to indicate that a different order should be used, or that the identity prefers to have the name filed differently. The /myContacts/contact/name/fileAsName/@xml:lang (minOccurs=1 maxOccurs=1) required attribute is used to specify an ISO 639 language code or an ISO 3166 country code as described in RFC 1766. The value of this attribute indicates the language type of the content within this element.

The /myContacts/contact/name/fileAsName/@dir (string minOccurs=0 maxOccurs=1) optional attribute specifies the default layout direction for the localized string. Valid values are rtl (right to left), and ltr (left to right). The /myContacts/contact/name/{any} (minOccurs=0 maxOccurs=unbounded) allows the My Contacts section to be extended with respect to name information.

The /myContacts/contact/puid (string minOccurs=0 maxOccurs=1) element is used to specify a Passport Unique ID (PUID). The ID itself is in raw form, it is not encrypted in any way. The /myContacts/contact/specialDate (minOccurs=0 maxOccurs=unbounded) element encapsulates a special date that is important to this entity. Multiple special date nodes may exist. This is not a substitute for dates stored on an entity's myCalendar service, but rather intends to provide a convenient place to store a birth date, an anniversary date, and so on, because these dates are frequently imported into a contact record.

The /myContacts/contact/specialDate/@calendarType (string minOccurs=0 maxOccurs=1) field identifies an enumeration which determines the kind of calendar event this is, based on the following table, (which can be expanded):

The /myContacts/contact/specialDate/{any} (minOccurs=0 maxOccurs=unbounded) provides date extensibility. The /myContacts/contact/picture (minOccurs=0 maxOccurs=unbounded) optional element encapsulates a URL that points to a picture of the identity. The /myContacts/contact/picture/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/picture/cat/@ref (anyURI minOccurs=0 maxOccurs=1) attribute references a category definition (<catDef/>) element using the rules outlined in the myCategories section of the present application. The /myContacts/contact/picture/url (string minOccurs=1 maxOccurs=1) element contains the URL that points to the actual picture. The /myContacts/contact/picture/{any} (minOccurs=0 maxOccurs=unbounded) provides for picture-related extensibility.

The /myContacts/contact/gender (string minOccurs=0 maxOccurs=1) element specifies the gender for this entity. There can only be a single gender associated with an entity. The format of this element is a single, 7-bit ASCII character with one of two possible values: 'm' for male, and 'f' for female. The /myContacts/contact/notes (string minOccurs=0 maxOccurs=1) element contains free-form notes related to this contact. The /myContacts/contact/notes/@xml:lang (minOccurs=1 maxOccurs=1) required attribute is used to

| Value | Enumeration Constant | Description |
|---|---|---|
| −1 | HSCAL_ALL_CALENDARS | Unknown Calendar; system default (HSCAL_GREGORIAN_US) |
| 1 | HSCAL_GREGORIAN | Gregorian (localized) calendar |
| 2 | HSCAL_GREGORIAN_US | Gregorian (U.S.) calendar |
| 3 | HSCAL_JAPAN | Japanese Emperor Era calendar |
| 4 | HSCAL_TAIWAN | Taiwan Era calendar |
| 5 | HSCAL_KOREA | Korean Tangun Era calendar |
| 6 | HSCAL_HIJRI | Hijri (Arabic Lunar) calendar |
| 7 | HSCAL_THAI | Thai calendar |
| 8 | HSCAL_HEBREW | Hebrew (Lunar) calendar |
| 9 | HSCAL_GREGORIAN_ME_FRENCH | Gregorian Middle East French calendar |
| 10 | HSCAL_GREGORIAN_ARABIC | Gregorian Arabic calendar |
| 11 | HSCAL_GREGORIAN_XLIT_ENGLISH | Gregorian Transliterated English calendar |
| 12 | HSCAL_GREGORIAN_XLIT_FRENCH | Gregorian Transliterated French calendar |
| 13 | HSCAL_KOREA_LUNAR | Default Korea Lunar calendar |
| 14 | HSCAL_JAPAN_LUNAR | Default Japanese Lunar calendar |
| 15 | HSCAL_CHINESE_LUNAR | Chinese Lunar calendar |
| 16 | HSCAL_SAKA | Indian Saka calendar |
| 17 | HSCAL_LUNAR_ETO_CHN | Chinese Zodiac calendar |
| 18 | HSCAL_LUNAR_ETO_KOR | Korean Zodiac calendar |
| 19 | HSCAL_LUNAR_ROKUYOU | Japanese Lucky days calendar |

The /myContacts/contact/specialDate/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/specialDate/cat/@ref (anyURI minOccurs=0 maxOccurs=1) attribute references a category definition (<catDef/>) element using the rules outlined in the myCategories section of the present application (/myContacts/contact/specialDate/date (date minOccurs=1 maxOccurs=1)).

specify an ISO 639 language code or an ISO 3166 country code as described in RFC 1766. The value of this attribute indicates the language type of the content within this element.

The /myContacts/contact/notes/@dir (string minOccurs=0 maxOccurs=1) optional attribute specifies the base direction of directionally neutral text. Possible values include rtl (right to left), or ltr (left to right). The /myContacts/contact/address (minOccurs=0 maxOccurs=unbounded) element encapsulates a geographic address. The contained nodes describe the geographic address in detail. Typical use is one address element for each geographical address for this identity, e.g., a user with a primary home and a vacation home might have two address elements in this service.

The /myContacts/contact/address/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myContacts/contact/address/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/address/@creator (string minOccurs=0 maxOccurs=1) attribute identifies the creator in terms of userId, appId, and platformId of the node. The /myContacts/contact/address/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/address/cat/@ref (anyURI minOccurs=0 maxOccurs=1) attribute references a category definition (<catDef/>) element using the rules outlined in the myCategories section of the present application. The /myContacts/contact/address/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element would be to enclose a street address, post office box address, private bag, or any other similar official address. Internal routing information like department name, suite number within a building, internal mailstop number, or similar properties should be placed within the internalAddressLine element. The /myContacts/contact/address/officialAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/address/officialAddressLine/@dir (string minOccurs=0 maxOccurs=1) optional attribute specifies the default layout direction for the localized string. Valid values are rtl (right to left), and ltr (left to right).

The /myContacts/contact/address/internalAddressLine (string minOccurs=0 maxOccurs=1) element contains internal routing information relative to the address specified by the officialAddressLine. Items like department name, suite number within a building, internal mailstop number, or similar properties should be placed within this element. The /myContacts/contact/address/internalAddressLine/@xml:lang (minOccurs=1 maxOccurs=1) required attribute is used to specify an ISO 639 language code or an ISO 3166 country code as described in RFC 1766. The value of this attribute indicates the language type of the content within this element.

The /myContacts/contact/address/internalAddressLine/@dir (string minOccurs=0 maxOccurs=1) optional attribute specifies the default layout direction for the localized string. Valid values are rtl (right to left), and ltr (left to right). The /myContacts/contact/address/primaryCity (string minOccurs=0 maxOccurs=1) element defines the primary city for this address. The /myContacts/contact/address/primaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/address/primaryCity/{fourth root}dir (string minOccurs=0 maxOccurs=1) optional attribute specifies the default layout direction for the localized string. Valid values are rtl (right to left), and ltr (left to right).

The /myContacts/contact/address/secondaryCity (string minOccurs=0 maxOccurs=1) optional element defines the secondary city for this address. Example types for this element include city district, city wards, postal towns, and so on. The /myContacts/contact/address/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/address/secondaryCity/@dir (string minOccurs=0 maxOccurs=1) optional attribute specifies the default layout direction for the localized string. Valid values are rtl (right to left), and ltr (left to right). The /myContacts/contact/address/subdivision (string minOccurs=0 maxOccurs=1) element contains the official subdivision name within the country or region for this address. In the United States, this element would contain the two-letter abbreviation for the name of the state. This element is also commonly treated as the "first order admin subdivision" and will typically contain subdivision names referring to administrative division, Bundesstaat, canton, federal district, province, region, state or territory. The /myContacts/contact/address/subdivision/@xml:lang (minOccurs=1 maxOccurs=1) is a required attribute is used to specify an ISO 639 language code or an ISO 3166 country code as described in RFC 1766. The value of this attribute indicates the language type of the content within this element, while the /myContacts/contact/address/subdivision/@dir (string minOccurs=0 maxOccurs=1) optional attribute specifies the default layout direction for the localized string. Valid values are rtl (right to left), and ltr (left to right).

The /myContacts/contact/address/postalCode (string minOccurs=0 maxOccurs=1) element contains the official postal code for this address. The /myContacts/contact/address/countryCode (string minOccurs=0 maxOccurs=1) element contains the 2 letter ISO-3166 id of the country, dependency, or functionally equivalent region for this address.

The /myContacts/contact/address/latitude (string minOccurs=0 maxOccurs=1) element specifies the latitude value for this address in units of decimal degrees while the /myContacts/contact/address/latitude/longitude (string minOccurs=0 maxOccurs=1) element specifies the longitude value for this address in units of decimal degrees. The /myContacts/contact/address/latitude/elevation (string minOccurs=0 maxOccurs=1) element specifies the elevation above sea level with respect to WGS84 geodetic datum, in units of meters. Geodetic datum WGS84 is required for these elements. The /myContacts/contact/address/latitude/velocity (minOccurs=0 maxOccurs=1) element specifies the last reported velocity associated with this address. Of course for fixed addresses, the velocity node would either not be present, or speed would be zero indication stationary position. The /myContacts/contact/address/latitude/velocity/speed (string minOccurs=0 maxOccurs=1) element specifies the last known speed associated with this report in units of meters per second. The /myContacts/contact/address/latitude/velocity/direction (string minOccurs=0 maxOccurs=1) element specifies the last known direction associated with this report in units of degrees decimal. The /myContacts/contact/address/latitude/confidence (string minOccurs=0 maxOccurs=1) element specifies a percentage value that indicates the confidence value that this location is accurate within the specified precision. The /myContacts/contact/address/latitude/precision (string minOccurs=0 maxOccurs=1) element specifies the precision in meters of this location. The value defines a spherical zone that the location falls within.

The /myContacts/contact/address/{any} (minOccurs=0 maxOccurs=unbounded) field allows extensibility of address information.

The /myContacts/contact/emailAddress (minOccurs=0 maxOccurs=unbounded) element encapsulates an electronic address for this entity, specifically, it contains an email address associated with this identity. This element may be repeated any number of times. Typical use is one emailAddress element for each email address associated with this identity.

The /myContacts/contact/emailAddress/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myContacts/contact/emailAddress/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/emailAddress/@creator (string minOccurs=0 maxOccurs=1) attribute identifies the creator in terms of userId, appId, and platformId of the node. The /myContacts/contact/emailAddress/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/emailAddress/cat/@ref (anyURI minOccurs=0 maxOccurs=1) attribute references a category definition (<catDef/>) element using the rules outlined in the myCategories section of the present application. The /myContacts/contact/emailAddress/email (string minOccurs=1 maxOccurs=1) element contains the actual value of the email address (e.g. someone@microsoft.com). The /myContacts/contact/emailAddress/name (string minOccurs=0 maxOccurs=1) element contains the friendly, or display name associated with this email address. The /myContacts/contact/emailAddress/name/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/emailAddress/name/@dir (string minOccurs=0 maxOccurs=1) optional attribute specifies the default layout direction for the localized string. Valid values are rtl (right to left), and ltr (left to right).

The /myContacts/contact/emailAddress/{any} (minOccurs=0 maxOccurs=unbounded) allows for extensibility with respect to email contacts.

The /myContacts/contact/webSite (minOccurs=0 maxOccurs=unbounded) element encapsulates an electronic address for this entity, specifically, it contains a web site or URL associated with this identity. This element may be repeated any number of times. Typical use is one webSite element for each web site associated with this identity. The /myContacts/contact/webSite/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myContacts/contact/webSite/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/webSite/@creator (string minOccurs=0 maxOccurs=1) attribute identifies the creator in terms of userId, appId, and platformId of the node. The /myContacts/contact/webSite/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/webSite/cat/@ref (anyURI minOccurs=0 maxOccurs=1) attribute references a category definition (<catDef/>) element using the rules outlined in the myCategories section of the present application. The /myContacts/contact/webSite/url (string minOccurs=1 maxOccurs=1) element contains the URL for this web site. If the site is accessible through multiple URLs, this element may be repeated an appropriate number of times.

The /myContacts/contact/webSite/{any} (minOccurs=0 maxOccurs=unbounded) provides extensibility.

The /myContacts/contact/screenName (minOccurs=0 maxOccurs=unbounded) element encapsulates an electronic address for this entity, specifically, it contains a screen name commonly used in real time communications applications like instant messaging applications, chat rooms, and so on. This element may be repeated any number of times, and the type attribute may be used for simple classifications on the screenName. The /myContacts/contact/screenName/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/screenName/cat/@ref (anyURI minOccurs=0 maxOccurs=1) attribute references a category definition (<catDef/>) element using the rules outlined in the myCategories section of the present application. The /myContacts/contact/screenName/name (string minOccurs=1 maxOccurs=1) element contains the value of the screen name. The /myContacts/contact/screenName/name/@xml:lang (minOccurs=1 maxOccurs=1) This required attribute is used to specify an ISO 639 language code or an ISO 3166 country code as described in RFC 1766. The value of this attribute indicates the language type of the content within this element. The /myContacts/contact/screenName/name/@dir (string minOccurs=0 maxOccurs=1) optional attribute specifies the default layout direction for the localized string. Valid values are rtl (right to left), and ltr (left to right).

The /myContacts/contact/screenName/{any} (minOccurs=0 maxOccurs=unbounded) The /myContacts/contact/telephoneNumber (minOccurs=0 maxOccurs=unbounded) element encapsulates an electronic address for this entity, specifically, it contains a telephone number. This element may be repeated any number of times. Typical use is one telephoneNumber element for each phone number associated with this identity. A telephone number comprises an optional country code, a required nationalCode (e.g., US area code), a number, an optional extension, and an optional pin (described below).

The /myContacts/contact/telephoneNumber/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myContacts/contact/telephoneNumber/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/telephoneNumber/@creator (string minOccurs=0 maxOccurs=1) attribute identifies the creator in terms of userId, appId, and platformId of the node. The /myContacts/contact/telephoneNumber/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/telephoneNumber/cat/@ref (anyURI minOccurs=0 maxOccurs=1) attribute references a category definition (<catDef/>) element using the rules outlined in the myCategories section of the present application.

The /myContacts/contact/telephoneNumber/countryCode (string minOccurs=0 maxOccurs=1) optional element specifies the country code for this telephone number. The /myContacts/contact/telephoneNumber/nationalCode (string minOccurs=1 maxOccurs=1) element specifies the national code for this phone number. For US telephone numbers, this is equivalent to the area code. The /myContacts/contact/telephoneNumber/number (string minOccurs=1 maxOccurs=1) element specifies the actual telephone number within the country and national code number scheme.

The /myContacts/contact/telephoneNumber/numberExtension (string minOccurs=0 maxOccurs=1) optional element specifies an extension used to reach this identity and this number. The /myContacts/contact/telephoneNumber/pin (string minOccurs=0 maxOccurs=1) optional element specifies a pin number used on this phone number. A pin is similar to an extension, but pin's are commonly used to address pagers while extensions are typically used to address phones relative to a local pbx. The /myContacts/contact/telephoneNumber/{any} (minOccurs=0 maxOccurs=unbounded) allows telephone number extensibility.

The /myContacts/contact/identificationNumber (minOccurs=0 maxOccurs=unbounded) optional element encapsulates an identification number for the entity. For example, information such as an employee ID number, social security number, national ID number, drivers license number, and so on, may be stored within this element. The /myContacts/contact/identificationNumber/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/identificationNumber/cat/@ref (anyURI minOccurs=0 maxOccurs=1) attribute references a category definition (<catDef/>) element using the rules outlined in the myCategories section of the present application. The /myContacts/contact/identificationNumber/number (string minOccurs=1 maxOccurs=1) element contains the actual identification number value. The /myContacts/contact/identificationNumber/{any} (minOccurs=0 maxOccurs=unbounded) provides extensibility for identification number type of information.

The /myContacts/contact/workInformation (minOccurs=0 maxOccurs=unbounded) element encapsulates work-related or occupation-related information for this entity. The /myContacts/contact/workInformation/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myContacts/contact/workInformation/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myContacts/contact/workInformation/@creator (string minOccurs=0 maxOccurs=1) attribute identifies the creator in terms of userId, appId, and platformId of the node. The /myContacts/contact/workInformation/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/workInformation/cat/@ref (anyURI minOccurs=0 maxOccurs=1) attribute references a category definition (<catDef/>) element using the rules outlined in the myCategories section of the present application. The /myContacts/contact/workInformation/profession (string minOccurs=0 maxOccurs=1) This optional element specifies the entity's profession within this particular workInformation element. The /myContacts/contact/workInformation/profession/@xml:lang (minOccurs=1 maxOccurs=1) is a required attribute used to specify an ISO 639 language code or an ISO 3166 country code as described in RFC 1766. The value of this attribute indicates the language type of the content within this element. The /myContacts/contact/workInformation/profession/@dir (string minOccurs=0 maxOccurs=1) optional attribute specifies the default layout direction for the localized string. Valid values are rtl (right to left), and ltr (left to right).

The /myContacts/contact/workInformation/jobTitle (string minOccurs=0 maxOccurs=1) element specifies the job title for this piece of work information. The /myContacts/contact/workInformation/jobTitle/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/workInformation/jobTitle/@dir (string minOccurs=0 maxOccurs=1) optional attribute specifies the default layout direction for the localized string. Valid values are rtl (right to left), and ltr (left to right).

The /myContacts/contact/workInformation/officeLocation (string minOccurs=0 maxOccurs=1) element specifies the office location for this piece of work information. The /myContacts/contact/workInformation/officeLocation/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/workInformation/officeLocation/@dir (string minOccurs=0 maxOccurs=1) optional attribute specifies the default layout direction for the localized string. Valid values are rtl (right to left), and ltr (left to right).

The /myContacts/contact/workInformation/coworkerOrDepartment (minOccurs=0 maxOccurs=unbounded) element encapsulates information about this entity's manager, assistant, company, department, and so on. The information can include its name, its PUID and its email address. Using this anchor information, additional details may be obtained. The required cat element indicates the relationship of the element to this entity (e.g., ref="system#manager"). The /myContacts/contact/workInformation/coworkerOrDepartment/name (string minOccurs=0 maxOccurs=1) optional element specifies the name for the enclosing element.

The /myContacts/contact/workInformation/coworkerOrDepartment/name/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/workInformation/coworkerOrDepartment/name/@dir (string minOccurs=0 maxOccurs=1) optional attribute specifies the default layout direction for the localized string. Valid values are rtl (right to left), and ltr (left to right).

The /myContacts/contact/workInformation/coworkerOrDepartment/puid (string minOccurs=0 maxOccurs=1) optional element specifies the name for the enclosing element. The /myContacts/contact/workInformation/coworkerOrDepartment/email (string minOccurs=0 maxOccurs=1) optional name specifies an email address for the enclosing element. The /myContacts/contact/workInformation/coworkerOrDepartment/cat (minOccurs=1 maxOccurs=1) element is used to categorize the element that contains it by referencing a global category definition in either the .NET Categories service system document or an external resource containing category definitions, or by referencing an identity centric category definition in the content document of the .NET Categories service for a particular puid.

The /myContacts/contact/workInformation/coworkerOrDepartment/cat/@ref (anyURI minOccurs=0 maxOccurs=1) attribute references a category definition (<catDef/>) element using the rules outlined in the myCategories section of the present application.

The /myContacts/contact/workInformation/{any} (minOccurs=0 maxOccurs=unbounded) extends the work information-related data.

The /myContacts/contact/userReference (minOccurs=0 maxOccurs=unbounded) includes information related to reference data. The /myContacts/contact/userReference/name (string minOccurs=0 maxOccurs=1) optional element specifies the name for the enclosing element. The /myContacts/contact/userReference/name/@xml:lang (minOccurs=1 maxOccurs=1) required attribute is used to specify an ISO 639 language code or an ISO 3166 country code as described in RFC 1766. The value of this attribute indicates the language type of the content within this element. The /myContacts/contact/userReference/name/@dir (string minOccurs=0 maxOccurs=1) optional attribute specifies the default layout direction for the localized string. Valid values are rtl (right to left), and ltr (left to right).

The /myContacts/contact/userReference/puid (string minOccurs=0 maxOccurs=1) optional element specifies the name for the enclosing element. The /myContacts/contact/userReference/email (string minOccurs=0 maxOccurs=1) optional name specifies an email address for the enclosing element. The /myContacts/contact/userReference/cat (minOccurs=1 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/userReference/cat/@ref (anyURI minOccurs=0 maxOccurs=1) attribute references a category definition (<catDef/>) element using the rules outlined in the myCategories section of the present application.

The /myContacts/contact/securityCertificate (minOccurs=0 maxOccurs=unbounded) is directed to securityCertificate data. The /myContacts/contact/securityCertificate/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myContacts/contact/securityCertificate/cat/@ref (anyURI minOccurs=0 maxOccurs=1) attribute references a category definition (<catDef/>) element using the rules outlined in the myCategories section of the present application.

The /myContacts/contact/securityCertificate/certificate (hexBinary minOccurs=1 maxOccurs=1) includes the certification information, and the /myContacts/contact/{any} (minOccurs=0 maxOccurs=unbounded) allows for extensibility.

The system document is a global document for the service. Its content and meaning is independent of the puid used to address the service, and the document is read only to all users. The system document contains a set of base items common to .NET My Services, described above, with the *actual service name* equal to myContacts.

myContacts/Domain Specific Methods

The myContacts service supports the standard methods query, insert, replace, delete, update, and the domain-specific methods updateContactData, serviceOnline and serviceOffline.

myDevices

The .NET Devices service is designed to store a combination of characteristics about primarily mobile communication devices, along with the carriers which provision those devices. This service is primarily designed to allow notifications, messages and other real-time communications to be delivered to a wide variety of devices on various transports.

myDevices/Roles

The myDevices service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myDevices roleTemplate rt0 role gives complete read/write access to the information within the content document of the service being protected through this roleTemplate. The following table illustrates the available methods and the scope in effect when accessing the myDevices service through that method while mapped to this roleTemplate:

TABLE

| \_\_\_myDevices roleTemplate rt0\_\_\_ | |
|---|---|
| method | scope/name |
| Query | allElements |
| Insert | allElements |
| Replace | allElements |
| Delete | allElements |
| Update | allElements |

The myDevices roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myDevices service through that method while mapped to this roleTemplate:

TABLE

| \_\_\_myDevices roleTemplate rt1\_\_\_ | |
|---|---|
| method | scope/name |
| Query | allElements |
| Insert | onlySelfElements |
| Replace | onlySelfElements |
| Delete | onlySelfElements |

The myDevices roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myDevices service through that method while mapped to this roleTemplate:

TABLE

| \_\_\_myDevices roleTemplate rt2\_\_\_ | |
|---|---|
| method | scope/name |
| Query | allElements |
| Insert | onlySelfSubscriptionElements |
| replace | onlySelfSubscriptionElements |
| Delete | onlySelfSubscriptionElements |

The myDevices roleTemplate rt3 role gives limited read access to information within the content document that is categorized as "public." The following table illustrates the available methods and the scope in effect when accessing the myDevices service through that method while mapped to this roleTemplate:

| \_\_\_myDevices roleTemplate rt3\_\_\_ | |
|---|---|
| method | scope/name |
| Query | onlyPublicElements |

The myDevices roleTemplate rt99 blocks access to the content document. Note that lack of a role in the roleList has the same effect as assigning someone to rt99.

myDevices/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myDevices service:

```
<m:myDevices changeNumber="..." instanceId="..."
  xmlns:m="http://schemas.microsoft.com/hs/2001/10/myDevices"
  xmlns:hs="http://schemas.microsoft.com/hs/2001/10/core">$_{1..1}$
  <m:device changeNumber="..." id="..." creator="...">$_{0..unbounded}$
    <m:cat ref="...">$_{0..unbounded}$</m:cat>
    <m:deviceId>$_{1..1}$</m:deviceId>
    <m:carrierId>$_{1..1}$</m:carrierId>
    <m:name xml:lang="..." dir="...">$_{1..1}$</m:name>
    <m:address>$_{0..unbounded}$</m:address>
    {any}
```

-continued

```
  </m:device>
  <m:subscription changeNumber="..." id="..." creator=
"...">0..unbounded
    <hs:trigger select="..." mode="..." baseChangeNumber=
    "...">1..1</hs:trigger>
    <hs:expiresAt>0..1</hs:expiresAt>
    <hs:context uri="...">1..1 {any}</hs:context>
    <hs:to>1..1</hs:to>
  </m:subscription>
  {any}
</m:myDevices>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myDevices (minOccurs=1 maxOccurs=1) element encapsulates the content document for the .NET Devices service. The /myDevices/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDevices/@instanceId (string minOccurs=0 maxOccurs=1) attribute is a unique identifier typically assigned to the root element of a service. It is a read-only element and assigned by the .NET My Services system when a user is provisioned for a particular service.

The /myDevices/device (minOccurs=0 maxOccurs=unbounded) element defines a communication device within the .NET Devices service. Each device is an extensible, categorized item containing the name of the device encoded as a URI, the name of the carrier that services the device encoded as a URI, a friendly name for the device, a list of URIs that may be used to address the device, and so on.

Devices are categorized into classes using simple categorization. For instance, a device is classified as a cellPhone through the "system#callPhone" categorization. Additionally, a device is marked as a primary device through categorization using the "system#primary" category reference.

A validated device is one that has been digitally signed and certified by some entity. .NET My Services accommodates this by allowing the use of extension elements holding certified digital signatures, or holding references to verification services that may validate a node on the fly.

The /myDevices/device/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDevices/device/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myDevices/device/@creator (string minOccurs=0 maxOccurs=1) attribute identifies the creator in terms of useId, appId, and platformId of the node.

The /myDevices/device/cat (minOccurs=0 maxOccurs=unbounded) element is used to categorize the element that contains it by referencing a global category definition in either the .NET Categories service section, described above, an external resource containing category definitions, or by referencing an identity centric category definition in the content document of the .NET Categories service for a particular puid.

The /myDevices/device/cat/@ref (anyURI minOccurs=0 maxOccurs=1) attribute references a category definition (<catDef/>) element using the rules outlined in the myCategories section described above.

The /myDevices/device/deviceId (anyURI minOccurs=1 maxOccurs=1) element contains the device name/id in a URI form. This element is encoded as a URI to allow much richer and extensible naming for the device than can be expressed using a simple uuid. The URI name will be of the form http://mydevices.microsoft.com/carrierID/deviceID#9c20f0e8-c0ef-472d-8bec-4cc6f8b0f456.

The /myDevices/device/carrierId (anyURI minOccurs=1 maxOccurs=1) element contains the URI of the carrier that is responsible for servicing this device. The element is encoded as a URI. Which allows for both uuid: based identification of the carrier as well as richer identification mechanisms.

The /myDevices/device/name (string minOccurs=1 maxOccurs=1) element contains a user-readable, not necessarily unique friendly name for the device. The /myDevices/device/name/@xml:lang (minOccurs=1 maxOccurs=1) required attribute is used to specify an ISO 639 language code or an ISO 3166 country code as described in RFC 1766. The value of this attribute indicates the language type of the content within this element. The /myDevices/device/name/@dir (string minOccurs=0 maxOccurs=1) optional attribute specifies the default layout direction for the localized string. Valid values are rtl (right to left), and ltr (left to right).

The /myDevices/device/address (anyURI minOccurs=0 maxOccurs=unbounded) element contains addresses in the form of URI's that may be used to address this device. For example, if the device is addressable through email, an address entry of "mailto:someone@microsoft.com" may appear in this element. If the device is also addressable through an http gateway, an additional address of "http://microsoft.com/somepath/someid" may be specified in this element. This element is repeated for each address that may be used to address the device.

The /myDevices/device/{any} (minOccurs=0 maxOccurs=unbounded) allows for extensibility of this schema.

myDocuments

The .NET Documents service is designed to store and manage online files and folders for the associated .NET Passport. Files are provided on demand to .NET-based services, applications, and devices. The service can be used for roaming of personal files, or sharing files with other .NET Passport users.

By way of example, consider a consumer web site that contains product brochures in .pdf format. On the web site, the user selects "Add this file to my .NET Documents" to automatically retain a copy of the brochure. As another example, a corporation's internal expense report management web site allows a user to submit an expense report .xls file that is stored either on the local disk or from the user's .NET Documents. As yet another example, tax preparation software can open a user's data files either on the local disk, or from the user's .NET Documents. The user may allow a tax advisor to see and update the data files contained in the user's .NET Documents, which allows the tax advisor to directly update the user's data.

myDocuments/Roles

The myDocuments service controls access by using the rt0, rt1, rt2, rt3 and rt99 roleTemplates, using the following scopes:

```
scope allElements
    <hs:scope id=7215df55-e4af-449f-a8e4-72a1f7c6a987>
        <hs:shape base=t>
        </hs:shape>
    </hs:scope>
scope onlySelfElements
    <hs:scope id=a159c93d-4010-4460-bc34-5094c49c1633>
        <hs:shape base=nil>
            <hs:include select=//*[@creator='$callerId']/>
        </hs:shape>
    </hs:scope>
scope onlySelfSubscriptionElements
    <hs:scope id=b7f05a6d-75cd-4958-9dfb-f532ebb17743>
        <hs:shape base=nil>
            <hs:include select=//subscription[@creator='$callerId']/>
        </hs:shape>
    </hs:scope>
scope onlyPublicElements
    <hs:scope id=da025540-a0c0-470f-adcf-9f07e5a5ec8f>
        <hs:shape base=nil>
            <hs:include select=//*[cat/@ref='hs:public']/>
            <hs:include select=//subscription[@creator='$callerId']/>
        </hs:shape>
    </hs:scope>
```

The myDocuments roleTemplate rt0 role gives complete read/write access to the information within the content document of the service being protected through this roleTemplate. The following table illustrates the available methods and the scope in effect when accessing the myDocuments service through that method while mapped to this roleTemplate:

TABLE

| myDocuments roleTemplate rt0 | |
|---|---|
| method | scope/name |
| Query | allElements |
| Insert | allElements |
| Replace | allElements |
| Delete | allElements |
| Update | allElements |

The myDocuments roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myDocuments service through that method while mapped to this roleTemplate:

TABLE

| myDocuments roleTemplate rt1 | |
|---|---|
| method | scope/name |
| Query | allElements |
| Insert | onlySelfElements |
| Replace | onlySelfElements |
| Delete | onlySelfElements |

The myDocuments roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myDocuments service through that method while mapped to this roleTemplate:

TABLE

| myDocuments roleTemplate rt2 | |
|---|---|
| method | scope/name |
| Query | allElements |
| Insert | onlySelfSubscriptionElements |
| replace | onlySelfSubscriptionElements |
| Delete | onlySelfSubscriptionElements |

The myDocuments roleTemplate rt3 role gives limited read access to information within the content document that is categorized as "public." The following table illustrates the available methods and the scope in effect when accessing the myDocuments service through that method while mapped to this roleTemplate:

TABLE

| myDocuments roleTemplate rt3 | |
|---|---|
| method | scope/name |
| Query | onlyPublicElements |

The myDocuments roleTemplate rt99 blocks access to the content document. Note that lack of a role in the roleList has the same effect as assigning someone to rt99.

myDocuments/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myDocuments service:

```
<m:myDocuments changeNumber="..." instanceId="..."
    xmlns:m="http://schemas.microsoft.com/hs/2001/10/myDocuments"
    xmlns:hs="http://schemas.microsoft.com/hs/2001/10/core">1..1
    <m:document changeNumber="..." id="..." creator="...">0..unbounded
```

-continued

```
<m:cat ref="...">0..unbounded</m:cat>
<m:name xml:lang="..." dir="...">1..1</m:name>
<m:lock taken="..." expires="...">0..1</m:lock>
<m:attributes>0..1
    <m:hidden>1..1</m:hidden>
    <m:system>1..1</m:system>
    <m:readOnly>1..1</m:readOnly>
</m:attributes>
<m:lastAccessDate>0..1</m:lastAccessDate>
<m:creationDate>0..1</m:creationDate>
<m:ref folderId="..." name="..." expires="...">0..unbounded
    <m:delete>0..1</m:delete>
    <m:show>0..1</m:show>
    {any}
</m:ref>
<m:stream name="..." href="..." size="...">1..unbounded
    <m:httpHeaders>0..1</m:httpHeaders>
    <m:body>0..1</m:body>
    {any}
</m:stream>
<m:properties changeNumber="..." id="..." creator="...">0..1 {any}</m:properties>
    {any}
</m:document>
<m:folder parent="..." path="..." changeNumber="..." id="..." creator="...">0..unbounded
    <m:name xml:lang="..." dir="...">1..1</m:name>
    <m:attributes>0..1
        <m:hidden>1..1</m:hidden>
        <m:system>1..1</m:system>
        <m:readOnly>1..1</m:readOnly>
    </m:attributes>
    {any}
</m:folder>
<m:quota>0..1
    <m:provisioned>1..1</m:provisioned>
    <m:used>1..1</m:used>
</m:quota>
<m:subscription changeNumber="..." id="..." creator="...">0..unbounded
    <hs:trigger select="..." mode="..." baseChangeNumber="...">1..1</hs:trigger>
    <hs:expiresAt>0..1</hs:expiresAt>
    <hs:context uri="...">1..1 {any}</hs:context>
    <hs:to>1..1</hs:to>
</m:subscription>
{any}
</m:myDocuments>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myDocuments (minOccurs=1 maxOccurs=1) element encapsulates the content document for the service. The .NET Documents service provides scaleable storage for opaque file data. While some of the meta data can be promoted into the .NET My Services content document, the primary purpose of this service is to provide file storage, and to allow other services to access and grant access to this data. The cache scope for this document is the entire content document; that is, there is a single changeNumber attribute, and it occurs at the root element. Any change to the document changes this attribute.

The /myDocuments/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDocuments/@instanceId (string minOccurs=0 maxOccurs=1) attribute is a unique identifier typically assigned to the root element of a service. It is a read-only element and assigned by the .NET My Services system when a user is provisioned for a particular service.

The /myDocuments/document (minOccurs=0 maxOccurs=unbounded) node is directed to the document, which is the myDocuments root object for document properties, references, and content. The /myDocuments/document/ @changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDocuments/document/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myDocuments/document/@creator (string minOccurs=0 maxOccurs=1) attribute identifies the creator in terms of userId, appId, and platformId of the node.

The /myDocuments/document/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myDocuments/document/cat/@ref (anyURI minOccurs=0 maxOccurs=1) attribute references a category definition (<catDef/>) element using the rules outlined in the myCategories section, described above.

The /myDocuments/document/name (string minOccurs=1 maxOccurs=1) contains the name of the document. The /myDocuments/document/name/@xml:lang (minOccurs=1 maxOccurs=1) required attribute is used to specify an ISO 639 language code or an ISO 3166 country code as described in RFC 1766. The value of this attribute indicates the language type of the content within this element. The /myDocuments/document/name/@dir (string minOccurs=0 maxOccurs=1) optional attribute specifies the default layout direction for the localized string. Valid values are rtl (right to left), and ltr (left to right).

The /myDocuments/document/lock (minOccurs=0 maxOccurs=1) element is used for document level locking. Since locks must be taken in an atomic fashion, this method is necessary as opposed to a standard update. If the lock is successfully taken, then it can be released by simply calling the update method and setting the taken attribute to zero (00. If a lock has been taken, but should be renewed, set the "Force" flag to TRUE when calling this method. The Force flag should only be used to renew a lock that was previously successfully taken. Parameters include:

1. Query must result in a LOCK element for a specific document
2. Single BOOL parameter "Force" which, if true, simply takes the lock, ignoring the current state of the Taken attribute.
3. A datetime which specifies when the lock should automatically expire. This should be set to a reasonably small delta from the time the lock is taken to avoid holding locks when the client holding the lock crashes. It is best to periodically refresh the lock and have relatively small lock expirations times.

A /myDocuments/document/lock/@taken (int minOccurs=0 maxOccurs=1) value of 0 indicates no lock has been taken. If 1, then a lock is being held for the document. If the lock has been taken, the /myDocuments/document/lock/@expires (dateTime minOccurs=0 maxOccurs=1) optional attribute specifies when the lock should be automatically released.

The /myDocuments/document/attributes (minOccurs=0 maxOccurs=1) element contains the file system store attributes for the document.

The /myDocuments/document/attributes/hidden (int minOccurs=1 maxOccurs=1) contains a value that if 0, indicates that the document should be displayed in normal UI, while if 1, then it should be hidden from most views.

The /myDocuments/document/attributes/system (int minOccurs=1 maxOccurs=1) indicates when equal to zero (0) that the file is not a system file, while if one (1), then the file should be treated as a special system file.

The /myDocuments/document/attributes/readOnly (int minOccurs=1 maxOccurs=1) value is 0 when the document is read/write, or 1 if read-only.

The /myDocuments/document/lastAccessDate (dateTime minOccurs=0 maxOccurs=1) field and /myDocuments/document/creationDate (dateTime minOccurs=0 maxOccurs=1) store this self-explanatory file system information.

The /myDocuments/document/ref (minOccurs=0 maxOccurs=unbounded) element defines a reference to a document. Documents are all ref counted objects. These references can be deleted through the standard delete method. When the final reference is deleted, the file and all associated metadata is deleted. References always refer to a specific folder. This means that documents conceptually "exist" within one or more Folders. The traditional "file name" for the document is unique per reference. References can also specify a time to live. This allows other services to post data to a user's store in a temporary fashion. For example, they can use the user's store to create temp files. If all references have expired, then the document is automatically deleted. However, if any reference exists that has not expired, then all references, including ones that have expired, remain valid. When adding a reference to an existing document, the reference must refer to an existing folder ID, and the name given must be unique within that folder. Updates to references require that any update will leave the name unique within the referencing folder. If the final reference to a document is deleted, then the deletion of the reference results in the deletion of the document and all associated streams.

The /myDocuments/document/ref/@folderId (string minOccurs=0 maxOccurs=1) contains the ID of the folder object that holds this reference to this object.

The /myDocuments/document/ref/@name (string minOccurs=0 maxOccurs=1) contains the name of this document within this reference (folder).

The /myDocuments/document/ref/@expires (dateTime minOccurs=0 maxOccurs=1), when this attribute exists, specifies the number of minutes this reference is valid relative to the last access time for the document.

The /myDocuments/document/ref/delete (int minOccurs=0 maxOccurs=1) element, if it exists, specifies an HTTP GET operation to be performed to cleanly delete the reference (this would be placed here by another service which stored data in the .NET Documents service).

The /myDocuments/document/ref/show (string minOccurs=0 maxOccurs=1) element, if it exists, specifies a URL that can be used to render HTML to display the referenced object. For example, if the document is really a photograph in a photo album, this URL would show the document in the appropriate context.

The /myDocuments/document/ref/{any} (minOccurs=0 maxOccurs=unbounded) provides for extensibility.

The /myDocuments/document/stream (minOccurs=1 maxOccurs=unbounded) element contains information about a single stream within a document. Documents support multiple streams of data. Each stream is stored as a separate object from the document in the .NET My Services content document. Streams have names that must be unique to a given document. When adding a stream, stream names must be unique for a given document. When updating a stream, stream names must be unique within a given document. The null stream can not be renamed. The null stream may not be deleted, while any other stream may be deleted.

The /myDocuments/document/stream/@name (string minOccurs=0 maxOccurs=1) attribute specifies a name for the stream which is unique within this document. There is always one stream with the null name (" ").

The /myDocuments/document/stream/@href (string minOccurs=0 maxOccurs=1) attribute specifies an http reference to the actual stream object data.

The /myDocuments/document/stream/@size (int minOccurs=0 maxOccurs=1) attribute specifies the size of the stream data in bytes.

The /myDocuments/document/stream/httpHeaders (string minOccurs=0 maxOccurs=1) optional element has a value that will be returned by the .NET Documents service for a HTTP GET operation in the response headers. If this element is empty, then no additional response headers will be returned. If this element does not exist, the default response header for the file extension will be returned.

The /myDocuments/document/stream/body (hexBinary minOccurs=0 maxOccurs=1) contains stream data information for the /myDocuments/document/stream/{any} (minOccurs=0 maxOccurs=unbounded) field. The /myDocuments/document/properties (minOccurs=0 maxOccurs=1) element defines the basic property type.

The /myDocuments/document/properties/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDocuments/document/properties/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myDocuments/document/properties/@creator (string minOccurs=0 maxOccurs=1) attribute identifies the creator in terms of userId, appId, and platformId of the node.

The /myDocuments/document/properties/{any} (minOccurs=0 maxOccurs=unbounded) allows property-related data to be extended, while the /myDocuments/document/{any} (minOccurs=0 maxOccurs=unbounded) provides document-related extensibility.

The /myDocuments/folder (minOccurs=0 maxOccurs=unbounded) element defines the basic folder type. Folders have both a path and a unique server generated id. Documents are only associated with the folder ID (through a reference), and are not "contained" within a folder in the .NET Documents content document. When adding a folder, the folder must have a unique path name, and if the folder has a parent, then the first portion of the folder path must match the path of the parent. When changing the path name of a folder, the name must not conflict with an existing name. If the name does not conflict then an update of a folder that is the parent of other folders has the side-effect of changing the path=" . . . " attribute of all child folders to reflect the new parent path name. For a folder to be deleted, there must exist no other folder which is a child of the folder and there must be no documents that are referenced by the folder.

The /myDocuments/folder/@parent (string minOccurs=0 maxOccurs=1) contains a Parent folder id, while the /myDocuments/folder/@path (string minOccurs=0 maxOccurs=1) contains the fully qualified path to this folder.

The /myDocuments/folder/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myDocuments/folder/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myDocuments/folder/@creator (string minOccurs=0 maxOccurs=1) attribute identifies the creator in terms of userId, appId, and platformId of the node.

The /myDocuments/folder/name (string minOccurs=1 maxOccurs=1) contains the default name of the folder. The /myDocuments/folder/name/@xml:lang (minOccurs=1 maxOccurs=1) required attribute is used to specify an ISO 639 language code or an ISO 3166 country code as described in RFC 1766. The value of this attribute indicates the language type of the content within this element. The /myDocuments/folder/name/@dir (string minOccurs=0 maxOccurs=1) optional attribute specifies the default layout direction for the localized string. Valid values are rtl (right to left), and ltr (left to right).

The /myDocuments/folder/attributes (minOccurs=0 maxOccurs=1) element contains file system store attributes for the document. The /myDocuments/folder/attributes/hidden (int minOccurs=1 maxOccurs=1), when equal to 0, indicates that the document should be displayed in normal UI. If 1, then the document should be hidden from most views.

The /myDocuments/folder/attributes/system (int minOccurs=1 maxOccurs=1) specifies that if equal to 0, the file is not a system file. If 1, then file should be treated as a special system file. The /myDocuments/folder/attributes/readOnly (int minOccurs=1 maxOccurs=1) value specifies that the document is read/write if 0, or read-only if 1.

The /myDocuments/folder/{any} (minOccurs=0 maxOccurs=unbounded) provides folder-related extensibility.

The /myDocuments/quota (minOccurs=0 maxOccurs=1) field is used by the service to restrict and report usage of storage. The quota element can only be updated by a client mapped to the Provision role. The /myDocuments/quota/provisioned (int minOccurs=1 maxOccurs=1) value contains the maximum number of bytes of storage that can be used by this instance of the .NET Documents service. The /myDocuments/quota/used (int minOccurs=1 maxOccurs=1) field contains the number of bytes actually in use by this instance of the .NET Documents service.

The /myDocuments/subscription (minOccurs=0 maxOccurs=unbounded) element defines a subscription node as described above in the subscription section.

myFavoriteWebSites

The MyFavoriteWebSites service is designed to store and manage the addresses and organization of the favorite web sites for an end user. In some ways, the MyFavoriteWebSites service is similar to the "favorites" menu item in Internet Explorer, or the "favorites" button in MSN Explorer, in that both of these applications maintain a user's favorite web sites and track usage. .NET My Services provides this service so that favorite web sites can be used in multiple applications.

myFavoriteWebSites/Roles

The myFavoriteWebSites service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myFavoriteWebSites roleTemplate rt0 role gives complete read/write access to the information within the content document of the service being protected through this roleTemplate. The following table illustrates the available methods and the scope in effect when accessing the myFavoriteWebSites service through that method while mapped to this roleTemplate:

TABLE

| myFavoriteWebSites roleTemplate rt0 | |
|---|---|
| method | scope/name |
| Query | allElements |
| Insert | allElements |
| Replace | allElements |
| Delete | allElements |
| Update | allElements |

The myFavoriteWebSites roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myFavoriteWebSites service through that method while mapped to this roleTemplate:

TABLE

| myFavoriteWebSites roleTemplate rt1 | |
|---|---|
| method | scope/name |
| Query | allElements |
| Insert | onlySelfElements |
| Replace | onlySelfElements |
| Delete | onlySelfElements |

The myFavoriteWebSites roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myFavoriteWebSites service through that method while mapped to this roleTemplate:

TABLE

| myFavoriteWebSites roleTemplate rt2 | |
|---|---|
| method | scope/name |
| Query | allElements |
| Insert | onlySelfSubscriptionElements |
| replace | onlySelfSubscriptionElements |
| Delete | onlySelfSubscriptionElements |

The myFavoriteWebSites roleTemplate rt3 role gives limited read access to information within the content document that is categorized as "public." The following table illustrates the available methods and the scope in effect when accessing the myFavoriteWebSites service through that method while mapped to this roleTemplate:

| myFavoriteWebSites roleTemplate rt3 | |
|---|---|
| method | scope/name |
| Query | onlyPublicElements |

The myFavoriteWebSites roleTemplate rt99 blocks access to the content document. Note that lack of a role in the roleList has the same effect as assigning someone to rt99.

myFavoriteWebSites/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myFavoritewebsites service:

```
<m:myFavoriteWebSites changeNumber="..." instanceId="..."
  xmlns:m="http://schemas.microsoft.com/hs/2001/10/
  myFavoriteWebSites"
  xmlns:hs="http://schemas.microsoft.com/hs/2001/10/core">$_{1..1}$
  <m:favoriteWebSite changeNumber="..." id="..."
  creator="...">$_{0..unbounded}$
    <m:cat ref="...">$_{0..unbounded}$</m:cat>
    <m:title xml:lang="..." dir="...">$_{0..unbounded}$</m:title>
    <m:url>$_{1..1}$</m:url>
    {any}
  </m:favoriteWebSite>
  <m:subscription changeNumber="..." id="..."
  creator="...">$_{0..unbounded}$
    <hs:trigger select="..." mode="..."
    baseChangeNumber="...">$_{1..1}$</hs:trigger>
    <hs:expiresAt>$_{0..1}$</hs:expiresAt>
    <hs:context uri="...">$_{1..1}$ {any}</hs:context>
    <hs:to>$_{1..1}$</hs:to>
  </m:subscription>
  {any}
</m:myFavoriteWebSites>
```

The /myfavoriteWebSites (minOccurs=1 maxOccurs=1) element encapsulates the content document for the service. The cache scope for this document is the entire content document, that is, there is a single changeNumber attribute, and it occurs at the root element. Any change to the document changes this attribute.

The /myfavoriteWebSites/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myfavoriteWebSites/@instanceId (string minOccurs=0 maxOccurs=1) attribute is a unique identifier typically assigned to the root element of a service. It is a read-only element and assigned by the .NET My Services system when a user is provisioned for a particular service.

The /myfavoriteWebSites/favoriteWebSite (minOccurs=0 maxOccurs=unbounded) element describes a complete favorite Web site, including the title, URL, and free-form extensions. This element may contain zero (0) or more category elements that are used to organize favoriteWebSites.

The /myfavoriteWebSites/favoriteWebSite/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myfavoriteWebSites/favoriteWebSite/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myfavoriteWebSites/favoriteWebSite/@creator (string minOccurs=0 maxOccurs=1) attribute identifies the creator in terms of userId, appId, and platformId of the node.

The /myfavoriteWebSites/favoriteWebSite/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myfavoriteWebSites/favoriteWebSite/cat/@ref (anyURI minOccurs=0 maxOccurs=1) attribute references a category definition (<catDef/>) element using the rules outlined in the myCategories section, above.

The /myfavoriteWebSites/favoriteWebSite/title (string minOccurs=0 maxOccurs=unbounded) element specifies the title of the favorite Web site. A typical use is to fill this element from the HTML <title> element in the Web site referred to by this entry. The /myfavoriteWebSites/favoriteWebSite/title/@xml:lang (minOccurs=1 maxOccurs=1) required attribute is used to specify an ISO 639 language code or an ISO 3166 country code as described in RFC 1766. The value of this attribute indicates the language type of the content within this element. The /myfavoriteWebSites/favoriteWebSite/title/@dir (string minOccurs=0 maxOccurs=1) optional attribute specifies the default layout direction for the localized string. Valid values are rtl (right to left), and ltr (left to right).

The /myfavoriteWebSites/favoriteWebSite/url (anyURI minOccurs=1 maxOccurs=1) required element specifies the URL used to navigate to the Web site referred to by this entry. Its content should be URL-encoded.

The /myfavoriteWebSites/favoriteWebSite/{any} (minOccurs=0 maxOccurs=unbounded) and /myFavoriteWebSites/{any} (minOccurs=0 maxOccurs=unbounded) fields provide for extensibility.

The /myfavoriteWebSites/subscription (minOccurs=0 maxOccurs=unbounded) element defines a subscription node as described above in the subscription section.

myInbox

The .NET Inbox service, generally referred to as myInbox, is designed to store and manage e-mail related information for the associated identity. A primary purpose of the myInbox service is to supply this information, on demand, to applications operating on the identity's behalf. Using this service, an identity can manage e-mail from a variety of devices, and even manage multiple accounts from the same application. It is expected that this service will support some form of subscription, or pending query, so that applications or services can reliably cache information contained within the service. An example of this caching might be an e-mail application or service. For each folder and message in the store, a subscription is issued against this service for that item. If the item changes, the application can refresh itself.

This myInbox service uses an XML schema to describe email, a user's email store, and the methods by which email is sent and received from the store.

myInbox/Roles

The myInbox service controls access by using the rt0, rt2 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myInbox roleTemplate rt0 role gives complete read/write access to the information within the content document of the service being protected through this roleTemplate. The following table illustrates the available methods and the scope in effect when accessing the myInbox service through that method while mapped to this roleTemplate:

TABLE

| method | scope/name |
| --- | --- |
| Query | allElements |
| Insert | allElements |
| Replace | allElements |
| Delete | allElements |
| Update | allElements |
| sendMessage | allElements |
| saveMessage | allElements |
| copyMessage | allElements |

The myInbox roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myInbox service through that method while mapped to this roleTemplate:

TABLE

| myInbox roleTemplate rt2 | |
|---|---|
| method | scope/name |
| Query | allElements |
| Insert | onlySelfSubscriptionElements |
| Replace | onlySelfSubscriptionElements |
| Delete | onlySelfSubscriptionElements |

TABLE-continued

| myInbox roleTemplate rt2 | |
|---|---|
| method | scope/name |
| sendMessage | allElements |
| saveMessage | allElements |

The myInbox roleTemplate rt99 blocks access to the content document. Note that lack of a role in the roleList has the same effect as assigning someone to rt99.

myInbox/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myInbox service:

```
m:myInbox changeNumber="..." instanceId="..."
   xmlns:m="http://schemas.microsoft.com/hs/2001/10/myInbox"
   xmlns:hs="http://schemas.microsoft.com/hs/2001/10/core">_{1..1}
   <m:account changeNumber="..." id="..." creator="...">_{1..unbounded}
      <m:name xml:lang="..." dir="...">_{1..1}</m:name>
      <m:email>_{1..1}</m:email>
      <m:primary>_{1..1}</m:primary>
      <m:cat ref="...">_{0..unbounded}</m:cat>
      <m:pop3Settings>_{0..1}
         <m:server>_{1..1}</m:server>
         <m:userName>_{1..1}</m:userName>
         <m:password>_{1..1}</m:password>
      </m:pop3Settings>
      {any}
   </m:account>
   <m:folder changeNumber="..." id="..." creator="...">_{4..unbounded}
      <m:name xml:lang="..." dir="...">_{1..1}</m:name>
      <m:type>_{1..1}</m:type>
      <m:unread>_{0..1}</m:unread>
      <m:parentFolder ref="...">_{0..1}</m:parentFolder>
      <m:childFolderCount>_{0..1}</m:childFolderCount>
      {any}
   </m:folder>
   <m:message changeNumber="..." id="..." creator="...">_{0..unbounded}
      <m:messageStatus changeNumber="...">_{1..1}
         <m:isRead>_{1..1}</m:isRead>
         <m:folder ref="...">_{1..1}</m:folder>
         <m:flag>_{0..1}
            <m:state>_{1..1}</m:state>
            <m:title xml:lang="..." dir="...">_{1..1}</m:title>
            <m:reminderDate>_{0..1}</m:reminderDate>
            {any}
         </m:flag>
         <m:state>_{1..1}</m:state>
         {any}
      </m:messageStatus>
      <m:messageContent changeNumber="...">_{1..1}
         <m:cat ref="...">_{0..unbounded}</m:cat>
         <m:account ref="...">_{0..1}</m:account>
         <m:messageType>_{1..1}
            <m:type>_{1..1}</m:type>
            <m:contentType>_{0..1}</m:contentType>
            {any}
         </m:messageType>
         <m:size>_{1..1}</m:size>
         <m:importance>_{1..1}</m:importance>
         <m:sensitivity>_{1..1}</m:sensitivity>
         <m:hasAttachments>_{1..1}</m:hasAttachments>
         <m:isJunkMail>_{1..1}</m:isJunkMail>
         <m:containsAdultContent>_{1..1}</m:containsAdultContent>
         <m:conversationId>_{0..1}</m:conversationId>
         <m:conversationIndex>_{0..1}</m:conversationIndex>
         <m:dateReceived>_{1..1}</m:dateReceived>
```

```
<m:dateSent>₁..₁</m:dateSent>
<m:subject xml:lang="..." dir="...">₁..₁
    <m:prefix>₁..₁</m:prefix>
    <m:text>₁..₁</m:text>
</m:subject>
<m:from>₁..₁
    <m:name xml:lang="..." dir="...">₁..₁</m:name>
    <m:email>₁..₁</m:email>
</m:from>
<m:recipient type="...">₀..unbounded
    <m:name xml:lang="..." dir="...">₁..₁</m:name>
    <m:email>₁..₁</m:email>
</m:recipient>
<m:plainBody>₀..₁</m:plainBody>
<m:htmlBody>₀..₁
    <m:body>₁..₁</m:body>
    <m:inlineAttachment>₀..unbounded
        <m:uri>₁..₁</m:uri>
        <m:contentType>₁..₁</m:contentType>
        <m:content>₁..₁</m:content>
    </m:inlineAttachment>
</m:htmlBody>
<m:attachment>₀..unbounded
    <m:name>₁..₁</m:name>
    <m:ord>₁..₁</m:ord>
    <m:contentType>₁..₁</m:contentType>
    <m:content>₁..₁</m:content>
</m:attachment>
<m:messagePart id="...">₀..unbounded
    <m:parentPart ref="...">₁..₁</m:parentPart>
    <m:order>₁..₁</m:order>
    <m:contentType>₁..₁</m:contentType>
    <m:size>₁..₁</m:size>
    <m:contentDisposition>₀..₁</m:contentDisposition>
    <m:contentId>₀..₁</m:contentId>
    <m:contentLocation>₀..₁</m:contentLocation>
    <m:contentTransferEncoding>₀..₁</m:contentTransferEncoding>
    <m:partContent>₀..₁</m:partContent>
</m:messagePart>
<m:preview xml:lang="..." dir="...">₀..₁</m:preview>
<m:single2822Header>₀..unbounded</m:single2822Header>
<m:raw2822Content>₀..₁</m:raw2822Content>
<m:raw2822Headers>₀..₁</m:raw2822Headers>
{any}
    </m:messageContent>
</m:message>
<m:draft changeNumber="..." id="..." creator="...">₀..unbounded
    <m:draftStatus changeNumber="...">₁..₁
        <m:isRead>₁..₁</m:isRead>
        <m:folder ref="...">₁..₁</m:folder>
        <m:flag>₀..₁
            <m:state>₁..₁</m:state>
            <m:title xml:lang="..." dir="...">₁..₁</m:title>
            <m:reminderDate>₀..₁</m:reminderDate>
            {any}
        </m:flag>
        <m:state>₁..₁</m:state>
        {any}
    </m:draftStatus>
    <m:draftContent changeNumber="...">₁..₁
        <m:cat ref="...">₀..unbounded</m:cat>
        <m:account ref="...">₁..₁</m:account>
        <m:draftType>₁..₁
            <m:type>₁..₁</m:type>
            <m:contentType>₀..₁</m:contentType>
            {any}
        </m:draftType>
        <m:size>₁..₁</m:size>
        <m:importance>₁..₁</m:importance>
        <m:sensitivity>₁..₁</m:sensitivity>
        <m:hasAttachments>₁..₁</m:hasAttachments>
        <m:conversationId>₀..₁</m:conversationId>
        <m:conversationIndex>₀..₁</m:conversationIndex>
        <m:subject xml:lang="..." dir="...">₁..₁
            <m:prefix>₁..₁</m:prefix>
            <m:text>₁..₁</m:text>
        </m:subject>
        <m:from>₁..₁
            <m:name xml:lang="..." dir="...">₁..₁</m:name>
```

```
            <m:email>₁..₁</m:email>
          </m:from>
          <m:recipient type="...">₀..unbounded
            <m:name xml:lang="..." dir="...">₁..₁</m:name>
            <m:email>₁..₁</m:email>
          </m:recipient>
          <m:plainBody>₀..₁</m:plainBody>
          <m:htmlBody>₀..₁
            <m:body>₁..₁</m:body>
            <m:inlineAttachment>₀..unbounded
              <m:uri>₁..₁</m:uri>
              <m:contentType>₁..₁</m:contentType>
              <m:content>₁..₁</m:content>
            </m:inlineAttachment>
          </m:htmlBody>
          <m:attachment>₀..unbounded
            <m:name>₁..₁</m:name>
            <m:ord>₁..₁</m:ord>
            <m:contentType>₁..₁</m:contentType>
            <m:content>₁..₁</m:content>
          </m:attachment>
          <m:draftPart changeNumber="...">₁..unbounded
            <m:parentPart ref="...">₁..₁</m:parentPart>
            <m:order>₁..₁</m:order>
            <m:contentType>₁..₁</m:contentType>
            <m:size>₁..₁</m:size>
            <m:contentDisposition>₀..₁</m:contentDisposition>
            <m:contentId>₀..₁</m:contentId>
            <m:contentLocation>₀..₁</m:contentLocation>
            <m:contentTransferEncoding>₀..₁</m:contentTransferEncoding>
            <m:partContent>₁..₁</m:partContent>
            {any}
          </m:draftPart>
          <m:preview xml:lang="..." dir="...">₀..₁</m:preview>
          <m:single2822Header>₀..unbounded</m:single2822Header>
          <m:raw2822Content>₀..₁</m:raw2822Content>
          <m:raw2822Headers>₀..₁</m:raw2822Headers>
          {any}
        </m:draftContent>
      {any}
    </m:draft>
    <m:rule sequence="..." changeNumber="..." id="..." creator="...">₀..unbounded
      <m:name xml:lang="..." dir="...">₁..₁</m:name>
      <m:state>₁..₁</m:state>
      <m:runat>₁..₁</m:runat>
      <m:runwhen>₁..₁</m:runwhen>
      <m:type>₁..₁</m:type>
      <m:provider xml:lang="..." dir="...">₁..₁</m:provider>
      <m:condition select="...">₁..₁</m:condition>
      <m:action sequence="...">₁..unbounded
        <m:copyMessage>₀..₁
          <m:targetFolder select="...">₁..₁</m:targetFolder>
        </m:copyMessage>
        <m:moveMessage>₀..₁
          <m:targetFolder select="...">₁..₁</m:targetFolder>
        </m:moveMessage>
        <m:deleteMessage>₀..₁</m:deleteMessage>
        <m:assignCategory>₀..₁
          <m:cat ref="...">₀..unbounded</m:cat>
        </m:assignCategory>
        <m:forwardMessage>₀..₁
          <m:recipient type="...">₀..unbounded
            <m:name xml:lang="..." dir="...">₁..₁</m:name>
            <m:email>₁..₁</m:email>
          </m:recipient>
        </m:forwardMessage>
        <m:forwardAsAttachment>₀..₁
          <m:recipient type="...">₀..unbounded
            <m:name xml:lang="..." dir="...">₁..₁</m:name>
            <m:email>₁..₁</m:email>
          </m:recipient>
        </m:forwardAsAttachment>
        <m:serverReply>₀..₁
          <m:subject xml:lang="..." dir="...">₁..₁
            <m:prefix>₁..₁</m:prefix>
            <m:text>₁..₁</m:text>
          </m:subject>
          <m:simpleBody xml:lang="..." dir="...">₁..₁</m:simpleBody>
        </m:serverReply>
```

-continued

```
<m:redirectMessage>₀‥₁
  <m:recipient type="...">₀‥unbounded
    <m:name xml:lang="..." dir="...">₁‥₁</m:name>
    <m:email>₁‥₁</m:email>
  </m:recipient>
</m:redirectMessage>
<m:flagMessage>₀‥₁
  <m:flag>₁‥₁
    <m:state>₁‥₁</m:state>
    <m:title xml:lang="..." dir="...">₁‥₁</m:title>
    <m:reminderDate>₀‥₁</m:reminderDate>
    {any}
  </m:flag>
</m:flagMessage>
<m:markAsRead>₀‥₁</m:markAsRead>
<m:stopProcessingRulesOfThisType>₀‥₁</m:stopProcessingRulesOfThisType>
</m:action>
{any}
</m:rule>
<m:subscription changeNumber="..." id="..." creator="...">₀‥unbounded
  <hs:trigger select="..." mode="..." baseChangeNumber="...">₁‥₁</hs:trigger>
  <hs:expiresAt>₀‥₁</hs:expiresAt>
  <hs:context uri="...">₁‥₁ {any}</hs:context>
  <hs:to>₁‥₁</hs:to>
</m:subscription>
{any}
</m:myInbox>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myInbox (minOccurs=1 maxOccurs=1) element represents the root element of myInbox. The /myInbox/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/@instanceId (string minOccurs=0 maxOccurs=1) attribute is a unique identifier typically assigned to the root element of a service. It is a read-only element and assigned by the .NET My Services system when a particular service is provisioned for a user. The /myInbox/account (minOccurs=1 maxOccurs=unbounded) element represents a provisioned user's email account. This element can optionally contain POP3 settings for myInbox services that support POP3 aggregation.

The /myInbox/account/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/account/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myInbox/account/@creator (minOccurs=1 maxOccurs=1) attribute identifies the creator in terms of userId, appId, and platformId of the node.

The /myInbox/account/name (string minOccurs=1 maxOccurs=1) field maintains the display name of the account. The /myInbox/account/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/account/name/@dir (string minOccurs=0 maxOccurs=1) optional attribute specifies the default layout direction for the localized string. Valid values are rtl (right to left) and ltr (left to right).

The /myInbox/account/email (string minOccurs=1 maxOccurs=1) field maintains the SMTP email account.

The /myInbox/account/primary (boolean minOccurs=1 maxOccurs=1) element defines this account as a primary or non-primary account. There can be only one primary account, and it can never be deleted.

The /myInbox/account/cat/@ref (anyURI minOccurs=1 maxOccurs=1) attribute references a category definition (catDef) element using the rules outlined in the .NET Categories section (myCategories) described above.

The /myInbox/account/pop3Settings (minOccurs=0 maxOccurs=1) defines pop3 settings, if this account is a POP3 account. Note that the primary account can not be a POP3 account. The /myInbox/account/pop3Settings/server (string minOccurs=1 maxOccurs=1) field contains the name of the POP3 server. The /myInbox/account/pop3Settings/userName (string minOccurs=1 maxOccurs=1) contains the username of the POP3 account. The /myInbox/account/pop3Settings/password (string minOccurs=1 maxOccurs=1) contains the password of the POP3 account.

Like other unbounded elements, multiple accounts may be set up, providing significantly functionality. For example, one node may maintain a user's primary email account, with another node set up as a secondary account. Even though email is received on one account, e.g., a POP3 account, it can be sent out on the other, e.g., an office email account.

The /myInbox/account/{any} (minOccurs=0 maxOccurs=unbounded) field allows for extensibility.

Folders represent the unit of containment for the myInbox service. The /myInbox/folder (minOccurs=4 maxOccurs=unbounded) folder element in myInbox are containers for messages, although not directly. Messages are related to folders via the /myInbox/message/messageStatus/folder ref=" " attribute. Folders can be organized hierarchically, although again not directly. Instead, folder containment is modeled using the /myInbox/folder/parentFolder ref=" " attribute. If a folder is deleted, all associated messages, folders and their messages are deleted. It is recommended that instead of deleting a folder directly, it should be moved to the type="deleted" folder first. There are four built in types of folders, and these can be identified by four special type element values: /folder/type='inbox' is the Inbox folder. /folder/type='sent' is the Sent Items folder. /folder/type='drafts' is the Drafts folder. /folder/type='deleted' is the Deleted Items folder. These four special folders will always exist in a provisioned .NET Inbox account, and cannot be deleted or modified. To create user defined folders, the standard .NET My Services insert method can be used, with the type set to 'custom'. Custom (user-defined) folders can be created, deleted or modified, and virtual hierarchies can be established via the parent folder attribute.

The /myInbox/folder/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/folder/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myInbox/folder/@creator (minOccurs=1 maxOccurs=1) attribute identifies the creator in terms of userId, appId, and platformId of the node. The /myInbox/folder/name (string minOccurs=1 maxOccurs=1) element contains the name of the e-mail folder. For the four special folders, this element is read only. For custom folders, this element can be edited. The /myInbox/folder/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/folder/name/@dir (string minOccurs=0 maxOccurs=1) optional attribute specifies the default layout direction for the localized string. Valid values are rtl (right to left) and ltr (left to right).

The /myInbox/folder/type (string minOccurs=1 maxOccurs=1) element contains a type identifier for this folder, and will contain the value 'inbox, 'sent', 'drafts' or 'delete' for the four special folders. For other folders, this value will be 'custom'.

The /myInbox/folder/unread (unsignedLong minOccurs=0 maxOccurs=1) contains the calculated count of the unread messages associated with this folder. This element is read only. The /myInbox/folder/parentFolder (minOccurs=0 maxOccurs=1) element contains a ref attribute that specifies the ID of the parent folder. For top-level folders, this attribute =="". This attribute cannot be set on the four special folders, as they remain top level folders.

The /myInbox/folder/parentFolder/@ref (minOccurs=0 maxOccurs=1) contains a uuidType used to specify a universally unique identifier (UUID).

The /myInbox/folder/childFolderCount (unsignedLong minOccurs=0 maxOccurs=1) attribute is calculated by the service, and indicates how many subfolders that folder contains. Note that fields can be calculated rather than stored or changed by the user. For example, a calculated field is used to maintain information such as how many items are in a folder since this number is not something a user directly decides, but rather results from other information.

The /myInbox/folder/{any} (minOccurs=0 maxOccurs=unbounded) field allows for extensibility.

The /myInbox/message (minOccurs=0 maxOccurs=unbounded) element defines a single message in myInbox in the base schema. A message represents an email message, and is divided into two sub-groups 'messageStatus' and 'messageContent'. This field is for received and sent messages, (not for drafts).

The /myInbox/message/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/message/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myInbox/message/@creator (minOccurs=1 maxOccurs=1) attribute identifies the creator in terms of userId, appId, and platformId of the node. The /myInbox/message/messageStatus (minOccurs=1 maxOccurs=1) element defines the status of the email, and frequently changes. Caching clients should take advantage of this when deciding which part of the message to change.

The /myInbox/message/messageStatus/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

Certain email-related elements frequently change. If a user wants to synchronize on each change, a great deal of information would need to be exchanged, even though most changes are simple changes in message status, rather than content, such as from unread to read. Status information is thus maintained separately. The /myInbox/message/messageStatus/is Read (boolean minOccurs=1 maxOccurs=1) element defines the read/unread state of the message, and can be modified. The /myInbox/message/messageStatus/folder (minOccurs=1 maxOccurs=1) element defines the single folder to which this message logically belongs. The /myInbox/message/messageStatus/folder/@ref (minOccurs=0 maxOccurs=1) uuidType is used to specify a universally unique identifier (UUID).

The /myInbox/message/messageStatus/flag (minOccurs=0 maxOccurs=1) optional element defines the flag state of the message. It includes an {any} element that can be used for extensible flags. The /myInbox/message/messageStatus/ flag/state (string minOccurs=1 maxOccurs=1) field maintains state of a message flag. The /myInbox/message/messageStatus/flag/title (string minOccurs=1 maxOccurs=1) field maintains the client-defined text of the flag. The /myInbox/message/messageStatus/flag/title/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/message/messageStatus/flag/title/@dir (string minOccurs=0 maxOccurs=1) optional attribute specifies the default layout direction for the localized string. Valid values are rtl (right to left) and ltr (left to right).

The /myInbox/message/messageStatus/flag/reminderDate (dateTime minOccurs=0 maxOccurs=1) field maintains the client-defined reminder date of the flag. The /myInbox/message/messageStatus/flag/{any} (minOccurs=0 maxOccurs=unbounded) field allows for extensibility.

The /myInbox/message/messageStatus/state (string minOccurs=1 maxOccurs=1) element defines the sent/received state of the message. This element is read only, which means that it can be queried for, but not updated. The /myInbox/message/messageStatus/{any} (minOccurs=0 maxOccurs=unbounded) field allows for extensibility.

The /myInbox/message/messageContent (minOccurs=1 maxOccurs=1) element defines the content of the message. This data changes rarely in a normal application.

The /myInbox/message/messageContent/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/message/messageContent/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /myInbox/message/messageContent/cat/@ref (anyURI minOccurs=1 maxOccurs=1) attribute references a category definition (catDef) element using the rules outlined in the .NET Categories section (myCategories) described above.

The /myInbox/message/messageContent/account (minOccurs=0 maxOccurs=1) element contains a reference to the /myInbox/account element to which this message was sent.

The /myInbox/message/messageContent/account/@ref (minOccurs=0 maxOccurs=1) uuidType is used to specify a universally unique identifier (UUID).

The /myInbox/message/messageContent/messageType (minOccurs=1 maxOccurs=1) subelements of this element describe the contents of the message.

The /myInbox/message/messageContent/messageType/type (string minOccurs=1 maxOccurs=1) element contains a value that provides the client with enough information to render an 'Inbox' view of the messages. Valid values include 'voice', 'subscription', 'fax', 'dsn', 'readReceipt', 'meetingResponse', 'meetingRequest', 'email' or 'liveEmail'.

The /myInbox/message/messageContent/messageType/contentType (string minOccurs=0 maxOccurs=1) field maintains the contentType of the message (in accordance with RFC 2045). Examples of this are: 'text/plain' and 'multipart/mime'.

The /myInbox/message/messageContent/messageType/{any} (minOccurs=0 maxOccurs=unbounded) field allows for extensibility.

The /myInbox/message/messageContent/size (unsignedLong minOccurs=1 maxOccurs=1) element contains the size, in bytes, of the entire RFC2822 message in the store.

The /myInbox/message/messageContent/importance (string minOccurs=1 maxOccurs=1) element indicates the importance of this message. Valid values include 'low', 'normal', or 'high'. The default is 'normal'.

The /myInbox/message/messageContent/sensitivity (string minOccurs=1 maxOccurs=1) element indicates the sensitivity of the message. Valid values include 'normal', 'personal', 'private', or 'confidential'.

The /myInbox/message/messageContent/hasAttachments (boolean minOccurs=1 maxOccurs=1) element indicates whether a message has one or more attachments. The value will either be 0 (to indicate that the message has no attachments) or 1 (to indicate that the message has one or more attachments).

The /myInbox/message/messageContent/isJunkMail (boolean minOccurs=1 maxOccurs=1) element is read only and is set by the myInbox service when the message was delivered, and indicates if the message was marked as junk mail by the junk mail filter.

The /myInbox/message/messageContent/containsAdultContent (boolean minOccurs=1 maxOccurs=1) read-only element is set by the myInbox service when the message was delivered and indicates if the message was determined to contain adult content by the adult content mail filter.

The /myInbox/message/messageContent/conversationId (string minOccurs=0 maxOccurs=1) optional element identifies the 'conversation,' or e-mail thread of which this message is a part.

The /myInbox/message/messageContent/conversationIndex (string minOccurs=0 maxOccurs=1) optional element identifies the 'conversation,' or e-mail thread of which this message is a part.

The /myInbox/message/messageContent/dateReceived (dateTime minOccurs=1 maxOccurs=1) read-only element contains the UTC date/time the message was received, and appears in all messages except ones that were sent by the user.

The /myInbox/message/messageContent/dateSent (dateTime minOccurs=1 maxOccurs=1) read-only element contains the UTC date/time the message was sent. For /message/messageStatus/state="sent" messages, this element represents the time the message was sent. For /message/messageStatus/state="received" this element represents the time the sender sent the message.

The /myInbox/message/messageContent/subject (minOccurs=1 maxOccurs=1) element contains the subject of the message. This element contains both a prefix and text sub-elements, to allow clients to sort on the non-prefix part of the subject (e.g., so RE: RE: doesn't get sorted). The /myInbox/message/messageContent/subject/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/message/messageContent/subject/@dir (string minOccurs=0 maxOccurs=1) optional attribute specifies the default layout direction for the localized string. Valid values are rtl (right to left), and ltr (left to right).

The /myInbox/message/messageContent/subject/prefix (string minOccurs=1 maxOccurs=1) contains the prefix of a message subject, (e.g., 'FW:').

The /myInbox/message/messageContent/subject/text (string minOccurs=1 maxOccurs=1) contains the subject of a message minus the prefix (e.g., 'hello there').

The /myInbox/message/messageContent/from (minOccurs=1 maxOccurs=1) is a read-only element that describes who this message is from.

The /myInbox/message/messageContent/from/name (string minOccurs=1 maxOccurs=1) field includes the display name of an e-mail address. The /myInbox/message/messageContent/from/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/message/messageContent/from/name/@dir (string minOccurs=0 maxOccurs=1) optional attribute specifies the default layout direction for the localized string. Valid values are rtl (right to left) and ltr (left to right).

The /myInbox/message/messageContent/from/email (string minOccurs=1 maxOccurs=1) field maintains an e-mail address (for example, someone@microsoft.com).

The /myInbox/message/messageContent/recipient (minOccurs=0 maxOccurs=unbounded) field specifies the recipient of this message and where they appear. A collection of recipient elements is only returned if the query option 'expandRecipients' is specified.

The /myInbox/message/messageContent/recipient/@type (string minOccurs=1 maxOccurs=1) field specifies whether the recipient is in the 'to' or 'cc' list.

The /myInbox/message/messageContent/recipient/name (string minOccurs=1 maxOccurs=1) stores the display name of the recipient's e-mail address. The /myInbox/message/messageContent/recipient/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/message/messageContent/recipient/name/@dir (string minOccurs=0 maxOccurs=1) optional attribute specifies the default layout direction for the localized string. Valid values are rtl (right to left) and ltr (left to right).

The /myInbox/message/messageContent/recipient/email (string minOccurs=1 maxOccurs=1) field contains an e-mail address (for example, someone@microsoft.com).

The /myInbox/message/messageContent/plainBody (string minOccurs=0 maxOccurs=1) field contains the plain body representation of the message. This element is returned by passing the 'includeSimpleMessageView' element in query options.

The /myInbox/message/messageContent/htmlBody (minOccurs=0 maxOccurs=1) field contains the html body representation of the message. This element can also contain inline attachments that are related to the html content via the 'uri' element of the inline attachment. This element is returned by passing the 'includeSimpleMessageView' element in query options. The /myInbox/message/messageContent/htmlBody/body (string minOccurs=1 maxOccurs=1) field contains the contents of the body.

The /myInbox/message/messageContent/htmlBody/inlineAttachment (minOccurs=0 maxOccurs=unbounded) element represents an inline attachment The /myInbox/message/messageContent/htmlBody/inlineAttachment/uri (string minOccurs=1 maxOccurs=1) field contains the client-defined unique identifier for the inline attachment. This element is used to identify this attachment location within the html body of a message.

The /myInbox/message/messageContent/htmlBody/inlineAttachment/contentType (string minOccurs=1 maxOccurs=1) field contains the Content-Type of the attachment.

The /myInbox/message/messageContent/htmlBody/inlineAttachment/content (base64Binary minOccurs=1 maxOccurs=1) field contains the base64 encoded attachment content.

The /myInbox/message/messageContent/attachment (minOccurs=0 maxOccurs=unbounded) element represents a mail attachment and is returned by passing the 'includeSimpleMessageViewAttachments' element in query options.

The /myInbox/message/messageContent/attachment/name (string minOccurs=1 maxOccurs=1) field contains the client defined name of the attachment.

The /myInbox/message/messageContent/attachment/ord (unsignedLong minOccurs=1 maxOccurs=1) field contains the unique order that this attachment should appear relative to all other attachments.

The /myInbox/message/messageContent/attachment/contentType (string minOccurs=1 maxOccurs=1) field contains the Content-Type of the attachment.

The /myInbox/message/messageContent/attachment/content (base64Binary minOccurs=1 maxOccurs=1) field contains the base64 encoded attachment content.

The /myInbox/message/messageContent/messagePart (minOccurs=0 maxOccurs=unbounded) field contains the element and its children define the message structure (including the contents). This element is returned by passing the 'includeMessagePartStructure' element in query options.

The /myInbox/message/messageContent/messagePart/@id (minOccurs=1 maxOccurs=1) field contains the unique identifier of the messagePart. The /myInbox/message/messageContent/messagePart/parentPart (minOccurs=1 maxOccurs=1) element points to the parent part of this part. The /myInbox/message/messageContent/messagePart/parentPart/@ref (minOccurs=0 maxOccurs=1) uuidType is used to specify a universally unique identifier (UUID).

The /myInbox/message/messageContent/messagePart/order (unsignedLong minOccurs=1 maxOccurs=1) element defines the order of this part relative to its siblings. The /myInbox/message/messageContent/messagePart/contentType (string minOccurs=1 maxOccurs=1) element defines the contentType of the part, (for example, message/rfc or text/plain.a).

The /myInbox/message/messageContent/messagePart/size (unsignedLong minOccurs=1 maxOccurs=1) field contains the size in bytes of the message part (including mime headers). The /myInbox/message/messageContent/messagePart/contentDisposition (string minOccurs=0 maxOccurs=1) element defines the content-disposition of the part, e.g., attachment; filename="txt1.txt".

The /myInbox/message/messageContent/messagePart/contentId (string minOccurs=0 maxOccurs=1) element defines the content-id of the part.

The /myInbox/message/messageContent/messagePart/contentLocation (string minOccurs=0 maxOccurs=1) element defines the content-location of the part.

The /myInbox/message/messageContent/messagePart/contentTransferEncoding (string minOccurs=0 maxOccurs=1) element defines the content-transfer-encoding of this part.

The /myInbox/message/messageContent/messagePart/part Content (base64Binary minOccurs=0 maxOccurs=1) elements contains the content of this message part and is only returned by including the 'includePartContent' element in the query options.

The /myInbox/message/messageContent/preview (string minOccurs=0 maxOccurs=1) field contains the first 256 characters of the message body. This element is only returned if the query option 'includePreview' is specified, to allow clients to selectively implement a preview-like message function or not, e.g., thin clients may not want to download an entire message just for a quick view. The /myInbox/message/messageContent/preview/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/message/messageContent/preview/@dir (string minOccurs=0 maxOccurs=1) optional attribute specifies the default layout direction for the localized string. Valid values are rtl (right to left) and ltr (left to right).

At times it may be desirable to a client to only obtain metadata about a message rather than downloading the message. The /myInbox/message/messageContent/single2822Header (string minOccurs=0 maxOccurs=unbounded) field contains the rfc2822 headers not included in the base schema (e.g., x-apparently-to). This element is returned by passing the 'includeSingle2822Headers' element in query options. The /myInbox/message/messageContent/raw2822Content (base64Binary minOccurs=0 maxOccurs=1) field contains the raw 2822 message (including headers and body) This element is returned by passing the includeRaw2822Contentelement in query options. The /myInbox/message/messageContent/raw2822Headers (base64Binary minOccurs=0 maxOccurs=1) field contains the raw rfc2822 headers not included in the base schema (e.g., x-apparently-to). This element is returned by passing the 'includeRaw2822Headers' element in query options.

The /myInbox/message/messageContent/{any} (minOccurs=0 maxOccurs=unbounded) field allows for extensibility.

A draft is a message that has not been sent. A draft node is defined that is similar in many ways to that of a regular message node. However, certain things about a draft message are different from received or sent messages, such as that they may be edited, do not have a date sent or date received time. The shape of a draft message is different, as well, and draft messages are likely to change, and thus the draft schema includes many red nodes.

In traditional email applications a draft message is stored in a Drafts folder and later sent. .NET Inbox allows for a draft to be stored in any folder. To this end, the /myInbox/draft (minOccurs=0 maxOccurs=unbounded) element defines a single draft in myInbox in the base schema. A draft represents an unsent email and is divided into two sub-groups 'messageStatus' and 'messageContent'. The /myInbox/draft/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/draft/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myInbox/draft/@creator (minOccurs=1 maxOccurs=1) attribute identifies the creator in terms of userId, appId, and platformId of the node.

The /myInbox/draft/draftStatus (minOccurs=1 maxOccurs=1) field contains the contents of this element represent the status metadata of the draft.

The /myInbox/draft/draftStatus/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/draft/draftStatus/isRead (boolean minOccurs=1 maxOccurs=1) element defines the read/unread state of the message and can be modified.

The /myInbox/draft/draftStatus/folder (minOccurs=1 maxOccurs=1) element defines the single folder that this message logically belongs to. For drafts this may point to the drafts folder, but also may point to another folder, enabling drafts to be stored in another folder.

The /myInbox/draft/draftStatus/folder/@ref (minOccurs=0 maxOccurs=1) uuidType is used to specify a universally unique identifier (UUID).

The /myInbox/draft/draftStatus/flag (minOccurs=0 maxOccurs=1) optional element defines the flag state of the message. It includes an {any} element that can be used for extensible flags.

The /myInbox/draft/draftStatus/flag/state (string minOccurs=1 maxOccurs=1) field contains the state of a message flag.

The /myInbox/draft/draftStatus/flag/title (string minOccurs=1 maxOccurs=1) field contains the client defined text of the flag. The /myInbox/draft/draftStatus/flag/title/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/draft/draftStatus/flag/title/@dir (string minOccurs=0 maxOccurs=1) optional attribute specifies the default layout direction for the localized string. Valid values are rtl (right to left) and ltr (left to right).

The /myInbox/draft/draftStatus/flag/reminderDate (dateTime minOccurs=0 maxOccurs=1) field contains the client defined reminder date of the flag. The /myInbox/draft/draftStatus/flag/{any} (minOccurs=0 maxOccurs=unbounded) field allows for extensibility. The /myInbox/draft/draftStatus/state (string minOccurs=1 maxOccurs=1) is an element, the value of which is 'draft'. It is provided for compatibility with messages. The /myInbox/draft/draftStatus/{any} (minOccurs=0 maxOccurs=unbounded) field allows for extensibility.

The /myInbox/draft/draftContent (minOccurs=1 maxOccurs=1) element includes the contents that represent the content of the draft. The /myInbox/draft/draftContent/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/draft/draftContent/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /myInbox/draft/draftContent/cat/@ref (anyURI minOccurs=1 maxOccurs=1) attribute references a category definition (catDef) element using the rules outlined in the .NET Categories section (myCategories) described above.

The /myInbox/draft/draftContent/account (minOccurs=1 maxOccurs=1) element contains a reference to the /myInbox/account element ref from which this message should be sent.

The /myInbox/draft/draftContent/account/@ref (minOccurs=0 maxOccurs=1) uuidType-- is used to specify a universally unique identifier (UUID).

The /myInbox/draft/draftContent/draftType (minOccurs=1 maxOccurs=1) element includes subelements that describe the contents of the message. The /myInbox/draft/draftContent/draftType/type (string minOccurs=1 maxOccurs=1) element contains a value that provides the client with enough information to render an 'Inbox' view of the messages. Valid values are 'voice', 'subscription', 'fax', 'dsn', 'readReceipt', 'meetingResponse', 'meetingRequest', 'email' or 'liveEmail'. The /myInbox/draft/draftContent/draftType/contentType (string minOccurs=0 maxOccurs=1) field contains the contentType of the message (in accordance with RFC 2045). Examples of this are: 'text/plain' and 'multipart/mime'.

The /myInbox/draft/draftContent/draftType/{any} (minOccurs=0 maxOccurs=unbounded) field allows for extensibility.

The /myInbox/draft/draftContent/size (unsignedLong minOccurs=1 maxOccurs=1) read only element contains the size, in bytes, of the entire RFC2822 message in the store.

The /myInbox/draft/draftContent/importance (string minOccurs=1 maxOccurs=1) element indicates the importance of this message. Valid values include 'low', 'normal', or 'high'. The default is 'normal'.

The /myInbox/draft/draftContent/sensitivity (string minOccurs=1 maxOccurs=1) element indicates the sensitivity of the message. Valid values include 'normal', 'personal', 'private', or 'confidential'.

The /myInbox/draft/draftContent/hasAttachments (boolean minOccurs=1 maxOccurs=1) read only element indicates whether a message has one or more attachments. The value will either be 0 (to indicate that the message has no attachments) or 1 (to indicate that the message has one or more attachments).

The /myInbox/draft/draftContent/conversationId (string minOccurs=0 maxOccurs=1) optional element identifies the 'conversation,' or e-mail thread of which this message is a part.

The /myInbox/draft/draftContent/conversationIndex (string minOccurs=0 maxOccurs=1) optional element identifies the 'conversation,' or e-mail thread of which this message is a part.

The /myInbox/draft/draftContent/subject (minOccurs=1 maxOccurs=1) field contains the subject of the message. This element contains both a prefix and text sub-elements to allow clients to sort on the non-prefix part of the subject (so RE: RE: doesn't get sorted). The /myInbox/draft/draftContent/subject/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/draft/draftContent/subject/@dir (string minOccurs=0 maxOccurs=1) optional attribute specifies the default layout direction for the localized string. Valid values are rtl (right to left), and ltr (left to right).

The /myInbox/draft/draftContent/subject/prefix (string minOccurs=1 maxOccurs=1) field contains the prefix of a message subject (e.g., 'FW:').

The /myInbox/draft/draftContent/subject/text (string minOccurs=1 maxOccurs=1) field contains the subject of a message minus the prefix (e.g., 'hello there').

The /myInbox/draft/draftContent/from (minOccurs=1 maxOccurs=1) read-only element describes who this message is from. To set this value, set the account element.

The /myInbox/draft/draftContent/from/name (string minOccurs=1 maxOccurs=1) field contains the display name of an e-mail address. The /myInbox/draft/draftContent/from/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/draft/draftContent/from/name/{fourth root}dir (string minOccurs=0 maxOccurs=1) optional attribute specifies the default layout direction for the localized string. Valid values are rtl (right to left) and ltr (left to right).

The /myInbox/draft/draftContent/from/email (string minOccurs=1 maxOccurs=1) field contains an e-mail address (for example, someone microsoft.com).

The /myInbox/draft/draftContent/recipient (minOccurs=0 maxOccurs=unbounded) field specifies the recipient of this message and where they appear.

The /myInbox/draft/draftContent/recipient/@type (string minOccurs=1 maxOccurs=1) field specifies whether the recipient is in the 'to', 'cc' or 'bcc' list.

The /myInbox/draft/draftContent/recipient/name (string minOccurs=1 maxOccurs=1) field contains the display name of an e-mail address. The /myInbox/draft/draftContent/recipient/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/draft/draftContent/recipient/name/@dir (string minOccurs=0 maxOccurs=1) optional attribute specifies the default layout direction for the localized string. Valid values are rtl (right to left) and ltr (left to right).

The /myInbox/draft/draftContent/recipient/email (string minOccurs=1 maxOccurs=1) field contains an e-mail address (for example, someone microsoft.com).

The /myInbox/draft/draftContent/plainBody (string minOccurs=0 maxOccurs=1) field contains the plain body representation of the draft. The /myInbox/draft/draftContent/htmlBody (minOccurs=0 maxOccurs=1) field contains the html body representation of the draft. This element can optionally contain inline attachments. The /myInbox/draft/draftContent/htmlBody/body (string minOccurs=1 maxOccurs=1) field contains the contents of the body. The /myInbox/draft/draftContent/htmlBody/inlineAttachment (minOccurs=0 maxOccurs=unbounded) element represents an inline attachment.

The /myInbox/draft/draftContent/htmlBody/inlineAttachment/uri (string minOccurs=1 maxOccurs=1) field contains the client-defined unique identifier for the inline attachment. This element is used to identify this attachment location within the html body of a message.

The /myInbox/draft/draftContent/htmlBody/inlineAttachment/contentType (string minOccurs=1 maxOccurs=1) field contains the Content-Type of the attachment. The /myInbox/draft/draftContent/htmlBody/inlineAttachment/content (base64Binary minOccurs=1 maxOccurs=1) field contains the base64 encoded attachment content. The /myInbox/draft/ draftContent/attachment (minOccurs=0 maxOccurs=unbounded) element represents a mail attachment.

The /myInbox/draft/draftContent/attachment/name (string minOccurs=1 maxOccurs=1) field contains the client defined name of the attachment. The /myInbox/draft/draftContent/attachment/ord (unsignedLong minOccurs=1 maxOccurs=1) specifies the unique order that this attachment should appear relative to all other attachments. The /myInbox/draft/draftContent/attachment/contentType (string minOccurs=1 maxOccurs=1) provides he Content-Type of the attachment.

The /myInbox/draft/draftContent/attachment/content (base64Binary minOccurs=1 maxOccurs=1) comprises the base64 encoded attachment content. The /myInbox/draft/draftContent/draftPart (minOccurs=1 maxOccurs=unbounded) element and its children define the message structure (including the mime body).

The /myInbox/draft/draftContent/draftPart/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/draft/draftContent/draftPart/parentPart (minOccurs=1 maxOccurs=1) element points to the parent part of this part. The /myInbox/draft/draftContent/draftPart/parentPart/@ref (minOccurs=0 maxOccurs=1) uuidType is used to specify a universally unique identifier (UUID).

The /myInbox/draft/draftContent/draftPart/order (unsignedLong minOccurs=1 maxOccurs=1) element defines the order of this part relative to its siblings. The /myInbox/draft/draftContent/draftPart/contentType (string minOccurs=1 maxOccurs=1) element defines the contentType of the part, (e.g., message/rfc or text/plain.a).

The /myInbox/draft/draftContent/draftPart/size (unsignedLong minOccurs=1 maxOccurs=1) field contains the size in bytes of the message part (including mime headers). The /myInbox/draft/draftContent/draftPart/contentDisposition (string minOccurs=0 maxOccurs=1) field contains the element defines the content-disposition of the part ex: attachment; filename="txt1.txt". The /myInbox/draft/draftContent/draftPart/contentId (string minOccurs=0 maxOccurs=1) element defines the content-id of the part. The /myInbox/draft/draftContent/draftPart/contentLocation (string minOccurs=0 maxOccurs=1) element defines the content-location of the part.

The /myInbox/draft/draftContent/draftPart/contentTransferEncoding (string minOccurs=0 maxOccurs=1) element defines the content-transfer-encoding of this part. The /myInbox/draft/draftContent/draftPart/part Content (base64Binary minOccurs=1 maxOccurs=1) elements contain the content of this message part. The /myInbox/draft/draftContent/draftPart/{any} (minOccurs=0 maxOccurs=unbounded) field allows for extensibility.

The /myInbox/draft/draftContent/preview (string minOccurs=0 maxOccurs=1) field contains the first 256 characters of the message body. This element is only returned if the query option 'includePreview' is specified. The /myInbox/draft/draftContent/preview/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/draft/draftContent/preview/@dir (string minOccurs=0 maxOccurs=1) optional attribute specifies the default layout direction for the localized string. Valid values are rtl (right to left) and ltr (left to right).

The /myInbox/draft/draftContent/single2822Header (string minOccurs=0 maxOccurs=unbounded) field contains the rfc2822 headers not included in the base schema (e.g., x-apparently-to). This element is returned by passing the 'includeSingle2822Headers' element in query options.

The /myInbox/draft/draftContent/raw2822Content (base64Binary minOccurs=0 maxOccurs=1) field contains the raw 2822 message (including headers and body) This element is returned by passing the includeRaw2822Contentelement in query options. The /myInbox/draft/draftContent/raw2822Headers (base64Binary minOccurs=0 maxOccurs=1) field contains the raw rfc2822 headers not included in the base schema (e.g., x-apparently-to). This element is returned by passing the 'includeRaw2822Headers' element in query options. The /myInbox/draft/draftContent/{any} (minOccurs=0 maxOccurs=unbounded) and the /myInbox/draft/{any} (minOccurs=0 maxOccurs=unbounded) fields allow for extensibility.

The /myInbox/rule (minOccurs=0 maxOccurs=unbounded) field contains rules that specify actions that should be performed on the active message during sending or delivery. For example, certain messages may be moved to a particular folder via a rule, while out-of-office is also implemented via rule. The /myInbox/rule/@sequence (unsignedLong minOccurs=1 maxOccurs=1) required attribute specifies the order in which this action should be performed, relative to other actions for this rule.

Most email applications allow for rules, however rules expressed by one email application normally cannot be consumed by another application, forcing each client to invent a new storage mechanism. In .NET Inbox there is a single schema for how a rule is stored. For example, the sample schema table below would move new messages with the importance set to high to the Important mail folder:

```
<myInbox>
  <folder id="123">
    <name xml:lang="en">Important</name>
  </folder>
  <rule>
    <name xml:lang="en">Move high priority email to Important
    folder</name>
    <enabled>True</enabled>
    <runat>server</runat>
    <condition
      select="./importance = 'high'">
    </condition>
    <action>
      <moveMessage>
        <targetFolder ref="123"/>
      </moveMessage>
    </action>
  </rule>
</myInbox>
```

Expressing this rule structure in XML allows all clients to know what the rules are and which are run by the server and which by the client.

The /myInbox/rule/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myInbox/rule/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myInbox/rule/@creator (minOccurs=1 maxOccurs=1) attribute identifies the creator in terms of userId, appId, and platformId of the node. The /myInbox/rule/name (string minOccurs=1 maxOccurs=1) field contains the application-defined, human readable identifier of the rule. The /myInbox/rule/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/name/@dir (string minOccurs=0 maxOccurs=1) optional attribute specifies the default layout direction for the localized string. Valid values are rtl (right to left) and ltr (left to right).

The /myInbox/rule/state (string minOccurs=1 maxOccurs=1) field indicates whether the rule represented by this node is currently enabled. The /myInbox/rule/runat (string minOccurs=1 maxOccurs=1) required attribute specifies where the rule must run. For example, rules may be run at a server, wherein the value is 'server', or may be run at a client.

The /myInbox/rule/runwhen (string minOccurs=1 maxOccurs=1) required attribute specifies when the rule must run. Allowable values include 'sending' and 'receiving'.

The /myInbox/rule/type (string minOccurs=1 maxOccurs=1) field specifies if this is of type 'oof' or 'normal'.

The /myInbox/rule/provider (string minOccurs=1 maxOccurs=1) field contains the application-defined provider of the rule. This is provided so that multiple applications can (if they so desire) only alter their own rules. The /myInbox/rule/provider/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/provider/@dir (string minOccurs=0 maxOccurs=1) optional attribute specifies the default layout direction for the localized string. Valid values are rtl (right to left) and ltr (left to right).

The /myInbox/rule/condition (minOccurs=1 maxOccurs=1) element's select attribute specifies the xpath expression used to evaluate if this rule applies to the active message. The /myInbox/rule/condition/@select (string minOccurs=1 maxOccurs=1) attribute specifies an xpath expression used to determine if this rule applies to the active message. Because rules only apply to messages, this statement must be scoped to the message element. Valid examples include "/importance='high'"; "/from/email='someone@microsoft.com' and contains (./subject/full, 'hello')". Examples of invalid statements include "/myInbox/message[./importance='high']"; "/myInbox/folder"; "/myInbox/rule".

The /myInbox/rule/action (minOccurs=1 maxOccurs=unbounded) field specifies an individual action to perform if the select element matches minOccurs-maxOccurs messages. The /myInbox/rule/action/@sequence (unsignedLong minOccurs=1 maxOccurs=1) required attribute specifies the order that this action should be performed in relative to all other actions for this rule. The /myInbox/rule/action/copyMessage (minOccurs=0 maxOccurs=1) action is used to copy the active message in rules processing to another folder specified by the 'targetFolder' element.

The /myInbox/rule/action/copyMessage/targetFolder (minOccurs=1 maxOccurs=1) element specifies the folder to save the message to. If omitted, the message is saved in the drafts folder. The /myInbox/rule/action/copyMessage/targetFolder/@select (string minOccurs=1 maxOccurs=1) field contains the location of the folder to which save the message. For example, The /myInbox/folder[@id=" "].

The /myInbox/rule/action/moveMessage (minOccurs=0 maxOccurs=1) field is used in rule actions to indicate that the active message should be moved to the targetFolder. The /myInbox/rule/action/moveMessage/targetFolder (minOccurs=1 maxOccurs=1) element specifies the folder to save the message to. If omitted, the message is saved in the drafts folder.

The /myInbox/rule/action/moveMessage/targetFolder/@select (string minOccurs=1 maxOccurs=1) field contains the location of the folder to which save the message. For example, The /myInbox/folder[@id=" "].

The /myInbox/rule/action/deleteMessage (minOccurs=0 maxOccurs=1) field is used in rule actions to indicate that the active message should be deleted. The /myInbox/rule/action/assignCategory (minOccurs=0 maxOccurs=1) field is used in rule actions to indicate that the active message should have the included cat element added to it.

The /myInbox/rule/action/assignCategory/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /myInbox/rule/action/assignCategory/cat/@ref (anyURI minOccurs=1 maxOccurs=1) attribute references a category definition (catDef) element using the rules outlined in the .NET Categories section (myCategories) described above.

The /myInbox/rule/action/forwardMessage (minOccurs=0 maxOccurs=1) field is used in rule actions to indicate that the active message should be forwarded to the included recipients. The /myInbox/rule/action/forwardMessage/recipient (minOccurs=0 maxOccurs=unbounded) field specifies an e-mail address and display name, or the PUID that represents them.

The /myInbox/rule/action/forwardMessage/recipient/@type (string minOccurs=1 maxOccurs=1) field specifies whether the recipient is in the 'to', 'cc' or 'bcc' list.

The /myInbox/rule/action/forwardMessage/recipient/name (string minOccurs=1 maxOccurs=1) field contains the display name of an e-mail address. The /myInbox/rule/action/forwardMessage/recipient/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/forwardMessage/recipient/name/@dir (string minOccurs=0 maxOccurs=1) optional attribute specifies the default layout direction for the localized string. Valid values are rtl (right to left) and ltr (left to right). The /myInbox/rule/action/forwardMessage/recipient/email (string minOccurs=1 maxOccurs=1) field contains an e-mail address (for example, someone@microsoft.com).

The /myInbox/rule/action/forwardAsAttachment (minOccurs=0 maxOccurs=1) field is used in rule actions to indicate that the active message should be forwarded to the included recipients as an attachment. The /myInbox/rule/action/forwardAsAttachment/recipient (minOccurs=0 maxOccurs=unbounded) field specifies an e-mail address and display name, or the PUID that represents them. The /myInbox/rule/action/forwardAsAttachment/recipient/@type (string minOccurs=1 maxOccurs=1) field specifies whether the recipient is in the 'to', 'cc' or 'bcc' list.

The /myInbox/rule/action/forwardAsAttachment/recipient/name (string minOccurs=1 maxOccurs=1) field contains the display name of an e-mail address. The /myInbox/rule/action/forwardAsAttachment/recipient/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/forwardAsAttachment/recipient/name/@dir (string minOccurs=0 maxOccurs=1) optional attribute specifies the default layout direction for the localized string. Valid values are rtl (right to left) and ltr (left to right).

The /myInbox/rule/action/forwardAsAttachment/recipient/email (string minOccurs=1 maxOccurs=1) field contains an e-mail address (for example, someone@microsoft.com).

The /myInbox/rule/action/serverReply (minOccurs=0 maxOccurs=1) field, if present, includes the /myInbox/rule/action/serverReply/subject (minOccurs=1 maxOccurs=1) field which contains the subject of the message from the server. The /myInbox/rule/action/serverReply/subject/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/serverReply/subject/@dir (string minOccurs=0 maxOccurs=1) optional attribute specifies the default layout direction for the localized string. Valid values are rtl (right to left), and ltr (left to right).

The /myInbox/rule/action/serverReply/subject/prefix (string minOccurs=1 maxOccurs=1) field contains the prefix of a message subject (e.g., 'FW:'). The /myInbox/rule/action/serverReply/subject/text (string minOccurs=1 maxOccurs=1) field contains the subject of a message, minus the prefix (e.g., 'hello there').

The /myInbox/rule/action/serverReply/simpleBody (string minOccurs=1 maxOccurs=1) field contains a plain text simple body that should be sent from the server. The /myInbox/rule/action/serverReply/simpleBody/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/serverReply/simpleBody/@dir (string minOccurs=0 maxOccurs=1) optional attribute specifies the default layout direction for the localized string. Valid values are rtl (right to left) and ltr (left to right).

The /myInbox/rule/action/redirectMessage (minOccurs=0 maxOccurs=1) field is used in rule actions to indicate that the active message should be redirected to the included recipient. The /myInbox/rule/action/redirectMessage/recipient (minOccurs=0 maxOccurs=unbounded) field specifies an e-mail address and display name, or the PUID that represents them. The /myInbox/rule/action/redirectMessage/recipient/@type (string minOccurs=1 maxOccurs=1) specifies whether the recipient is in the 'to', 'cc' or 'bcc' list.

The /myInbox/rule/action/redirectMessage/recipient/name (string minOccurs=1 maxOccurs=1) field contains the display name of an e-mail address. The /myInbox/rule/action/redirectMessage/recipient/name/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/redirectMessage/recipient/name/@dir (string minOccurs=0 maxOccurs=1) optional attribute specifies the default layout direction for the localized string. Valid values are rtl (right to left) and ltr (left to right).

The /myInbox/rule/action/redirectMessage/recipient/email (string minOccurs=1 maxOccurs=1) field contains an e-mail address (for example, someone@microsoft.com).

The /myInbox/rule/action/flagMessage (minOccurs=0 maxOccurs=1) field is used in rule actions to indicate that the active message should have the included flag added to it. The /myInbox/rule/action/flagMessage/flag (minOccurs=1 maxOccurs=1) optional element defines the flag state of the message. It includes an {any} element that can be used for extensible flags.

The /myInbox/rule/action/flagMessage/flag/state (string minOccurs=1 maxOccurs=1) field contains the state of a message flag. The /myInbox/rule/action/flagMessage/flag/title (string minOccurs=1 maxOccurs=1) field contains the client-defined text of the flag. The myInbox/rule/action/flagMessage/flag/title/@xml:lang (minOccurs=1 maxOccurs=1) required attribute is used to specify an ISO 639 language code or an ISO 3166 country code as described in RFC 1766. The value of this attribute indicates the language type of the content within this element. The /myInbox/rule/action/flagMessage/flag/title/@dir (string minOccurs=0 maxOccurs=1) optional attribute specifies the default layout direction for the localized string. Valid values are rtl (right to left) and ltr (left to right).

The /myInbox/rule/action/flagMessage/flag/reminderDate (dateTime minOccurs=0 maxOccurs=1) field contains the client-defined reminder date of the flag. The /myInbox/rule/action/flagMessage/flag/{any} (minOccurs=0 maxOccurs=unbounded) field allows for extensibility.

The /myInbox/rule/action/markAsRead (minOccurs=0 maxOccurs=1) field is used in rule actions to indicate that the active message should be marked as read. The /myInbox/rule/action/stopProcessingRulesOfFhisType (minOccurs=0 maxOccurs=1) is directed to stopping certain rules from processing, e.g., if a rule has already handled a received message, certain other rules should not process it.

The /myInbox/rule/{any} (minOccurs=0 maxOccurs=unbounded) field allows for extensibility.

The subscription elements and attributes are common to other services, and are described above.

myInbox/Domain Specific Methods

The .NET Inbox service has seven domain-specific messages, including a myInbox /sendMessage method, which sends a plain-text or fully MIME-encoded message from the user's account. If the optional, "saveSentMessage" is included, a copy of the sent message will be saved in the Sent Messages folder and the responseBody will include a header element with the new system-defined ID attribute.

Another method is a myInbox/sendMessageRequest, which is accessed using a request message. In response, this method may generate a response message or a SOAP Fault message. The following sample document fragments generally set forth the structure and meaning of the elements and attributes in the request and response messages.

The following section describes the request message for this method:

```
<m:sendMessageRequest
    xmlns:m="http://schemas.microsoft.com/hs/2001/10/myInbox"
    xmlns:hs="http://schemas.microsoft.com/hs/2001/10/core">_{1..1}
    <m:draftMessage select="...">_{0..1}
        <m:saveInFolder ref="...">_{0..1}</m:saveInFolder>
    </m:draftMessage>
    <m:rawMessage>_{0..1}
        <m:messageStatus>_{0..1}
            <m:saveInFolder ref="...">_{0..1}</m:saveInFolder>
            <m:flag>_{0..1}
                <m:state>_{1..1}</m:state>
                <m:title xml:lang="..." dir="...">_{1..1}</m:title>
                <m:reminderDate>_{0..1}</m:reminderDate>
                {any}
            </m:flag>
            {any}
        </m:messageStatus>
        <m:messageContent>_{0..1}
            <m:cat ref="...">_{0..unbounded}</m:cat>
            <m:raw2822Content>_{1..1}</m:raw2822Content>
            {any}
        </m:messageContent>
    </m:rawMessage>
</m:sendMessageRequest>
```

The /sendMessageRequest (minOccurs=1 maxOccurs=1) method is used to send a message from myInbox. It takes a pointer to a draft message to send, or a raw message that represents a full RFC2822/Mime message. This method is accessed using a request message, and in response may generate a domain-specific response message, or may generate a SOAP fault message. The types used in these messages are fully specified in the service's schema document referenced above.

The sendMessageRequest/draftMessage (minOccurs=0 maxOccurs=1) element is used to identify an existing draft to send. The /sendMessageRequest/draftMessage/@select (string minOccurs=1 maxOccurs=1) item specifies an XPath expression that selects a set of nodes relative to the externally established context. The expression can never travel outside the node-set established by this externally established current context. The expression can match zero or more nodes, and the operation manipulates all selected nodes. The minOccurs and maxOccurs attributes are optional and place restrictions and limitations on the number of nodes selected.

The /sendMessageRequest/draftMessage/saveInFolder (minOccurs=0 maxOccurs=1) element defines the folder in which a copy of this message should be saved. The /sendMessageRequest/draftMessage/saveInFolder/@ref (minOccurs=0 maxOccurs=1) uuidType is used to specify a universally unique identifier (UUID).

The /sendMessageRequest/rawMessage (minOccurs=0 maxOccurs=1) element is used to specify a raw message to send.

The /sendMessageRequest/rawMessage/messageStatus (minOccurs=0 maxOccurs=1) includes a The /sendMessageRequest/rawMessage/messageStatus/saveInFolder (minOccurs=0 maxOccurs=1) element that defines the folder in which a copy of this message should be saved.

The /sendMessageRequest/rawMessage/messageStatus/saveInFolder/@ref (minOccurs=0 maxOccurs=1) uuidType is used to specify a universally unique identifier (UUID).

The /sendMessageRequest/rawMessage/messageStatus/flag (minOccurs=0 maxOccurs=1) optional element defines the flag state of the message. It includes an {any} element that can be used for extensible flags. The /sendMessageRequest/rawMessage/messageStatus/flag/state (string minOccurs=1 maxOccurs=1) field contains the state of a message flag. The /sendMessageRequest/rawMessage/messageStatus/flag/title (string minOccurs=1 maxOccurs=1) field contains the client defined text of the flag. The /sendMessageRequest/rawMessage/messageStatus/flag/title/@xml:lang (minOccurs=1 maxOccurs=1) required attribute is used to specify an ISO 639 language code or an ISO 3166 country code as described in RFC 1766. The value of this attribute indicates the language type of the content within this element. The /sendMessageRequest/rawMessage/messageStatus/flag/title/@dir (string minOccurs=0 maxOccurs=1) optional attribute specifies the default layout direction for the localized string. Valid values are rtl (right to left) and ltr (left to right).

The /sendMessageRequest/rawMessage/messageStatus/flag/reminderDate (dateTime minOccurs=0 maxOccurs=1) field contains the client-defined reminder date of the flag.

The /sendMessageRequest/rawMessage/messageStatus/flag/{any} (minOccurs=0 maxOccurs=unbounded), if present, includes the /sendMessageRequest/rawMessage/messageStatus/{any} (minOccurs=0 maxOccurs=unbounded) field, for extensibility. The /sendMessageRequest/rawMessage/messageContent (minOccurs=0 maxOccurs=1) field represents a complete RFC2822/MIME message. The /sendMessageRequest/rawMessage/messageContent/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /sendMessageRequest/rawMessage/messageContent/cat/@ref (anyURI minOccurs=1 maxOccurs=1) attribute references a category definition (catDef) element using the rules outlined in the .NET Categories section, above.

The /sendMessageRequest/rawMessage/messageContent/raw2822Content (base64Binary minOccurs=1 maxOccurs=1) field contains the complete RFC2822/MIME content. The /sendMessageRequest/rawMessage/messageContent/{any} (minOccurs=0 maxOccurs=unbounded) field provides for extensibility.

Upon successful completion of a message request, a response message is generated by the sendMessageResponse method. The format of the response message is described in the following table:

```
<m:sendMessageResponse selectedNodeCount="..." status="..."
    xmlns:m="http://schemas.microsoft.com/hs/2001/10/myInbox"
    xmlns:hs="http://schemas.microsoft.com/hs/2001/10/core">_{1..1}
    <m:newBlueId id="...">_{1..1}</m:newBlueId>
</m:sendMessageResponse>
```

The /sendMessageResponse (minOccurs=1 maxOccurs=1) response is used to indicate the success of the operation as well as the new id associated with any messages that were saved as a result of this method. The /sendMessageResponse/@selectedNodeCount (int minOccurs=0 maxOccurs=1) attribute is used to return the number of selected nodes, selected by the corresponding data language operation.

The /sendMessageResponse/@status (string minOccurs=1 maxOccurs=1) attribute indicates the status of the method. If the status is success, the corresponding method was completed successfully. If the status is failure, the corresponding method was not completed successfully. If the status is rollback, the method failed, but was rolled back to its pre-update- Block status. If the status is notAttempted, the corresponding method was not attempted. This occurs when a previous operation failed.

The /sendMessageResponse/newBlueId (minOccurs=1 maxOccurs=1) field contains the new identifier of the message that was saved in myInbox. The /sendMessageResponse/newBlueId/@id (minOccurs=1 maxOccurs=1) attribute specifies the ID of the deleted item.

If the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

The myInbox/saveMessage allows a client to add either a complete rfc822 local message to .NET Inbox or to save a draft message.

The myInbox/saveMessageRequest method is accessed using a request message, and in response may generate a response message or a SOAP Fault message. The following sample document fragments and description below illustrate the structure and meaning of the elements and attributes in the request and response messages:

```
<m:saveMessageRequest
    xmlns:m="http://schemas.microsoft.com/hs/2001/10/myInbox"
    xmlns:hs="http://schemas.microsoft.com/hs/2001/10/core">1..1
  <m:completeLocalMessage>0..1
    <m:messageStatus>0..1
      <m:isRead>1..1</m:isRead>
      <m:folder ref="...">1..1</m:folder>
      <m:flag>0..1
        <m:state>1..1</m:state>
        <m:title xml:lang="..." dir="...">1..1</m:title>
        <m:reminderDate>0..1</m:reminderDate>
        {any}
      </m:flag>
      <m:state>1..1</m:state>
      {any}
    </m:messageStatus>
    <m:messageContent>0..1
      <m:cat ref="...">0..unbounded</m:cat>
      <m:raw2822Content>1..1</m:raw2822Content>
      {any}
    </m:messageContent>
  </m:completeLocalMessage>
</m:saveMessageRequest>
```

The /saveMessageRequest (minOccurs=1 maxOccurs=1) method is used to save a local message (for example in a PST file) into myInbox. This method is accessed using a request message, and in response may generate a domain-specific response message, or may generate a SOAP fault message. The types used in these messages are fully specified in the services base schema document referenced above.

The /saveMessageRequest/completeLocalMessage (minOccurs=0 maxOccurs=1) element represents a complete local message to add to myInbox. The /saveMessageRequest/completeLocalMessage/messageStatus (minOccurs=0 maxOccurs=1), if present, includes the /saveMessageRequest/completeLocalMessage/messageStatus/isRead (boolean minOccurs=1 maxOccurs=1) element, which defines the read/unread state of the message and can be modified.

The /saveMessageRequest/completeLocalMessage/messageStatus/folder (minOccurs=1 maxOccurs=1) element defines the single folder that this message logically belongs to. The /saveMessageRequest/completeLocalMessage/messageStatus/folder/@ref (minOccurs=0 maxOccurs=1) uuidType is used to specify a universally unique identifier (UUID). The /saveMessageRequest/completeLocalMessage/messageStatus/flag (minOccurs=0 maxOccurs=1) optional element defines the flag state of the message. It includes an {any} element that can be used for extensible flags.

The /saveMessageRequest/completeLocalMessage/messageStatus/flag/state (string minOccurs=1 maxOccurs=1) field contains the state of a message flag. The /saveMessageRequest/completeLocalMessage/messageStatus/flag/title (string minOccurs=1 maxOccurs=1) field contains the client-defined text of the flag. The /saveMessageRequest/completeLocalMessage/messageStatus/flag/title/@xml:lang (minOccurs=1 maxOccurs=1) required attribute is used to specify an ISO 639 language code or an ISO 3166 country code as described in RFC 1766. The value of this attribute indicates the language type of the content within this element. The /saveMessageRequest/completeLocalMessage/messageStatus/flag/title/@dir (string minOccurs=0 maxOccurs=1) optional attribute specifies the default layout direction for the localized string. Valid values are rtl (right to left) and ltr (left to right). The /saveMessageRequest/completeLocalMessage/messageStatus/flag/reminderDate (dateTime minOccurs=0 maxOccurs=1) field contains the client-defined reminder date of the flag. The /saveMessageRequest/completeLocalMessage/messageStatus/flag/{any} (minOccurs=0 maxOccurs=unbounded) field provides extensibility, as described above.

The /saveMessageRequest/completeLocalMessage/messageStatus/state (string minOccurs=1 maxOccurs=1) element defines the sent/received state of the message. The /saveMessageRequest/completeLocalMessage/messageStatus/{any} (minOccurs=0 maxOccurs=unbounded) field provides for extensibility.

The /saveMessageRequest/completeLocalMessage/messageContent (minOccurs=0 maxOccurs=1) field represents a complete RFC2822/MIME message. The /saveMessageRequest/completeLocalMessage/messageContent/cat (minOccurs=0 maxOccurs=unbounded) element is used to categorize the element that contains it by referencing either a global category definition (in either the .NET Categories service system document or an external resource containing category definitions), or by referencing an identity-centered category definition in the content document of the .NET Categories service for a particular PUID.

The /saveMessageRequest/completeLocalMessage/messageContent/cat/@ref (anyURI minOccurs=1 maxOccurs=1) attribute references a category definition (catDef) element using the rules outlined in the .NET Categories (MyCategories) section, above. The /saveMessageRequest/completeLocalMessage/messageContent/raw2822Content (base64Binary minOccurs=1 maxOccurs=1) field contains the complete RFC2822/MIME content. The /saveMessageRequest/completeLocalMessage/messageContent/{any} (minOccurs=0 maxOccurs=unbounded) field provides for extensibility.

Upon successful completion of this method, a response message is generated. The format of the response message, myInbox/saveMessageResponse, is described next. To this end, the document fragment in the table below and the various meanings are described:

```
<m:saveMessageResponse selectedNodeCount="..." status="..."
    xmlns:m="http://schemas.microsoft.com/hs/2001/10/myInbox"
    xmlns:hs="http://schemas.microsoft.com/hs/2001/10/core">1..1
  <m:newBlueId id="...">1..1</m:newBlueId>
</m:saveMessageResponse>
```

The /saveMessageResponse (minOccurs=1 maxOccurs=1) response contains a newBlueId for each message that was successfully saved. The /saveMessageResponse/@selectedNodeCount (int minOccurs=0 maxOccurs=1) attribute is used to return the number of selected nodes, selected by the corresponding data language operation. The /saveMessageResponse/@status (string minOccurs=1 maxOccurs=1) attribute indicates the status of the method. If the status is success, the corresponding method was completed successfully. If the status is failure, the corresponding method was not completed successfully. If the status is rollback, the method failed, but was rolled back to its pre-updateBlock status. If the status is notAttempted, the corresponding method was not attempted. This occurs when a previous operation failed.

The /saveMessageResponse/newBlueId (minOccurs=1 maxOccurs=1) element represents the new or saved message. The /saveMessageResponse/newBlueId/@id (minOccurs=1 maxOccurs=1) attribute specifies the ID of the deleted item.

If the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

The myInbox/copyMessage method allows clients to copy one or more messages into a folder. The message data, (including attachments) is copied and new message headers are returned with unique header ID values.

The myInbox/copyMessageRequest method is accessed using a request message, and in response may generate a response message or a SOAP Fault message. The following sample document fragments and following description illustrate the structure and meaning of the elements and attributes in the request and response messages:

```
<m:copyMessageRequest useClientIds="..."
    xmlns:m="http://schemas.microsoft.com/hs/2001/10/myInbox"
    xmlns:hs="http://schemas.microsoft.com/hs/2001/10/core">1..1
    <m:message select="..." copyAsDraft="..."
    clientId="...">1..unbounded</m:message>
    <m:targetFolder ref="...">1..1</m:targetFolder>
</m:copyMessageRequest>
```

The /copyMessageRequest (minOccurs=1 maxOccurs=1) message allows clients to copy one or more messages to a folder. The message data (including attachments) is copied and new message messages are returned with unique message ID values. This element encapsulates the arguments to the copyMessage method. It contains a message element and a targetFolder element.

The /copyMessageRequest/@useClientIds (boolean minOccurs=0 maxOccurs=1) optional attribute, if present, specifies that each message element's id attribute will be used as the new id. The /copyMessageRequest/message (minOccurs=1 maxOccurs=unbounded) element contains a select statement that contains an XPATH expression indicating a message for which to copy the associated message.

The /copyMessageRequest/message/@select (string minOccurs=1 maxOccurs=1) field contains the location of the message (which is associated with the message) to copy, e.g., /myInbox/message[@id=" "].

The /copyMessageRequest/message/@copyAsDraft (boolean minOccurs=0 maxOccurs=1), if this value is present and set to true, causes the message to be copied as a draft into the target folder.

The /copyMessageRequest/message/@clientId (minOccurs=0 maxOccurs=1) attribute specifies that the server should use the value of this attribute as the id of the new message; useClientIds should be present on the copyRequest element and set to true The /copyMessageRequest/targetFolder (minOccurs=1 maxOccurs=1) field contains the id of an existing folder to copy the message(s) to.

The /copyMessageRequest/targetFolder/@ref (minOccurs=0 maxOccurs=1) uuidType is used to specify a universally unique identifier (UUID).

Upon successful completion of this method, a response message, myInbox/copyMessageResponse, is generated. The format of the response message is described next:

```
<m:copyMessageResponse selectedNodeCount="..." status="..."
    xmlns:m="http://schemas.microsoft.com/hs/2001/10/myInbox"
    xmlns:hs="http://schemas.microsoft.com/hs/2001/10/core">1..1
    <m:newBlueId id="...">1..1</m:newBlueId>
</m:copyMessageResponse>
```

The /copyMessageResponse (minOccurs=1 maxOccurs=1) response from copyMessage includes a newBlueId element for each successfully copied message. The /copyMessageResponse/@selectedNodeCount (int minOccurs=0 maxOccurs=1) attribute is used to return the number of selected nodes, selected by the corresponding data language operation.

The /copyMessageResponse/@status (string minOccurs=1 maxOccurs=1) attribute indicates the status of the method. If the status is success, the corresponding method was completed successfully. If the status is failure, the corresponding method was not completed successfully. If the status is rollback, the method failed, but was rolled back to its pre-updateBlock status. If the status is notAttempted, the corresponding method was not attempted. This occurs when a previous operation failed.

The /copyMessageResponse/newBlueId (minOccurs=1 maxOccurs=1) element is typically found in the body of an insertResponse, updateResponse, or replaceResponse to indicate that a new ID value was generated by the corresponding request operation. Applications, in response, need to walk through their changes in order, and apply the returned ID to any cached value of the node they just inserted. Only a new ID generation triggers this, so in the case of an ID-preserving replaceRequest, the root of the replacement never generates one of these, but an inner xdb:blue does.

The /copyMessageResponse/newBlueId/@id (minOccurs=1 maxOccurs=1) attribute specifies the ID of the deleted item.

If the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

myLocation

The .NET myLocation service is designed to provide a repository for location reports on the current location of the identity bound to the service. The service is not designed to provide realtime streamed location reporting. For this application, a location stream should be connected via the .NET Presence service.

myLocation/Roles

The myLocation service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myLocation roleTemplate rt0 role gives complete read/write access to the information within the content document of the service being protected through this roleTemplate. The following table illustrates the available methods and the scope in effect when accessing the myLocation service through that method while mapped to this roleTemplate:

TABLE

| myLocation roleTemplate rt0 | |
|---|---|
| method | scope/name |
| Query | allElements |
| Insert | allElements |
| Replace | allElements |
| Delete | allElements |
| Update | allElements |

The myLocation roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myLocation service through that method while mapped to this roleTemplate:

TABLE

| myLocation roleTemplate rt1 | |
|---|---|
| method | scope/name |
| Query | allElements |
| Insert | onlySelfElements |
| Replace | onlySelfElements |
| Delete | onlySelfElements |

The myLocation roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myLocation service through that method while mapped to this roleTemplate:

TABLE

| myLocation roleTemplate rt2 | |
|---|---|
| method | scope/name |
| Query | allElements |
| Insert | onlySelfSubscriptionElements |
| replace | onlySelfSubscriptionElements |
| Delete | onlySelfSubscriptionElements |

The myLocation roleTemplate rt3 role gives limited read access to information within the content document that is categorized as "public." The following table illustrates the available methods and the scope in effect when accessing the myLocation service through that method while mapped to this roleTemplate:

| myLocation roleTemplate rt3 | |
|---|---|
| method | scope/name |
| Query | onlyPublicElements |

The myLocation roleTemplate rt99 blocks access to the content document. Note that lack of a role in the roleList has the same effect as assigning someone to rt99.

myLocation/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myLocation service:

```
<m:myLocation changeNumber="..." instanceId="..."
  xmlns:m="http://schemas.microsoft.com/hs/2001/10/myLocation"
  xmlns:hs="http://schemas.microsoft.com/hs/2001/10/core">$_{1..1}$
  <m:location changeNumber="..." id="..." creator="...">$_{0..unbounded}$
    <m:cat ref="...">$_{0..unbounded}$</m:cat>
    <m:address>$_{1..1}$
      <hs:cat ref="...">$_{0..unbounded}$</hs:cat>
      <hs:officialAddressLine xml:lang="..."
        dir="...">$_{0..1}$</hs:officialAddressLine>
      <hs:internalAddressLine xml:lang="..."
        dir="...">$_{0..1}$</hs:internalAddressLine>
      <hs:primaryCity xml:lang="..." dir="...">$_{0..1}$</hs:primaryCity>
      <hs:secondaryCity xml:lang="..." dir="...">$_{0..1}$</hs:secondaryCity>
      <hs:subdivision xml:lang="..." dir="...">$_{0..1}$</hs:subdivision>
      <hs:postalCode>$_{0..1}$</hs:postalCode>
      <hs:countryCode>$_{0..1}$</hs:countryCode>
      <hs:latitude>$_{0..1}$</hs:latitude>
      <hs:longitude>$_{0..1}$</hs:longitude>
      <hs:elevation>$_{0..1}$</hs:elevation>
      <hs:velocity>$_{0..1}$
        <hs:speed>$_{0..1}$</hs:speed>
        <hs:direction>$_{0..1}$</hs:direction>
      </hs:velocity>
```

-continued

```
      <hs:confidence>₀..₁</hs:confidence>
      <hs:precision>₀..₁</hs:precision>
      {any}
   </m:address>
   <m:reportingDevice>₁..₁</m:reportingDevice>
   <m:lastUpdateTime>₁..₁</m:lastUpdateTime>
   <m:expiresAt>₀..₁</m:expiresAt>
   {any}
</m:location>
<m:subscription changeNumber="..." id=
"..." creator="...">₀..unbounded
   <hs:trigger select="..." mode="..."
   baseChangeNumber="...">₁..₁</hs:trigger>
   <hs:expiresAt>₀..₁</hs:expiresAt>
   <hs:context uri="...">₁..₁ {any}</hs:context>
   <hs:to>₁..₁</hs:to>
</m:subscription>
{any}
</m:myLocation>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myLocation (minOccurs=1 maxOccurs=1) element encapsulates the content document for the .NET Location service. The /myLocation/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myLocation/@instanceId (string minOccurs=0 maxOccurs=1) attribute is a unique identifier typically assigned to the root element of a service. It is a read-only element and assigned by the .NET My Services system when a user is provisioned for a particular service.

The /myLocation/location (minOccurs=0 maxOccurs=unbounded) node has a /myLocation/location/@changeNumber (minOccurs=0 maxOccurs=1) changeNumber attribute, designed to facilitate caching of the element and its descendants. This attribute is assigned to this element by the .NET My Services system. The attribute is read-only to applications. Attempts to write this attribute are silently ignored.

The /myLocation/location/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myLocation/location/@creator (string minOccurs=0 maxOccurs=1) attribute identifies the creator in terms of useRId, appId, and platformId of the node.

The /myLocation/location/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myLocation/location/cat/@ref (anyURI minOccurs=0 maxOccurs=1) attribute references a category definition (<catDef/>) element using the rules outlined in the myCategories section, described above.

The /myLocation/address/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element would be to enclose a street address, post office box address, private bag, or any other similar official address. Internal routing information like department name, suite number within a building, internal mailstop number, or similar properties should be placed within the internalAddressLine element. The /myLocation/address/officialAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/officialAddressLine/@dir (string minOccurs=0 maxOccurs=1) optional attribute specifies the default layout direction for the localized string. Valid values are rtl (right to left), and ltr (left to right).

The /myLocation/address/internalAddressLine (string minOccurs=0 maxOccurs=1) element contains internal routing information relative to the address specified by the officialAddressLine. Items like department name, suite number within a building, internal mailstop number, or similar properties should be placed within this element. The /myLocation/address/internalAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/internalAddressLine/@dir (string minOccurs=0 maxOccurs=1) optional attribute specifies the default layout direction for the localized string. Valid values are rtl (right to left), and ltr (left to right).

The /myLocation/address/primaryCity (string minOccurs=0 maxOccurs=1) element defines the primary city for this address. The /myLocation/address/primaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/primaryCity/@dir (string minOccurs=0 maxOccurs=1) optional attribute specifies the default layout direction for the localized string. Valid values are rtl (right to left), and ltr (left to right).

The /myLocation/address/secondaryCity (string minOccurs=0 maxOccurs=1) optional element defines the secondary city for this address. Example types for this element include city district, city wards, postal towns, and so on. The /myLocation/address/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/secondaryCity/@dir (string minOccurs=0 maxOccurs=1) optional attribute specifies the default layout direction for the localized string. Valid values are rtl (right to left), and ltr (left to right).

The /myLocation/address/subdivision (string minOccurs=0 maxOccurs=1) element contains the official subdivision name within the country or region for this address. In the United States, this element would contain the two letter abbreviation for the name of the state. This element is also commonly treated as the "first order admin subdivision" and will typically contain subdivision names referring to administrative division, Bundesstaat, canton, federal district, province, region, state or territory. The /myLocation/address/subdivision/@xml:lang (minOccurs=1 maxOccurs=1) required attribute is used to specify an ISO 639 language code or an ISO 3166 country code as described in RFC 1766. The value of this attribute indicates the language type of the content within this element. The /myLocation/address/subdivision/@dir (string minOccurs=0 maxOccurs=1) optional attribute specifies the default layout direction for the localized string. Valid values are rtl (right to left), and ltr (left to right).

The /myLocation/address/postalCode (string minOccurs=0 maxOccurs=1) element contains the official postal code for this address. The /myLocation/address/countryCode (string minOccurs=0 maxOccurs=1) element contains the 2 letter ISO-3166 id of the country, dependency, or functionally equivalent region for this address. The /myLocation/address/latitude (string minOccurs=0 maxOccurs=1) element specifies the latitude value for this address in units of decimal degrees. Geodetic datum WGS84 is required. The /myLocation/address/longitude (string minOccurs=0 maxOccurs=1) element specifies the longitude value for this address in units of decimal degrees. Geodetic datum WGS84 is required. The /myLocation/address/elevation (string minOccurs=0 maxOccurs=1) element specifies the elevation above sea level with respect to WGS84 geodetic datum. The units for this value is meters.

The /myLocation/address/velocity (minOccurs=0 maxOccurs=1) element specifies the last reported velocity associated with this address. Of course, for fixed addresses the velocity node would either not be present, or speed would be zero indication stationary position. The /myLocation/address/velocity/speed (string minOccurs=0 maxOccurs=1) element specifies the last known speed associated with this report in units of meters per second. The /myLocation/address/velocity/direction (string minOccurs=0 maxOccurs=1) element specifies the last known direction associated with this report in units of degrees decimal. The /myLocation/address/confidence (string minOccurs=0 maxOccurs=1) element specifies a percentage value that indicates the confidence value that this location is accurate within the specified precision. The /myLocation/address/precision (string minOccurs=0 maxOccurs=1) element specifies the precision in meters of this location. The value defines a spherical zone that the location falls within.

The /myLocation/location/address/{any} (minOccurs=0 maxOccurs=unbounded) allows for address-related extensibility.

The /myLocation/location/reportingDevice (anyURI minOccurs=1 maxOccurs=1) element contains the device name of the device supplying this location information. The name is encoded as a URI. One common format for this name is a uuid: scheme uri interpreted as a "Universal Device Number" as exposed by a Universal Plug and Play infrastructure.

The /myLocation/location/lastUpdateTime (dateTime minOccurs=1 maxOccurs=1) element specifies the last update time of this location report. The /myLocation/location/expiresAt (dateTime minOccurs=0 maxOccurs=1) optional element specifies the time after which this location report is considered expires. The system is free to delete expired elements on its own schedule.

The /myLocation/location/{any} (minOccurs=0 maxOccurs=unbounded) field allows for location-related extensibility.

The /myLocation/subscription (minOccurs=0 maxOccurs=unbounded) element defines a subscription node as described above in the subscription section.

myLists

The .NET Lists service is a general purpose service designed to manage simple lists with minimal structure for what a list is, and what an item is within a list. Like other .NET My Services, the .NET Lists service allows free-form, namespace qualified extensions to be added to a list, or an item within a list. This mechanism is useful to add semi-structured information to the service with a downside that the service is unable to schema-validate these extensions.

The .NET Lists service breaks down a list into two major components which are the list defined by the list element, and an item defined by the item element.

The list element is designed to contain the definition of a list and serves as an anchor location to which items that belong to that list may refer. Lists may also refer to lists. In any event, the linkage is designed to be a soft linkage so that list definitions may be defined within the confines of the .NET Lists service as well as external to the service. This linkage pattern is that same as the linkage pattern used between element categorization and category definitions as defined in the .NET Category section, above. With this linkage model, the service is able to support personal list definitions in the per-user content document, global list definitions in the shared system document, and external list definitions stored in other addressable resources. The .NET Lists service defines a number of pre-defined lists in the system document. An xpQuery of //sys:list from the .NET Lists service's system document will return these lists.

The item element is designed to represent something that belongs to one or more lists. An item may be categorized (personal, private, sports, and so on) using standard .NET My Services categorization techniques, must have a title, an optional full description, may contain external references via the URL namespace, may be associated or "assigned" to another user, and so on. As noted above, an item refers to a list element, and may in fact refer to multiple list elements. There are however no referential integrity checks made through these references because as will be seen, some will likely use the reference itself as an implicit definition of a list element and in some cases, that element may not exist or may be inaccessible.

An item associates itself with one or more lists by using the listRef element and specifying a relative or absolute URI in the listRef/@ref attribute. The URI is able to refer to a list element by name where the list element is physically stored in the system document of the .NET Lists service, the content document of the .NET Lists service and/or an arbitrary XML file located by URI containing list elements.

The listRef element refers to a list definition by absolute or relative URI. The linkage between the two is through the list/@idName attribute and the listRef/@ref attribute. The list/@idName attribute specifies the local id for the list definition, and the listRef/@ref attribute is the value of that reference.

The value of the listRef/@ref attribute may take the form:

system #name-of-list

The list definition being referenced is located in the system document of the .NET Lists service, and its list/@idName attribute is "name-of-list". For example, the list reference of <listRef ref="system#todo"/> is a reference to the list definition whose list/@idName value is "todo", and that this list definition is located in the system document of the .NET Lists service i.e. <list idName="todo"/>.

The value of the listRef/@ref attribute may also take the form:

content[?puid=puid-value] #name-of-list

The list definition being referenced is located in the content document of the .NET Lists service, and its list/@idName attribute is "name-of-list". The instance of the .NET Lists service (i.e., the puid of the service) is implied by the context of the reference. This may be made explicit by inserting ?puid=puid-value to the URI, and when this is done, it means the content document of the .NET Lists service whose puid is "puid-value" holds the list definition. For example, the list reference of <listRef ref="content#bellSqaureShopping"/> is a reference to the list definition whose list/@idName value is "bellSquareShopping", and that this list definition is located in the content document of the .NET Lists service for the current puid i.e. <list idName="bellSquareShopping"/>.

The value of the listRef/@ref attribute may also take the form:

any-uri#name-of-list

The category list being referenced is located in an external (to .NET My Services) resource. The "any-uri" portion of the reference refers to a resource containing the list element whose @idName attribute matches the "name-of-list". The mapping between the "any-uri" portion of the reference and an XML document containing the list elements is a function of the "any-uri". By convention, this uri is the name of an XML document containing those elements. The purpose of this reference form is to allow and support a free form set of extended list definitions that are global and available to all. For example, the list reference of <cat ref="http://schemas.xyz.com/im/lists.xml#imChatRoom"/> is a reference to the list definition whose list/@idName value is "imChatRoom", and that this category definition is located in an external resource located at "http://schemas.xyz.com/im/lists.xml". Note that it is expected that list definitions will exist in the appropriate locations, but there is no requirement or enforcement of this.

In any events, the mapping between a listRef reference, and the list definition is very simple:

1. Locate the document containing the list definition by taking the name prior to the "#".
2. If the document is "system", then the document containing the list definition is the system document of the .NET Lists service and is addressed using request/@service="myLists" and request/@document="system".
3. If the document is "content", then the document containing the list definition is the content document of the .NET Lists service and is addressed using request/@service="myLists" and request/@document="content". If the ?puid=puid-value argument is present, the request is further qualified by request/key/@puid="puid-value". Otherwise, this attribute contains the puid of the document containing the reference.
4. For any other document, the value is the uri of the XML document containing the list definition.
5. Locate the list idName which is the portion of the reference after the "#".
6. With the document in hand, the xpath expression //list[@idName='list-id'] selects the list definition.

Like several other .NET My Services, the .NET Lists service makes use of categorization in order to classify, and categorize, both lists and elements.

myLists/Roles

The myLists service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myLists roleTemplate rt0 role gives complete read/write access to the information within the content document of the service being protected through this roleTemplate. The following table illustrates the available methods and the scope in effect when accessing the myLists service through that method while mapped to this roleTemplate:

TABLE

| myLists roleTemplate rt0 | |
| --- | --- |
| method | scope/name |
| Query | allElements |
| Insert | allElements |
| Replace | allElements |
| Delete | allElements |
| Update | allElements |

The myLists roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myLists service through that method while mapped to this roleTemplate:

TABLE myLists roleTemplate rt1

| method | scope/name |
|---|---|
| Query | allElements |
| Insert | onlySelfElements |
| Replace | onlySelfElements |
| Delete | onlySelfElements |

The myLists roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myLists service through that method while mapped to this roleTemplate:

TABLE myLists roleTemplate rt2

| method | scope/name |
|---|---|
| Query | allElements |
| Insert | onlySelfSubscriptionElements |
| replace | onlySelfSubscriptionElements |
| Delete | onlySelfSubscriptionElements |

The myLists roleTemplate rt3 role gives limited read access to information within the content document that is categorized as "public." The following table illustrates the available methods and the scope in effect when accessing the myLists service through that method while mapped to this roleTemplate:

myLists roleTemplate rt3

| method | scope/name |
|---|---|
| Query | onlyPublicElements |

The myLists roleTemplate rt99 blocks access to the content document. Note that lack of a role in the roleList has the same effect as assigning someone to rt99.

myLists/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myLists service:

```
<m:myLists changeNumber="..." instanceId="..."
  xmlns:m="http://schemas.microsoft.com/hs/2001/10/myLists"
  xmlns:hs="http://schemas.microsoft.com/hs/2001/10/core">1..1
  <m:device changeNumber="..." id="..." creator="...">0..unbounded
    <m:cat ref="...">0..unbounded</m:cat>
    <m:deviceId>1..1</m:deviceId>
    <m:carrierId>1..1</m:carrierId>
    <m:name xml:lang="..." dir="...">1..1</m:name>
    <m:address>0..unbounded</m:address>
    {any}
```

-continued

```
  </m:device>
  <m:subscription changeNumber="..." id="..."
  creator="...">0..unbounded
    <hs:trigger select="..." mode="..."
      baseChangeNumber="...">1..1</hs:trigger>
    <hs:expiresAt>0..1</hs:expiresAt>
    <hs:context uri="...">1..1 {any}</hs:context>
    <hs:to>1..1</hs:to>
  </m:subscription>
  {any}
</m:myLists>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myLists (minOccurs=1 maxOccurs=1) element encapsulates the content document for the .NET Lists service. The /myLists/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myLists/@instanceId (string minOccurs=0 maxOccurs=1) attribute is a unique identifier typically assigned to the root element of a service. It is a read-only element and assigned by the .NET My Services system when a user is provisioned for a particular service.

The /myLists/list (minOccurs=0 maxOccurs=unbounded) element defines a list which includes categorization of the list, a localized name for the list, a brief description of the list, and any other application specific properties contained within the any block(s).

The /myLists/list/@idName (string minOccurs=0 maxOccurs=1) attribute specifies the name of the list that can be used in a list reference. Note that list references are coded as URIs in both absolute, and myLists relative forms. This attribute is the value of the fragment identifier from those URIs. For example, a listRef/@ref value of "system#todo" would map to a list element whose @idName attribute was todo, and that is located in the system document of the myLists service.

The /myLists/list/@changeNumber (minOccurs=0 maxOccurs=1) changenumber attribute is designed to facilitate caching of the element and its descendants. This attribute is assigned to this element by the .NET My Services system. The attribute is read-only to applications. Attempts to write this attribute are silently ignored.

The /myLists/list/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myLists/list/@creator (string minOccurs=0 maxOccurs=1) attribute identifies the creator in terms of userId, appId, and platformId of the node.

The /myLists/list/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myLists/list/cat/@ref (anyURI minOccurs=0 maxOccurs=1) attribute references a category definition (<catDef/>) element using the rules outlined in the myCategories section described above.

The /myLists/list/listRef (minOccurs=0 maxOccurs=unbounded) element specifies the lists that this item is considered contained within. Note that it is valid to have a free-form list item that is not considered to be in part of any list, which is why this element is not required (minOccurs=0).

The /myLists/list/listRef/@ref (anyURI minOccurs=0 maxOccurs=1) attribute contains the name of a list element encoded as a URI. The URI follows encoding rules similar to those used in cat/catDef linkage:

system#name-of-list

The list (definition) being referenced is located in the system document of the .NET Lists service, and its list/@idName attribute is "name-of-list". For example, the listRef of <listRef ref="system#todo"/> is a reference to the list definition whose list/@idName value is "todo", and that this list definition is located in the system document of the .NET Lists service i.e. <list name="todo"/>.

content[?puid=puid-value]#name-of-list

The list definition being referenced is located in the content document of the .NET Lists service, and its list/@idName attribute is "name-of-list". The instance of the .NET Lists service (i.e., the puid of the service) is implied by the context of the reference. This may be made explicit by inserting ?puid=puid-value to the URI, and when this is done, it means the content document of the .NET Lists service whose puid is "puid-value" holds the list definition. For example, the list reference of <listRef ref="content#bellSqareShopping"/> is a reference to the list definition whose list/@idName value is "bellSquareShopping", and that this list definition is located in the content document of the .NET List service for the current puid i.e. <list name="bellSquareShopping"/>.

any-uri#name-of-list

The list definition being referenced is located in an external (to .NET My Services) resource. The "any-uri" portion of the reference refers to a resource containing the list element whose @idName attribute matches the "name-of-list". The mapping between the "any-uri" portion of the reference and an XML document containing the list elements is a function of the "any-uri". By convention, this uri is the name of an XML document containing those elements. The purpose of this reference form is to allow and support a free form set of extended list definitions that are global and available to all. For example, the list reference of <listRef ref="http://schemas.xyz.com/im/globalLists.xml#xyzStuff"/> is a reference to the list definition whose list/@idName value is "xyzStuff", and that this list definition is located in an external resource located at "http://schemas.xyz.com/im/globalLists.xml". Note that it is expected that list definitions will exist in the appropriate locations, but there is no requirement or enforcement of this.

The /myLists/list/listRef/@order (int minOccurs=0 maxOccurs=1) attribute contains an optional numeric order for the containing item relative to this list. Since an item (or even a list) may logically be contained within multiple lists, the order of the item is attached to the list reference so that an item's order can vary based on the list that it is contained within.

The /myLists/list/title (string minOccurs=0 maxOccurs=unbounded) element specifies the title of the list. The /myLists/list/title/@xml:lang (minOccurs=1 maxOccurs=1) required attribute is used to specify an ISO 639 language code or an ISO 3166 country code as described in RFC 1766. The value of this attribute indicates the language type of the content within this element. The /myLists/list/title/@dir (string minOccurs=0 maxOccurs=1) optional attribute specifies the default layout direction for the localized string. Valid values are rtl (right to left), and ltr (left to right).

The /myLists/list/description (string minOccurs=0 maxOccurs=unbounded) element specifies a more detailed description of the list. The /myLists/list/description/@xml:lang (minOccurs=1 maxOccurs=1) required attribute is used to specify an ISO 639 language code or an ISO 3166 country code as described in RFC 1766. The value of this attribute indicates the language type of the content within this element. The /myLists/list/description/@dir (string minOccurs=0 maxOccurs=1) optional attribute specifies the base direction of directionally neutral text. Possible values include rtl (right to left), or ltr (left to right).

The /myLists/list/status (anyURI minOccurs=0 maxOccurs=1) contains a status value for a list the optional status of that list. This elements value is coded as a category reference and follows the same rules as found in the usage of cat/@ref. The value may reference a category in the myCategories system document, a private status value in the user's myCategories content document, or an external category definition. It is expected that pre-defined system category values in the "system#status" category will be used and this would mean that expected values for this element include system#notStarted, system#in Progress, system#completed, system#waiting and system#defered.

A node select of "//sys:catDef[hs:cat[@ref='system#status']]" will locate all definitions for system defined status values.

The /myLists/list/{any} (minOccurs=0 maxOccurs=unbounded) provides extensibility.

The /myLists/item (minOccurs=0 maxOccurs=unbounded) element defines a list item, something that is considered as part of a list. An item may be part of multiple lists by including multiple listRef elements. These listRef elements may refer to list elements in the content document, the system document, or to external resources containing list elements.

The /myLists/item/@changeNumber (minOccurs=0 maxOccurs=1) changenumber attribute is designed to facilitate caching of the element and its descendants. This attribute is assigned to this element by the .NET My Services system. The attribute is read-only to applications. Attempts to write this attribute are silently ignored.

The /myLists/item/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myLists/item/@creator (string minOccurs=0 maxOccurs=1) attribute identifies the creator in terms of userId, appId, and platformId of the node.

The /myLists/item/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myLists/item/cat/@ref (anyURI minOccurs=0 maxOccurs=1) attribute references a category definition (<catDef/>) element using the rules outlined in the myCategories section described above.

The /myLists/item/title (string minOccurs=0 maxOccurs=unbounded) element specifies the title of the list item. The /myLists/item/title/@xml:lang (minOccurs=1 maxOccurs=1) required attribute is used to specify an ISO 639 language code or an ISO 3166 country code as described in RFC 1766. The value of this attribute indicates the language type of the content within this element. The /myLists/item/title/@dir (string minOccurs=0 maxOccurs=1) optional attribute specifies the default layout direction for the localized string. Valid values are rtl (right to left), and ltr (left to right).

The /myLists/item/description (string minOccurs=0 maxOccurs=unbounded) element specifies a more detailed description of the list item. The /myLists/item/description/@xml:lang (minOccurs=1 maxOccurs=1) required attribute is used to specify an ISO 639 language code or an ISO 3166 country code as described in RFC 1766. The value of this attribute indicates the language type of the content within this element. The /myLists/item/description/@dir (string minOccurs=0 maxOccurs=1) optional attribute specifies the base direction of directionally neutral text. Possible values include rtl (right to left), or ltr (left to right).

The /myLists/item/url (anyURI minOccurs=0 maxOccurs=unbounded) optional element specifies a URL associated with this list item.

The /myLists/item/listRef (minOccurs=1 maxOccurs=unbounded) element specifies the lists that this item is considered contained within.

The /myLists/item/listRef/@ref (anyURI minOccurs=0 maxOccurs=1) attribute contains the name of a list element encoded as a URI. The URI follows encoding rules similar to those used in cat/catDef linkage:

system#name-of-list

The list (definition) being referenced is located in the system document of the .NET Lists service, and its list/@idName attribute is "name-of-list". For example, the listRef of <listRef ref="system#todo"/> is a reference to the list definition whose list/@idName value is "todo", and that this list definition is located in the system document of the .NET Lists service i.e. <list name="todo"/>.

content[?puid=puid-value]#name-of-list

The list definition being referenced is located in the content document of the .NET Lists service, and its list/@idName attribute is "name-of-list". The instance of the .NET Lists service (i.e., the puid of the service) is implied by the context of the reference. This may be made explicit by inserting ?puid=puid-value to the URI, and when this is done, it means the content document of the .NET Lists service whose puid is "puid-value" holds the list definition. For example, the list reference of <listRef ref="content#bellSqareShopping"/> is a reference to the list definition whose list/@idName value is "bellSquareShopping", and that this list definition is located in the content document of the .NET List service for the current puid i.e. <list name="bellSquareShopping"/>.

any-uri#name-of-list

The list definition being referenced is located in an external (to .NET My Services) resource. The "any-uri" portion of the reference refers to a resource containing the list element whose @idName attribute matches the "name-of-list". The mapping between the "any-uri" portion of the reference and an XML document containing the list elements is a function of the "any-uri". By convention, this uri is the name of an XML document containing those elements. The purpose of this reference form is to allow and support a free form set of extended list definitions that are global and available to all. For example, the list reference of <listRef ref="http://schemas.xyz.com/im/globalLists.xml#xyzStuff"/> is a reference to the list definition whose list/@idName value is "xyzStuff", and that this list definition is located in an external resource located at "http://schemas.xyz.com/im/globalLists.xml". Note that it is expected that list definitions will exist in the appropriate locations, but there is no requirement or enforcement of this.

The /myLists/item/listRef/@order (int minOccurs=0 maxOccurs=1) attribute contains an optional numeric order for the containing item relative to this list. Since an item (or even a list) may logically be contained within multiple lists, the order of the item is attached to the list reference so that an item's order can vary based on the list that it is contained within.

The /myLists/item/date (dateTime minOccurs=0 maxOccurs=unbounded) optional element specifies a categorized date/time for this item. A single optional category reference may be attached to the date. It is expected that system defined dates like "system#dueDate" will be used, but this is not meant to be limiting.

The /myLists/item/date/@ref (anyURI minOccurs=0 maxOccurs=1) optional attribute is a reference to an existing category for this date. For instance, a value of "system#dueDate" implies that this date is a due date.

The /myLists/item/status (anyURI minOccurs=0 maxOccurs=1) status value for an item indicates the optional status of that item. This element's value is coded as a category reference and follows the same rules as found in the usage of cat/@ref. The value may reference a category in the myCategories system document, a private status value in the user's myCategories content document, or an external category definition. It is expected that pre-defined system category values in the "system#status" category will be used and this would mean that expected values for this element include system#notStarted, system#in Progress, system#completed, system#waiting and system#defered.

A node select of "//sys:catDef[hs:cat[@ref='system#status']]" will locate all definitions for system defined status values.

The /myLists/item/priority (anyURI minOccurs=0 maxOccurs=1) contains a priority value for an item indicates the optional importance, or priority of that item. This elements value is coded as a category reference and follows the same rules as found in the usage of cat/@ref. The value may reference a category in the myCategories system document, a private priority value in the user's myCategories content document, or an external category definition. It is expected that pre-defined system category values in the "system#priority" category will be used and this would mean that expected values for this element include system#lowest, system#belowNormal, system#normal, system#aboveNormal and system#highest.

A node select of "//sys:catDef[hs:cat[@ref='system#priority']]" will locate all definitions for system defined priority values.

The /myLists/item/assignedTo (minOccurs=0 maxOccurs=unbounded) optional element may be repeated and specifies who the item is "assigned" to. It is most useful when sharing a list in myLists.

The /myLists/item/assignedTo/name (string minOccurs=0 maxOccurs=1) optional element specifies the name for the enclosing element. The /myLists/item/assignedTo/name/@xml:lang (minOccurs=1 maxOccurs=1) required attribute is used to specify an ISO 639 language code or an ISO 3166 country code as described in RFC 1766. The value of this attribute indicates the language type of the content within this element. The /myLists/item/assignedTo/name/@dir (string minOccurs=0 maxOccurs=1) optional attribute specifies the default layout direction for the localized string. Valid values are rtl (right to left), and ltr (left to right).

The /myLists/item/assignedTo/puid (string minOccurs=0 maxOccurs=1) optional element specifies the name for the enclosing element. The /myLists/item/assignedTo/email (string minOccurs=0 maxOccurs=1) optional name specifies an email address for the enclosing element. The /myLists/item/{any} (minOccurs=0 maxOccurs=unbounded) and /myLists/list/{any} (minOccurs=0 maxOccurs=unbounded) allows for extensibility of this schema.

The /myLists/subscription (minOccurs=0 maxOccurs=unbounded) element defines a subscription node as described above in the subscription section.

The following table illustrates the structure and contents of a simple "tripList" list. Note that changeNumbers, creator attributes, and other bookkeeping items are not included in this example for purposes of simplicity.

```
<myLists>
    <list idName="tripList" id="1">
        <title xml:lang="en" dir="ltr">SVC Trip, Todo List</title>
        <listRef idName="system#todo" order="1"/>
        <status>system#inProgress</status>
    </list>
    <item id="2">
        <title xml:lang="EN">Make Dental Appointment</title>
        <listRef idName="content#tripList" order="1"/>
        <status>system#notStarted</status>
    </item>
    <item id="3">
        <title xml:lang="EN">Pick up Suit</title>
        <listRef idName="content#tripList" order="2"/>
        <status>system#notStarted</status>
    </item>
    <item id="3">
        <title xml:lang="EN">Work on Resume</title>
        <listRef idName="content#tripList" order="1"/>
        <status>system#inProgress</status>
    </item>
</myLists>
```

With this information, a simple list display might present this list as:

| SVC Trip, Todo List | |
|---|---|
| Not Started | Make Dental Appointment |
| Not Started | Pick up Suit |
| In Progress | Work on Resume |

The following table illustrates the structure and contents of a simple "trip" list and a shopping list for things to purchase or pick up at the mall. Note that some elements appear in both lists. Further, note that changeNumbers, creator attributes and other bookkeeping items are not included in this example for simplicity.

```
<myLists>
    <list idName="tripList" id="1">
        <title xml:lang="en" dir="ltr">SVC Trip, Todo List</title>
        <listRef idName="system#todo" order="1"/>
        <status>system#inProgress</status>
    </list>
    <item id="2">
        <title xml:lang="EN">Make Dental Appointment</title>
        <listRef idName="content#tripList" order="1"/>
        <status>system#notStarted</status>
    </item>
    <item id="3">
        <title xml:lang="EN">Pick up Suit</title>
        <listRef idName="content#tripList" order="2"/>
        <listRef idName="system#shopping" order="1"/>
        <status>system#notStarted</status>
    </item>
    <item id="3">
        <title xml:lang="EN">Work on Resume</title>
        <listRef idName="content#tripList" order="1"/>
        <status>system#inProgress</status>
    </item>
    <item id="4">
        <title xml:lang="EN">Tennis Shoes</title>
        <listRef idName="system#shopping" order="3"/>
        <status>notStarted</status>
    </item>
    <item id="5">
        <title xml:lang="EN">Buy a CD</title>
        <listRef idName="system#shopping" order="2"/>
        <status>notStarted</status>
    </item>
</myLists>
```

With this information, a simple list display might present these lists as:

| SVC Trip, Todo List | |
|---|---|
| Not Started | Make Dental Appointment |
| Not Started | Pick up Suit |
| In Progress | Work on Resume |

| Shopping | |
|---|---|
| Not Started | Pick up Suit |
| Done | Buy a CD |
| Not Started | Tennis Shoes | myLists/System

TABLE myLists/system

```
<sys:system>
    :
    :   see common system
    :
    <sys:list idName="..." changeNumber="..."
    id="..." creator="...">0..unbounded
        <m:cat ref="...">0..unbounded</m:cat>
        <m:listRef ref="..." order="...">0..unbounded</m:listRef>
        <m:title xml:lang="..." dir="...">0..unbounded</m:title>
        <m:description xml:lang="..." dir="...">0..unbounded
```

TABLE-continued myLists/system

```
        </m:description>
        <m:status>_{0..1}</m:status>
        {any}
    </sys:list>
    {any}
</sys:system>
```

The /system/list (minOccurs=0 maxOccurs=unbounded) element defines a list which includes categorization of the list, a localized name for the list, a brief description of the list, and any other application specific properties contained within the any block(s). The /system/list/@idName (string minOccurs=0 maxOccurs=1) attribute specifies the name of the list that can be used in a list reference. Note that list references are coded as URIs in both absolute, and myLists relative forms. This attribute is the value of the fragment identifier from those URIs. For example, a listRef/@ref value of "system#todo" would map to a list element whose @idName attribute was todo, and that is located in the system document of the myLists service.

The /system/list/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/list/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/list/@creator (string minOccurs=0 maxOccurs=1) attribute identifies the creator in terms of userId, appId, and platformId of the node.

The /system/list/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /system/list/cat/@ref (anyURI minOccurs=0 maxOccurs=1) attribute references a category definition (<catDef/>) element using the rules outlined in the myCategories section above. The /system/list/listRef (minOccurs=0 maxOccurs=unbounded) element specifies the lists that this item is considered contained within. Note that it is valid to have a free-form list item that is not considered to be in part of any list which is why this element is minOccurs=0.

The /system/list/listRef/@ref (anyURI minOccurs=0 maxOccurs=1) attribute contains the name of a list element encoded as a URI. The URI follows encoding rules similar to those used in cat/catDef linkage:

system#name-of-list

The list (definition) being referenced is located in the system document of the .NET Lists service, and its list/@idName attribute is "name-of-list". For example, the listRef of <listRef ref="system#todo"/> is a reference to the list definition whose list/@idName value is "todo", and that this list definition is located in the system document of the .NET Lists service i.e. <list name="todo"/>.

content[?puid=puid-value]#name-of-list

The list definition being referenced is located in the content document of the .NET Lists service, and its list/@idName attribute is "name-of-list". The instance of the .NET Lists service (i.e., the puid of the service) is implied by the context of the reference. This may be made explicit by inserting ?puid=puid-value to the URI, and when this is done, it means the content document of the .NET Lists service whose puid is "puid-value" holds the list definition. For example, the list reference of <listRef ref="content#bellSqareShopping"/> is a reference to the list definition whose list/@idName value is "bellSquareShopping", and that this list definition is located in the content document of the .NET List service for the current puid i.e. <list name="bellSquareShopping"/>.

y-uri#name-of-list

The list definition being referenced is located in an external (to .NET My Services) resource. The "any-uri" portion of the reference refers to a resource containing the list element whose @idName attribute matches the "name-of-list". The mapping between the "any-uri" portion of the reference and an XML document containing the list elements is a function of the "any-uri". By convention, this uri is the name of an XML document containing those elements. The purpose of this reference form is to allow and support a free form set of extended list definitions that are global and available to all. For example, the list reference of <listRef ref="http://schemas.xyz.com/im/globalLists.xml#xyzStuff"/> is a reference to the list definition whose list/@idName value is "xyzStuff", and that this list definition is located in an external resource located at "http://schemas.xyz.com/im/globalLists.xml". Note that it is expected that list definitions will exist in the appropriate locations, but there is no requirement or enforcement of this.

The /system/list/listRef/@order (int minOccurs=0 maxOccurs=1) attribute contains an optional numeric order for the containing item relative to this list. Since an item (or even a list) may logically be contained within multiple lists, the order of the item is attached to the list reference so that an item's order can vary based on the list that it is contained within.

The /system/list/title (string minOccurs=0 maxOccurs=unbounded) element specifies the title of the list. The /system/list/title/@xml:lang (minOccurs=1 maxOccurs=1) required attribute is used to specify an ISO 639 language code or an ISO 3166 country code as described in RFC 1766. The value of this attribute indicates the language type of the content within this element. Te /system/list/title/@dir (string minOccurs=0 maxOccurs=1) optional attribute specifies the default layout direction for the localized string. Valid values are rtl (right to left), and ltr (left to right).

The /system/list/description (string minOccurs=0 maxOccurs=unbounded) element specifies a more detailed description of the list. The /system/list/description/@xml:lang (minOccurs=1 maxOccurs=1) required attribute is used to specify an ISO 639 language code or an ISO 3166 country code as described in RFC 1766. The value of this attribute indicates the language type of the content within this element. The /system/list/description/@dir (string minOccurs=0 maxOccurs=1) optional attribute specifies the base direction of directionally neutral text. Possible values include rtl (right to left), or ltr (left to right).

The /system/list/status (anyURI minOccurs=0 maxOccurs=1) contains a status value for a list the optional status of that list. This elements value is coded as a category reference and follows the same rules as found in the usage of cat/@ref. The value may reference a category in the myCategories system document, a private status value in the user's myCategories content document, or an external category definition. It is expected that pre-defined system category values in the "system#status" category will be used and this would mean that expected values for this element include, system#notStarted, system#in Progress, system#completed, system#waiting and system#defered.

A node select of "//sys:catDef[hs:cat[@ref='system#status']" will locate all definitions for system defined status values.

The /system/list/{any} (minOccurs=0 maxOccurs=unbounded) and /system/{any} (minOccurs=0 maxOccurs=unbounded) fields provide extensibility as discussed above.

myPresence

The .NET Presence service (myPresence) provides a generalized framework for clients to publish and subscribe to presence information about the endpoint of a specific user, wherein a client is any entity that can issue an XMI request to myPresence. The myPresence service also provides for a way of classifying the information in multiple contexts. Note that subscriptions (described above) may be made on endpoints, which will generate a notification whenever a change occurs that satisfies the query of the notification.

An endpoint has no strict semantics within .NET Presence. It is a typology for classifying different forms of presence information, but .NET Presence is not aware of the semantics of endpoints, so any restrictions and classifications are outside the scope of the service itself. Some of the potential types of endpoints include instant messaging presence services (e.g., MSN Messenger), device-oriented presence (mobile phones, pagers), physical location presence (GPS, directory, and so on), and integrated presence (obtained by joining other endpoints). Again, no semantics are exposed for any of these endpoints at the core level of .NET Presence.

The semantics of a given endpoint are exposed through one or more argots. An argot identifies a type of domain-specific schema through which the presence of an endpoint is represented. Since the presence semantics are entirely contained within argots, consumers of presence information can only understand presence information to the extent that they understand the argots in which that information is represented. In other words, argots are tagged blobs of information that applications know how to interpret, at least in part, so as to exchange presence-related data, (although a given application may not know anything about a particular argot and will simply not interpret that argot). Note that in an alternative implementation, argots may be implemented in tagged "any" fields of XML blobs.

In general, argots can be application-specific. With an application-specific argot, the argot's schema is understood by a limited set of applications, containing data that is only meaningful to those applications. Argots can instead be common, wherein the argot's schema is known by many applications. Common argots contain more generalized presence and communications data. An argot can also be integrated, wherein the argot's schema is common and expresses information about multiple endpoints.

Figure 6:
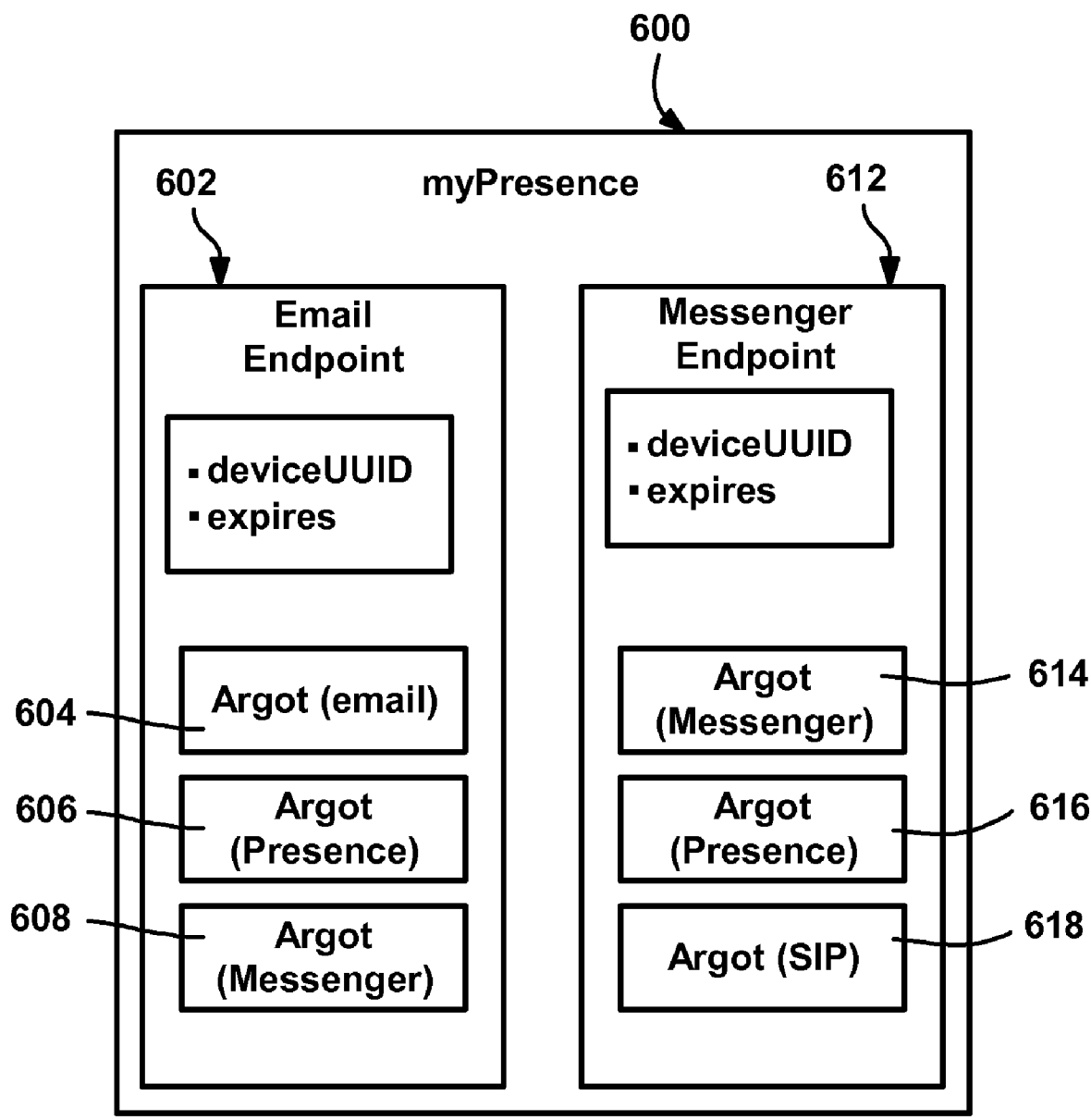
FIG. 6 is a block diagram generally representing presence information distributed among endpoints in accordance with one aspect of the present invention.

FIG. 6 generally represents a structure of an example myPresence schema 600. In FIG. 6, an Email application program endpoint 602 is expressing Email application program-specific data (e.g., which documents a user is working on) in an Email argot 604, while also publishing presence data in two other schemas, designated by the Presence argot 606 and the Messenger argot 608. The Messenger argot 608 expresses "Messenger presence" which is information that a Messenger application can consume, allowing Email application program to interoperate with the Messenger application program. The Presence argot 606 is a common argot, and allows a further level of compatibility, in that its schema may be public. Thus, any application that understands the Presence argot can understand that level of presence information in endpoints that publish that argot.

Likewise, a Messenger endpoint 612 is using a Messenger argot 614 and a common Presence argot 616, as well as expressing its data in a standardized (e.g., SIP) argot 618.

The myPresence service employs the above-described subscription schema to allow users of the schema to receive timely updates on changes to presence information. Users of the schema may subscribe to changes on it, and have updates delivered to them as the schema changes.

myPresence/Roles

The myPresence service controls access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myPresence roleTemplate rt0 role gives complete read/write access to the information within the content document of the service being protected through this roleTemplate. The following table illustrates the available methods and the scope in effect when accessing the myPresence service through that method while mapped to this roleTemplate:

TABLE

| myPresence roleTemplate rt0 | |
|---|---|
| method | scope/name |
| Query | allElements |
| Insert | allElements |
| Replace | allElements |
| Delete | allElements |
| Update | allElements |

The myPresence roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myPresence service through that method while mapped to this roleTemplate:

TABLE

| myPresence roleTemplate rt1 | |
| --- | --- |
| method | scope/name |
| Query | allElements |
| Insert | onlySelfElements |
| Replace | onlySelfElements |
| Delete | onlySelfElements |

The myPresence roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myPresence service through that method while mapped to this roleTemplate:

TABLE

| myPresence roleTemplate rt2 | |
| --- | --- |
| method | scope/name |
| Query | allElements |
| Insert | onlySelfSubscriptionElements |
| replace | onlySelfSubscriptionElements |
| Delete | onlySelfSubscriptionElements |

The myPresence roleTemplate rt3 role gives limited read access to information within the content document that is categorized as "public." The following table illustrates the available methods and the scope in effect when accessing the myPresence service through that method while mapped to this roleTemplate:

| myPresence roleTemplate rt3 | |
| --- | --- |
| method | scope/name |
| Query | onlyPublicElements |

The myPresence roleTemplate rt99 blocks access to the content document. Note that lack of a role in the roleList has the same effect as assigning someone to rt99.

myPresence/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myPresence service:

```
<m:myPresence changeNumber="..." instanceId="..."
   xmlns:m="http://schemas.microsoft.com/hs/2001/10/myPresence"
   xmlns:ma="http://schemas.microsoft.com/hs/2001/10/myAlerts"
   xmlns:hs="http://schemas.microsoft.com/hs/2001/10/core">1..1
   <m:endpoint name="..." changeNumber="..."
      id="..." creator="...">0..unbounded
      <m:deviceUuid>0..1</m:deviceUuid>
      <m:expiresAt>0..1</m:expiresAt>
      <m:argot argotURI="..." name="..."
         changeNumber="..." id="..." creator="...">0..unbounded
   {any}</m:argot>
   </m:endpoint>
   <m:subscription changeNumber="..." id="..."
   creator="...">0..unbounded
      <hs:trigger select="..." mode="..."
      baseChangeNumber="...">1..1</hs:trigger>
      <hs:expiresAt>0..1</hs:expiresAt>
      <hs:context uri="...">1..1 {any}</hs:context>
      <hs:to>1..1</hs:to>
   </m:subscription>
</m:myPresence>
```

The meaning of the attributes and elements shown in the table are set forth below, wherein in the syntax used in the table, boldface type corresponds to a blue node, and underlined type to a red node, as described above, and the minimum and maximum occurrence information (0, 1, unbounded) indicates whether an element or attribute is required or optional, and how many are possible.

The/myPresence (minOccurs=1 maxOccurs=1) element defines the basic myPresence types. The /myPresence/ @changeNumber (minOccurs=1 maxOccurs=1) change-Number attribute is designed to facilitate caching of the element and its descendants. This attribute is assigned to this element by the .NET My Services system. The attribute is read only to applications. Attempts to write this attribute are silently ignored.

The myPresence/@instanceId (string minOccurs=0 maxOccurs=1) attribute is a unique identifier typically assigned to the root element of a service. It is a read-only element and assigned by the .NET My Services system when a particular service is provisioned for a user. The /myPresence/endpoint (minOccurs=0 maxOccurs=unbounded) contains the collection of endpoints for this user's .NET Presence service.

The /myPresence/endpoint/@name (string minOccurs=1 maxOccurs=1) is directed to an endpoint name, and includes the /myPresence/endpoint/@changeNumber (minOccurs=1 maxOccurs=1) changeNumber attribute, which is designed to facilitate caching of the element and its descendants. This attribute is assigned to this element by the .NET My Services system. The attribute is read only to applications. Attempts to write this attribute are silently ignored.

The /myPresence/endpoint/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The /myPresence/endpoint/@creator (minOccurs=1 maxOccurs=1) attribute identifies the creator in terms of useIrd, appId, and platformId of the node. The /myPresence/ endpoint/deviceUuid (minOccurs=0 maxOccurs=1) uuid-Type is used to specify a universally unique identifier (UUID). (Note that the base type below is probably wrong and needs to be fixed to match a correct definition for a UUID.)

The /myPresence/endpoint/expiresAt (dateTime minOccurs=0 maxOccurs=1) is directed to when the presence information should expire. The /myPresence/endpoint/argot (minOccurs=0 maxOccurs=unbounded) provides a collection of argots for this endpoint.

The /myPresence/endpoint/argot/@argotURI (anyURI minOccurs=1 maxOccurs=1) URI points to a location containing the XSD for this argot. It also uniquely identifies the type of argot.

The /myPresence/endpoint/argot/@name (string minOccurs=1 maxOccurs=1) includes the /myPresence/endpoint/argot/@changeNumber (minOccurs=1 maxOccurs=1) changeNumber attribute is designed to facilitate caching of the element and its descendants. This attribute is assigned to this element by the .NET My Services system. The attribute is read only to applications. Attempts to write this attribute are silently ignored.

The /myPresence/endpoint/argot/@id (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored. The /myPresence/endpoint/argot/@creator (minOccurs=1 maxOccurs=1) attribute identifies the creator in terms of userId, appId, and platformId of the node.

The /myPresence/endpoint/argot/{any} (minOccurs=0 maxOccurs=unbounded) provides for extensibility. Note that argots in general may be described as XML blobs.

myPresence Domain-Specific Methods

In addition to the standard methods, which operate on this service using the same message format and method-interchange techniques described above, the myPresence service includes a myPresence/notifyEndpoint domain-specific method.

In general, the notifyEndpoint method sends a notification to a specified endpoint, via a myPresence/notifyEndpointRequest request message. In response, a response message or a SOAP Fault message may be generated. The following sample document outline in the table below and accompanying description illustrate the structure and meaning of the elements and attributes in the request and response messages:

```
<m:notifyEndpointRequest
   xmlns:m="http://schemas.microsoft.com/hs/2001/10/myPresence"
   xmlns:ma="http://schemas.microsoft.com/hs/2001/10/myAlerts"
   xmlns:hs="http://schemas.microsoft.com/hs/2001/10/core">1..1
   <m:endpointId>1..1</m:endpointId>
   <m:notification id="...">1..1
      <ma:from>1..1
         <ma:identityHeader type="...">0..1
            <ma:onBehalfOfUser>1..1</ma:onBehalfOfUser>
            <ma:licenseHolder>1..1</ma:licenseHolder>
            <ma:platformId>1..1</ma:platformId>
         </ma:identityHeader>
         <ma:expiresAt ttl="..." onDate="..."
            replace="...">0..1</ma:expiresAt>
         <ma:acknowledge>0..1</ma:acknowledge>
         <ma:category id="...">0..1</ma:category>
      </ma:from>
      <ma:to>0..1
```

-continued

```
         <ma:originalUser>0..1</ma:originalUser>
      </ma:to>
      <ma:contents>1..1 {any}</ma:contents>
      <ma:routing>1..1
         <ma:timestamp>0..1</ma:timestamp>
         <ma:hops>0..1</ma:hops>
      </ma:routing>
   </m:notification>
</m:notifyEndpointRequest>
```

The /notifyEndpointRequest (minOccurs=1 maxOccurs=1) method takes an endpoint and sends a specified notification to it by means of the endpoint's owner's .NET Alerts. The endpoint exposes the notifiableEndpoint argot, so that the .NET Presence service knows which connection to target in .NET Alerts. This method serves two purposes: first, as an abstraction layer over individual connections so that users may target groups of connections classified as endpoints. Second, as a privacy measure, so that a specific connection associated with an endpoint may be targeted without that connection being exposed to the user invoking the method.

The /notifyEndpointRequest/endpointId (minOccurs=1 maxOccurs=1) attribute is a globally unique ID assigned to this element by .NET My Services. Normally, .NET My Services generates and assigns this ID during an insertRequest operation or possibly during a replaceRequest. Application software can override this ID generation by specifying the useClientIds attribute in the request message. After an ID has been assigned, the attribute is read only and attempts to write it are silently ignored.

The notifyEndpointRequest/notification (minOccurs=1 maxOccurs=1) is directed to an alert. An alert has contents, including "from" (sender) data, optional "to" (receiver) data, and optional "routing" data. The contents are a set of argots (domain-specific blobs). The sender and receiver understand and agree on the argots that are transmitted in the alert. In the .NET Alerts service, both streams and connections usually choose which alerts they process based on the argots contained within the alerts.

The /notifyEndpointRequest/notification/@id (string minOccurs=0 maxOccurs=1) includes the /notifyEndpointRequest/notification/from (minOccurs=1 maxOccurs=1) tag, which contains all data from the sender, including sender authentication as well as preferences and requests from the sender.

The /notifyEndpointRequest/notification/from/identityHeader (minOccurs=0 maxOccurs=1), /notifyEndpointRequest/notification/from/identityHeader/@type (string minOccurs=0 maxOccurs=1) and /notifyEndpointRequest/notification/from/identityHeader/on BehalfOfUser (minOccurs=1 maxOccurs=1) uuidType is used to specify a universally unique identifier (UUID). /notifyEndpointRequest/notification/from/identityHeader/licenseHolder (minOccurs=1 maxOccurs=1).

The uuidType is used to specify a universally unique identifier (UUID). The /notifyEndpointRequest/notification/from/identityHeader/platformId (minOccurs=1 maxOccurs=1) uuidType is used to specify a universally unique identifier (UUID). The /notifyEndpointRequest/notification/from/expiresAt (string minOccurs=0 maxOccurs=1), /notifyEndpointRequest/notification/from/expiresAt/@ttl (string minOccurs=0 maxOccurs=1), /notifyEndpointRequest/notification/from/expiresAt/@on Date (string minOccurs=0 maxOccurs=1)/notifyEndpointRequest/notification/from/ expiresAt/@replace (string minOccurs=0 maxOccurs=1) are directed to establishing when the presence information expires.

The /notifyEndpointRequest/notification/from/acknowledge (string minOccurs=0 maxOccurs=1) is directed to acknowledgement to the sender, while /notifyEndpointRequest/notification/from/category (minOccurs=0 maxOccurs=1) and /notifyEndpointRequest/notification/from/category/@id (string minOccurs=0 maxOccurs=1) are directed to sender category information.

The /notifyEndpointRequest/notification/to (minOccurs=0 maxOccurs=1) tag contains the data pertaining to the receiver. This data can be set by the sender or by any processing/routing agent between the sender and the receiver. The /notifyEndpointRequest/notification/to/originalUser (minOccurs=0 maxOccurs=1) element defines the original receiver of the alert. A routing agent may change (forward or fan out) an alert to other receivers. If so, it should add this element to the alert.

The /notifyEndpointRequest/notification/contents (minOccurs=1 maxOccurs=1) element contains the problem domain-specific data to be conveyed to the receiver. Each child element of the contents element is an argot, a problem domain-specific strongly-typed XML blob. Streams and connections query against the element names of these blobs when selecting alerts they will process. Note that argots may be implemented as tagged .NET XML {any} blobs. The /notifyEndpointRequest/notification/contents/{any} (minOccurs=0 maxOccurs=unbounded) provides for notification contents extensibility.

The /notifyEndpointRequest/notification/routing (minOccurs=1 maxOccurs=1) tag contains any routing data inserted by the .NET Alerts routing process. The /notifyEndpointRequest/notification/routing/timestamp (string minOccurs=0 maxOccurs=1) element contains the timestamp of when the alert was received by the .NET Alerts service.

The /notifyEndpointRequest/notification/routing/hops (string minOccurs=0 maxOccurs=1) element defines the actors that have processed the alert to date. This data can be used by .NET Alerts to recognize and stop infinite loops.

If the method causes a failure response to be generated, the failure is noted by generation of a SOAP Fault message. Failures can include a failure to understand a header marked as "s:mustUnderstand", a .NET My Services standard error, security violation, load-balance redirect, or any service-specific severe error condition.

myPresence/MessengerArgot

This schema fragment illustrates a sample argot for a basic instant messaging-like presence application:

```
<m:MessengerArgot status="..."
   xmlns:m="http://schemas.microsoft.com/hs/2001/10/myPresence"
   xmlns:ma="http://schemas.microsoft.com/hs/2001/10/myAlerts"
   xmlns:hs="http://schemas.microsoft.com/hs/2001/10/core">$_{1..1}$
   <m:statusMessage>$_{0..1}$</m:statusMessage>
</m:MessengerArgot>
```

The /MessengerArgot (minOccurs=1 maxOccurs=1) argot represents an instant messaging client's presence. The /MessengerArgot/@status (string minOccurs=1 maxOccurs=1) contains the present state of the Messenger client. The /MessengerArgot/statusMessage (string minOccurs=0 maxOccurs=1) is directed to an unrestricted status message reflecting presence.

myPresence/PresenceArgot

The following schema fragment and description below illustrate the Presence argot for generic representation of presence data:

```
<m:PresenceArgot availability="..." responsiveness="..."
userPreference="..."
   xmlns:m="http://schemas.microsoft.com/hs/2001/10/myPresence"
   xmlns:ma="http://schemas.microsoft.com/hs/2001/10/myAlerts"
   xmlns:hs="http://schemas.microsoft.com/hs/2001/10/core">$_{1..1}$
</m:PresenceArgot>
```

The /PresenceArgot (minOccurs=1 maxOccurs=1) argot represent generic presence data about an endpoint. The /PresenceArgot/@availability (int minOccurs=1 maxOccurs=1) attribute indicates how fast and reliable communications are to the endpoint. The /PresenceArgot/@responsiveness (int minOccurs=1 maxOccurs=1) attribute indicates how quickly the owner of the endpoint is likely to respond.

The /PresenceArgot/@userPreference (int minOccurs=1 maxOccurs=1) contains the user's preference for this endpoint. This attribute indicates whether this endpoint is the user's preferred method of contact.

myPresence/./ConnectableArgot

The following schema fragment and description below illustrate the Connectable argot, which designates one or more connections on the user's .NET Alerts service that are represented by this endpoint:

```
<m:ConnectableArgot
   xmlns:m="http://schemas.microsoft.com/hs/2001/10/myPresence"
   xmlns:ma="http://schemas.microsoft.com/hs/2001/10/myAlerts"
   xmlns:hs="http://schemas.microsoft.com/hs/2001/10/core">$_{1..1}$
   <m:connectionID>$_{1..unbounded}$</m:connectionID>
</m:ConnectableArgot>
```

The /ConnectableArgot (minOccurs=1 maxOccurs=1) argot represents the connectability of an endpoint. If present, it designates a connection on the user's .NET Alerts. The /ConnectableArgot/connectionID (minOccurs=1 maxOccurs=unbounded) contains the ID for one or more connection elements on the user's .NET Alerts that are represented by this endpoint.

myProfile

The myProfile service is designed to store and manage personal profile information like name, identification numbers, and picture pointers for the end user. The service is a place holder for personal information that is not covered by other personal .NET My Services like .NET Address. Between this service, and the .NET Address service, many of the pieces of data typically found in an address book entry, or personal profile can be found.

Each .NET My Services user has one (logical) Profile service document, and each user maintains complete control over read and write access to the information contained within that profile service document. The user can control visibility of nodes and grant various levels access to applications and other users based on the role templates. Users can consent to either a one-time or continued access, allowing applications to use data from the Profile to pre-fill a form as part of a transaction.

Users can also direct the Profile service to publish information to one or more .NET Contacts service (myContacts) users via a mechanism called LiveContacts. Subscribers view this data in the form of a Contact record. The Profile owner chooses what information is published to each subscriber role. Once a publisher/subscriber relationship is established, the subscriber's myContact entry for the user's Profile becomes an automatically updated, read only Contact record (a "LiveContact"), i.e., any changes made to that Profile will automatically be reflected in all subscribers' Contact record. The decision about what information gets published to whom is controlled by the owner of the profile through the use of roles. In one implementation, the aforementioned service-to-service communications protocol (SSCP) provides a highly efficient, robust mechanism for such automatic updates, as described below.

myProfile/Roles

The myProfile service controls access by using the rt0, rt1, rt2, rt3 and rt99 roleTemplates, using the following scopes:

```
scope allElements
   <hs:scope id=7215df55-e4af-449f-a8e4-72a1f7c6a987>
      <hs:shape base=t>
      </hs:shape>
   </hs:scope>
scope onlySelfElements
   <hs:scope id=a159c93d-4010-4460-bc34-5094c49c1633>
      <hs:shape base=nil>
         <hs:include select=//*[@creator='$callerId']/>
      </hs:shape>
   </hs:scope>
scope onlySelfSubscriptionElements
   <hs:scope id=b7f05a6d-75cd-4958-9dfb-f532ebb17743>
      <hs:shape base=nil>
         <hs:include select=//subscription[@creator='$callerId']/>
      </hs:shape>
   </hs:scope>
scope onlyPublicElements
   <hs:scope id=da025540-a0c0-470f-adcf-9f07e5a5ec8f>
      <hs:shape base=nil>
         <hs:include select=//*[cat/@ref='hs:public']/>
         <hs:include select=//subscription[@creator='$callerId']/>
      </hs:shape>
   </hs:scope>
```

The myProfile roleTemplate rt0 role gives complete read/write access to the information within the content document of the service being protected through this roleTemplate. The following table illustrates the available methods and the scope in effect when accessing the myProfile service through that method while mapped to this roleTemplate:

TABLE

| \multicolumn{2}{c}{myProfile roleTemplate rt0} | |
| --- | --- |
| Method | scope/name |
| query | allElements |
| Insert | allElements |
| Replace | allElements |
| Delete | allElements |
| Update | allElements |
| updateContactMaps | allElements |
| serviceOnline | allElements |
| serviceOffline | allElements |

The myProfile roleTemplate rt1 role gives complete read access to all information within the content document of the service being protected through this roleTemplate. Applications mapping to this role also have a limited ability to write to information in the content document. They may create nodes in any location, but may only change/replace, or delete nodes that they created. The following table illustrates the available methods and the scope in effect when accessing the myProfile service through that method while mapped to this roleTemplate:

TABLE

| myProfile roleTemplate rt1 | |
| --- | --- |
| Method | scope/name |
| Query | allElements |
| Insert | onlySelfElements |
| Replace | onlySelfElements |
| Delete | onlySelfElements |
| updateContactMaps | allElements |
| serviceOnline | allElements |
| serviceOffline | allElements |

The myProfile roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myProfile service through that method while mapped to this roleTemplate:

TABLE

| myProfile roleTemplate rt2 | |
| --- | --- |
| method | scope/name |
| Query | allElements |
| Insert | onlySelfSubscriptionElements |
| replace | onlySelfSubscriptionElements |
| Delete | onlySelfSubscriptionElements |
| updateContactMaps | allElements |
| serviceOnline | allElements |
| serviceOffline | allElements |

The myProfile roleTemplate rt3 role gives limited read access to information within the content document that is categorized as "public." The following table illustrates the available methods and the scope in effect when accessing the myProfile service through that method while mapped to this roleTemplate:

TABLE

| myProfile roleTemplate rt3 | |
| --- | --- |
| method | scope/name |
| Query | onlyPublicElements |
| updateContactMaps | allElements |
| serviceOnline | allElements |
| serviceOffline | allElements |

The myProfile roleTemplate rt99 blocks access to the content document. Note that lack of a role in the roleList has the same effect as assigning someone to rt99.

myProfile/Content

The content document is an identity centric document. Its content and meaning is a function of the puid used to address the service. Accessing the document is controlled by the associated roleList document. This schema outlined in the following table illustrates the layout and meaning of the information found in the content document for the myProfile service.

```
<m:myProfile changeNumber="..." instanceId="..."
    xmlns:m="http://schemas.microsoft.com/hs/2001/10/myProfile"
    xmlns:mc="http://schemas.microsoft.com/hs/2001/10/myCalendar"
    xmlns:hs="http://schemas.microsoft.com/hs/2001/10/core">$_{1..1}$
    <m:name changeNumber="..." id="..." creator="...">$_{0..unbounded}$
        <m:cat ref="...">$_{0..unbounded}$</m:cat>
        <m:title xml:lang="..." dir="...">$_{0..1}$</m:title>
        <m:givenName xml:lang="..." dir="...">$_{0..1}$</m:givenName>
        <m:middleName xml:lang="..." dir="...">$_{0..1}$</m:middleName>
        <m:surname xml:lang="..." dir="...">$_{0..1}$</m:surname>
        <m:suffix xml:lang="..." dir="...">$_{0..1}$</m:suffix>
        <m:fileAsName xml:lang="..." dir="...">$_{0..1}$</m:fileAsName>
        {any}
    </m:name>
    <m:memberInformation changeNumber="..." id="..."
    creator="...">$_{0..unbounded}$
        <m:memberNamePortion xml:lang="..."
            dir="...">$_{1..1}$</m:memberNamePortion>
        <m:domainNamePortion>$_{1..1}$</m:domainNamePortion>
    </m:memberInformation>
    <m:languagePreference level="..." changeNumber="..." id="..."
    creator="...">$_{0..unbounded}$</m:languagePreference>
    <m:timeZonePreference changeNumber="..." id="..."
    creator="...">$_{0..unbounded}$
        <m:cat ref="...">$_{0..unbounded}$</m:cat>
        <m:timeZone>$_{1..1}$</m:timeZone>
    </m:timeZonePreference>
    <m:specialDate calendarType="..." changeNumber="..." id="..."
    creator="...">$_{0..unbounded}$
        <m:cat ref="...">$_{0..1}$</m:cat>
        <m:date>$_{1..1}$</m:date>
        {any}
    </m:specialDate>
    <m:userReference changeNumber="..." id="..."
    creator="...">$_{0..unbounded}$
        <hs:name xml:lang="..." dir="...">$_{0..1}$</hs:name>
        <hs:puid>$_{0..1}$</hs:puid>
        <hs:email>$_{0..1}$</hs:email>
        <hs:cat ref="...">$_{1..1}$</hs:cat>
        {any}
    </m:userReference>
    <m:picture changeNumber="..." id="..." creator="...">$_{0..unbounded}$
        <m:cat ref="...">$_{0..1}$</m:cat>
        <m:url>$_{1..1}$</m:url>
        {any}
    </m:picture>
    <m:gender changeNumber="..." id="..." creator="...">$_{0..1}$</m:gender>
    <m:identificationNumber changeNumber="..." id="..."
    creator="...">$_{0..unbounded}$
        <m:cat ref="...">$_{0..1}$</m:cat>
        <m:number>$_{1..1}$</m:number>
        {any}
    </m:identificationNumber>
    <m:workInformation changeNumber="..." id="..."
    creator="...">$_{0..unbounded}$
        <m:cat ref="...">$_{0..unbounded}$</m:cat>
        <m:profession xml:lang="..." dir="...">$_{0..1}$</m:profession>
        <m:jobTitle xml:lang="..." dir="...">$_{0..1}$</m:jobTitle>
        <m:officeLocation xml:lang="..." dir="...">$_{0..1}$</m:officeLocation>
        <m:coworkerOrDepartment>$_{0..unbounded}$
            <hs:name xml:lang="..." dir="...">$_{0..1}$</hs:name>
            <hs:puid>$_{0..1}$</hs:puid>
            <hs:email>$_{0..1}$</hs:email>
            <hs:cat ref="...">$_{1..1}$</hs:cat>
        </m:coworkerOrDepartment>
        {any}
    </m:workInformation>
    <m:address changeNumber="..." id="..." creator="...">$_{0..unbounded}$
        <hs:cat ref="...">$_{0..unbounded}$</hs:cat>
        <hs:officialAddressLine xml:lang="..."
            dir="...">$_{0..1}$</hs:officialAddressLine>
        <hs:internalAddressLine xml:lang="..."
            dir="...">$_{0..1}$</hs:internalAddressLine>
        <hs:primaryCity xml:lang="..." dir="...">$_{0..1}$</hs:primaryCity>
        <hs:secondaryCity xml:lang="..." dir="...">$_{0..1}$</hs:secondaryCity>
        <hs:subdivision xml:lang="..." dir="...">$_{0..1}$</hs:subdivision>
        <hs:postalCode>$_{0..1}$</hs:postalCode>
        <hs:countryCode>$_{0..1}$</hs:countryCode>
        <hs:latitude>$_{0..1}$</hs:latitude>
        <hs:longitude>$_{0..1}$</hs:longitude>
        <hs:elevation>$_{0..1}$</hs:elevation>
        <hs:velocity>$_{0..1}$
            <hs:speed>$_{0..1}$</hs:speed>
            <hs:direction>$_{0..1}$</hs:direction>
        </hs:velocity>
        <hs:confidence>$_{0..1}$</hs:confidence>
        <hs:precision>$_{0..1}$</hs:precision>
        {any}
    </m:address>
    <m:webSite changeNumber="..." id="..." creator="...">$_{0..unbounded}$
        <m:cat ref="...">$_{0..1}$</m:cat>
        <m:url>$_{1..1}$</m:url>
        {any}
    </m:webSite>
    <m:emailAddress changeNumber="..." id="..."
    creator="...">$_{0..unbounded}$
        <m:cat ref="...">$_{0..unbounded}$</m:cat>
        <m:email>$_{1..1}$</m:email>
        <m:name xml:lang="..." dir="...">$_{0..1}$</m:name>
        {any}
    </m:emailAddress>
    <m:screenName changeNumber="..." id="..." creator="...">$_{0..unbounded}$
        <m:cat ref="...">$_{0..1}$</m:cat>
        <m:name xml:lang="..." dir="...">$_{1..1}$</m:name>
        {any}
    </m:screenName>
    <m:telephoneNumber changeNumber="..." id="..."
    creator="...">$_{0..unbounded}$
        <hs:cat ref="...">$_{0..unbounded}$</hs:cat>
        <hs:countryCode>$_{0..1}$</hs:countryCode>
        <hs:nationalCode>$_{1..1}$</hs:nationalCode>
        <hs:number>$_{1..1}$</hs:number>
        <hs:numberExtension>$_{0..1}$</hs:numberExtension>
        <hs:pin>$_{0..1}$</hs:pin>
        {any}
    </m:telephoneNumber>
    <m:subscription changeNumber="..." id="..." creator="...">$_{0..unbounded}$
        <hs:trigger select="..." mode="..."
            baseChangeNumber="...">$_{1..1}$</hs:trigger>
        <hs:expiresAt>$_{0..1}$</hs:expiresAt>
        <hs:context uri="...">$_{1..1}${any}</hs:context>
        <hs:to>$_{1..1}$</hs:to>
    </m:subscription>
    <m:securityCertificate changeNumber="..." id="..."
    creator="...">$_{0..unbounded}$
        <m:catref="...">$_{0..unbounded}$</m:cat>
        <m:certificate>$_{1..1}$</m:certificate>
    </m:securityCertificate>
    {any}
</m:myProfile>
```

The meaning of the attributes and elements shown in the table are set forth below, wherein in the syntax used in the table, boldface type corresponds to a blue node, and underlined type to a red node, as described above, and the minimum occurrence information (0, 1) indicates whether an element or attribute is required or optional, and maximum occurrence information (1, unbounded) indicates whether one or many are possible.

The /myProfile (minOccurs=1 maxOccurs=1) element encapsulates the content document for this service. This element establishes a global cache scope for the service and contains other root-level system attributes for this instance of the service.

The /myProfile/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/@instanceId (string minOccurs=0 maxOccurs=1) attribute is a unique identifier typically assigned to the root element of a service. It is a read-only element and assigned by the .NET My Services system when a user is provisioned for a particular service.

The /myProfile/name (minOccurs=0 maxOccurs=unbounded) element encapsulates a name associated with the identity. An identity can have multiple names associated with it. These name nodes are not intended to be used for storing screen names or other electronic names, but rather to store a commonly used name for the entity. Names contain five parts and are meant to be combined in proper order, with spaces separating the parts and empty content parts excluded.

The /myProfile/name/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/name/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/name/@creator (string minOccurs=0 maxOccurs=1) attribute identifies the creator in terms of userId, appId, and platformId of the node.

The /myProfile/name/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myProfile/name/cat/@ref (anyURI minOccurs=0 maxOccurs=1) attribute references a category definition (<catDef/>) element using the rules outlined in the myCategories section of the present application.

The /myProfile/name/title (string minOccurs=0 maxOccurs=1) optional element is designed to store a title or prefix associated with the name. Examples are 'Mr.', 'Mrs.', 'Dr.', or any other commonly used name title or prefix. The /myProfile/name/title/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/title/@dir (string minOccurs=0 maxOccurs=1) optional attribute specifies the default layout direction for the localized string. Valid values are rtl (right to left), and ltr (left to right).

The /myProfile/name/givenName (string minOccurs=0 maxOccurs=1) optional element is meant to store the first portion of a name. The /myProfile/name/givenName/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/givenName/@dir (string minOccurs=0 maxOccurs=1) optional attribute specifies the default layout direction for the localized string. Valid values are rtl (right to left), and ltr (left to right).

The /myProfile/name/middleName (string minOccurs=0 maxOccurs=1) optional element is meant to store the middle portion or initial of a name. The /myProfile/name/middleName/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/middleName/@dir (string minOccurs=0 maxOccurs=1) optional attribute specifies the default layout direction for the localized string. Valid values are rtl (right to left), and ltr (left to right).

The /myProfile/name/surname (string minOccurs=0 maxOccurs=1) optional element is meant to store the last portion of a name. The /myProfile/name/surname/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/surname/@dir (string minOccurs=0 maxOccurs=1) optional attribute specifies the default layout direction for the localized string. Valid values are rtl (right to left), and ltr (left to right).

The /myProfile/name/suffix (string minOccurs=0 maxOccurs=1) optional element is designed to store a suffix associated with the name. Examples include 'Jr.', 'Sr.', 'III', or any other commonly used name suffix. The /myProfile/name/suffix/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/suffix/@dir (string minOccurs=0 maxOccurs=1) optional attribute specifies the default layout direction for the localized string. Valid values are rtl (right to left), and ltr (left to right).

A complete name is usually the combination of title, givenName, middleName, surname, and suffix. The /myProfile/name/fileAsName (string minOccurs=0 maxOccurs=1) optional element is present to indicate that a different order should be used or that the identity prefers to have the name filed differently. The /myProfile/name/fileAsName/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/name/fileAsName/@dir (string minOccurs=0 maxOccurs=1) optional attribute specifies the default layout direction for the localized string. Valid values are rtl (right to left), and ltr (left to right).

The /myProfile/name/{any} (minOccurs=0 maxOccurs=unbounded) allows for extensibility of the myProfile schema.

The /myProfile/memberInformation (minOccurs=0 maxOccurs=unbounded) node wraps member-specific public information for this entity. The information is not changeable, which is reflected in the schemas that modify the content document.

The /myProfile/memberInformation/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/memberInformation/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/memberInformation/@creator (string minOccurs=0 maxOccurs=1) attribute identifies the creator in terms of userId, appId, and platformId of the node.

A member name is a combination of a user name portion, and a domain name portion. These names are separated with an '@' character to form a fully qualified member name. The /myProfile/memberInformation/memberNamePortion (string minOccurs=1 maxOccurs=1) element contains the user name portion of the name. For a fully qualified member name of someone microsoft.com, this element contains the value 'someone'. The /myProfile/memberInformation/memberNamePortion/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/memberInformation/memberNamePortion/@dir (string minOccurs=0 maxOccurs=1) optional attribute specifies the default layout direction for the localized string. Valid values are rtl (right to left), and ltr (left to right).

The /myProfile/memberInformation/domainNamePortion (string minOccurs=1 maxOccurs=1) field contains the other part of the fully qualified member name described above, that is, this element contains the domain name portion. For example, for a fully qualified member name of someone microsoft.com, this element contains the value 'microsoft.com'.

The /myProfile/languagePreference (string minOccurs=0 maxOccurs=unbounded) element specifies the preferred language code of the identity encoded using ISO 639 language codes or ISO 3166 country codes as defined by RFC 1766. The purpose of this value in this service is to help guide applications regarding the languages understood by this identity. When manipulating localizable content, they should choose from an appropriate language preference. When encountering localized content not falling within this set, the software should translate into a language understood by this set.

The /myProfile/languagePreference/@level (string minOccurs=0 maxOccurs=1) attribute indicates how well this language is understood by this identity. Valid values include, native, fluent, intermediate and beginner.

The /myProfile/languagePreference/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/languagePreference/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/languagePreference/@creator (string minOccurs=0 maxOccurs=1) attribute identifies the creator in terms of userId, appId, and platformId of the node.

The /myProfile/timeZonePreference (minOccurs=0 maxOccurs=unbounded) element supplies the base timezone preference for this entity.

The /myProfile/timeZonePreference/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/timeZonePreference/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/timeZonePreference/@creator (string minOccurs=0 maxOccurs=1) attribute identifies the creator in terms of userId, appId, and platformId of the node. The /myProfile/timeZonePreference/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myProfile/timeZonePreference/cat/@ref (anyURI minOccurs=0 maxOccurs=1) attribute references a category definition (<catDef/>) element using the rules outlined in the my Categories section of the present application.

The /myProfile/specialDate (minOccurs=0 maxOccurs=unbounded) element encapsulates a special date that is important to this entity. Multiple special date nodes may exist. This is not a substitute for dates stored on an entity's myCalendar service. The main purpose is to provide a convenient place to store a birth date or an anniversary date, because these dates are frequently imported into a contact record. The /myProfile/specialDate/@calendarType (string minOccurs=0 maxOccurs=1) field identifies an enumeration which determines the kind of calendar event this is based on the following table, (which can be expanded):

| Value | Enumeration Constant | Description |
| --- | --- | --- |
| −1 | HSCAL_ALL_CALENDARS | Unknown Calendar; system default (HSCAL_GREGORIAN_US) |
| 1 | HSCAL_GREGORIAN | Gregorian (localized) calendar |
| 2 | HSCAL_GREGORIAN_US | Gregorian (U.S.) calendar |
| 3 | HSCAL_JAPAN | Japanese Emperor Era calendar |
| 4 | HSCAL_TAIWAN | Taiwan Era calendar |
| 5 | HSCAL_KOREA | Korean Tangun Era calendar |
| 6 | HSCAL_HIJRI | Hijri (Arabic Lunar) calendar |
| 7 | HSCAL_THAI | Thai calendar |
| 8 | HSCAL_HEBREW | Hebrew (Lunar) calendar |

-continued

| Value | Enumeration Constant | Description |
|---|---|---|
| 9 | HSCAL_GREGORIAN_ME_FRENCH | Gregorian Middle East French calendar |
| 10 | HSCAL_GREGORIAN_ARABIC | Gregorian Arabic calendar |
| 11 | HSCAL_GREGORIAN_XLIT_ENGLISH | Gregorian Transliterated English calendar |
| 12 | HSCAL_GREGORIAN_XLIT_FRENCH | Gregorian Transliterated French calendar |
| 13 | HSCAL_KOREA_LUNAR | Default Korea Lunar calendar |
| 14 | HSCAL_JAPAN_LUNAR | Default Japanese Lunar calendar |
| 15 | HSCAL_CHINESE_LUNAR | Chinese Lunar calendar |
| 16 | HSCAL_SAKA | Indian Saka calendar |
| 17 | HSCAL_LUNAR_ETO_CHN | Chinese Zodiac calendar |
| 18 | HSCAL_LUNAR_ETO_KOR | Korean Zodiac calendar |
| 19 | HSCAL_LUNAR_ROKUYOU | Japanese Lucky days calendar |

The /myProfile/specialDate/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/specialDate/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/specialDate/@creator (string minOccurs=0 maxOccurs=1) attribute identifies the creator in terms of userId, appId, and platformId of the node. The /myProfile/specialDate/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid.

The /myProfile/specialDate/cat/@ref (anyURI minOccurs=0 maxOccurs=1) attribute references a category definition (<catDef/>) element using the rules outlined in the myCategories section of the present application.

The /myProfile/specialDate/{any} (minOccurs=0 maxOccurs=unbounded) allows for date-related extensibility.

The /myProfile/userReference/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/userReference/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/userReference/@creator (string minOccurs=0 maxOccurs=1) attribute identifies the creator in terms of userId, appId, and platformId of the node. The /myProfile/userReference/name (string minOccurs=0 maxOccurs=1) optional element specifies the name for the enclosing element. The /myProfile/userReference/name/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/userReference/name/@dir (string minOccurs=0 maxOccurs=1) optional attribute specifies the default layout direction for the localized string. Valid values are rtl (right to left), and ltr (left to right).

The /myProfile/userReference/puid (string minOccurs=0 maxOccurs=1) optional element specifies the name for the enclosing element. The /myProfile/userReference/email (string minOccurs=0 maxOccurs=1) optional name specifies an email address for the enclosing element. The /myProfile/userReference/cat (minOccurs=1 maxOccurs=1) element is used to categorize the element that contains it by referencing a global category definition in either the .NET Categories service system document or an external resource containing category definitions, or by referencing an identity centric category definition in the content document of the .NET Categories service for a particular puid.

The /myProfile/userReference/cat/@ref (anyURI minOccurs=0 maxOccurs=1) attribute references a category definition (<catDef/>) element using the rules outlined in the myCategories section of the present application.

The /myProfile/userReference/{any} (minOccurs=0 maxOccurs=unbounded) provides for extensibility of user-reference related data in the myProfile schema.

The /myProfile/picture (minOccurs=0 maxOccurs=unbounded) optional element encapsulates a URL that points to a picture of the identity. The /myProfile/picture/@changeNumber (minOccurs=0 maxOccurs=1) changeNumber attribute is designed to facilitate caching of the element and its descendants. This attribute is assigned to this element by the .NET My Services system. The attribute is read-only to applications; attempts to write this attribute are silently ignored.

The /myProfile/picture/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/picture/@creator (string minOccurs=0 maxOccurs=1) attribute identifies the creator in terms of userId, appId, and platformId of the node.

The /myProfile/picture/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myProfile/picture/cat/@ref (anyURI minOccurs=0 maxOccurs=1) attribute references a category definition (<catDef/>) element using the rules outlined in the myCategories section of the present application. The /myProfile/picture/url (string minOccurs=1 maxOccurs=1) element contains the URL that points to the actual picture. The /myProfile/picture/{any} (minOccurs=0 maxOccurs=unbounded) provides for extensibility of picture-related data.

The /myProfile/gender (string minOccurs=0 maxOccurs=1) element specifies the gender for this entity. There can only be a single gender associated with an entity. The format of this element is a single, 7-bit ASCII character with one of two possible values: 'm' for male, and 'f' for female. The /myProfile/gender/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myProfile/gender/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/gender/@creator (string minOccurs=0 maxOccurs=1) attribute identifies the creator in terms of userId, appId, and platformId of the node.

The /myProfile/identificationNumber (minOccurs=0 maxOccurs=unbounded) optional element encapsulates an identification number for the entity. Things like an employee ID number, social security number, national ID number, drivers license number, and so on, may be stored within this element. The /myProfile/identificationNumber/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myProfile/identificationNumber/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/identificationNumber/@creator (string minOccurs=0 maxOccurs=1) attribute identifies the creator in terms of userId, appId, and platformId of the node. The /myProfile/identificationNumber/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myProfile/identificationNumber/cat/@ref (anyURI minOccurs=0 maxOccurs=1) attribute references a category definition (<catDef/>) element using the rules outlined in the myCategories section of the present application.

The /myProfile/identificationNumber/number (string minOccurs=1 maxOccurs=1) element contains the actual identification number value. The /myProfile/identificationNumber/{any} (minOccurs=0 maxOccurs=unbounded) provides for extensibility.

The /myProfile/workInformation (minOccurs=0 maxOccurs=unbounded) element encapsulates work-related or occupation-related information for this entity. The /myProfile/workInformation/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/workInformation/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/workInformation/@creator (string minOccurs=0 maxOccurs=1) attribute identifies the creator in terms of userId, appId, and platformId of the node. The /myProfile/workInformation/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myProfile/workInformation/cat/@ref (anyURI minOccurs=0 maxOccurs=1) attribute references a category definition (<catDef/>) element using the rules outlined in the myCategories section of the present application.

The /myProfile/workInformation/profession (string minOccurs=0 maxOccurs=1) optional element specifies the entity's profession within this particular workInformation element. The /myProfile/workInformation/profession/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/workInformation/profession/@dir (string minOccurs=0 maxOccurs=1) optional attribute specifies the default layout direction for the localized string. Valid values are rtl (right to left), and ltr (left to right).

The /myProfile/workInformation/jobTitle (string minOccurs=0 maxOccurs=1) element specifies the job title for this piece of work information. The /myProfile/workInformation/jobTitle/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/workInformation/jobTitle/@dir (string minOccurs=0 maxOccurs=1) optional attribute specifies the default layout direction for the localized string. Valid values are rtl (right to left), and ltr (left to right).

The /myProfile/workInformation/officeLocation (string minOccurs=0 maxOccurs=1) element specifies the office location for this piece of work information. The /myProfile/workInformation/officeLocation/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/workInformation/officeLocation/@dir (string minOccurs=0 maxOccurs=1) optional attribute specifies the default layout direction for the localized string. Valid values are rtl (right to left), and ltr (left to right).

The /myProfile/workInformation/coworkerOrDepartment (minOccurs=0 maxOccurs=unbounded) element encapsulates information about this entity's manager, assistant, company, department, and so on. The information can include its name, its PUID and its email address. Using this anchor information, additional details may be obtained. The required cat element indicates the relationship of the element to this entity (e.g., ref="system#manager").

The /myProfile/workInformation/coworkerOrDepartment/name (string minOccurs=0 maxOccurs=1) optional element specifies the name for the enclosing element. The /myProfile/workInformation/coworkerOrDepartment/name/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/workInformation/coworkerOrDepartment/name/@dir (string minOccurs=0 maxOccurs=1) optional attribute specifies the default layout direction for the localized string. Valid values are rtl (right to left), and ltr (left to right).

The /myProfile/workInformation/coworkerOrDepartment/puid (string minOccurs=0 maxOccurs=1) optional element specifies the name for the enclosing element. The /myProfile/workInformation/coworkerOrDepartment/email (string minOccurs=0 maxOccurs=1) optional name specifies an email address for the enclosing element. The /myProfile/workInformation/coworkerOrDepartment/cat (minOccurs=1 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myProfile/workInformation/coworkerOrDepartment/cat/@ref (anyURI minOccurs=0 maxOccurs=1) attribute references a category definition (<catDef/>) element using the rules outlined in the myCategories section of the present application. The /myProfile/workInformation/{any} (minOccurs=0 maxOccurs=unbounded) provides for extensibility.

The /myProfile/address (minOccurs=0 maxOccurs=unbounded) element encapsulates a geographic address. The contained nodes describe the geographic address in detail. Typical use is one address element for each geographical address for this identity. For instance, a user with a primary home and a vacation home might have two address elements in this service. The /myProfile/address/@changeNumber (minOccurs=0 maxOccurs=1) changeNumber attribute is designed to facilitate caching of the element and its descendants. This attribute is assigned to this element by the .NET My Services system. The attribute is read-only to applications; attempts to write this attribute are silently ignored.

The /myProfile/address/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/address/@creator (string minOccurs=0 maxOccurs=1) attribute identifies the creator in terms of userId, appId, and platformId of the node. The /myProfile/address/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myProfile/address/cat/@ref (anyURI minOccurs=0 maxOccurs=1) attribute references a category definition (<catDef/>) element using the rules outlined in the myCategories section of the present application.

The /myProfile/address/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element would be to enclose a street address, post office box address, private bag, or any other similar official address. Internal routing information like department name, suite number within a building, internal mailstop number, or similar properties should be placed within the internalAddressLine element. The /myProfile/address/officialAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/address/officialAddressLine/@dir (string minOccurs=0 maxOccurs=1) optional attribute specifies the default layout direction for the localized string. Valid values are rtl (right to left), and ltr (left to right).

The /myProfile/address/internalAddressLine (string minOccurs=0 maxOccurs=1) element contains internal routing information relative to the address specified by the officialAddressLine. Items like department name, suite number within a building, internal mailstop number, or similar properties should be placed within this element. The /myProfile/address/internalAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/address/internalAddressLine/@dir (string minOccurs=0 maxOccurs=1) optional attribute specifies the default layout direction for the localized string. Valid values are rtl (right to left), and ltr (left to right).

The /myProfile/address/primaryCity (string minOccurs=0 maxOccurs=1) element defines the primary city for this address. The /myProfile/address/primaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/address/primaryCity/@dir (string minOccurs=0 maxOccurs=1) optional attribute specifies the default layout direction for the localized string. Valid values are rtl (right to left), and ltr (left to right).

The /myProfile/address/secondaryCity (string minOccurs=0 maxOccurs=1) optional element defines the secondary city for this address. Example types for this element include city district, city wards, postal towns, and so on. The /myProfile/address/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/address/secondaryCity/@dir (string minOccurs=0 maxOccurs=1) optional attribute specifies the default layout direction for the localized string. Valid values are rtl (right to left), and ltr (left to right).

The /myProfile/address/subdivision (string minOccurs=0 maxOccurs=1) element contains the official subdivision name within the country or region for this address. In the United States, this element would contain the two letter abbreviation for the name of the state. This element is also commonly treated as the "first order admin subdivision" and will typically contain subdivision names referring to administrative division, Bundesstaat, canton, federal district, province, region, state or territory. The /myProfile/address/subdivision/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/address/subdivision/@dir (string minOccurs=0 maxOccurs=1) optional attribute specifies the default layout direction for the localized string. Valid values are rtl (right to left), and ltr (left to right).

The /myProfile/address/postalCode (string minOccurs=0 maxOccurs=1) element contains the official postal code for this address. The /myProfile/address/countryCode (string minOccurs=0 maxOccurs=1) element contains the 2 letter ISO-3166 id of the country, dependency, or functionally equivalent region for this address. The /myProfile/address/latitude (string minOccurs=0 maxOccurs=1) element specifies the latitude value for this address in units of decimal degrees. Geodetic datum WGS84 is required. The /myProfile/address/longitude (string minOccurs=0 maxOccurs=1) element specifies the longitude value for this address in units of decimal degrees. Geodetic datum WGS84 is required. The /myProfile/address/elevation (string minOccurs=0 maxOccurs=1) element specifies the elevation above sea level with respect to WGS84 geodetic datum. The units for this value is meters.

The /myProfile/address/velocity (minOccurs=0 maxOccurs=1) element specifies the last reported velocity associated with this address. Of course, for fixed addresses the velocity node would either not be present, or speed would be zero indication stationary position. The /myProfile/address/velocity/speed (string minOccurs=0 maxOccurs=1) element specifies the last known speed associated with this report in units of meters per second. The /myProfile/address/velocity/direction (string minOccurs=0 maxOccurs=1) element specifies the last known direction associated with this report in units of degrees decimal. The /myProfile/address/confidence (string minOccurs=0 maxOccurs=1) element specifies a percentage value that indicates the confidence value that this location is accurate within the specified precision. The /myProfile/address/precision (string minOccurs=0 maxOccurs=1) element specifies the precision in meters of this location. The value defines a spherical zone that the location falls within. The /myProfile/address/{any} (minOccurs=0 maxOccurs=unbounded) field allows for address-related extensibility.

The /myProfile/webSite (minOccurs=0 maxOccurs=unbounded) element encapsulates an electronic address for this entity, specifically, it contains a web site or URL associated with this identity. This element may be repeated any number of times. Typical use is one webSite element for each web site associated with this identity. The /myProfile/webSite/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/webSite/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/webSite/@creator (string minOccurs=0 maxOccurs=1) attribute identifies the creator in terms of userId, appId, and platformId of the node.

The /myProfile/webSite/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myProfile/webSite/cat/@ref (anyURI minOccurs=0 maxOccurs=1) attribute references a category definition (<catDef/>) element using the rules outlined in the myCategories section of the present application. The /myProfile/webSite/url (string minOccurs=1 maxOccurs=1) element contains the URL for this web site. If the site is accessible through multiple URLs, this element may be repeated an appropriate number of times. The /myProfile/webSite/{any} (minOccurs=0 maxOccurs=unbounded) provides for extensibility.

The /myProfile/emailAddress (minOccurs=0 maxOccurs=unbounded) element encapsulates an electronic address for this entity, specifically, it contains an email address associated with this identity. This element may be repeated any number of times. Typical use is one emailAddress element for each email address associated with this identity. The /myProfile/emailAddress/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myProfile/emailAddress/@id (minOccurs=0 maxOccurs=1) attribute comprises a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/emailAddress/@creator (string minOccurs=0 maxOccurs=1) attribute identifies the creator in terms of userId, appId, and platformId of the node. The /myProfile/emailAddress/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myProfile/emailAddress/cat/@ref (anyURI minOccurs=0 maxOccurs=1) attribute references a category definition (<catDef/>) element using the rules outlined in the myCategories section of the present application.

The /myProfile/emailAddress/email (string minOccurs=1 maxOccurs=1) element contains the actual value of the email address (e.g. someone@microsoft.com). The /myProfile/emailAddress/name (string minOccurs=0 maxOccurs=1) element contains the friendly, or display name associated with this email address. The /myProfile/emailAddress/name/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/emailAddress/name/@dir (string minOccurs=0 maxOccurs=1) optional attribute specifies the default layout direction for the localized string. Valid values are rtl (right to left), and ltr (left to right). The /myProfile/emailAddress/{any} (minOccurs=0 maxOccurs=unbounded) field allows for extensibility.

The /myProfile/screenName (minOccurs=0 maxOccurs=unbounded) element encapsulates an electronic address for this entity, specifically, it contains a screen name commonly used in real time communications applications like instant messaging applications, chat rooms, and so on. This element may be repeated any number of times, and the type attribute may be used for simple classifications on the screenName.

The /myProfile/screenName/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myProfile/screenName/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myProfile/screenName/@creator (string minOccurs=0 maxOccurs=1) attribute identifies the creator in terms of userId, appId, and platformId of the node. The /myProfile/screenName/cat (minOccurs=0 maxOccurs=1) element is used to categorize the element that contains it by referencing a global category definition in either the .NET Categories service system document or an external resource containing category definitions, or by referencing an identity centric category definition in the content document of the .NET Categories service for a particular puid. The /myProfile/screenName/cat/@ref (anyURI minOccurs=0 maxOccurs=1) attribute references a category definition (<catDef/>) element using the rules outlined in the myCategories section of the present application. The /myProfile/screenName/name (string minOccurs=1 maxOccurs=1) element contains the value of the screen name. The /myProfile/screenName/name/@xml:lang (minOccurs=1 maxOccurs=1) required attribute is used to specify an ISO 639 language code or an ISO 3166 country code as described in RFC 1766. The value of this attribute indicates the language type of the content within this element. The /myProfile/screenName/name/@dir (string minOccurs=0 maxOccurs=1) optional attribute specifies the default layout direction for the localized string. Valid values are rtl (right to left), and ltr (left to right). The /myProfile/screenName/{any} (minOccurs=0 maxOccurs=unbounded) provides for extensibility.

The /myProfile/telephoneNumber (minOccurs=0 maxOccurs=unbounded) element encapsulates an electronic address for this entity, specifically, it contains a telephone number. This element may be repeated any number of times. Typical use is one telephoneNumber element for each phone number associated with this identity. A telephone number is an optional country code, a required nationalCode (US area code), a number, an optional extension, and an optional pin.

The /myProfile/telephoneNumber/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /myProfile/telephoneNumber/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/telephoneNumber/@creator (string minOccurs=0 maxOccurs=1) attribute identifies the creator in terms of userId, appId, and platformId of the node. The /myProfile/telephoneNumber/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myProfile/telephoneNumber/cat/@ref (anyURI minOccurs=0 maxOccurs=1) attribute references a category definition (<catDef/>) element using the rules outlined in the myCategories section of the present application.

The /myProfile/telephoneNumber/countryCode (string minOccurs=0 maxOccurs=1) optional element specifies the country code for this telephone number. The /myProfile/telephoneNumber/nationalCode (string minOccurs=1 maxOccurs=1) element specifies the national code for this phone number. For US telephone numbers, this is equivalent to the area code. The /myProfile/telephoneNumber/number (string minOccurs=1 maxOccurs=1) element specifies the actual telephone number within the country and national code number scheme. The /myProfile/telephoneNumber/numberExtension (string minOccurs=0 maxOccurs=1) optional element specifies an extension used to reach this identity and this number. The /myProfile/telephoneNumber/pin (string minOccurs=0 maxOccurs=1) optional element specifies a pin number used on this phone number. A pin is similar to an extension, but pin's are commonly used to address pagers while extensions are typically used to address phones relative to a local pbx. The /myProfile/telephoneNumber/{any} (minOccurs=0 maxOccurs=unbounded) allows for telephone number-related extensibility.

The /myProfile/subscription (minOccurs=0 maxOccurs=unbounded) element defines a subscription node as described above in the subscription section.

The /myProfile/securityCertificate (minOccurs=0 maxOccurs=unbounded) node has thereunder the /myProfile/securityCertificate/@changeNumber (minOccurs=0 maxOccurs=1) changeNumber attribute, which is designed to facilitate caching of the element and its descendants. This attribute is assigned to this element by the .NET My Services system. The attribute is read-only to applications. Attempts to write this attribute are silently ignored. The /myProfile/securityCertificate/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /myProfile/securityCertificate/@creator (string minOccurs=0 maxOccurs=1) attribute identifies the creator in terms of userId, appId, and platformId of the node.

The /myProfile/securityCertificate/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myProfile/securityCertificate/cat/@ref (anyURI minOccurs=0 maxOccurs=1) attribute references a category definition (<catDef/>) element using the rules outlined in the myCategories section of the present application. The /myProfile/securityCertificate/certificate (hexBinary minOccurs=1 maxOccurs=1) maintains the data, with the /myProfile/{any} (minOccurs=0 maxOccurs=unbounded) providing extensibility.

myWallet

The .NET Wallet service, generally referred to as myWallet, is designed to store and manage an identity-defined user's financial-related information, such as credit and debit card information, bank account information, and the like, and thus provides an electronic wallet for users. To this end, the myWallet service uses an XML schema to describe payment instruments in a user's wallet and the methods by which a payment instrument is stored and manipulated in the store. The methods and access rights that allow for the manipulation of contents in a user's wallet by different role type.

For example, in addition to the XML schema for wallet content, the .NET Wallet service provides, under the user's control, the ability for data access by a merchant on behalf of a user. The myWallet service accomplishes this via a query only method for a merchant to view the payment instrument to which a user has granted access. As another example, access by a financial issuer on behalf of a user is allowed, whereby a financial issuer may manage the payment instruments that are issued by this issuer (e.g. the credit card issuer), provided that the user has granted the issuer such access right. For example, a financial issuer may manage certain aspects of wallet content on behalf of a user, such as to update the expiration date of a card, change the billing address when a user is moved and notified his or her bank, change the bank routing number when the bank is merged, and so forth.

To increase security and data privacy, the key elements of a wallet (e.g. credit card number) may be encrypted using a key or password that only the user knows. By doing so, even if a user's account is compromised, the key data in wallet is still protected and non-usable.

The myWallet service is thus directed to payment instrument information, which comprises a payment method that the entity will use to pay, including card based payment instruments like credit cards and debit cards, and account based payment instruments, such as traditional checking accounts and savings accounts, or any non-traditional account that allows a user to accumulate charges and be billed on a regular basis, such as a telephone bill.

In keeping with the present invention, the .NET Wallet service supplies such information on demand to appropriate .Net-based services, applications or devices. To this end, the .NET Wallet service uses .NET My Services to support a rich sharing model based on the access control list, role map, and identity header.

The .NET Wallet service exposes the changeNotify method to be used on the .NET Wallet element only. When such an operation occurs on the .NET Wallet with a pending changeNotify request outstanding, a notification will be sent to the subscriber via the .NET Alerts service.

myWallet/Roles

As with other services, the myWallet service controls data access by using the rt0, rt1, rt2, rt3 and rt99 roleTemplates, using the following scopes:

```
scope allElements
  <hs:scope id=7215df55-e4af-449f-a8e4-72a1f7c6a987>
    <hs:shape base=t>
    </hs:shape>
  </hs:scope>
scope onlySelfElements
  <hs:scope id=a159c93d-4010-4460-bc34-5094c49c1633>
    <hs:shape base=nil>
      <hs:include select=//*[@creator='$callerId']/>
    </hs:shape>
  </hs:scope>
scope onlySelfSubscriptionElements
  <hs:scope id=b7f05a6d-75cd-4958-9dfb-f532ebb17743>
    <hs:shape base=nil>
      <hs:include select=//subscription[@creator='$callerId']/>
    </hs:shape>
  </hs:scope>
scope onlyPublicElements
  <hs:scope id=da025540-a0c0-470f-adcf-9f07e5a5ec8f>
    <hs:shape base=nil>
      <hs:include select=//*[cat/@ref='hs:public']/>
      <hs:include select=//subscription[@creator='$callerId']/>
    </hs:shape>
  </hs:scope>
```

The myWallet roleTemplate rt0 role to gives complete read/write access to information within the content document of the service being protected through this roleTemplate. The standard methods following table illustrates the available methods and the scope in effect when accessing the myWallet service through that method while mapped to this roleTemplate:

TABLE

| myWallet roleTemplate rt0 | |
| --- | --- |
| method | scope/name |
| query | allElements |
| insert | allElements |
| replace | allElements |
| delete | allElements |
| update | allElements |

The myWallet roleTemplate role gives complete read access to information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myWallet service through that method while mapped to this roleTemplate:

TABLE

| \_\_\_\_\_myWallet roleTemplate rt1\_\_\_\_\_ | |
|---|---|
| method | scope/name |
| query | allElements |
| insert | onlySelfElements |
| replace | onlySelfElements |
| delete | onlySelfElements |

The myWallet roleTemplate rt2 gives complete read access to information within the content document of the service being protected through this roleTemplate. Applications mapping to this role have very limited write access and are only able to create and manipulate their own subscription nodes. The following table illustrates the available methods and the scope in effect when accessing the myWallet service through that method while mapped to this roleTemplate:

TABLE

| \_\_\_\_\_myWallet roleTemplate rt2\_\_\_\_\_ | |
|---|---|
| method | scope/name |
| query | allElements |
| Insert | onlySelfSubscriptionElements |
| replace | onlySelfSubscriptionElements |
| delete | onlySelfSubscriptionElements |

The myWallet roleTemplate rt3 gives limited read access to information within the content document that is categorized as "public." The following table illustrates the available methods and the scope in effect when accessing the myWallet service through that method while mapped to this roleTemplate:

TABLE

| \_\_\_\_\_myWallet roleTemplate rt3\_\_\_\_\_ | |
|---|---|
| method | scope/name |
| query | onlyPublicElements |

The myWallet roleTemplate rt99 blocks access to the content document. Note that lack of a role in the roleList has the same effect as assigning someone to rt99. No methods/scope are in effect when accessing the myWallet service while mapped to this rt99 roleTemplate.

myWallet/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myWallet service:

TABLE myWallet/content

```
<m:myWallet changeNumber=" ..." instanceId=" ..."
   xmlns:m=" http://schemas.microsoft.com/hs/2001/10The/myWallet"
   xmlns:hs=" http://schemas.microsoft.com/hs/2001/10/core" >_{1..1}
   <m:card changeNumber=" ..." id=" ..." creator=" ..." >_{0..unbounded}
      <m:cat ref=" ..." >_{0..unbounded}</m:cat>
      <m:typeOfCard>_{1..1}</m:typeOfCard>
      <m:networkBrand>_{1..1}</m:networkBrand>
      <m:affiliateBrand>_{0..1}</m:affiliateBrand>
      <m:cardNumber>_{1..1}</m:cardNumber>
      <m:displayNumber>_{1..1}</m:displayNumber>
      <m:nameOnCard xml:lang=" ..." dir=" ..." >_{1..1}</m:nameOnCard>
      <m:description xml:lang=" ..." dir=" ..." >_{1..1}</m:description>
      <m:expirationDate>_{0..1}</m:expirationDate>
      <m:issueDate>_{0..1}</m:issueDate>
      <m:validFromDate>_{0..1}</m:validFromDate>
      <m:issueNumber>_{0..1}</m:issueNumber>
      <m:currency>_{1..1}
         <m:currencyCode>_{1..1}</m:currencyCode>
      </m:currency>
      <m:billingAddress>_{1..1}
         <hs:cat ref=" ..." >_{0..unbounded}</hs:cat>
         <hs:officialAddressLine xml:lang=" ..." dir=" ..." >_{0..1}</hs:officialAddressLine>
         <hs:internalAddressLine xml:lang=" ..." dir=" ..." >_{0..1}</hs:internalAddressLine>
         <hs:primaryCity xml:lang=" ..." dir=" ..." >_{0..1}</hs:primaryCity>
         <hs:secondaryCity xml:lang=" ..." dir=" ..." >_{0..1}</hs:secondaryCity>
         <hs:subdivision xml:lang=" ..." dir=" ..." >_{0..1}</hs:subdivision>
         <hs:postalCode>_{0..1}</hs:postalCode>
         <hs:countryCode>_{0..1}</hs:countryCode>
         <hs:latitude>_{0..1}</hs:latitude>
         <hs:longitude>_{0..1}</hs:longitude>
         <hs:elevation>_{0..1}</hs:elevation>
         <hs:velocity>_{0..1}
            <hs:speed>_{0..1}</hs:speed>
            <hs:direction>_{0..1}</hs:direction>
         </hs:velocity>
         <hs:confidence>_{0..1}</hs:confidence>
         <hs:precision>_{0..1}</hs:precision>
         {any}
      </m:billingAddress>
```

TABLE-continued

| myWallet/content |
|---|

```
    <m:paymentInstrumentsIssuerPuid>₀..₁</m:paymentInstrumentsIssuerPuid>
    {any}
  </m:card>
  <m:account changeNumber=" ..." id=" ..." creator=" ..." >₀..unbounded
    <m:cat ref=" ..." >₀..unbounded</m:cat>
    <m:typeOfAccount>₁..₁</m:typeOfAccount>
    <m:accountRoutingNumber>₀..₁</m:accountRoutingNumber>
    <m:accountNumber xml:lang=" ..." dir=" ..." >₁..₁</m:accountNumber>
    <m:displayNumber>₁..₁</m:displayNumber>
    <m:nameOnAccount xml:lang=" ..." dir=" ..." >₁..₁</m:nameOnAccount>
    <m:description xml:lang=" ..." dir=" ..." >₁..₁</m:description>
    <m:currency>₁..₁
      <m:currencyCode>₁..₁</m:currencyCode>
    </m:currency>
    <m:accountAddress>₁..₁
      <hs:cat ref=" ..." >₀..unbounded</hs:cat>
      <hs:officialAddressLine xml:lang=" ..." dir=" ..." >₀..₁</hs:officialAddressLine>
      <hs:internalAddressLine xml:lang=" ..." dir=" ..." >₀..₁</hs:internalAddressLine>
      <hs:primaryCity xml:lang=" ..." dir=" ..." >₀..₁</hs:primaryCity>
      <hs:secondaryCity xml:lang=" ..." dir=" ..." >₀..₁</hs:secondaryCity>
      <hs:subdivision xml:lang=" ..." dir=" ..." >₀..₁</hs:subdivision>
      <hs:postalCode>₀..₁</hs:postalCode>
      <hs:countryCode>₀..₁</hs:countryCode>
      <hs:latitude>₀..₁</hs:latitude>
      <hs:longitude>₀..₁</hs:longitude>
      <hs:elevation>₀..₁</hs:elevation>
      <hs:velocity>₀..₁
        <hs:speed>₀..₁</hs:speed>
        <hs:direction>₀..₁</hs:direction>
      </hs:velocity>
      <hs:confidence>₀..₁</hs:confidence>
      <hs:precision>₀..₁</hs:precision>
      {any}
    </m:accountAddress>
    <m:paymentInstrumentsIssuerPuid>₀..₁</m:paymentInstrumentsIssuerPuid>
    {any}
  </m:account>
  <m:subscription changeNumber=" ..." id=" ..." creator=" ..." >₀..unbounded
    <hs:trigger select=" ..." mode=" ..." baseChangeNumber=" ..." >₁..₁</hs:trigger>
    <hs:expiresAt>₀..₁</hs:expiresAt>
    <hs:context uri=" ..." >₁..₁ {any}</hs:context>
    <hs:to>₁..₁</hs:to>
  </m:subscription>
</m:myWallet>
```

The meaning of the attributes and elements shown in the table are set forth below, wherein in the syntax used in the table, boldface type corresponds to a blue node, and underlined type to a red node, as described above, and the minimum and maximum occurrence information (0, 1, unbounded) indicates whether an element or attribute is required or optional, and how many are possible, as also discussed above.

The /myWallet (minOccurs=1 maxOccurs=1) node includes a change number attribute, /myWallet/@changeNumber (minOccurs=0 maxOccurs=1). The changeNumber attribute is designed to facilitate caching of the element and its descendants. This attribute is assigned to this element by the .NET My Services system. The attribute is read-only to applications, with attempts to write this attribute silently ignored, (e.g., without generating an error). The /myWallet/@instanceId (string minOccurs=0 maxOccurs=1) attribute is a unique identifier typically assigned to the root element of a service. It is a read-only element and assigned by the .NET My Services system when a user is provisioned for a particular service.

The /myWallet/card (minOccurs=0 maxOccurs=unbounded) element encapsulates information associated with credit or debit card-like payment instruments. This element includes the /myWallet/card/@changeNumber (minOccurs=0 maxOccurs=1) changeNumber attribute, designed to facilitate caching of the element and its descendants. This attribute is assigned to this element by the .NET My Services system, and is read-only to applications. Attempts to write this attribute are silently ignored. The /myWallet/card/@id (minOccurs=0 maxOccurs=1) comprises a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myWallet/card/@creator (string minOccurs=0 maxOccurs=1) attribute identifies the creator in terms of useId, appId, and platformId of the node. The /myWallet/card/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myWallet/card/cat/@ref (anyURI minOccurs=0 maxOccurs=1) is an attribute that references a category definition (<catDef/>) element, using the rules outlined in the myCategories section of the present application.

The /myWallet/card/typeOfCard (string minOccurs=1 maxOccurs=1) is required to store the card type, for example, whether the type is a credit card, a debit card, and so forth. Valid values are defined in an enumeration list in the My Wallet schema. The /myWallet/card/networkBrand (anyURI minOccurs=1 maxOccurs=1) element is required, and is designed to store a reference to the global or regional/national well recognized and accepted card brand, also known as card type. This is to ensure a naming convention among various applications and/or services, so that data is usable across these applications and/or services. Examples are VISA, MasterCard, American Express, Discover, Diners Club, and so forth.

The /myWallet/card/affiliateBrand (string minOccurs=0 maxOccurs=1) element is optional, and is designed to store the affiliated brand (i.e. sub-brand) or private brand for the card. Examples are Carte Bleue (a co-branded VISA debit card used in France), NHL Platinum credit card (a co-branded MasterCard issued by MBNA), and so on. The My Wallet service will not restrict the list, but rather lets the application validate and define a list of supported cards.

The /myWallet/card/cardNumber (string minOccurs=1 maxOccurs=1) attribute is required. The schema includes the following validation rules for listed networkBrand types:

| TYPE | VALIDATION RULES |
| --- | --- |
| VISA | prefix 4, card# length 16 or 13, Luhn mod 10 check sum |
| Mastercard | prefix 51-55, card# length 16, Luhn mod 10 check sum |
| American Express | prefix 34 or 37, card# length 15, Luhn mod 10 check sum |
| Discover | prefix 6011, card# length 16, Luhn mod 10 check sum |
| Diners Club | prefix 300-305 or 36 or 38, card# length 14, Luhn mod 10 check sum |
| JCB | prefix 3, card# length 16, Luhn mod 10 check sum |

The /myWallet/card/displayNumber (string minOccurs=1 maxOccurs=1) field specifies the last four digits of the card number, and is a required, read-only field derived from the card number by the system. The /myWallet/card/nameOnCard (string minOccurs=1 maxOccurs=1) field stores the card holder's name, and is required. The /myWallet/card/nameOnCard/@xml:lang (minOccurs=1 maxOccurs=1) attribute is required and is used to specify an ISO 639 language code or an ISO 3166 country code as described in RFC 1766. The value of this attribute indicates the language type of the content within this element.

The /myWallet/card/nameOnCard/@dir (string minOccurs=0 maxOccurs=1) attribute is optional, and specifies the default layout direction for the localized string. Valid values include rtl (right to left), and ltr (left to right). The /myWallet/card/description (string minOccurs=1 maxOccurs=1) provides a short description for the card for easy reference (e.g., my Bank X Visa, my corporate Amex, and so on). The /myWallet/card/description/@xml:lang (minOccurs=1 maxOccurs=1) required attribute is used to specify an ISO 639 language code or an ISO 3166 country code as described in RFC 1766. The value of this attribute indicates the language type of the content within this element.

The /myWallet/card/description/@dir (string minOccurs=0 maxOccurs=1) comprises an optional attribute that specifies the default layout direction for the localized string. Valid values are rtl (right to left), and ltr (left to right). The /myWallet/card/expirationDate (dateTime minOccurs=0 maxOccurs=1) optionally stores the expiration date of a card, while the /myWallet/card/issueDate (dateTime minOccurs=0 maxOccurs=1) attribute optionally stores the date that this card is issued. The /myWallet/card/validFromDate (dateTime minOccurs=0 maxOccurs=1) attribute optionally stores the date from which the card is valid. Optional.

The /myWallet/card/issueNumber (string minOccurs=0 maxOccurs=1) field stores the issue number of the card, used by some types of debit cards, and is optional. The /myWallet/card/currency (minOccurs=0 maxOccurs=1) stores the billing currency of this card, and is also optional. The /myWallet/card/currency/currencyCode (string minOccurs=1 maxOccurs=1) attribute stores the three letter ISO 4217 currency code, e.g., USD (US dollar), GBP (United Kingdom pound), and so forth.

The /myWallet/card/billingAddress (minOccurs=1 maxOccurs=1) attribute stores the billing address of the card, and is required. The /myWallet/card/billingAddress/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myWallet/card/billingAddress/cat/@ref (anyURI minOccurs=0 maxOccurs=1) attribute references a category definition (<catDef/>) element using the rules outlined in the myCategories section of the present application.

The /myWallet/card/billingAddress/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element includes enclosing a street address, post office box address, private bag, or any other similar official address. Internal routing information such as department name, suite number within a building, internal mailstop number, or similar properties should be placed within the internalAddressLine element. The /myWallet/card/billingAddress/officialAddressLine/@xml:lang (minOccurs=1 maxOccurs=1) attribute is required, and used to specify an ISO 639 language code or an ISO 3166 country code as described in RFC 1766. The value of this attribute indicates the language type of the content within this element.

The /myWallet/card/billingAddress/officialAddressLine/@dir (string minOccurs=0 maxOccurs=1) is an optional attribute that specifies the default layout direction for the localized string. Valid values are rtl (right to left), and ltr (left to right). The /myWallet/card/billingAddress/internalAddressLine (string minOccurs=0 maxOccurs=1) element contains internal routing information relative to the address specified by the officialAddressLine. Items like department name, suite number within a building, internal mailstop number, or similar properties may be placed within this element. The /myWallet/card/billingAddress/internalAddressLine/@xml:lang (minOccurs=1 maxOccurs=1) required attribute is used to specify an ISO 639 language code or an ISO 3166 country code as described in RFC 1766. The value of this attribute indicates the language type of the content within this element.

The myWallet/card/billingAddress/internalAddressLine/@dir (string minOccurs=0 maxOccurs=1) optional attribute specifies the default layout direction for the localized string. Valid values are rtl (right to left), and ltr (left to right). The /myWallet/card/billingAddress/primaryCity (string minOccurs=0 maxOccurs=1) element defines the primary city for this address, while the /myWallet/card/billingAddress/primaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/card/billingAddress/primaryCity/@dir (string minOccurs=0 maxOccurs=1) optional attribute specifies the default layout direction for the localized string. Valid values are rtl (right to left), and ltr (left to right).

The /myWallet/card/billingAddress/secondaryCity (string minOccurs=0 maxOccurs=1) optional element defines the secondary city for this address. Example types for this element include city district, city wards, postal towns, and so forth. The /myWallet/card/billingAddress/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/card/billingAddress/secondaryCity/@dir (string minOccurs=0 maxOccurs=1) optional attribute specifies the default layout direction for the localized string. Valid values are rtl (right to left), and ltr (left to right).

The /myWallet/card/billingAddress/subdivision (string minOccurs=0 maxOccurs=1) element contains the official subdivision name within the country or region for this address. In the United States, this element would contain the two-letter abbreviation for the name of the state. This element is also commonly treated as the "first order admin subdivision" and will typically contain subdivision names referring to administrative division, Bundesstaat, canton, federal district, province, region, state or territory. The /myWallet/card/billingAddress/subdivision/@xml:lang (minOccurs=1 maxOccurs=1) is a required attribute is used to specify an ISO 639 language code or an ISO 3166 country code as described in RFC 1766. The value of this attribute indicates the language type of the content within this element, while the /myWallet/card/billingAddress/subdivision/@dir (string minOccurs=0 maxOccurs=1) optional attribute specifies the default layout direction for the localized string. Valid values are rtl (right to left), and ltr (left to right). The /myWallet/card/billingAddress/postalCode (string minOccurs=0 maxOccurs=1) element contains the official postal code for this address, while the /myWallet/card/billingAddress/countryCode (string minOccurs=0 maxOccurs=1) element contains the 2 letter ISO-3166 id of the country, dependency, or functionally equivalent region for this address.

The /myWallet/card/billingAddress/latitude (string minOccurs=0 maxOccurs=1) element specifies the latitude value for this address in units of decimal degrees while the /myWallet/card/billingAddress/longitude (string minOccurs=0 maxOccurs=1) element specifies the longitude value for this address in units of decimal degrees. The /myWallet/card/billingAddress/elevation (string minOccurs=0 maxOccurs=1) element specifies the elevation above sea level with respect to WGS84 geodetic datum, in units of meters. Geodetic datum WGS84 is required for these elements. The /myWallet/card/billingAddress/velocity (minOccurs=0 maxOccurs=1) element specifies the last reported velocity associated with this address. Of course for fixed addresses, the velocity node would either not be present, or speed would be zero indication stationary position. The /myWallet/card/billingAddress/velocity/speed (string minOccurs=0 maxOccurs=1) element specifies the last known speed associated with this report in units of meters per second. The /myWallet/card/billingAddress/velocity/direction (string minOccurs=0 maxOccurs=1) element specifies the last known direction associated with this report in units of degrees decimal. The /myWallet/card/billingAddress/confidence (string minOccurs=0 maxOccurs=1) element specifies a percentage value that indicates the confidence value that this location is accurate within the specified precision. The /myWallet/card/billingAddress/precision (string minOccurs=0 maxOccurs=1) element specifies the precision in meters of this location. The value defines a spherical zone that the location falls within.

The /myWallet/card/billingAddress/{any} (minOccurs=0 maxOccurs=unbounded) allows an application to store any extended billing address information deemed necessary. Future extensions to the schema are thus facilitated and simple to implement.

The /myWallet/card/paymentInstrumentsIssuerPuid (string minOccurs=0 maxOccurs=1) optional element is meant to store Passport ID of the issuer for this card, usually a financial institution.

The /myWallet/card/{any} (minOccurs=0 maxOccurs=unbounded) field type allows any new type of card information to be stored, whereby future extensions to the schema are thus facilitated and simple to implement.

The /myWallet/account (minOccurs=0 maxOccurs=unbounded) element encapsulates information associated with the account-like payment instruments. The account can be a traditional bank account, or, for example, the account can be an account with a service provider wherein charges to the account are accumulated and billed to the account holder on a regular basis, (like phone bills, Internet Service Provider bills, and so forth).

The /myWallet/account/@changeNumber (minOccurs=0 maxOccurs=1) changeNumber attribute is designed to facilitate caching of the element and its descendants. This attribute is assigned to this element by the .NET My Services system. The attribute is read-only to applications, and attempts to write this attribute are silently ignored.

The /myWallet/account/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myWallet/account/@creator (string minOccurs=0 maxOccurs=1) attribute identifies the creator in terms of userId, appId, and platformId of the node.

The /myWallet/account/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myWallet/account/cat/@ref (anyURI minOccurs=0 maxOccurs=1) attribute references a category definition (<catDef/>) element using the rules outlined in the myCategories section of the present application.

The /myWallet/account/typeOfAccount (string minOccurs=1 maxOccurs=1) required element is designed to store the account type. Examples include checking, savings, stored value account and billToAccount. Valid values are defined in the enumeration list in the schema.

The /myWallet/account/accountRoutingNumber (string minOccurs=0 maxOccurs=1) number identifies the issuer of this account in a particular banking system. In the United States, it is the ACH routing transit number. Optional, as it is only applicable to traditional banking accounts. The /myWallet/account/accountNumber (string minOccurs=1 maxOccurs=1) stores the account number, and is required. The /myWallet/account/accountNumber/@xml:lang (minOccurs=1 maxOccurs=1) required attribute is used to specify an ISO 639 language code or an ISO 3166 country code as described in RFC 1766. The value of this attribute indicates the language type of the content within this element.

The /myWallet/account/accountNumber/@dir (string minOccurs=0 maxOccurs=1) optional attribute specifies the default layout direction for the localized string. Valid values are rtl (right to left), and ltr (left to right). The /myWallet/account/displayNumber (string minOccurs=1 maxOccurs=1) stores the last four characters or digits of the account number, and is required. This will be a read-only field derived from account number by the system.

The /myWallet/account/nameOnAccount (string minOccurs=1 maxOccurs=1) specifies the account holder name. The /myWallet/account/nameOnAccount/@xml:lang (minOccurs=1 maxOccurs=1) is a required attribute is used to specify an ISO 639 language code or an ISO 3166 country code as described in RFC 1766. The value of this attribute indicates the language type of the content within this element. The /myWallet/account/nameOnAccount/@dir (string minOccurs=0 maxOccurs=1) optional attribute specifies the default layout direction for the localized string. Valid values are rtl (right to left), and ltr (left to right).

The /myWallet/account/description (string minOccurs=1 maxOccurs=1) provides a short description for the account for easy reference (e.g., my Bank X checking), and is required. The /myWallet/account/description/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/description/@dir (string minOccurs=0 maxOccurs=1) optional attribute specifies the default layout direction for the localized string. Valid values are rtl (right to left), and ltr (left to right).

The /myWallet/account/currency (minOccurs=0 maxOccurs=1) field specifies the currency of this account. The /myWallet/account/currency/currencyCode (string minOccurs=1 maxOccurs=1) indicates the three letter ISO 4217 currency code. Examples are USD (US dollar), GBP (United Kingdom pound), and so forth.

The /myWallet/account/accountAddress (minOccurs=1 maxOccurs=1) maintains the account address. The /myWallet/account/accountAddress/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid.

The /myWallet/account/accountAddress/cat/@ref (anyURI minOccurs=0 maxOccurs=1) attribute references a category definition (<catDef/>) element using the rules outlined in the myCategories section of the present application.

The /myWallet/account/accountAddress/officialAddressLine (string minOccurs=0 maxOccurs=1) element contains the most precise, official line for the address relative to the postal agency servicing the area specified by the city(s)/postalCode. When parsing an address for official postal usage, this element contains the official, parsable address line that the regional postal system cares about. Typical usage of this element would be to enclose a street address, post office box address, private bag, or any other similar official address. Internal routing information like department name, suite number within a building, internal mailstop number, or similar properties should be placed within the internalAddressLine element.

The /myWallet/account/accountAddress/officialAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/accountAddress/officialAddressLine/@dir (string minOccurs=0 maxOccurs=1) optional attribute specifies the default layout direction for the localized string. Valid values are rtl (right to left), and ltr (left to right).

The /myWallet/account/accountAddress/internalAddressLine (string minOccurs=0 maxOccurs=1) element contains internal routing information relative to the address specified by the officialAddressLine. Items like department name, suite number within a building, internal mailstop number, or similar properties may be placed within this element. The /myWallet/account/accountAddress/internalAddressLine/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/accountAddress/internalAddressLine/@dir (string minOccurs=0 maxOccurs=1) optional attribute specifies the default layout direction for the localized string. Valid values are rtl (right to left), and ltr (left to right).

The /myWallet/account/accountAddress/primaryCity (string minOccurs=0 maxOccurs=1) element defines the primary city for this address. The /myWallet/account/accountAddress/primaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/accountAddress/primaryCity/@dir (string minOccurs=0 maxOccurs=1) optional attribute specifies the default layout direction for the localized string. Valid values are rtl (right to left), and ltr (left to right). The /myWallet/account/accountAddress/secondaryCity (string minOccurs=0 maxOccurs=1) optional element defines the secondary city for this address. Example types for this element include city district, city wards, postal towns, and the like. The /myWallet/account/accountAddress/secondaryCity/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/accountAddress/secondaryCity/@dir (string minOccurs=0 maxOccurs=1) optional attribute specifies the default layout direction for the localized string. Valid values are rtl (right to left), and ltr (left to right).

The /myWallet/account/accountAddress/subdivision (string minOccurs=0 maxOccurs=1) contains the official subdivision name within the country or region for this address. In the United States, this element would contain the two letter abbreviation for the name of the state. This element is also commonly treated as the "first order admin subdivision" and will typically contain subdivision names referring to administrative division, Bundesstaat, canton, federal district, province, region, state, territory. The /myWallet/account/accountAddress/subdivision/@xml:lang (minOccurs=1 maxOccurs=1) required attribute is used to specify an ISO 639 language code or an ISO 3166 country code as described in RFC 1766. The value of this attribute indicates the language type of the content within this element. The /myWallet/account/accountAddress/subdivision/@dir (string minOccurs=0 maxOccurs=1) optional attribute specifies the default layout direction for the localized string. Valid values are rtl (right to left), and ltr (left to right).

The /myWallet/account/accountAddress/postalCode (string minOccurs=0 maxOccurs=1) element contains the official postal code for this address, while the /myWallet/account/accountAddress/countryCode (string minOccurs=0 maxOccurs=1) element contains the 2 letter ISO-3166 id of the country, dependency, or functionally equivalent region for this address.

The /myWallet/account/accountAddress/latitude (string minOccurs=0 maxOccurs=1) element specifies the latitude value for this address in units of decimal degrees while the /myWallet/account/accountAddress/longitude (string minOccurs=0 maxOccurs=1) element specifies the longitude value for this address in units of decimal degrees. The /myWallet/account/accountAddress/elevation (string minOccurs=0 maxOccurs=1) element specifies the elevation above sea level with respect to WGS84 geodetic datum, in units of meters. Geodetic datum WGS84 is required for these elements. The /myWallet/account/accountAddress/velocity (minOccurs=0 maxOccurs=1) element specifies the last reported velocity associated with this address. Of course for fixed addresses, the velocity node would either not be present, or speed would be zero indication stationary position. The /myWallet/account/accountAddress/velocity/speed (string minOccurs=0 maxOccurs=1) element specifies the last known speed associated with this report in units of meters per second. The /myWallet/account/accountAddress/velocity/direction (string minOccurs=0 maxOccurs=1) element specifies the last known direction associated with this report in units of degrees decimal. The /myWallet/account/accountAddress/confidence (string minOccurs=0 maxOccurs=1) element specifies a percentage value that indicates the confidence value that this location is accurate within the specified precision. The /myWallet/account/accountAddress/precision (string minOccurs=0 maxOccurs=1) element specifies the precision in meters of this location. The value defines a spherical zone that the location falls within.

The /myWallet/account/accountAddress/{any} (minOccurs=0 maxOccurs=unbounded) field allows for extensibility of the schema with respect to account address information.

The /myWallet/account/paymentInstrumentsIssuerPuid (string minOccurs=0 maxOccurs=1) optional element is meant to store the Passport ID of the issuer for this account. An issuer for an account can be a financial institution for traditional bank accounts. It can also be a service provider for stored value accounts.

The /myWallet/account/{any} (minOccurs=0 maxOccurs=unbounded) field allows for extensibility of the schema with respect to accounts in general.

The /myWallet/subscription (minOccurs=0 maxOccurs=unbounded) element defines a subscription node as described above in the subscription section.

myWallet/System

The system document is a global document for the service, having content and meaning that are independent of the puid used to address the service. The document is read only to all users. The system document contains a set of base items common to other services in the .NET My Services model, as described above in the common system section of the present application, (with myWallet as the *actual service name* to insert) and is extended to include service-specific global information by the following:

This schema outline in the table below illustrates the layout and meaning of the information for the myWallet service.

TABLE

| myWallet/system |
|---|
| <sys:system><br>  :<br>  : see common system<br>  :<br>  <sys:networkBrand idName=" ..." changeNumber=" ..."<br>  id=" ..." creator=" ..." >$_{0..unbounded}$<br>    <sys:description>$_{1..1}$</sys:description><br>    <sys:brandImageURL>$_{0..1}$</sys:brandImageURL><br>  </sys:networkBrand><br>  {any}<br></sys:system> |

The meaning of the attributes and elements shown in the preceding sample document outline are listed below, using the syntax described above for blue (bold) and red nodes (underlined). The common system items are described in the common system documents section above.

The /system/networkBrand (minOccurs=0 maxOccurs=unbounded) element encapsulates the networkBrand information for a payment instrument. The /system/networkBrand/@idName (string minOccurs=0 maxOccurs=1) maintains the name, while the /system/networkBrand/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/networkBrand/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/networkBrand/@creator (string minOccurs=0 maxOccurs=1) attribute identifies the creator in terms of userId, appId, and platformId of the node.

The /system/networkBrand/description (string minOccurs=1 maxOccurs=1) and the /system/networkBrand/brandImageURL (anyURI minOccurs=0 maxOccurs=1) are also provided to maintain relative financial network brand related information. The /system/{any} (minOccurs=0 maxOccurs=unbounded) provides extensibility.

Service-to-Service Communications Protocol

The various .NET MyServices services described above are loosely coupled services, and have the ability to share data with each other. It is thus possible for the data to be stored and managed by one service, regardless of how many services or applications make use of the data.

Generally, there are at least two ways that this data sharing can take place (assuming that appropriate security constraints are satisfied), a first of which is that one service that wants data queries another service that has the data, i.e., a pull model. Alternatively, a service that wants data can informs the service that has the data to send it the current copy of the data and places an outstanding request to send it any changes to that data. The said changes are sent asynchronously. This is a push model.

The .NET services defines verbs such as query, update, etc., which can be used as a basis for the pull data pipe between services. But for reasons of bandwidth optimization and robustness, the push model turns out to be a better choice for service to service communication. To this end, and in accordance with one aspect of the present invention, a service-to-service communication protocol (SSCP) is provided that supports a push model of data sharing between .NET MyServices services.

As used herein, a "publisher" refers to the .NET MyServices service which is the source of the data, while a "subscriber" refers to the .NET MyServices service that receives the data. In general, SSCP is a generic way for a .NET MyServices service to publish data changes to another .NET MyServices service. For example, SSCP does not make any assumptions on what data is being published, and the data may be from any source, e.g., .NET Contacts, .NET Profile, .NET Presence, .NET Inbox and so forth. SSCP also does not make any assumptions on which services can be publishers and which services can be subscribers. With SSCP, the same service can be a publisher and subscriber, publishers can publish to multiple subscribers and subscribers can subscribe to multiple publishers.

In general, a given service can publish/subscribe to a static list of other services, e.g., .NET Contacts (alternatively referred to as myContacts) may be configured with the list of services (e.g., .NET Profile/myProfile, .NET Inbox/myInbox and so on) that it wants to publish to and/or subscribe from, and this list will ordinarily not change. However, although the services are static, the instances of services are not. For example, once a service A is configured with the ability to publish or subscribe from service B, service A can do so with any instance of B For security reasons and the like, only .NET services can participate in data communication over SSCP.

For purposes of explanation, the present invention will be described with respect to a number of examples. However, while these examples correspond to likely scenarios and implementations, it is understood that the present invention is not limited to the particular examples used, but rather works with essentially any service's data communication with essentially any other service.

By way of a first example, consider a scenario of an email whitelist, which is a list of addresses that are allowed to send email to a particular recipient. Email from people belonging to the whitelist is put in the inbox; all other email is sent to a Junk Mail folder or to the deleted folder. Sometimes, the whitelist of a user is the same as her contact list—this would be the case with the .NET Inbox service. Even if this is not the case, it is fairly straightforward to store a whitelist in .NET Contacts by the use of a categorization mechanism present in .NET My Services.

Using the pull model, a white list can be implemented in a brute force fashion by arranging the .NET Inbox service (e.g., directly or in conjunction with an application program) to look at the sender address whenever a message is received. The .NET Inbox service may query the user's .NET Contacts service to see if the sender is in the contact list, whereby depending on the result of the query, .NET Inbox service either puts the message in the Inbox or puts it in the Junk Mail folder. As can be understood, this approach has obvious performance and scaling problems, as it is impractical or impossible for any service that handles hundreds of millions of email messages every day to use such a model; the sheer volume of traffic between .NET Inbox and .NET Contacts would bring down both the services.

In keeping with the present invention, a superior approach is for the .NET Inbox service to maintain a local copy of the whitelist, and subscribe to the .NET Contacts data of every user that has enabled a Junk Mail filter. Whenever changes occur to the whitelist, the .NET Contacts service uses SSCP to send those changes to the .NET Inbox service. Because the .NET Inbox service has a local copy of the white list, the performance/scaling issues are avoided, and any traffic between the .NET Inbox service and the .NET Contacts service occurs only when the whitelist changes in the .NET Contacts service, the .NET Inbox service subscribes to the .NET Contacts service document of a new user (or a user who has newly activated her junk mail filters) or the .NET Inbox service asks the .NET Contacts service to delete the subscription of a currently subscribed user.

Whitelists represent a simple publish-subscribe scenario in that user id's of the publisher and subscriber are the same. There is no requirement to take into account the role of the subscriber in the publisher's document, the assumption being that the same id plays the "owner" role on both sides of this communication channel. A more complex example is that of Live Contacts. Among the contacts managed by the .NET Contacts service, it is likely that many are users of .NET My Services. As a result, these contacts will have a .NET Profile service which manages data in their profile. In general, the data stored in a contact record of .NET Contacts is a subset of what is stored in that contact's profile, the boundaries of the said subset being determined by the role of the subscriber in the originating profile's role list. Thus, it is natural for .NET Contacts service to subscribe to the .NET Profile service to get the data for many of the contacts that it manages. From the other perspective, the .NET Profile service publishes its data to the .NET Contacts service.

In accordance with one aspect of the present invention, because, .NET Profile of this user publishes any changes to the .NET Contacts service of each appropriately authorized user (e.g., in a trusted circle of friends), whenever a user updates his profile, such as to change his or her email address, that change becomes immediately visible to the users in his or her trusted circle when they look up his email via their .NET Contacts service. Note that SSCP works across realms as well as between services in the same realm, e.g., a subscriber contacts service in a realm corresponding to MSN.com will be able to receive published changes from a publisher profile service in a realm corresponding to a provider such as XYZ.com, as well as from an MSN.com profile service.

The present invention favors the push model over the pull model. While the pull model is usually simpler, its conceivable use is limited to data pipes with low traffic and/or few subscribers. However, the push model, while a little more involved, provides a bandwidth optimized, robust data pipe and is ideal for high-traffic and/or large number of subscribers. To ensure robustness in such an environment of transient network and/or service failures, the present invention establishes common message formats, and an accepted set of primitives that the parties involved understand, so that transactions among them follow predictable logical sequences. SSCP also establishes handshaking procedures with ACK to handle lost messages.

FIG. 5 provides a representation of an example publisher-subscriber relationship. In FIG. 5, there are two .NET Profile services 501 and 502, each managing the profiles of three users, 504-506 and 508-510, respectively. There is one instance of a .NET Contacts service 520 shown in FIG. 5, which manages the contact information sets (521 and 522) of two users. As is understood, in an actual implementation, each of these services 501, 502 and 520 will typically manage the data for hundreds of millions of users. Note that for each user, access to the various contact information sets is on a per-identifier basis, e.g., a contact that is specified as a friend by a user may be assigned different access rights to the user's contacts than a contact that is specified as an associate by the same user.

As represented by the logical connections (shown in FIG. 5 as arrows) between the identity-based contacts and the identify-based profiles, the .NET Contacts service 520 has subscriptions in two different .NET Profile services, namely 501 and 502. Similarly, it is likely that a given publisher will publish to multiple subscribers. Note that a single service may act both as a subscriber and a publisher, e.g., in the whitelist example above, the .NET Contacts service is a publisher, while in the Live Contacts example, .NET Contacts service is a subscriber.

As represented in FIG. 5, when the profile information for User6 (maintained in .NET Profile 510) changes, change information is published by the .NET Profile service2 502 to the .NET Contacts service 520, as both User1 and User2 have subscribed for the service. Note that in FIG. 5 this is indicated by the arrow to a particular contact for each user. Note that within the context of a given topic, the data flows from the publisher to the subscriber. As also represented by the arrows in FIG. 5, only User2 has subscribed for profile changes of User5. Thus, when User5's profile is changed, the .NET Profile service 502 will publish the changes only to User2's .NET Contacts , and User1's .NET Contacts does not see these changes.

Returning to User6, consider that User1's role in User6's .NET Profile is that of an associate, while the role of User2 is that of a friend. When .NET Profile publishes the data, it sends data visible to an associate to User1, and data visible to a friend to User2. To this end, SSCP sends changes only to subscribed users within a subscribing service, and determines the role of each subscribing user and filters the data based on the role. Furthermore, if User3's role was also that of an associate, then only one copy of the associate data would be sent to the subscribing service, thus optimizing usage of network resources.

In order to accomplish such selecting data communication and filtering, the publisher maintains information about the identifier (ID) of the subscribing users, (e.g., User1, User2). Also, for each subscribing user, the publisher maintains the ID of the user's data for which they have subscribed, e.g., for User1 of .NET Contacts , this is User2 and User3 in .NET Profile service . The publisher also maintains information regarding the role of the subscribing user, e.g., in the context of User6 in .NET Profile service2, this is associate for User1, friend for User2).

In order for the publisher to keep this information current, the subscriber notifies the publisher whenever one of its users wants to unsubscribe or add a new subscription. For example, consider that User1 wants to add User4 into his live contact list, and remove User6. SSCP provides for transmission of subscription updates from subscriber to publisher using the same robust mechanism as are used for transmitting data changes.

The SSCP data pipe is robust and as such, is tolerant of transient network and/or service failures. At a fundamental level, to provide robustness, the publisher or subscriber needs to know that their transmitted messages have reached the destination, which means that each request from a sender should have a response from the receiver. If the message fails to reach the receiver, e.g. due to transient network and/or service failure, it is resent during the next update interval. This resend process is repeated until a response is received, with a specified number of such retries performed, after which no further attempts are made for an appropriately longer time to prevent a flood of retry messages, e.g., in the case of a catastrophic failure at the destination.

More subtle types of failures also need to be handled. For example, consider a publisher sending a request to the subscriber, informing it of the change in a stored profile. The subscriber ordinarily receives and processes the request, and sends a response to the publisher. However, if the network connection between the subscriber and the publisher has a transient failure and the response fails to reach the publisher, the publisher will re-send its request it request during the next update interval. In SSCP, the subscriber recognizes that this is a redundant request, and that it has already been processed, whereby the subscriber acknowledges the request again, but does not process it. In other words, a request is processed only once even if it is sent multiple times. Alternatively, a subscriber can process a repeat request any number of times, however the result of any subsequent processing should not change the first processing result. This property is referred to as idempotency.

For efficiency, because a typical service manages enormous amounts of data, partitioned over millions of users and the source data will be almost constantly changing, the protocol batches multiple requests and send them periodically. To this end, a protocol handler at the service periodically wakes up after a specified interval and sends the batched messages. Moreover, if a catastrophic failure (such as loss of power) occurs, this state data regarding the messages to send should not be lost, so data pertaining to protocol state should be stored in a durable manner, e.g., persisted to a hard disk.

As generally represented in FIG. 6, SSCP is implemented at a publisher (service) 600 and subscriber (service) 610 by respective protocol handlers 602, 612, such as daemon processes or the like running with respect to a service. The publisher 600 and subscriber 610 exchange messages, and use this as a mechanism to communicate changes.

The requirements of the protocol dictate that SSCP handlers 602, 612 maintain several pieces of data, the sum total of which represents the state of a publisher or subscriber. As conceptually represented in FIG. 6, this data can be viewed as being segmented over several data structures 604-618. Note however that the arrangements, formats and other description presented herein are only logically represent the schema; the actual storage format is not prescribed, and an implementation may store in any fashion it deems fit as long as it logically conforms to this schema.

A publisher 600 communicates with a subscriber 610 using request and response messages. For example, when data changes at the publisher 600, the publisher 600, sends a request message to the subscriber 610 informing the subscriber that data has changed, normally along with the new data. The subscriber 610 receives the message, makes the required updates, and sends back an ACK message acknowledging that the message was received and that the changes were made. A subscriber 610 can also send a request message, such as when the subscriber 610 wants to subscribe or unsubscribe to a piece of datum. When the publisher 600 receives this message, the publisher 600 updates its list of subscriptions (in a publications table 608) and sends back a response acknowledging the request. Note that SSCP is agnostic to whether a response message for a given request is synchronous or asynchronous.

Thus, there are two primary parts to SSCP, a first from the publisher to the subscriber, which deals with sending changes made to the publisher's data, and a second from subscriber to the publisher, which deals with keeping the list of subscriptions synchronized. Furthermore, every service is required to provide notification to all other services that have subscriptions with it, or services with which it has subscriptions, when it is going offline or online.

The table below summarizes request messages, each of which having a corresponding response (e.g., ACK) message.

publisher service 600 sets the RetryCount parameter to zero and begins resending the queued up requests over again. This longer time (before beginning the retry cycle), is configurable by the parameter ResetInterval.

Below is the summary of these protocol parameters:

TABLE 1

PROTOCOL PARAMETERS

| Parameter | Use |
| --- | --- |
| UpdateInterval | The interval after which the protocol handler wakes up and processes batched requests. |
| RetryCount | The number of times we retry a connection before assuming the remote service is dead. |
| ResetInterval | The interval after which a service marked as dead is retested for aliveness. |

TABLE 1

REQUEST MESSAGES

| Message | Description | Type | From/To |
| --- | --- | --- | --- |
| UpdateSubscriptionData | Used by the publisher to publish changes to its data | Request | Publisher to Subscriber |
| updateSubscriptionDataResponse | Used by the subscriber to ACK updateSubscriptionData | Response | Subscriber to Publisher |
| UpdateSubscriptionMap | Used by the subscriber to inform the publisher that subscriptions have been added or deleted | Request | Subscriber to Publisher |
| UpdateSubscriptionMapResponse | Used by the publisher to ACK updateSubscriptionMap | Response | Publisher to Subscriber |
| ServiceStatus | Used by both publisher and subscriber to inform that they are going offline, or have come online | Request | Both directions |
| Standard .NET My Services ack | Used by both publisher and subscriber to ACK serviceStatus request | Response | Both directions |

Protocol parameters are supported by both the publisher and the subscriber and control the behavior of the protocol.

As noted above, SSCP supports the ability to batch request messages. Whenever there is a need to send a request message, such as when there are changes in publisher data or subscriptions, the service puts the corresponding request message into a publisher message queue 606. Periodically, the protocol handler 602 in the publishing service 600 wakes up and processes the messages in the queue 606. This period is called as the UpdateInterval, and is a configurable parameter.

To satisfy the robustness requirement, the publisher's protocol handler 602 needs to periodically resend requests until the publisher service 600 receives an acknowledge message (ACK). If the ACK for a message is successfully received, this message is purged from the queue 606. Until then, the message remains in the queue, flagged as having been sent at least once, so it will be retried at the next update interval. The number of times the publisher the publisher service 600 retries sending a message to the subscriber service 610 is configurable by the parameter RetryCount, i.e., after retrying this many times, the publisher service 600 assumes that the subscriber service 610 is dead. Then, once the maximum number of retries is over, the publisher service 600 waits for a relatively longer time. Once this longer time is elapsed, the Thus, to implement SSCP, the protocol handlers 602, 610 at the publisher and subscriber, respectively, track of several pieces of information, such as in their respective tables 604-618.

As with .NET in general, SSCP relies on the entities (services and users) being uniquely identifiable by the use of identifiers, e.g., every user in .NET has a unique identifier assigned by the Microsoft® Passport service. Each service, be it acting as a publisher or subscriber, also has a unique identifier, and in practice, a service ID will be a certificate issued by a certification authority.

Since there are various different kinds of identifiers, the following naming conventions are used herein:

SID Generic Service Identifier

PSID Publishing Service Identifier

SSID Subscribing Service Identifier

PUID Publishing User Identifier (PUID of myPublishingService user)

SUID Subscribing User Identifier (PUID of mySubscribingService user)

To send a request or a response, the service needs to know where the target is located, and, to ensure proper handling of the number of retries for a particular service, the handler needs to keep track of how many retries have been done. As mentioned above, this information is kept in the connections table, e.g., the connections table 604 for the publishing service 600 and the connections table 614 for the subscribing service 610. The following sets forth the information included in a connections table:

| SID | TO | CLUSTER | RETRY |
|-----|----|---------|-------| wherein "SID" comprises the service ID of a Subscriber or Publisher, "TO" comprises the URL at which the service is expecting requests comprises, "CLUSTER" comprises the cluster number of this service and "RETRY" comprises the current retry number of the service. There is one entry in this table for every target service. For a publisher 600, this means for each service that has one or more subscriptions registered with it; for a subscriber, this means every publisher that it has one ore more subscriptions with. When RetryCount<RETRY<ResetInterval, the target service is assumed to be dead. Note that when an unknown service is recognized (i.e., one that is not present in the connections table), an attempt is made to contact immediately, without waiting until the next interval.

As also represented in FIG. 6, a publications table 608 is used by the publisher 600 to track the users across the services that have subscriptions with it. The publications table 608 includes records with the following fields:

| PUID | SUID | SSID | ROLE | CN |
|------|------|------|------|----| wherein PUID comprises the identifier of the publishing user, SUID comprises the identifier of the subscribing user, SSID comprises the identifier of the subscribing service, ROLE comprises the role assign to this SUID and CN comprises the last known change number of the publisher's data which was delivered to the subscriber (for updating deltas). There is one row (record) in the publications table 608 for each subscribing user/publishing user/subscribing service combination. The CN field is required to ensure recovery from certain catastrophic failures, as described below. The publications table 608 may be made visible at the schema level, but ordinarily should be read-only.

In general, given a publishing service P and a subscribing service S, there will exist a [possibly empty] set SM={(PUi, SUi), for i=1 to n} such that PUi is a user managed by P, SUi is a user managed by S, and SUi subscribes to PUi's data. The set SM is referred to as the subscription map of P with respect to S. The subscription map is obtained by the following query:

SELECT PUID, SUID

FROM PUBLICATIONS

WHERE SSID=S

As further represented in FIG. 6, the publisher 600 includes a publications queue table 606 that is used by the publisher for batching requests until the protocol handler 602 sends the requests when the UpdateInterval time is achieved. The publisher also retries requests for which a response has not been received, and thus tracks messages that need to be sent for the first time, or need to be resent, in the publications queue table 606.

An entry in the table 606 looks like this:

| SUID | PUID | SSID |
|------|------|------| wherein SUID comprises the identifier of the subscribing user, PUID comprises the identifier of the publishing user, and SSID comprises the identifier of the subscribing service. Note that for practical reasons, the publication queue 606 does not store messages, because a publisher services millions of users, whereby at any given instant, the publications queue 606 is likely have thousands of entries, and thus the amount of change data may be enormous. Thus, rather than storing the change data for each message in the table 608, the publisher 600 uses the entries in the queue table 606 to look up the ROLE of the SUID (from the publications table 608), and dynamically generates the request message during an update interval.

Turning to the subscriber service 610, a subscriptions table 618 is used by the subscriber 610 to track of its subscriptions that are in effect. An entry in the table 618 looks like this:

| SUID | PUID | PSID | CN |
|------|------|------|----| wherein SUID comprises the identifier of the subscribing user, PUID comprises the identifier of the publishing user, PSID comprises the identifier of the publishing service, and CN comprises the last known change number received from the publisher. Note that the existence of a row in this table implies that the associated publishing service 600 has one or more associated entries in its publications table 608. The CN field is required to ensure that publisher retries are idempotent.

When a subscription is added, the subscribing user specifies the PUID of the user whose data he or she wants to subscribe to. For example, if a user1 changes a telephone number in user1's profile, user2 can subscribe to see the change in user2's contacts, whereby (if user2 is properly authorized) the profile service becomes a publisher of user1's changes and the contacts service becomes of subscriber of user1's changes. The subscriber queries .NET Services (myServices) to find out the ID of the publisher (PSID) and stores the SUID/PUID/PSID in subscriptions table 618.

A subscriptions queue table 616 is used by the subscriber 610 to batch its requests for sending by the protocol handler 610 whenever the UpdateInterval timer goes off. Also, the subscriber is required to retry requests for which a response has not been received, and thus keeps track of messages that need to be sent for the first time, or need to be resent, which is also done in the subscriptions queue table 616. An entry in the table looks like this:

| SUID | PUID | PSID | OPERATION | GENERATION |
|------|------|------|-----------|------------| wherein SUID comprises the identifier of the subscribing user, PUID comprises the identifier of the publishing user, PSID the comprises the identifier of the publishing service, OPERATION comprises the Boolean (TRUE is an addition of a subscription and FALSE is a deletion of a subscription) and GENERATION indicates whether this message is fresh or has been sent one or more times already. In one implementation, the subscription queue 616 does not store the messages, but rather during an update interval, the protocol handler simply looks at the OPERATION field (which indicates whether this request is to add a subscription or delete a subscription) and dynamically generates the appropriate request message.

As an example of the use of GENERATION, consider a user adding a subscription, but deciding to delete it before the publisher has responded to the original add request. If the addition and deletion happened within the same update interval, that is, the add request has not been sent to the publisher yet, the row can simply be deleted from the queue 616. However, if the addition happened during a previous update interval, the add request was sent to the publisher, but an ACK was not received. In this case, the row cannot simply be deleted from the queue, as the publisher may have already received the add request and updated its subscription map. Thus, a delete request needs to be sent. To send a delete request, the OPERATION bit is changed from TRUE to FALSE. Then, when the subscriber sends the message again during the next update interval, the publisher simply deletes an added subscription. Note that if the publisher did not receive the original add or delete requests, it is equivalent to asking it to add an existing row or delete a non-existent row, which is handled by the idempotency rules.

As set forth in TABLE1 above, SSCP defines several messages and the responses thereof.

The updateSubscriptionData message is used when a user's document gets modified, to send change information to the subscribers. When a document is modified, the publishing service 600 checks the contents of the publications table 608 for interested subscribers by issuing the following logical query:

SELECT * FROM PUBLICATIONS

WHERE PUID=% AFFECTED_PUID %

GROUP BY SSID, ROLE

The publisher 600 uses the resultant information to create an entry in the queue; the said entry records the information necessary to construct an updateSubscriptionData message to each affected subscribing service. At the next update interval, for the set of distinct ROLES used within the publication queue entries, an associated set of filtered data is created in a service-dependent manner. The data is then factored by SSID, and an updateSubscriptionData message is created for each affected subscriber and sent arrives. The message format for updateSubscriptionData follows the following schema using the XMI conventions:

```
<updateSubscriptionData topic="###">1..1
    <updateData publisher="..."
        changeNumber="###">0..unbounded
        <subscriber>0..unbounded</subscriber>
        <subscriptionData>1..1</subscriptionData>
    </updateData>
</updateSubscriptionData>
```

The data contained in the subscriptionData entity is defined by the participants in the service-to-service communication. Services which engage in multiple service-to-service communications should use the @topic attribute to disambiguate the meaning of the content. The @topic attribute is a URI and is specific to the instance of service-to-service communication. For instance the .NET Profile to .NET Contacts communication could use a URI such as "urn:microsoft.com:profile-contacts:1.0." No service should attempt to accept an updateSubscriptionMap request for any conversation that they have not been explicitly configured to accept.

The format of the response message, updateSubscriptionDataResponse, follows the following schema using the XMI conventions:

```
<updateSubscriptionDataResponse topic="###">1..1
    <updatedData publisher="...">0..unbounded
        <subscriber>0..unbounded</subscriber>
    </updatedData>
    <deleteFromSubscriptionMap subscriber="..." />0..unbounded
</updateSubscriptionDataResponse>
```

The function of <updatedData> is to inform the publisher, while the <deleteFromSubscriptionMap> is used by the subscriber to tell the publisher that this SUID has been deleted, as described below. Note that if a response is received for data that is not subscribed, an immediate delete may handle such a response.

The updateSubscriptionMap message is used when a set of one or more users changes their subscription status(es). When this occurs, the set of changes are sent to the affected publishers within an updateSubscriptionMap message. When the publisher receives this message it updates the records in the publications table 608. It is not an error to add an entry more than once, nor to delete a non-existent entry. In both these cases the response is formatted so that success is indicated. This is required to ensure that retries are idempotent.

The request message format for updateSubscriptionMap follows the following schema using the XMI conventions:

```
<updateSubscriptionMap topic="###">1..1
    <addToSubscriptionMap subscriber="...">0..unbounded
        <publisher>0..unbounded</publisher>
    </addToSubscriptionMap>
    <deleteFromSubscriptionMap subscriber="...">0..unbounded
        <publisher>0..unbounded</publisher>
    </deleteFromSubscriptionMap>
</updateSubscriptionMap>
```

The addToSubscriptionMap section is used to make additions to the subscriptionMap, while the deleteFromSubscriptionMap removes entries.

The response message for updateSubscriptionMapResponse is formatted according to the following schema using the XMI conventions:

```
<updateSubscriptionMapResponse topic="###">1..1
    <addedToSubscriptionMap subscriber="...">0..unbounded
        <publisher>0..unbounded</publisher>
    </addedToSubscriptionMap>
    <deletedFromSubscriptionMap subscriber="...">0..unbounded
        <publisher>0..unbounded</publisher>
    </deletedFromSubscriptionMap>
    <unknownPID publisher="..."/>0..unbounded
</updateSubscriptionMapResponse>
```

The <addedToSubscriptionMap> and <deletedFromSubscriptionMap> provide status information, while the entity <unknownPID> is used in situations where a publishing user is deleted.

Services also need to send out messages when they come on-line, e.g., to wake up other services which have stopped sending them messages. To this end, whenever a service is going offline or coming online, the service should send out the following message to its partner services stored in its connections table (604 if a publisher, 614 if a subscriber, although it is understood that a service may be both a publisher and a subscriber and thus access both tables at such a time). The format of this message using the XMI conventions is:

```
<serviceStatus>1..1
    <online/>0..1
    <offline/>0..1
</serviceStatus>
```

Only one of the online or offline entities should be sent in any given message.

There is no defined response format for this message, as the normal .NET My Services ACK or fault response supplies the information needed.

By way of explanation of the operation of SSCP, a protocol handler wakes up when the interval timer goes off, whereby the handler sends the queued up requests, or when a request is received from another service, whereby the handler performs the requested action and sends a response.

For purposes of this explanation of SSCP, a "Live Contacts" example, as generally discussed above, will be used herein. In the example, generally represented in FIG. 7, three .NET Profile services, having IDs of $PSID_1$, $PSID_2$, and $PSID_3$, will be described. $PSID_1$ contains the profile documents of three users, namely $PUID_{11}$, $PUID_{12}$, and $PUID_{13}$; $PSID_2$ contains profile documents of two users: $PUID_{21}$ and $PUID_{22}$; and $PSID_3$ contains profile documents of two users: $PUID_{31}$ and $PUID_{32}$. There are two .NET Contacts services whose IDs are SSID1 and SSID2, wherein SSID1 manages contact documents of three users, $SUID_{11}$, $SUID_{12}$, and $SUID_{13}$, and SSID2 manages contact documents of two users $SUID_{21}$ and $SUID_{22}$.

Consider an initial subscription map, generally represented in FIG. 7, indicating with respect to $PSID_1$:

$PUID_{11}$: friend($SUID_{11}$), associate($SUID_{12}$)

$PUID_{12}$: other($SUID_{21}$)

$PUID_{13}$:

with respect to $PSID_2$:

$PUID_{21}$: friend($SUID_{11}$)

$PUID_{22}$: friend($SUID_{21}$,$SUID_{22}$), associate($SUID_{12}$)

and with respect to $PSID_3$:

$PUID_{31}$: associate($SUID_{11}$), other($SUID_{13}$)

$PUID_{32}$: friend($SUID_{21}$), associate($SUID_{22}$)

and also indicating with respect to $SSID_1$:

$SUID_{11}$: $PUID_{11}$, $PUID_{21}$, $PUID_{31}$ $SUID_{12}$: $PUID_{11}$, $PUID_{22}$ $SUID_{13}$: $PUID_{31}$ and with respect to $SSID_2$:

$SUID_{21}$: $PUID_{12}$, $PUID_{22}$, $PUID_{32}$ $SUID_{22}$: $PUID_{22}$, $PUID_{32}$

As described above, for the example data, the two contacts services each include a connections table. For $SSID_1$ this table (with included information such as cluster and URL omitted for simplicity) looks like:

| $SSID_1$ CONNECTIONS Table |
|---|
| $PSID_1$ |
| $PSID_2$ |
| $PSID_3$ | while for $SSID_2$ the connections table looks like:

| $SAID_2$ CONNECTIONS Table |
|---|
| $PSID_1$ |
| $PSID_2$ |
| $PSID_3$ |

As described above, in addition, the three profile services each contain a publications table. For $PSID_1$ this table (with included information such as change number omitted for simplicity) looks like:

| $PSID_1$ PUBLICATIONS Table | | | |
|---|---|---|---|
| $PUID_{11}$ | $SUID_{11}$ | $SSID_1$ | friend |
| $PUID_{11}$ | $SUID_{12}$ | $SSID_1$ | associate |
| $PUID_{12}$ | $SUID_{21}$ | $SSID_2$ | other | which for $PSID_2$ looks like:

| $PSID_2$ PUBLICATIONS Table | | | |
|---|---|---|---|
| $PUID_{21}$ | $SUID_{11}$ | $SSID_1$ | friend |
| $PUID_{22}$ | $SUID_{12}$ | $SSID_1$ | associate |
| $PUID_{22}$ | $SUID_{21}$ | $SSID_2$ | friend |
| $PUID_{22}$ | $SUID_{22}$ | $SSID_2$ | friend | and for PSID3 this looks like:

| $PSID_3$ PUBLICATIONS Table | | | |
|---|---|---|---|
| $PUID_{31}$ | $SUID_{11}$ | $SSID_1$ | associate |
| $PUID_{31}$ | $SUID_{13}$ | $SSID_1$ | other |
| $PUID_{32}$ | $SUID_{21}$ | $SSID_2$ | friend |
| $PUID_{32}$ | $SUID_{22}$ | $SSID_2$ | associate |

If during an update interval on $SSID_1$, the user $SUID_1$ adds links to $PUID_{12}$ and $PUID_{32}$ and deletes the link from $PUID_{11}$, while $SUID_{12}$ deletes the link to $PUID_{11}$ the contents of the subscriptions queue for $SSID_1$ is:

| $SSID_1$ SUBSCRIPTIONS_QUEUE | | | | |
|---|---|---|---|---|
| $SUID_{11}$ | $PUID_{12}$ | $PSID_1$ | TRUE | 0 |
| $SUID_{11}$ | $PUID_{32}$ | $PSID_3$ | TRUE | 0 |
| $SUID_{11}$ | $PUID_{11}$ | $PSID_1$ | FALSE | 0 |
| $SUID_{12}$ | $PUID_{11}$ | $PSID_1$ | FALSE | 0 |

When processed, this table will generate two different updateSubscriptionMap requests that are sent to the two affected .NET Profile services.

$PSID_1$ is sent:

```
<updateSubscriptionMap topic="####">
    <addToSubscriptionMap subscriber="SUID11">
        <publisher>PUID12</publisher>
    </addToSubscriptionMap>
    <deleteFromSubscriptionMap subscriber="SUID11">
        <publisher>PUID11</publisher>
    </deleteFromSubscriptionMap>
    <deleteFromSubscriptionMap subscriber="SUID12">
        <publisher>PUID11</publisher>
    </deleteFromSUbscriptionMap>
</updateSubscriptionMap>
``` and $PSID_3$ is sent:

```
<updateSubscriptionMap topic="####">
    <addToSubscriptionMap subscriber="SUID11">
        <publisher>PUID32</publisher>
    </addToSubscriptionMap>
</updateSubscriptionMap>
```

After receiving these messages, each .NET Profile service updates the contents of their publications table as follows (with the CN change number column omitted).

For $PSID_1$, the resulting table looks like:

| $PSID_1$ PUBLICATIONS Table | | | |
|---|---|---|---|
| $PUID_{12}$ | $SUID_{21}$ | $SSID_2$ | Other |
| $PUID_{12}$ | $SUID_{11}$ | $SSID_1$ | associate | and for $PSID_3$, the resulting table looks like:

| $PSID_3$ PUBLICATIONS Table | | | |
|---|---|---|---|
| $PUID_{31}$ | $SUID_{11}$ | $SSID_1$ | associate |
| $PUID_{31}$ | $SUID_{13}$ | $SSID_1$ | Other |
| $PUID_{32}$ | $SUID_{11}$ | $SSID_1$ | Other |
| $PUID_{32}$ | $SUID_{21}$ | $SSID_2$ | Friend |
| $PUID_{32}$ | $SUID_{22}$ | $SSID_2$ | associate |

Based on the original configuration, $PUID_{11}$ changes the contents on its profile, whereby $PSID_1$ constructs the following updateSubscriptionData message to $SSID_1$:

```
<updateSubscriptionData topic="####">
    <updateData publisher="PUID11" changeNumber="###">
        <subscriber>SUID11</subscriber>
        <subscriptionData>friend-info</subscriptionData>
    </updateData>
    <updateData publisher="PUID11" changeNumber="###">
        <subscriber>SUID12</subscriber>
        <subscriptionData>associate-info</subscriptionData>
    </updateData>
</updateSubscriptionData>
```

Note that the message is split between two updateData blocks because of different roles being assigned. If $PUID_{22}$ were to change their profile information this would result in $PSID_2$ sending out two updateSubscriptionData messages to $SSID_1$ and $SSID_2$.

The message to $SSID_1$:

```
<updateSubscriptionData topic="####">
    <updateData publisher="PUID22" changeNumber="###">
        <subscriber>SUID12</subscriber>
        <profileData>associate-information</profileData>
    </updateData>
</updateSubscriptionData>
```

The message to $SSID_2$:

```
<updateSubscriptionData topic="####">
    <updateData publisher="PUID22" changeNumber="###">
        <subscriber>SUID21</subscriber>
        <subscriber>SUID22</subscriber>
        <profileData>friend-information</profileData>
    </updateData>
</updateSubscriptionData>
```

Note in this case, the message to $SSID_2$ only contains one copy of the data optimizing for identical roles.

Thus, as demonstrated above, and in accordance with one aspect of the present invention, the amount of information that is transmitted from one service to another is significantly reduced in SSCP because the change information for one user at a publisher service that is subscribed to by multiple users at a subscriber service who are assigned the same role at the publishing service, are aggregated into a single message. In other words, the publisher operates in a fan-in model to put change information together based on their roles, rather than separate it per user recipient, and leaves it up to the subscriber to fan the information out to the appropriate users. By way of example, a user may change his profile to reflect a new telephone number, address, occupation and so forth; based on what they are authorized to see, e.g., as friends (who can see all such changes) or associates (who can only see telephone number and occupation changes), SSCP constructs a message with one copy of the friends data and one copy of the associates data, and sends this message to the subscriber. The implicit assumption in this description is that all the subscribers reside on the same service. Should any of the subscribers reside on a different service, a separate message will be sent to that service, following the same aggregation principles outlined above.

SSCP is a robust protocol which is able to handle many different kinds of failure scenarios, including when the publisher fails, the subscriber fails, the link between publisher and subscriber goes down before the subscriber can respond (after it has received a request), the link between publisher and subscriber goes down before the publisher can respond (after it has received a request), the publisher loses the subscription map, and the subscriber loses published data. In general, these failure scenarios are handled by message retries and idempotency, as generally described below.

Message retries will be described with respect to an example that assumes the publisher sends the request message. However the message-retry mechanism applies equally well when the subscriber sends the retry message. When the publisher sends a request message, the publisher sends the message from the publications queue and waits for a response to this message. If the publisher gets a response, it deletes the message from the queue, otherwise it keeps the message in the queue and resends it the next time Update Interval timer goes off. As described above the number of retries occurs a specified maximum number of times, after which the subscriber is considered dead. After some longer interval time, the subscriber is automatically tested for aliveness, and the process begins all over. This aliveness testing can also be limited to some number of times. This method ensures that an alive subscriber does not miss an updateSubscriptionData message.

As described above, retry attempts should idempotent—that is, multiple retries of a request should behave as if the request had been sent only once. Idempotency is achieved by keeping track of the change number, or CN, which is a column in the publications and subscriptions tables as described above. Note that the underlying service implementation has change number data and keep track of it, entirely independent of SSCP. As used herein, change numbers are represented as an as an integer sequence, although it is understood that change numbers need not be sequential, but may be whatever the service has, as long as it increases (or decreases) monotonically. Note also that the smallest unit of change is a .NET blue node, the smallest query-able, cacheable, unit of data in .NET.

In general, when a fresh subscription is created, the publisher 600 adds a row into the publications table 608 (FIG. 6), with CN being set to the lower (upper) bound for the change number. Note that since every .NET blue node already has a change number associated with it, this value is guaranteed to be available. The subscriber 610 also keeps track of the value of this CN in its subscriptions table 618. Whenever the publisher 600 sends an updateSubscriptionData request to the subscriber, it includes the value of CN that it currently has for this [.NET blue]node. It records this CN in the publications table 608.

On receiving the updateSubscriptionData message, the subscriber 610 updates its copy of the CN (present in the CN field of subscriptions table 618) to the new value. If, due to a transient network failure, the publisher 600 fails to receive the response message from the subscriber, the publisher resends the request message again at the next update interval. On receiving this request, the subscriber inspects the CN, and determines that it has already processed this message because the CN in the message is the same as the CN that it has. The subscriber treats this as a no-op with respect to making any update, and sends back a response whereby the publisher will normally receive it and delete this message from the message queue. The net result is that any message received multiple times by the subscriber is processed exactly once, i.e., retries are idempotent.

The subscriber achieves idempotency because when a publisher receives a request to add a preexisting entry to its subscription map, it should treat this as a no-op, and not return an error. When the publisher receives a request to delete a non-existent entry from its subscription map, it should treat this as a no-op and not return an error. As can be readily appreciated, multiple add or delete from subscription map requests behave as if there was only one such request.

If the publisher fails, the publisher will not be able to respond to subscriber requests to update the subscription map. This is handled by resending the message until a response is received. As with other retries, long-term or catastrophic failures are handled by having a limit on the number of retries and waiting for a longer time before starting all over, and then if still no response after some number of "longer" time cycles, requiring the attempted recipient to initiate contact.

If down, the publisher will also not receive any responses that the subscriber may have sent to its updateSubscriptionData requests. From the point of view of the subscriber, this is logically indistinguishable from the case where the link between subscriber and publisher fails, and is handled as described below.

Subscriber failures are very similar to what happens when the publisher fails. The subscriber continues to resend the updateSubscriptionMap requests until it receives a response from the publisher, or the retry limit is reached, whereupon the retry attempts will be held off for a longer delay time. As in the publisher case, the non-reception of responses by the subscriber is the same as a link failure, the handling of which is explained below.

In the case where the link between the publisher and subscriber fails, the subscriber has sent an updateSubscriptionMap message, the publisher has processed this message and sent a response, but the subscriber does not receive the response. As described above, this causes the subscriber to resend the message. Thus the publisher receives a duplicate updateSubscriptionMap message from the subscriber, detected via the change number. Since retries are idempotent, the publisher simply sends back a response to the subscriber. A subscriber to publisher link failure is handled similarly.

Occasionally, a PUID may be deleted from the publisher and for some reason the subscriber does not get notified of this event. When a subscriber sends an updateSubscriptionMap request concerning a PUID that no longer exists in the publisher, the publisher comes back with the <unknownPID> entity in the response. This tells the subscriber to update its image of the subscription map.

Similarly, a SUID may be occasionally deleted at the subscriber and in general, the publisher has no way of knowing it. On data change, the publisher sends an update request to the deleted SUID, and when this happens, the subscriber sends a <deleteFromSubscriptionMap> entity in its response to notify the publisher of the SUID deletion. This tells the publisher to update its subscription map.

One catastrophic form of failure is when a publisher loses its subscription map or the subscriber loses its subscription data. This can cause various levels of data loss. For example, if the publisher has experienced a catastrophic failure, such as disk crash, the publisher needs to revert to data from a back up medium such as tape. As a result, its subscription map is out of date. For the subscriber, a similar situation makes its subscribed data out of date.

In such an event, the service that experienced the loss sends a message requesting an update. The publisher's subscription map can be brought up to date by the information stored in subscriptions table in the subscriber, while a subscriber's data can be made up to date by the subscription map and the change number stored in the publications table.

The following section describes pseudocode for implementing key aspects of publisher and subscriber protocol handlers.

Figure 8:
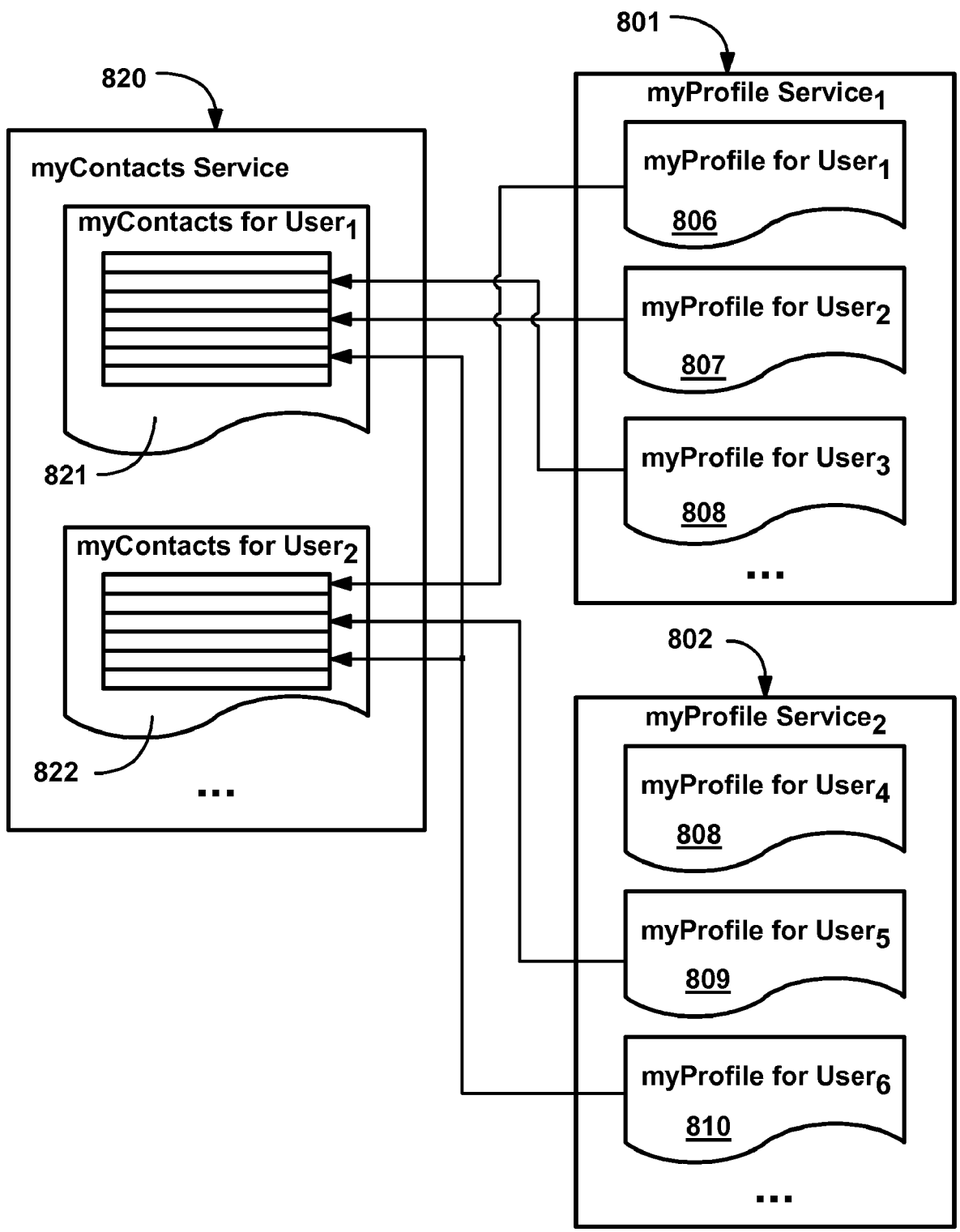
FIGS. 8-10 are block diagram generally representing publishers and subscribers interconnected via a service-to-service communication protocol in accordance with one aspect of the present invention.

When the data changes occur in the publisher, actions implied by the following pseudo-code (as generally represented in FIG. 8) are taken:

```
AddToPublicationQueue(PUID, CN)
{
    // PUID is the user id whose data was changed. Query the
    publications
    // table for all SUIDs that are affected, and insert this data into
    // the PUBLICATIONS_QUEUE, if it does not exist already
    ## IF NOT EXISTS (
    ##      SELECT SUID, PUID, SSID
    ##      FROM PUBLICATIONS
    ##      WHERE PUBLICATIONS.PUID = %PUID%)
```

```
INSERT INTO PUBLICATIONS_QUEUE
SELECT SUID, PUID, SSID
FROM PUBLICATIONS
WHERE PUBLICATIONS.PUID = %PUID%
// we also need to record the new value of the change number.
UPDATE PUBLICATIONS SET CN = %CN%
WHERE PUBLICATIONS.PUID = %PUID%
}
```

Figure 9:
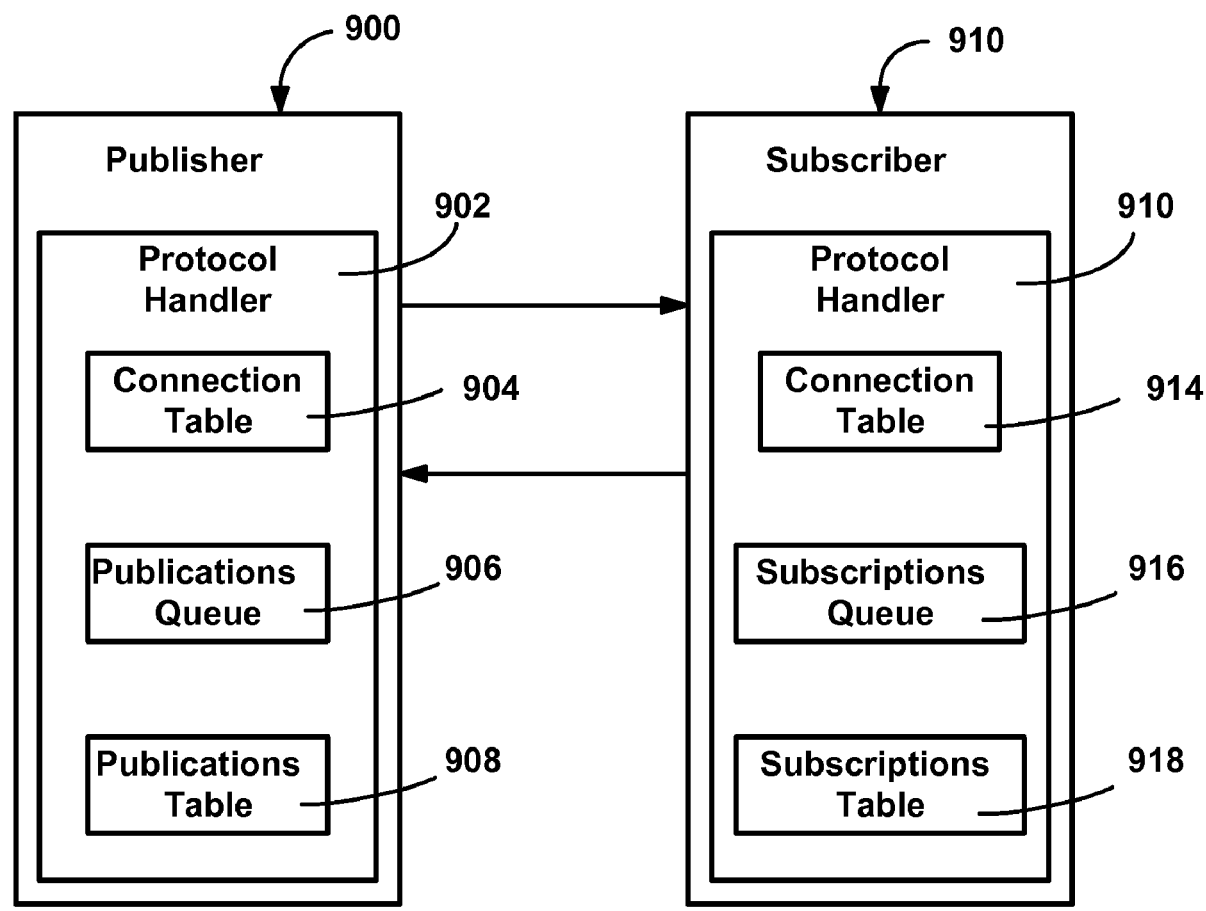

When a publisher receives a request message, actions implied by the following pseudo-code (also represented in FIG. 9) are taken:

```
OnRequestPub(SSID, requestMessage)
{
// what kind of a request message is this?
switch (requestType)
{
// request is for updating subscription map
case updateSubscriptionMap:
    // the request can have multiple entities. Loop for each
    for (each entity in request)
    {
        // See if the PUID of the <publisher> is known
        if (LookUpUser(PUID))
        {
            // new subscription
            if (entity == "<addToSubscriptionMap>")
            {
                // determine role of the subscriber
                role = FindRole(SUID);
                // insert into PUBLICATIONS table. Note that
                // CN is initialized to the current value that the publisher
                // has for it. Note also that
                // trying to add an existing row is not an error
                ## IF NOT EXISTS
                ## (SELECT SUID
                ## FROM PUBLICATIONS
                ## WHERE
                ##      SUID = %SUID% AND
                ##      PUID = %PUID% AND
                ##      SSID = %SSID%)
                ## INSERT INTO PUBLICATIONS VALUES
                ## (%PUID%, %SUID%, %SSID%, %role%, %CN%)
                // append to the response message
                response += "<addedToSubscriptionMap>";
            } // addToSubscriptionMap
            else if (entity == "<deletedFromSubscriptionMap>")
            {
                // delete from PUBLICATIONS table. If a non-existent
                // row is asked to be deleted, the delete will simply
                // return without deleting anything
                ## DELETE PUBLICATIONS
                ## WHERE
                ## SUID = %SUID% AND
                ## PUID = %PUID% AND
                ## SSID = %SSID%
                // append to the response message
                response += "<deletedFromSubscriptionMap>";
            } // deleteFromSubscriptionMap
        } // LookUpUser(PUID)
        else
        {
            // append an "unknown PUID entity to response
            response += "<unknownPUID>";
        }
    }// for (each entity in request)
    break; // updateSubscriptionMap
case serviceStatus:
    // if serviceStatus is online
    if (entity == "<online>")
    {
        // reset retry count to zero
        ## UPDATE CONNECTIONS
        ## SET RETRY = 0
        ## WHERE SID = %SSID%
    }
    else if (entity == offline)
    {
        // resent retry count to maximum
        ## UPDATE CONNECTIONS
        ## SET RETRY = %RetryCount%
        ## WHERE SID = %SSID%
    }
    // append a standard .NET ack message
    response += "<standard.NETck>";
    break; // serviceStatus
} // switch (requestType)
// Send response back service
Send(SSID, response);
}
```

Figure 10:
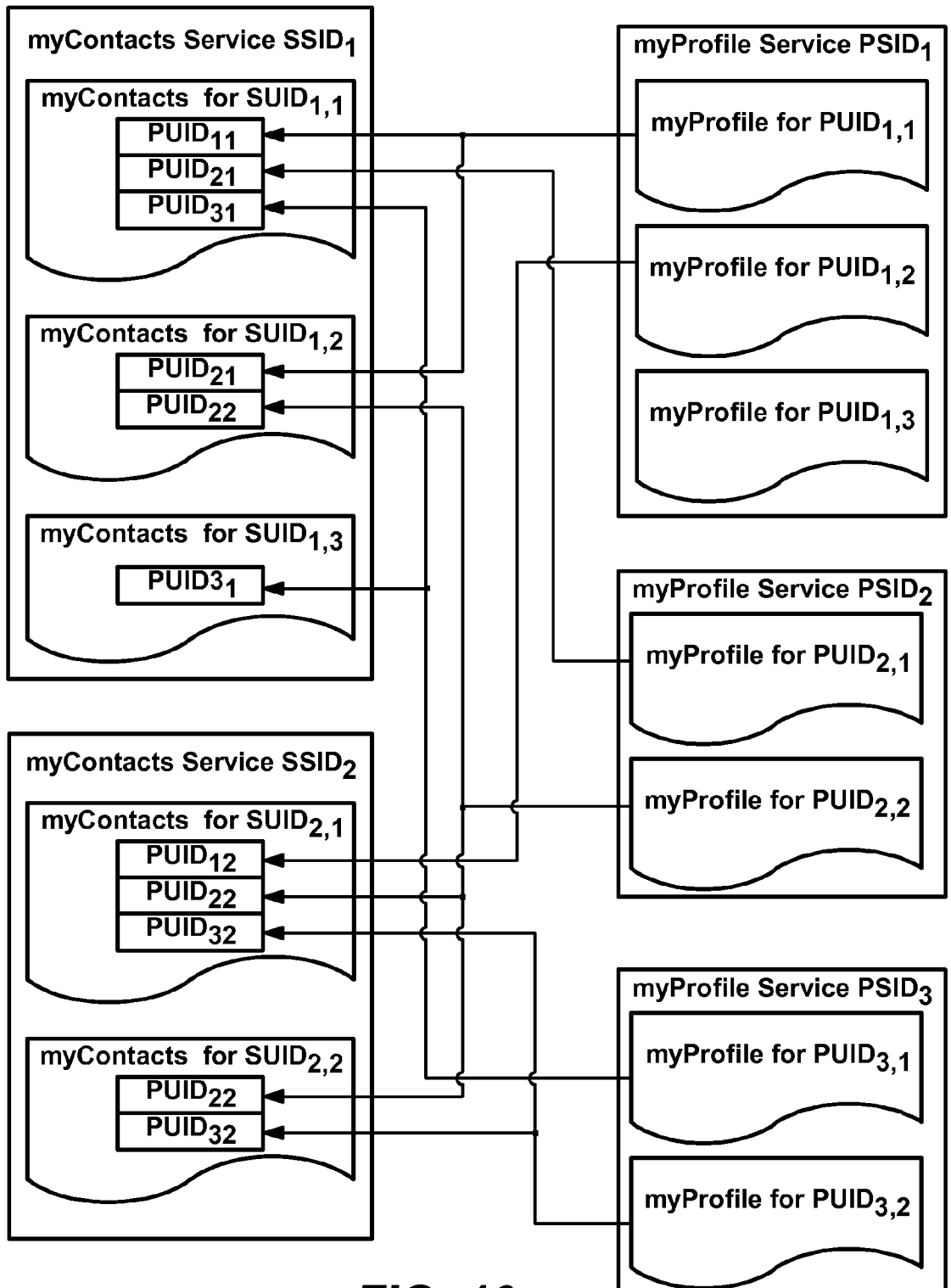
Figure 11:
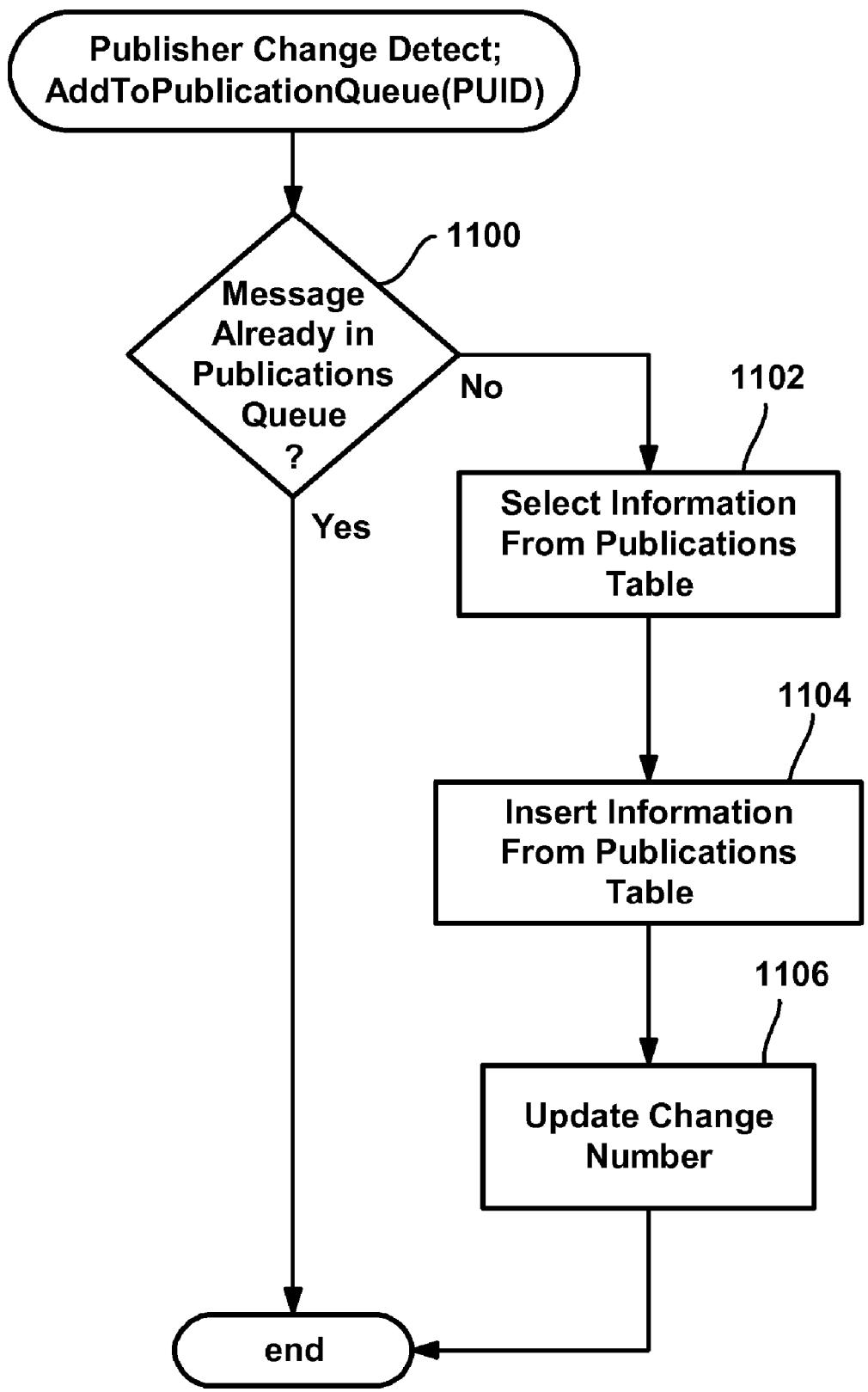

When the update interval timer goes off at the publisher, it takes actions implied by the following pseudo-code, as generally represented in FIGS. 10 and 11A-11B:

```
OnIntervalTimerPub( )
{
    // get a list of all Subscribes that have live connections
    ## SELECT SID AS SSID, RETRY FROM CONNECTIONS
    for (each SSID in result set)
    {
        if (RETRY < RetryCount)
        {
            // more retries left. process messages in the publication queue
            // for this SSID
            if (ProcessPublicationQueue(SSID))
            {
                // all requests in queue for this SSID have been sent, and
                // responses have been received
                ## UPDATE CONNECTIONS
                ## SET RETRY = 0
                ## WHERE SID = %SSID%
            }
            else
            {
                // no response from SSID; increment retry counter
                ## UPDATE CONNECTIONS
                ## SET RETRY = RETRY + 1
                ## WHERE SID = %SSID%
            }
        } // retry < retryCount
        else if (RETRY < ResetInterval)
        {
            // retry count exceeded; see if it's time to check for alive-ness
            ## UPDATE CONNECTIONS
            ## SET RETRY = RETRY + 1
            ## WHERE SID = %SSID%
        } // retry < retryInterval
        else
        {
            // check for alive-ness by starting another series of retries
            ## UPDATE CONNECTION
            ## SET RETRY = 0
            ## WHERE SID = %SSID%
        }
    } // for (each SSID in result set)
}
ProcessPublicationQueue(SSID)
{
    // select requests in the queue for this SSID; group them by
    // PUID followed by ROLE. The rows in each group will result
    // in one updateSubscriptionData message
    ## SELECT * FROM PUBLICATIONS_QUEUE
    ## WHERE SSID = %SSID%
    ## GROUP BY PUID, ROLE
    for (each group of rows in the result set)
    {
        // generate an updateSubscriptionData message
        request += GenerateMessage(group);
```

```
}
// Send request to the subscriber
if (!Send(SSID, request)) return FALSE;
// Receive response from service
if (!Recv(SSID, response)) return FALSE;
// The response has one entity for each SUID
for (each entity in response)
{
  success = true;
  if (entity == "<updatedData>")
  {
    // publisher needs to check the change number returned in the
    // response message and verify if it matches; if it does, then
    // everything is cool; if not, then the subscriber has sent a
    // spurious response for a previous request, and so this
    // message is ignored
    ## SELECT CN AS STORED_CN
    ## FROM PUBLICATIONS
    ## WHERE PUID = %publisher% AND SUID = %subscriber%
    // CN is the change number contained in the response
    if (STORED_CN != CN)
      success == false;
  }
  if (entity == "<deleteFromSubscriptionMap>")
  {
    // subscriber did not find PUID in its SUBSCRIPTIONS table
    // publisher should update its subscription map
    ## DELETE FROM PUBLICATIONS
    ## WHERE PUID=%subscriber% AND SSID=%SSID%
  }
  // since request has received the proper response, it can be deleted
  from
  // the publication queue
  if (success == true)
  {
    ## DELETE FROM PUBLICATIONS_QUEUE
    ## WHERE SSID = %SSID% AND PUID = %publisher%
    AND SUID = %subscriber%
  }
}
}
```

Figure 12:
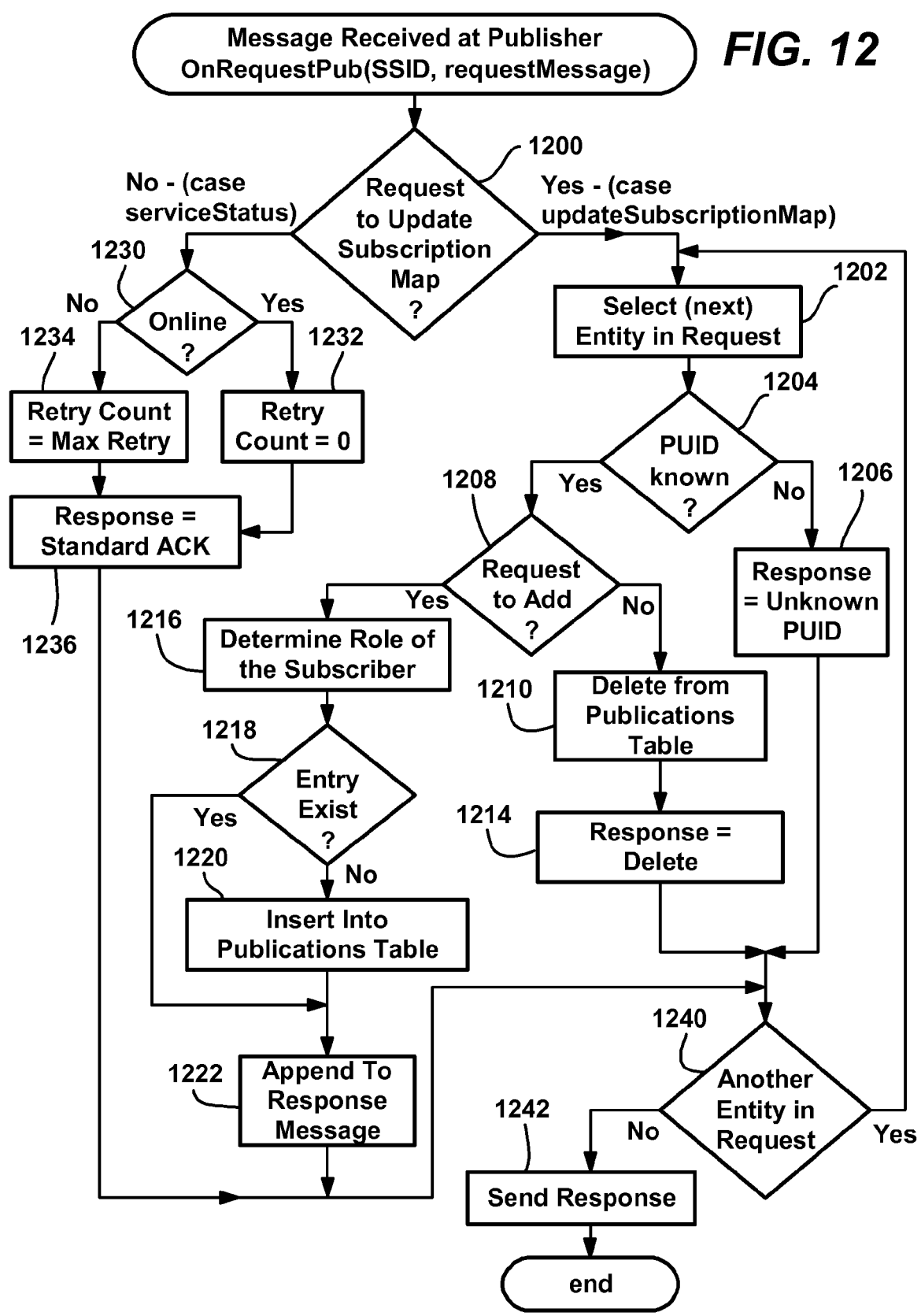

When a subscription is added, the actions implied by the following pseudo-code (also generally represented in FIG. 12) are taken:

```
AddSubscription(suid, puid, psid)
{
  // check if the publisher has an entry in the CONNECTIONS table
  // for this PSID
  if (UnknownServiceID( psid ))
  {
    // no entry exists; send an addSubscription message immediately to
    // the publisher.
    UpdateSingleSubscriptionMap( suid, puid, psid );
  }
  else
  {
    // see if row exists in the subscriptions queue
    if (LookUpQueue(suid, puid, psid))
    {
      // if a row exists in the subscription queue then:
      // if OPERATION is TRUE (=add) then do nothing
      // if it is FALSE (=delete) and GENERATION = 0, then
      // delete the row; otherwise, change FALSE to TRUE
      ## SELECT OPERATION, GENERATION
      ## FROM SUBSCRIPTIONS_QUEUE
      ## WHERE SUID = %suid% AND PUID = %puid% AND
      PSID = %psid%
      if (OPERATION == FALSE)
        if (GENERATION == 0)
        {
          ## DELETE SUBSCRIPTIONS_QUEUE
          ## WHERE SUID = %suid% AND PUID = %puid%
          AND PSID = %psid%
        }
        else
        {
          ## UPDATE SUBSCRIPTIONS_QUEUE
          ## SET OPERATION = TRUE
          ## WHERE SUID = %suid% AND PUID = %puid%
          AND PSID = %psid%
        }
    }
    else
    {
      // row does not exist; insert into the queue
      ## INSERT INTO SUBSCRIPTION_QUEUE
      ## VALUES (%suid%, %puid%, %psid%, TRUE, 0)
    }
  }
}
```

When a subscription is removed, the subscriber takes actions implied by the following pseudo-code, as generally represented in FIG. 13:

```
RemoveSubscription(from, to, sid)
{
  // see if row exists in the subscriptions queue
  if (LookUpQueue(suid, puid, psid))
  {
    // if a row exists in the subscription queue then:
    // if OPERATION is FALSE (=delete) then do nothing
    // if it is TRUE (=add) and GENERATION = 0, then
    // delete the row; otherwise, change TRUE to FALSE
    ## SELECT OPERATION, GENERATION
    ## FROM SUBSCRIPTIONS_QUEUE
    ## WHERE SUID = %suid% AND PUID = %puid% AND PSID =
    %psid%
    if (OPERATION == TRUE)
      if (GENERATION == 0)
      {
        ## DELETE SUBSCRIPTIONS_QUEUE
        ## WHERE SUID = %suid% AND PUID = %puid% AND
        PSID = %psid%
      }
      else
      {
        ## UPDATE SUBSCRIPTIONS_QUEUE
        ## SET OPERATION = FALSE
        ## WHERE SUID = %suid% AND PUID = %puid% AND
        PSID = %psid%
      }
  }
  else
  {
    // row does not exist; insert into the queue
    ## INSERT INTO SUBSCRIPTION_QUEUE
    ## VALUES (%suid%, %puid%, %psid%, FALSE, 0)
  }
}
```

Figure 14A:
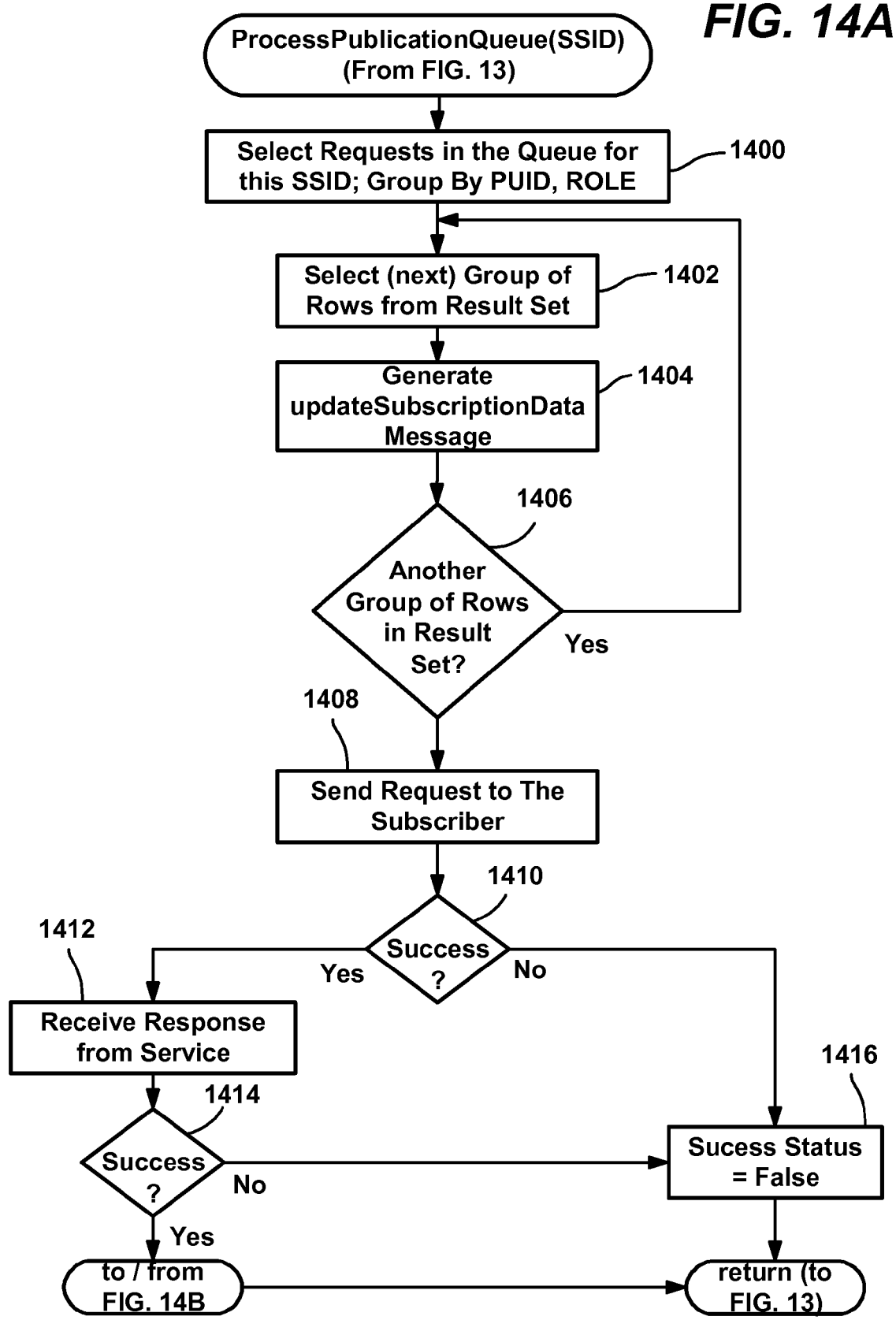
Figure 14B:
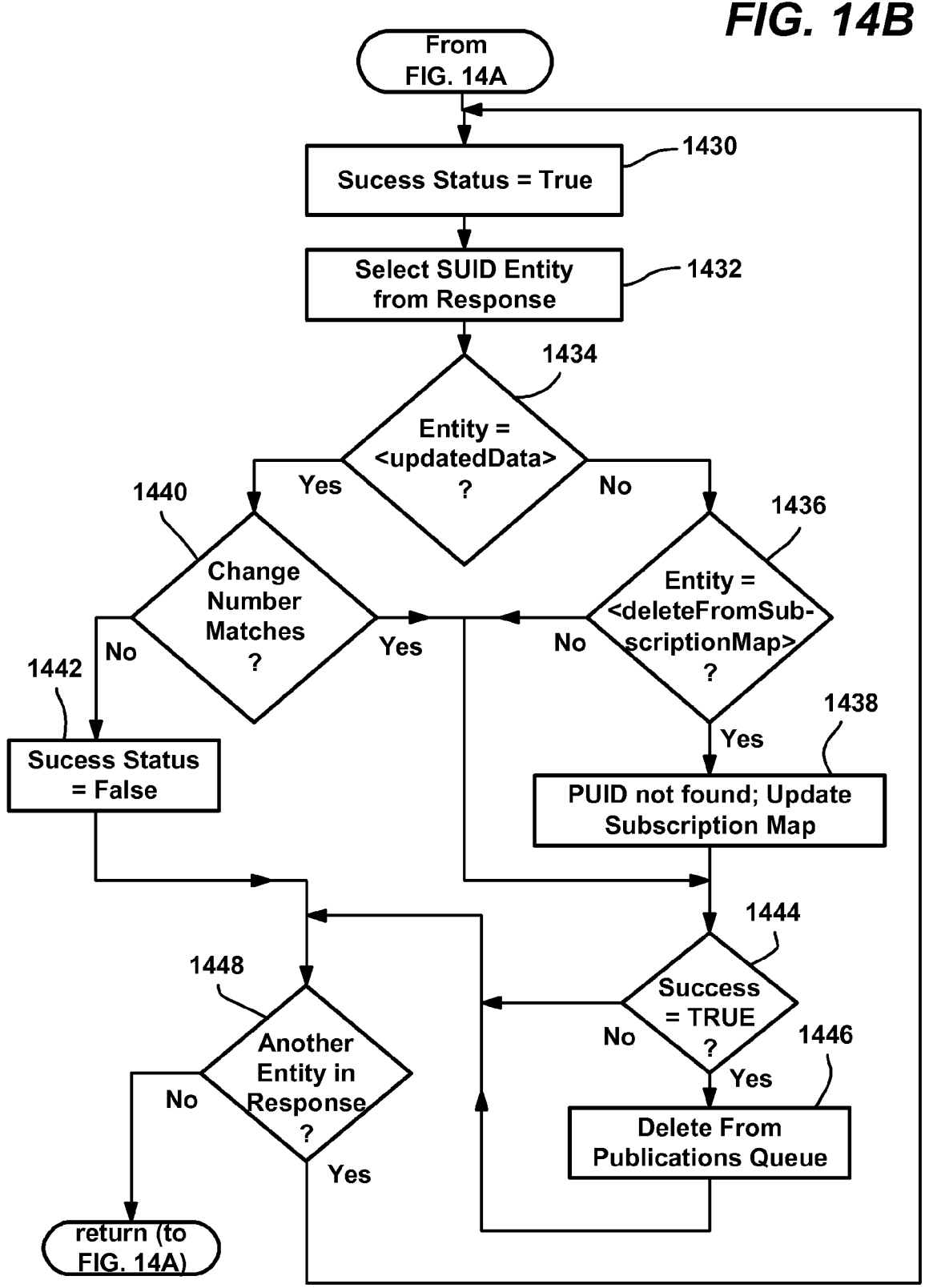

When a subscriber receives a request, the actions implied by the following pseudo-code are performed as generally represented in FIG. 14:

```
OnRequestSub(PSID, request)
{
  // what kind of a request message is this?
  switch (requestType)
  {
  // request is for updating subscription map
  case updateSubscriptionData:
    // request may contain multiple entities
    for (each entity in request)
```

-continued

```
{
    // check to see if the publisher's PUID is in the SUBSCRIPTIONS
    table
    if (LookUpPUID(publisher))
    {
        // is this a duplicate request message? I can find this by looking
        // at change numbers
        ## SELECT CN AS STORED_CN
        ## FROM SUBSCRIPTIONS
        ## WHERE PUID = %publisher% AND SUID = %subscriber%
        ##          AND PID = %pid%
        // cn is the change number present in the message
        if (cn != STORED_CN)
        {
            // This function updates subscribed data
            UpdateData(entity);
            // update the change number
            ## UPDATE SUBSCRIPTIONS
            ## SET CN = cn
            ## WHERE PUID = %publisher% AND
            SUID = %subscriber%
            ##          AND PID = %pid%
        }
        // append to response
        response += "<updatedData>";
    }
    else
    {
        // publisher is unknown; signal publishing service to delete it
        response += "<deleteFromSubscriptionMap>";
    }
} // for
// send response to the publishing service
break; // updateSubscriptionData
case serviceStatus:
    // if serviceStatus is online
    if (entity == "<online>")
    {
        // reset retry count to zero
        # UPDATE CONNECTIONS
        # SET RETRY = 0
        # WHERE SID = %PSID%
    }
    else if (entity == offline)
    {
        // resent retry count to maximum
        # UPDATE CONNECTIONS
        # SET RETRY = %RetryCount%
        # WHERE SID = %PSID%
    }
    // append a standard .NETack message
    response += "<standard.NETAck>";
    break; // serviceStatus
} // switch (requestType)
// Send response back service
Send(PSID, response);
}
```

Figure 15:
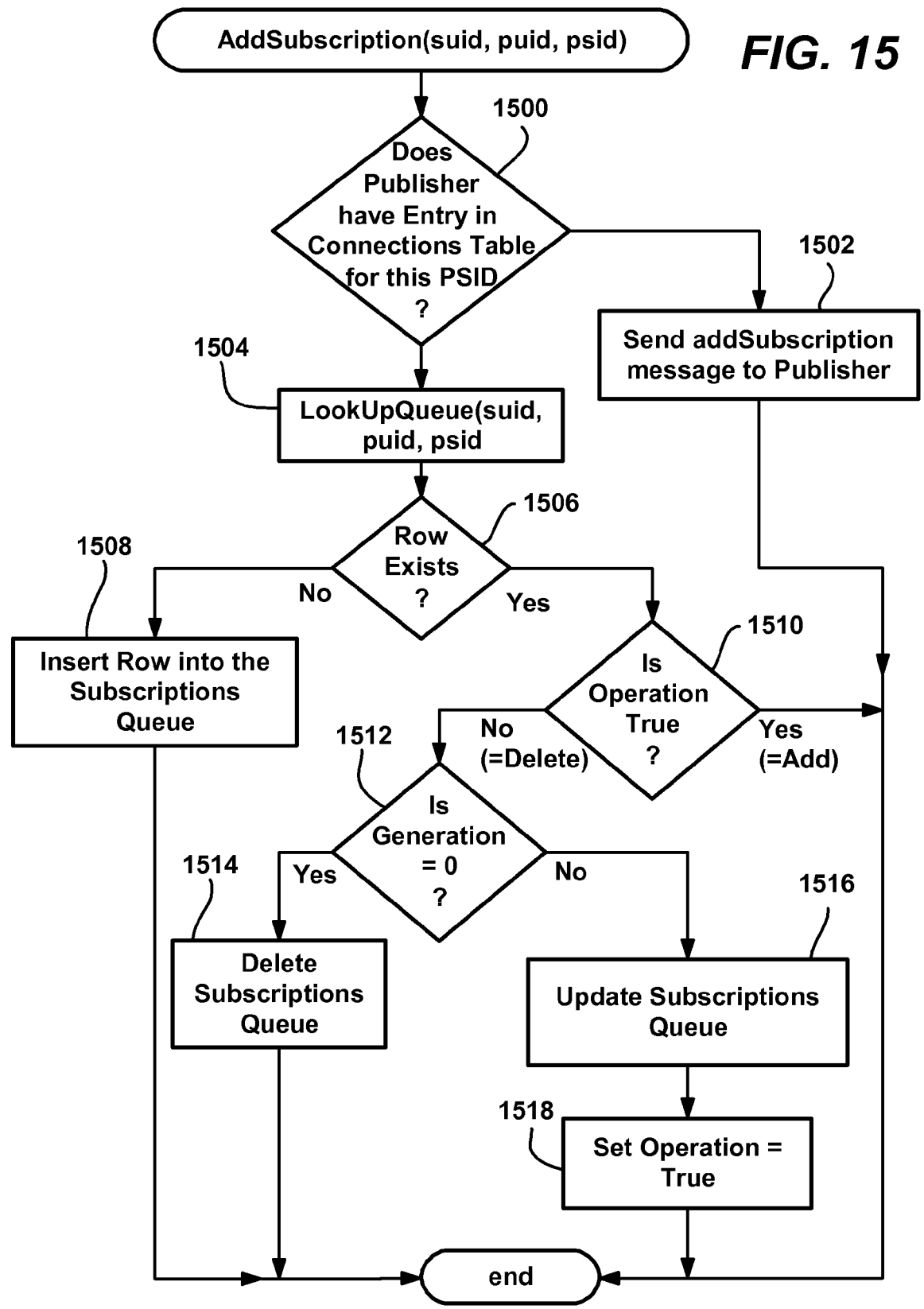
Figure 16:
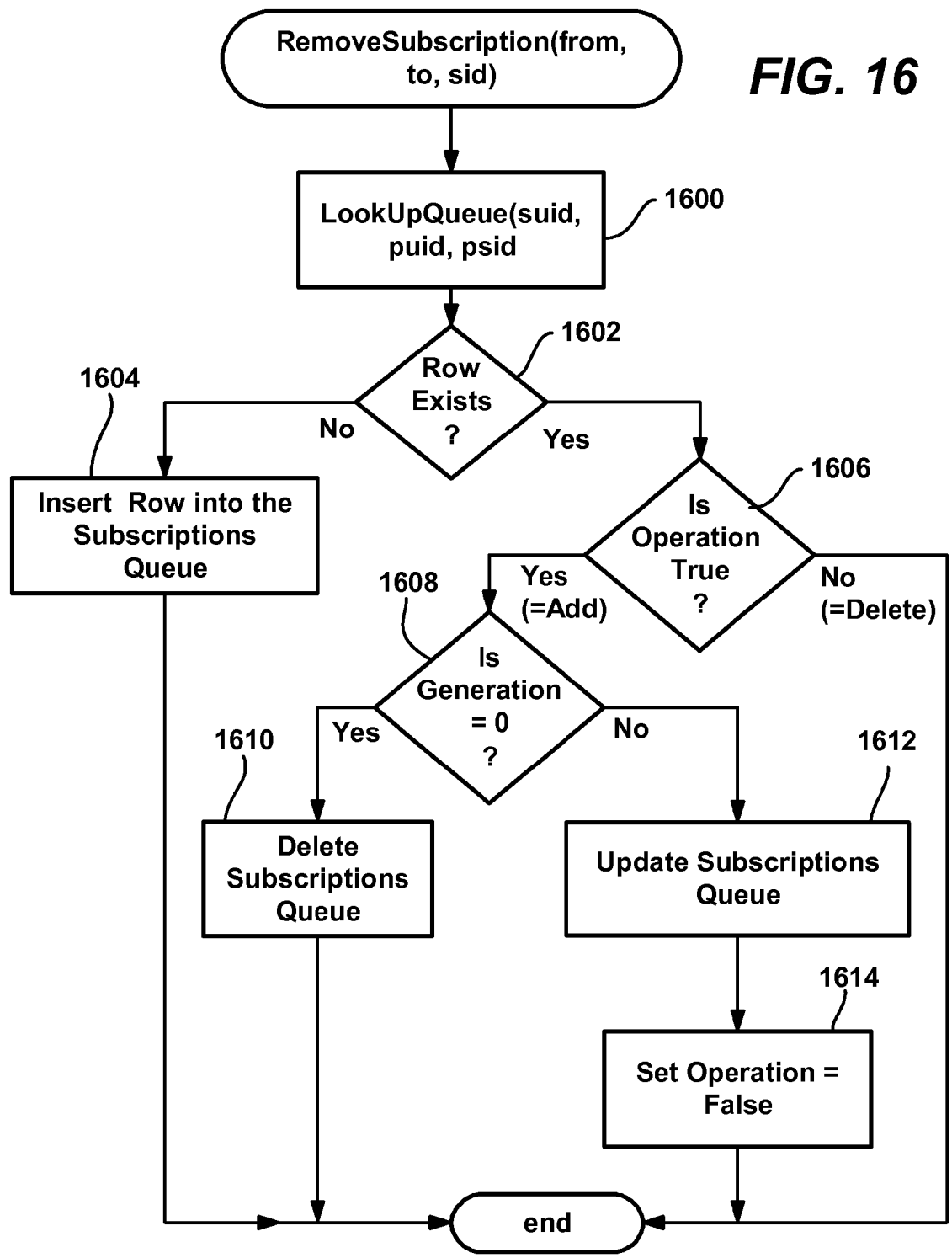
Figure 17:
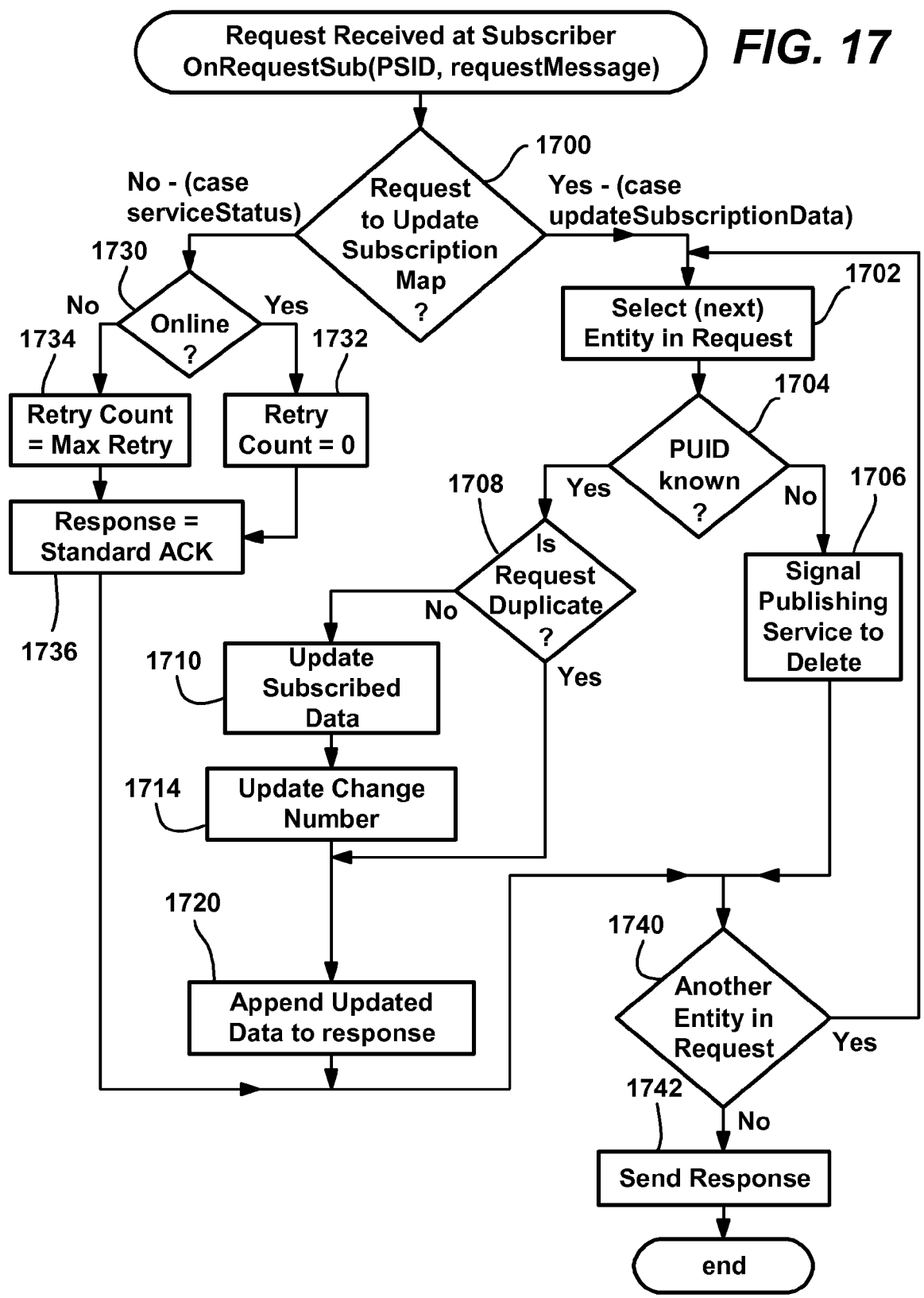
Figure 18:
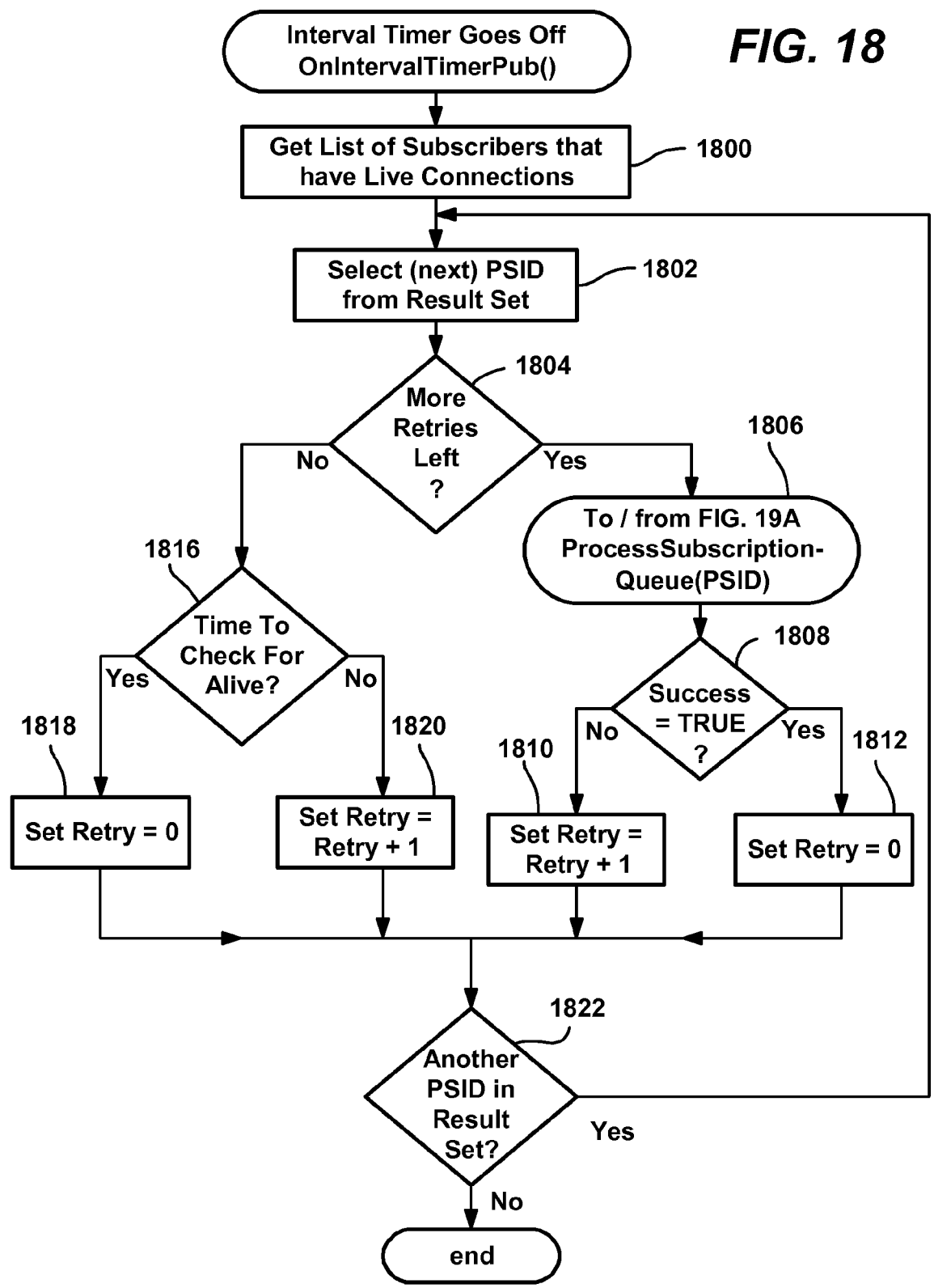
Figure 19A:
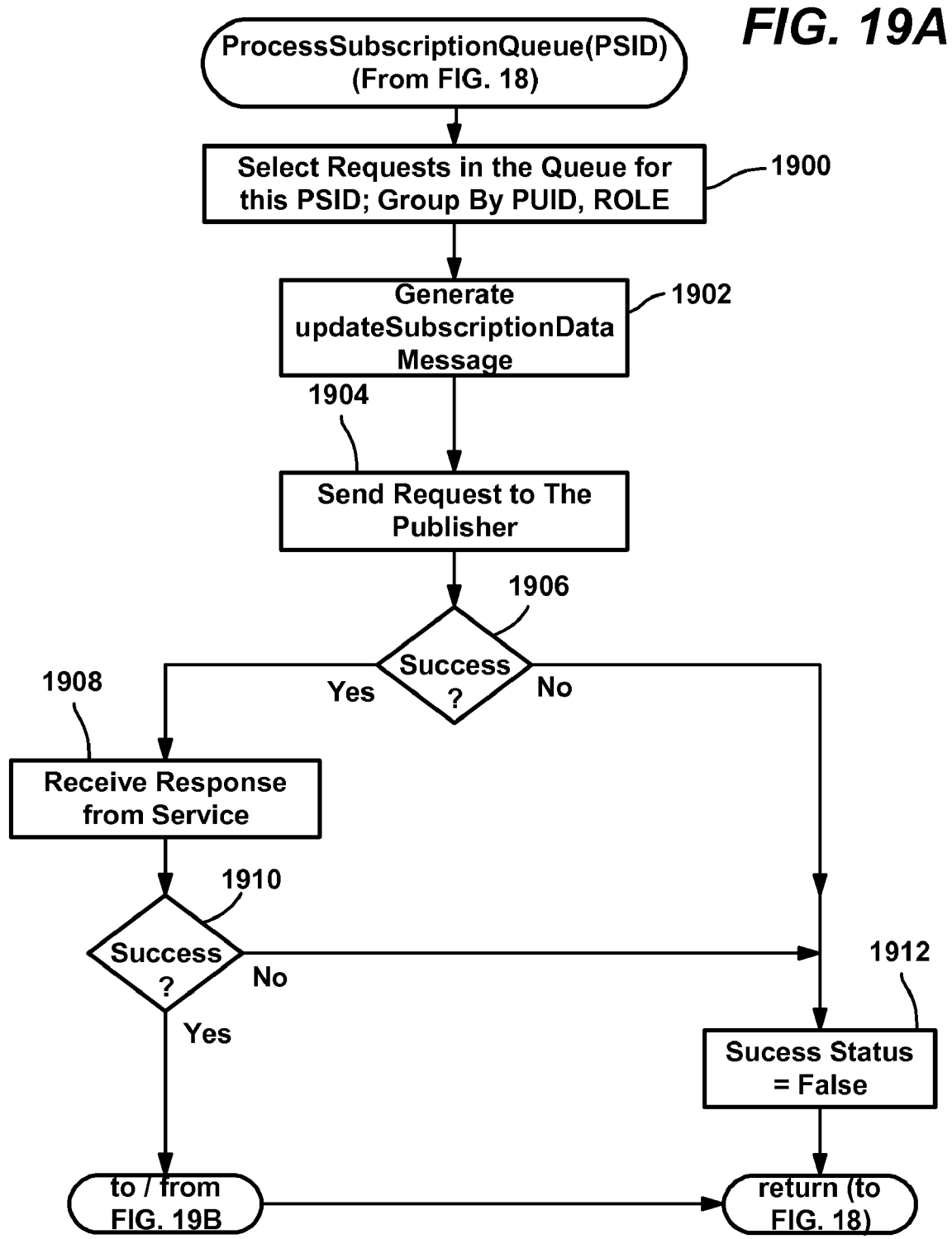
Figure 19B:
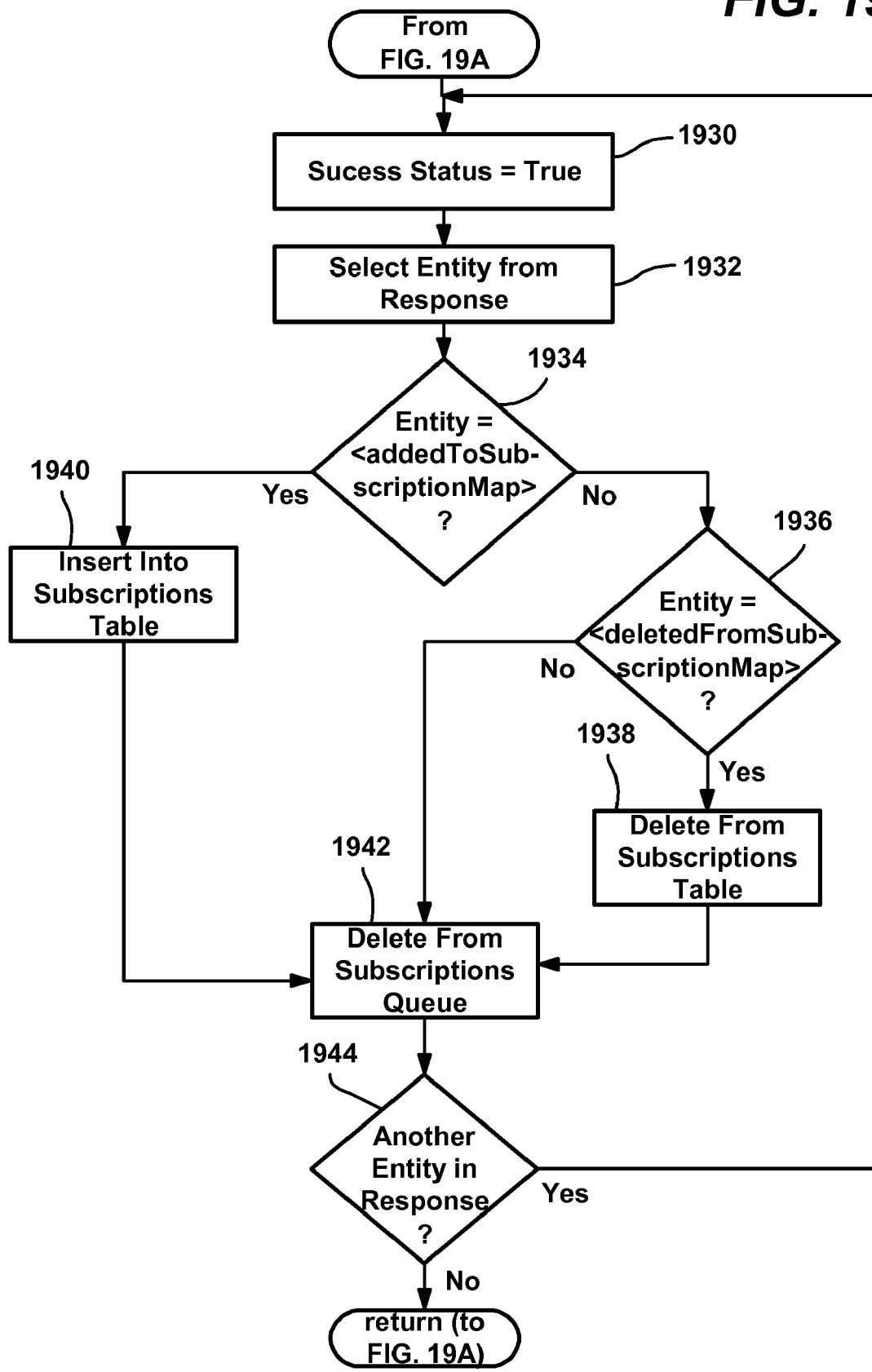

When the update interval timer goes off at the subscriber, it takes actions implied by the following pseudo-code as generally represented in FIGS. 15 and 16A-16B:

```
OnIntervalTimerSub( )
{
    // get a list of all publishers that have live connections
    ## SELECT SID AS PSID, RETRY FROM CONNECTIONS
    for (each PSID in result set)
    {
        if (RETRY < RetryCount)
        {
            // more retries left. process msgs in the publication q for this SSID
            if (ProcessSubscriptionQueue(PSID))
            {
                // all requests in queue for this PSID have been sent, and
                // responses have been received
```

```
                ## UPDATE CONNECTIONS
                ## SET RETRY = 0
                ## WHERE SID = %PSID%
            }
            else
            {
                // no response from PSID; increment retry counter
                ## UPDATE CONNECTIONS
                ## SET RETRY = RETRY + 1
                ## WHERE SID = %PSID%
            }
        } // retry < retryCount
        else if (RETRY < ResetInterval)
        {
            // retry count exceeded; see if it's time to check for alive-ness
            ## UPDATE CONNECTIONS
            ## SET RETRY = RETRY + 1
            ## WHERE SID = %PSID%
        } // retry < retryInterval
        else
        {
            // check for alive-ness by starting another series of retries
            ## UPDATE CONNECTION
            ## SET RETRY = 0
            ## WHERE SID = %PSID%
        }
    } // for (each SSID in result set)
}
ProcessSubscriptionQueue(PSID)
{
    // select requests in the queue for this PSID; group them by
    // PUID followed by OPERATION. The rows in each group will result
    // in one updateSubscriptionData message
    ## SELECT * FROM PUBLICATION_QUEUE
    ## WHERE PSID = %PSID%
    // generate an updateSubscriptionMap message. Note that all requests
    // for a given psid can be bunched into one single message. Thus, there
    // no need to group by column and loop for each group
    request += GenerateMessage( );
    // Send request to the publisher
    if (!Send(PSID, request)) return FALSE;
    // Receive response from service
    if (!Recv(PSID, response)) return FALSE;
    // The response has one entity for each row in subscription queue
    for (each entity in response)
    {
        if (entity == "<addedToSubscriptionMap>")
        {
            // publisher successfully added its subscription map
            // subscriber now adds to its subscriptions table
            ## INSERT INTO SUBSCRIPTIONS
            ## VALUES (%subscriber%, %publisher%, %psid%)
        }
        if (entity == "<deletedFromSubscriptionMap>")
        {
            // publisher successfully deleted from its subscription map
            // subscriber now deletes from its subscriptions table
            ## DELETE FROM SUBSCRIPTIONS
            ## WHERE SUID=%subscriber% AND PUID = %publisher%
                AND PSID=%PSID%
        }
        // since request has received the proper response, it can be
        deleted from
        // the subscriptions queue
        ## DELETE FROM SUBSCRIPTIONS_QUEUE
        ## WHERE PSID = %PSID% AND PUID = %publisher% AND
        SUID = %subscriber%
    }
}
```

SSCP Alternative

As described above, alternative ways to implement a service-to-service communications protocol are feasible. This section describes one such way, and also exemplifies an alternative wherein each user can have multiple instances of a .NET (or my*) service. For example, a user can have two instances of the myContacts service, one for company contacts and one for personal contacts, (although the same segmentation can also be achieved using categories). To distinguish between multiple instances of a user's services, there exists an identifier called INSTANCE, stored in the myServices service. For a given user and a given service, there also exists the notion of a default instance. The combination of an owner-id (OID) and INSTANCE is enough to uniquely identify a content document. Conceptually, a content document (determined by the OID/INSTANCE pair of the publisher) gets published to another content document (determined by the OID/INSTANCE pair of the subscriber), which are sometimes referred to herein as the publishing document and subscribing document, respectively.

Figure 20:
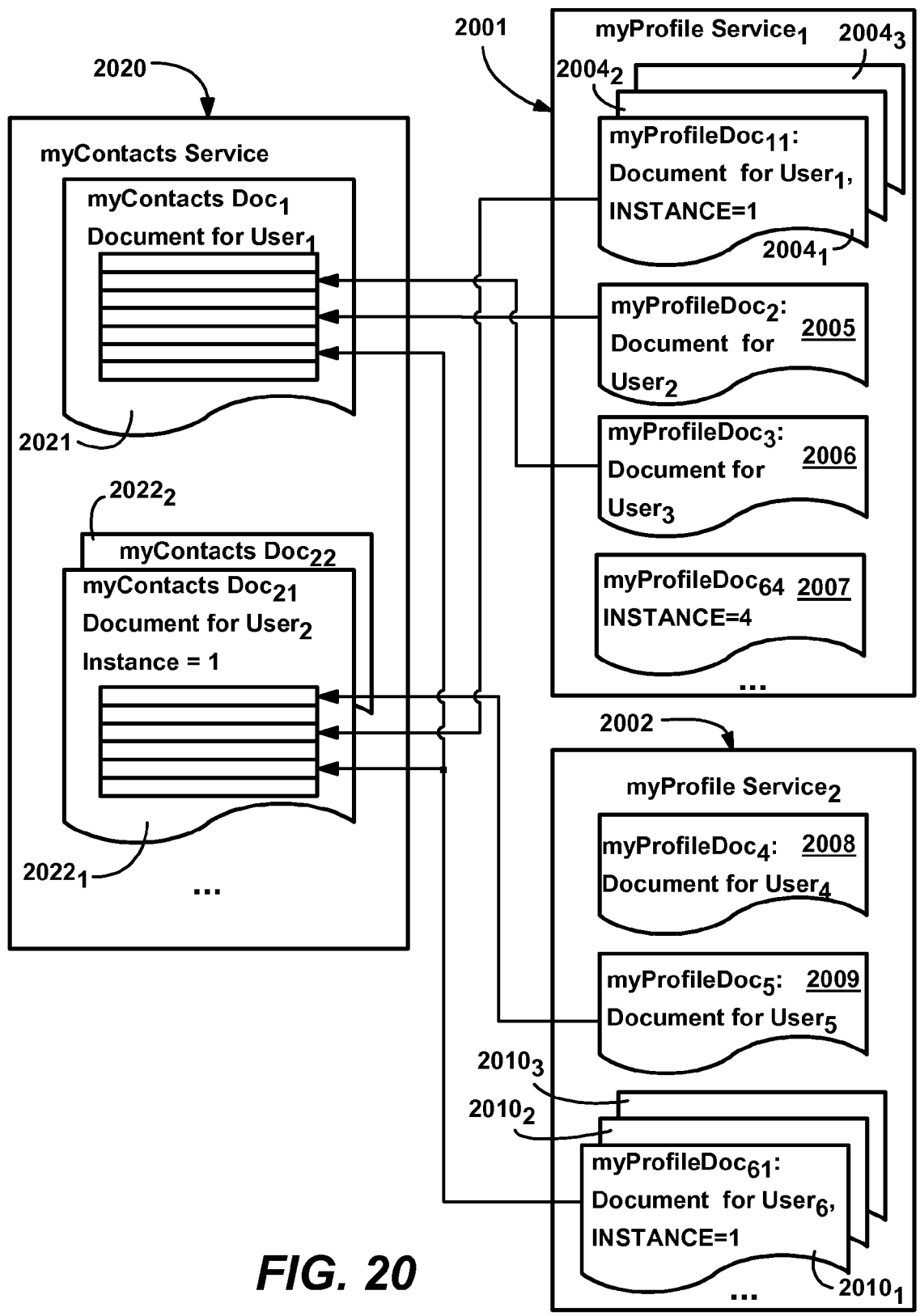
FIGS. 20-21 are block diagram generally representing publishers and subscribers interconnected via a service-to-service communication protocol in accordance with an alternative aspect of the present invention.

FIG. 20 shows an example of a publisher-subscriber relationship. In FIG. 20, there are two myProfile services 2001 and 2002, each managing the profiles of three users. $User_1$ has three instances ($2004_1$-$2004_3$) of a myProfile service, and $user_6$ has four instances, one of which resides in the first myProfile service 2001, three of which reside in the second myProfile service 2002. There is one myContacts service 2020, which manages the contact information of two users; $user_2$ has two instances ($2022_1$ and $2022_2$) of the service. In the real world, each of these services will manage the data for millions or even hundreds of millions of users.

As represented in FIG. 20, that myContacts service has subscriptions in the two different myProfile services 2001 and 2002; it is similarly likely that a given publisher will publish to multiple .NET services. Finally, it should be possible for a single service to act both as a subscriber and a publisher (e.g., in the whitelist example, myContacts is a publisher; in the Live Contacts example, it is a subscriber). Thus, as represented in FIG. 20, when the profile information for $myProfileDoc_{61}$ changes, this information should be published by $myProfile service_2$ 2002, to myContacts service 2020, as both $myContactsDoc_1$ 2021 and $myContactsDoc_{21}$ $2022_1$ have subscribed for the service. SSCP enables the publishing of data as changes occur, via the push model. Furthermore, in keeping with the present invention, the publisher should make all attempts to batch the changes to maximally utilize bandwidth.

In FIG. 20, note that only $myContactsDoc_{21}$ subscribes to the profile changes of $myProfileDoc_5$. Thus, when $User_5$'s profile is changed, myProfile should publish the changes only to $myContactsDoc_{21}$, and $myContactsDoc_1$ should not see these changes. Returning to $User_6$, assume that $User_1$'s role in $myProfileDoc_{61}$ is that of an associate; the role of $User_2$ is that of a friend. When a myProfile service publishes the data, it should send data visible to an associate to $myContactsDoc_1$ and data visible to a friend to $myContactsDoc_{21}$. As should be apparent, SSCP sends changes only to subscribed documents (user/instance) within a subscribing service, and determines the role of each subscribing user, and filter the data based on the role. To this end, the publisher maintains information about documents wanting subscriptions, which is determined by the OID/INSTANCE pair ($myContactsDoc_1$ and $myContactsDoc_{21}$). For each subscribing document, the publisher also maintains information about the document it is subscribing to (for $myContactsDoc_1$, this is $myProfileDoc_2$ and $myProfileDoc_3$ in $myProfile Service_1$), and about the role played by the owner of the subscribing document (for $myProfileDoc_{61}$ in $myProfile Service_2$, this is associate for $myContactsDoc_1$, friend for $myContactsDoc_{21}$).

In order for the publisher to keep this information current, the subscriber should notify the publisher whenever one of its users wants to unsubscribe or add a new subscription. Note that technically, it is a document that subscribes; that is, a user specifies an instance of the service which wants to act as a subscriber, but for purposes of description the user can be thought of as a subscribing. By way of example, consider For example, $User_1$ wants to add $User_4$ into his live contact list and remove $User_6$. SSCP should allow for transmission of this information from subscriber to publisher. SSCP allows the subscriber to send subscription updates to the publisher.

As above, the alternative embodiment described in this section provides robustness, to guarantee that the publisher and subscriber see the messages that they are supposed to see. At the most fundamental level, the publisher or subscriber need to know that their messages have reached the destination, whereby a message from the sender has a corresponding acknowledgement (ACK) returned from the receiver. The ACK need not be synchronous with respect to the message, and can instead be sent/received asynchronously.

The robust protocol of the present invention also handles the failures of publishers or subscribers, which is generally accomplished by resending a request until a response is received. However, to prevent a flood of retry messages in case of a catastrophic failure at the destination, a limited number of retries are specified, after which no further attempts are made for a longer time. This is accomplished via a reset interval (which is relatively much longer than the retry interval) after which the entire retry process begins.

A more subtle type of failure occurs when, for example, a publisher sends a request to the subscriber, informing it of the change in a stored profile, the subscriber processes the request, and sends a response to the publisher, but the network connection between the subscriber and the publisher has a transient failure and the response does not reach the publisher. As described above, to retry, the publisher resends its request. For the protocol to work correctly, the subscriber recognizes that this is a redundant request that has already been processed. In other words, a request should be processed only once even if it is sent multiple times; alternatively, the request could be processed any number of times, but the next result should be as if it was processed only once. As described above, in SSCP, retries are idempotent.

A typical service manages gigabytes of data, partitioned over millions of users. This means that in its role as a publisher, the source data will be frequently, if not almost constantly, changing. For efficiency, every change is not published immediately, but instead change requests are batched, and send occasionally (e.g., periodically). To this end, the protocol handler at the service periodically wakes up after a specified interval and sends the batched messages, as described above with respect to FIG. 6.

As generally represented in FIG. 6, SSCP is implemented at a publisher (service) 600 and subscriber (service) 610 by respective protocol handlers 602, 612, such as daemon processes or the like running with respect to a service. The publisher 600 and subscriber 610 exchange messages, and use this as a mechanism to communicate changes.

The requirements of the protocol dictate that SSCP handlers 602, 612 maintain several pieces of data, the sum total of which represents the state of a publisher or subscriber. As conceptually represented in FIG. 6, this data can be viewed as being segmented over several data structures 604-618. Note however that the arrangements, formats and other description presented herein are only logically represent the schema; the actual storage format is not prescribed, and an implementation may store in any fashion it deems fit as long as it logically conforms to this schema.

A publisher 600 communicates with a subscriber 610 using request and response messages. For example, when data changes at the publisher 600, the publisher 600, sends a request message to the subscriber 610 informing the subscriber that data has changed, normally along with the new data. The subscriber 610 receives the message, makes the required updates, and sends back an ACK message acknowledging that the message was received and that the changes were made. A subscriber 610 can also send a request message, such as when the subscriber 610 wants to subscribe or unsubscribe to a piece of datum. When the publisher 600 receives this message, the publisher 600 updates its list of subscriptions (in a publications table 608) and sends back a response acknowledging the request. Note that SSCP is agnostic to whether a response message for a given request is synchronous or asynchronous.

Thus, there are two primary parts to SSCP, a first from the publisher to the subscriber, which deals with sending changes made to the publisher's data, and a second from subscriber to the publisher, which deals with keeping the list of subscriptions synchronized. Furthermore, every service is required to provide notification to all other services that have subscriptions with it, or services with which it has subscriptions, when it is going offline or online.

The table below summarizes request messages, each of which having a corresponding response (e.g., ACK) message.

a relatively longer time. Once this longer time is elapsed, the publisher service 600 sets the RetryCount parameter to zero and begins resending the queued up requests over again. This longer time (before beginning the retry cycle), is configurable by the parameter ResetInterval.

Below is the summary of these protocol parameters:

| Parameter | Use |
|---|---|
| UpdateInterval | The interval after which the protocol handler wakes up and processes batched requests. |
| RetryCount | The number of times we retry a connection before assuming the remote service is dead. |
| ResetInterval | The interval after which a service marked as dead is retested for alive-ness. |
| BoxcarLength | The maximum number of sub-messages to chain together on a given boxcar. |

| Message | Description | Type | From/To |
|---|---|---|---|
| updateSubscriptionData | Used by the publisher to publish changes to its data | Request | Publisher to Subscriber |
| updateSubscriptionDataResponse | Used by the subscriber to ack updateSubscriptionData | Response | Subscriber to Publisher |
| updateSubscriptionMap | Used by the subscriber to inform the publisher that subscriptions have been added or deleted | Request | Subscriber to Publisher |
| updateSubscriptionMapResponse | Used by the publisher to ack updateSubscriptionMap | Response | Publisher to Subscriber |
| serviceStatus | Used by both publisher and subscriber to inform that they are going offline, or have come online | Request | Both directions |
| serviceStatusResponse | Used by both publisher and subscriber to ack serviceStatus request | Response | Both directions |

Protocol parameters are supported by both the publisher and the subscriber and control the behavior of the protocol.

As noted above, SSCP supports the ability to batch request messages. Whenever there is a need to send a request message, such as when there are changes in publisher data or subscriptions, the service puts the corresponding request message into a publisher message queue 606. Periodically, the protocol handler 602 in the publishing service 600 wakes up and processes the messages in the queue 606. This period is called as the UpdateInterval, and is a configurable parameter.

To satisfy the robustness requirement, the publisher's protocol handler 602 needs to periodically resend requests until the publisher service 600 receives an acknowledge message (ACK). If the ACK for a message is successfully received, this message is purged from the queue 606. Until then, the message remains in the queue, flagged as having been sent at least once, so it will be retried at the next update interval. The number of times the publisher the publisher service 600 retries sending a message to the subscriber service 610 is configurable by the parameter RetryCount, i.e., after retrying this many times, the publisher service 600 assumes that the subscriber service 610 is dead. Then, once the maximum number of retries is over, the publisher service 600 waits for Thus, to implement SSCP, the protocol handlers 602, 610 at the publisher and subscriber, respectively, track of several pieces of information, such as in their respective tables 604-618.

As with .NET in general, SSCP relies on the entities (services and users) being uniquely identifiable by the use of identifiers, e.g., every user in .NET has a unique identifier assigned by the Microsoft® Passport service. Each service, be it acting as a publisher or subscriber, also has a unique identifier, and in practice, a service ID will be a certificate issued by a certification authority.

SID Generic Service Identifier
PSID Publishing Service Identifier
SSID Subscribing Service Identifier
POID Publishing Owner Identifier (PUID of myPublishingService user)
PINST Instance ID of POID
SOID Subscribing Owner Identifier (PUID of mySubscribingService user)
SINST Instance ID of SOID To send a request or a response, the service needs to know where the target is located. For purposes of the protocol a service is identified either by just the URL or by a series of URL/CLUSTER entries. To ensure proper handling of the number of retries for a particular service, the handler needs to keep track of how many retries have been done. All this information is kept in the CONNECTIONS table, which is used by both publishers and subscribers:

| SID | URL | CLUSTER | RETRY |
|---|---|---|---|
| SID | The primary key for this table; the service ID of a Subscriber or Publisher | | |
| URL | the URL at which the service is expecting requests | | |
| CLUSTER | the cluster number of this service | | |
| RETRY | the current retry number of the service | | |

There is one entry in this table for every target service. For a publisher, this means every service that has subscriptions with it; for a subscriber, this means every publisher that it has subscriptions with. When RetryCount<RETRY<ResetInterval, the target service is assumed to be dead. Note that when an unknown service (i.e., one that is not present in the CONNECTIONS table) sends a request, an attempt is made to contact it immediately, without waiting until the next interval.

The publisher tracks the users across the services with which it has subscriptions. This is done in the PUBLICATIONS table. The PUBLICATIONS table, used by the publisher, looks like:

| PKEY | POID | PINST | SOID | SINST | SSID | SCN | ROLE | TOPIC |
|---|---|---|---|---|---|---|---|---| wherein:
PKEY    The primary key for this table; note that the columns POID, PINST, SOID, SINST and SSID form a candidate key
POID    Owner-ID of the publisher
PINST   Instance ID of the publishing service
SOID    Owner-ID of the subscriber
SINST   Instance ID of the subscribing service
SSID    ID of the subscribing service
SCN     Last known change number of an add or delete request received from the subscriber. For more information, see section "Error! Reference source not found.".
ROLE    Subscribing Owner-ID role in the publishing Owner-ID/Instance's roleList for this document
TOPIC   If the subscribing document is having multiple subscriptions with a publishing document, then a TOPIC is used to distinguish them.

There is one row in this table for each document/topic/subscribing service combination. The PUBLICATIONS table be made visible at the schema level, but should be read only.

Given a publishing service P and a subscribing service S, there will exist a (possibly empty) set $SM = \{(PO_i, PI_i, SO_i, SI_i, T_i),$ for $i=1$ to $n\}$ such that:
1) $PO_i$ is a user managed by P
2) $SO_i$ is a user managed by S
3) The document $(SO_i, SI_i)$ subscribes to the document $(PO_i, PI_i)$ with topic $T_i$.

The set SM is referred to as the subscription map of P with respect to S, wherein the subscription map may be obtained by the following query:

SELECT POID, PINST, SOID, SINST, TOPIC

FROM PUBLICATIONS

WHERE SSID=S

The PUBLICATIONS_QUEUE table is used by the publisher to batches the requests for the protocol handler to send when the interval is achieved, e.g., the UpdateInterval timer goes off. Also, the publisher is required to retry requests for which a response has not been received. The publisher thus tracks the messages that need to be sent for the first time, or those that need to be resent. This is done in the PUBLICATIONS_QUEUE table, which looks like this:

| PQKEY | PKEY | PCN |
|---|---|---| wherein:
PQKEY   Primary key for this table
PKEY    Identifies the row in PUBLICATIONS table - effectively pointing to a document in the publisher service, the changes to which needs to be published to a subscribing document
PCN     Last known change number of the publisher's data which was sent to the subscriber The PCN field is required to ensure correct updates in situations when multiple updates happen to the underlying data before a response is received from the subscriber. By way of example, suppose that change number five (5) occurs during update interval ten (10); a row is inserted into the PUBLICATION_QUEUE, with PCN=(5). When the interval timer goes off for the tenth time, a message is sent to the subscriber, with the changes relating to PCN=5. Assume that for whatever reason, a response from the subscriber is not received for this message, and during update interval eleven (11), change number six (6) occurs. This causes the PCN in the PUBLICATION_QUEUE to be updated from five (5) to six (6). At this time, the response comes back from the subscriber for the original message containing the change number that it had received, which is equal to five (5). The publisher compares this change number with the change number that it has stored in the PUBLICATION_QUEUE table, and finds that the one in the table has a value of 6. So, it knows that more changes need to be sent to the subscriber (those corresponding to change number six (6)), and hence it retains the row in the queue. Note that if during update interval eleven (11), change number six (6) did not occur, then the PCN in the PUBLICATION_QUEUE would still be five (5) and the publisher's comparison of this change number with the change number that it has stored in the PUBLICATION_QUEUE, would be true and the publisher would have deleted the row from the queue.

As described above, the Publication Queue Store does not store messages, but the information needed to create the messages. One reason is that the storage required by these messages is likely to be huge, so rather than storing the actual messages in the table, during an update interval, the publisher uses entries in this table to look up the ROLE of the owner of the subscribing document (from the PUBLICATIONS table), and generates the request message at the time of sending it. Another reason for not storing messages deals with multiple updates occurring within a single updateinterval. In this case multiple copies of the messages would needlessly get generated and then overwritten. Another reason to not store messages in the queue is that messages are collated so that similar data payloads get combined into a single outbound request. Generating messages for every queue entry would mean a redundant effort, discarded at message send time.

The subscriber uses a SUBSCRIPTIONS table to keep track of the subscriptions that are in effect:

| SKEY | SOID | SINST | POID | PINST | PSID | PCN | TOPIC |
|------|------|-------|------|-------|------|-----|-------| wherein:
SKEY    The primary key for this table; note that the columns POID, PINST, SOID, SINST and PSID form a candidate key
SOID    Owner-ID of the subscriber
SINST   Instance ID of the subscribing service
POID    Owner-ID of the publisher
PINST   Instance-ID of the publishing service
PSID    ID of the publishing service
PCN     Last known change number of the publisher's data received from the publisher
TOPIC   If the subscribing document is having multiple subscriptions with a publishing document, then a TOPIC is used to distinguish them.

Note that the existence of a row in this table implies that the associated publishing service has one or more associated entries in its PUBLICATIONS table. The PCN field is required to ensure that publisher retries are idempotent.

Recall that the subscriber batches requests and the protocol handler sends the requests every time the UpdateInterval timer goes off. Also, the subscriber is required to retry requests for which a response has not been received. Thus it needs to keep track of all messages that need to be sent for the first time, or need to be resent, which is done in the SUBSCRIPTIONS_QUEUE table:

| SQKEY | SOID | SINST | TOPIC | POID | PINST | OPERATION | SCN |
|-------|------|-------|-------|------|-------|-----------|-----| wherein:
SQKEY       The primary key for this table
SOID        Owner-ID of the subscriber
SINST       Instance ID of the subscribing service
TOPIC       The TOPIC ID for this subscription
POID        Owner-ID of the publisher
PINST       Instance-ID of the publishing service
OPERATION   Boolean; TRUE is addition and FALSE is deletion of subscription
SCN         Change number that keeps track of how many times this subscription has been added or deleted.

Note that the subscription queue does not store messages. Instead, the OPERATION field in the Queue indicates whether this request is to add a subscription or delete a subscription. During an update interval, the protocol handler simply looks at the OPERATION field and dynamically generates the appropriate request message. Thus, even though the subscription queue does not store the message, it has the information needed to formulate the message. Further, note that the subscription queue has multiple columns, while the publication-queue has only a key, because the publication queue only needs to identify which one of the pre-existing subscriptions needs a data update. Thus, it only needs to store the row-id in the PUBLICATIONS table. However, the subscription queue sometimes needs to add a subscription, and the information needed for this purpose should be in the subscription queue. The SCN field is required to ensure correctness in cases where the user adds/deletes the same subscription multiple times—for example, the user adds a subscription, and then deletes it or deletes a subscription and then adds it—before the original request was sent to, and a response received from, the publisher. In such cases, each change of mind on the part of the user is treated as a change, and is assigned a change number. This number is passed back and forth between subscriber and publisher in the request and response messages and ensure that the multiple adds and deletes are processed properly.

This updateSubscriptionData message is provided when a user's document gets modified. The publishing service checks the contents of the PUBLICATIONS table for interested subscribers by issuing the following logical query:

SELECT * FROM PUBLICATIONS

WHERE POID=% AFFECTED_POID % AND
    PINST=% AFFECTED_PINST % AND
    TOPIC=% TOPIC %

GROUP BY SSID, ROLE

The publisher uses this information to construct an updateSubscriptionData message to each affected subscribing service. For the set of distinct ROLES used within the result set an associated set of filtered data is created in a service dependent manner. Then, the data is factored by SSID and each affected subscriber is sent an updateSubscriptionData message (actually the messages are queued up and sent the next time the Update Interval timer goes off).

The message format for updateSubscriptionData follows the following schema using the XMI conventions:

```
<updateSubscriptionData topic="###">_{1..1}
    <updateData  publisher="..."
                 instance="..."
                 changeNumber="###">_{0..unbounded}
        <subscription subscriber="..."
                      instance="..."/>="..."_{0..unbounded}
        <subscriptionData>_{1..1}</subscriptionData>
    </updateData>
</updateSubscriptionData>
```

The data contained in the subscriptionData entity is defined by the participants in the service-to-service communication. Documents which engage in multiple publish/subscribe relationships should use the @topic attribute to disambiguate the meaning of the content. The @topic attribute is a URI and is specific to the instance of service-to-service communication. For instance the myProfile to myContacts communication topic could use a URI like: urn:microsoft.com:profile-contacts:1.0. No service should attempt to accept an updateSubscriptionMap request for any conversation that they have not been explicitly configured to accept.

The message format for updateSubscriptionDataResponse follows the following schema using the XMI conventions:

```
<updateSubscriptionDataResponse topic="###">_{1..1}
    <updatedData publisher="..." changeNumber="..."
                 instance="...">_{0..unbounded}
        <subscription subscriber="..."
                      instance="..."/>="..."_{0..unbounded}
    </updatedData>
```

-continued

```
    <deleteFromSubscriptionMap subscriber="..."
                      instance="..." />$_{0..unbounded}$
</updateSubscriptionDataResponse>
```

The function of <updatedData> is to inform the publisher, while <deleteFromSubscriptionMap> is used by the subscriber to tell the publisher that this SOID/SINST has been deleted.

When a set of users change their subscription statuses, the set of changes are sent to the affected Publishers within an updateSubscriptionMap message. When the Publisher receives this message it updates the records in the PUBLICATION_TABLE. It is important to the correctness of the protocol that all updates are handled robustly. In particular it is not an error to add an entry more than once. Likewise it is not an error to delete a non-existent entry. In both these cases it is important to format the response so that success is indicated for these cases.

The message format for updateSubscriptionMap follows the following schema using the XMI conventions:

```
<updateSubscriptionMap topic="###">$_{1..1}$
    <addToSubscriptionMap subscriber="..."
                  instance="..."
                  scn="###">$_{0..unbounded}$
        <subscription publisher="..."
                  instance="..."/>="..."$_{0..unbounded}$
    </addToSubscriptionMap>
    <deleteFromSubscriptionMap subscriber="..."
                  instance="..."
                  scn="###">$_{0..unbounded}$
        <subscription publisher="..."
                  instance="..."/>="..."$_{0..unbounded}$
    </deleteFromSubscriptionMap>
</updateSubscriptionMap>
```

The addToSubscriptionMap section is used to make additions to the subscriptionMap, while the deleteFromSubscriptionMap removes entries.

The message format for updateSubscriptionMapResponse follows the following schema using the XMI conventions:

```
<updateSubscriptionMapResponse topic="###">$_{1..01}$
    <addedToSubscriptionMap subscriber="..."
                  instance="..."
                  scn="###">$_{0..unbounded}$
        <subscription publisher="..."
                  instance="..."/>$_{0..unbounded}$
    </addedToSubscriptionMap>
    <deletedFromSubscriptionMap subscriber="..."
                  instance="..."
                  scn="###">$_{0..unbounded}$
        <subscription publisher="..."
                  instance="..."/>$_{0..unbounded}$
    </deletedFromSubscriptionMap>
    <unknownPID publisher="..." instance="..."/>$_{0..unbounded}$
</updateSubscriptionMapResponse>
```

The <addedToSubscriptionMap> and <deletedFromSubscriptionMap> provide status information, while the entity <unknownPID> is used in situations where a publishing user is deleted.

Services also need to send out messages when they come on-line, e.g., to wake up other services which have stopped sending them messages. To this end, whenever a service is going offline or coming online, the service should send out the following message to its partner services stored in its connections table (604 if a publisher, 614 if a subscriber, although it is understood that a service may be both a publisher and a subscriber and thus access both tables at such a time). The format of this message using the XMI conventions is:

```
<serviceStatus>1..1
    <online/>0..1
    <offline />0..1
</serviceStatus>
```

Only one of the online or offline entities should be sent in any given message.

There is no defined response format for this message, as the normal .NET My Services ACK or fault response supplies the information needed.

SSCP is designed so that the protocol does not impose any indigenous restrictions on what can or cannot be subscribed to. At the one extreme, a service can request a subscription to all of publisher's data (at least, all that is visible to it). However, it may also subscribe to only a subset of it. The "topic" attribute of updateSubscriptionMap message is used to specify this. From the perspective of SSCP, a topic is simply an identifier (mutually agreed upon by the subscriber and publisher) which specifies what the subscriber wants to subscribe to. For instance, if myInbox service only wants to subscribe to an email address in myContacts service (which is the case for whitelists) then one way of using "topic" attribute would be:

1) myInbox and myContacts agree that the identifier "emailOnly" indicates that only the email address should be subscribed to.
2) myInbox sends an updateSubscriptionMap request to myContacts in which it sets topic="emailOnly".
3) When email data for a contact changes, the publisher sends knows to send out an updateSubscriptionData message with only the email changes to the subscriber; in this message, it sets topic="emailOnly".

Because the value of the topic attribute is included in updateSubscriptionData message, a subscribing document S can have multiple subscriptions with a publishing document P where each subscription differs by only the topic attribute.

Figure 21:
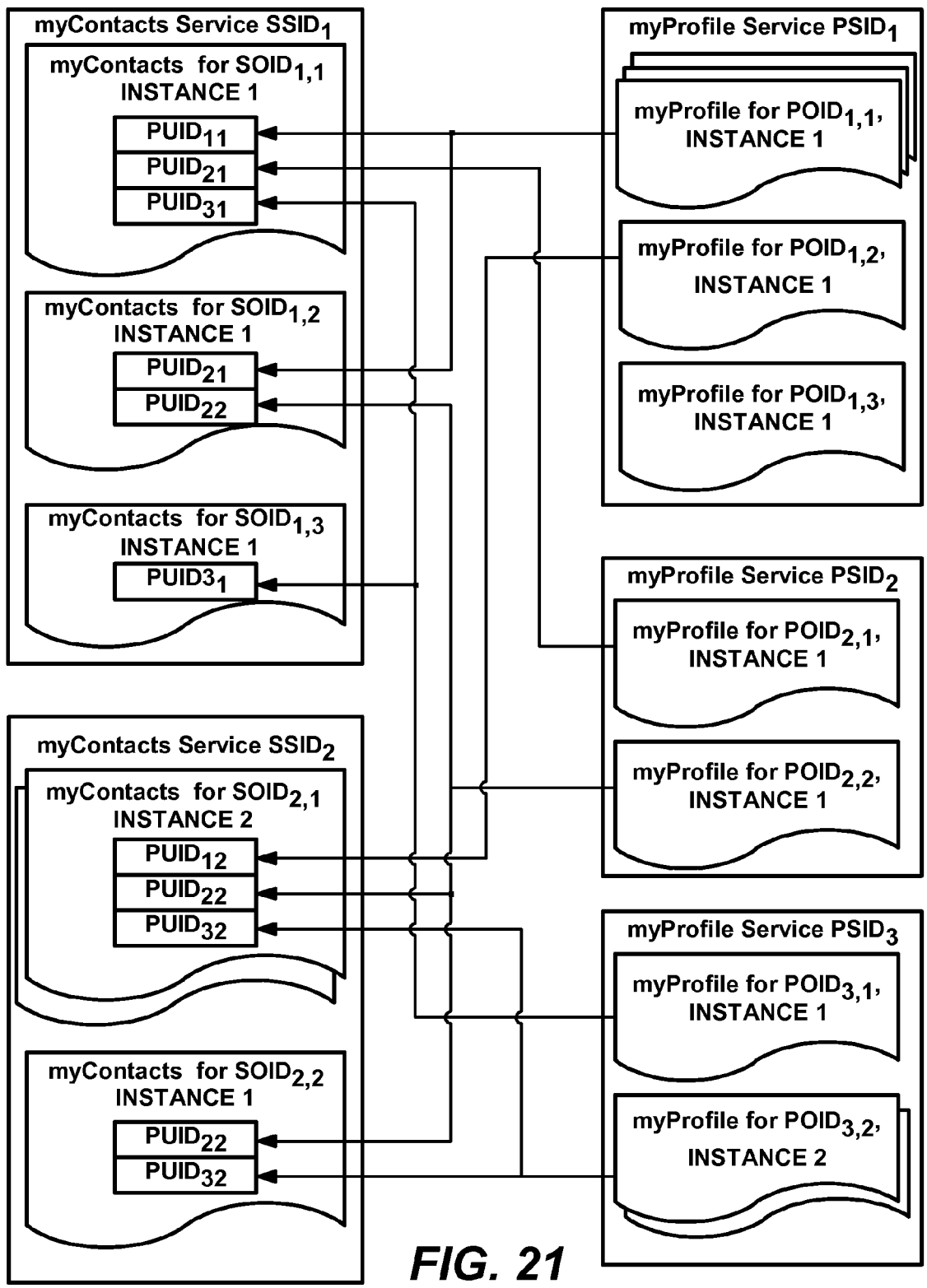

By way of explanation of the operation of the present invention, the protocol handler wakes up when the interval timer goes off, and the handler sends the queued requests, or a request is received from another service, and the handler performs the requested action and sends a response. By way of example using the Live Contacts operation, consider FIG. 21, in which there are three myProfile services whose IDs are $PSID_1$, $PSID_2$, and $PSID_3$. In FIG. 21:

$PSID_1$ contains the profile documents of three users: $POID_{11}$, $POID_{12}$, $POID_{13}$ $POID_{11}$ has three instance documents: 1, 2, and 3.

$POID_{12}$ and $POID_{13}$ have one instance document each.

$PSID_2$ contains profile documents of two users: $POID_{21}$ and $POID_{22}$, each having one instance document.

$PSID_3$ contains profile documents of two users: $POID_{31}$ and $POID_{32}$.

$POID_{31}$ has one instance document.

$POID_{32}$ has two instance documents: 1 and 2.

There are two myContacts services whose IDs are $SSID_1$ and $SSID_2$.

$SSID_1$ manages contact documents of three users: $SOID_{11}$, $SOID_{12}$, and $SOID_{13}$, each with one instance document.

$SSID_2$ manages contact documents of two users: $SOID_{21}$ and $SOID_{22}$.

$SOID_{21}$ has two instance documents: 1 and 2.

$SOID_{22}$ has one instance document.

The initial subscription maps look like below, with each document represented by the tuple (owner-id, instance):

$PSID_1$:
  $(POID_{11},1)$: friend($SOID_{11}$,1), associate($SOID_{12}$,1)
  $(POID_{12},1)$: other($SOID_{21}$,2)
  $(POID_{13},1)$:

$PSID_2$:
  $(POID_{21},1)$: friend($SOID_{11}$,1)
  $(POID_{22},1)$: friend(($SOID_{21}$,2), ($SOID_{22}$,1)), associate ($SOID_{12}$,1)

$PSID_3$:
  $(POID_{31},1)$: associate($SOID_{11}$,1), other($SOID_{13}$,1)
  $(POID_{32},2)$: friend($SOID_{21}$,2), associate($SOID_{22}$,1)

$SSID_1$:
  $(SOID_{11},1)$: $(POID_{11},1)$, $(POID_{21},1)$, $(POID_{31},1)$
  $(SOID_{12},1)$: $(POID_{11},1)$, $(POID_{22},1)$
  $(SOID_{13},1)$: $(POID_{31},1)$ $SSID_2$:
  $(SOID_{21},2)$: $(POID_{12},1)$, $(POID_{22},1)$, $(POID_{32},2)$
  $(SOID_{22},1)$: $(POID_{22},1)$, $(POID_{32},2)$

The two contacts services each include a CONNECTIONS table (for simplicity, information such as cluster, URL, and so on, are not shown below).

For $SSID_1$ the connections table includes:

| $SSID_1$ CONNECTIONS Table |
| --- |
| $PSID_1$ |
| $PSID_2$ |
| $PSID_3$ | while for $SSID_2$ the connections table includes:

| $SSID_2$ CONNECTIONS Table |
| --- |
| $PSID_1$ |
| $PSID_2$ |
| $PSID_3$ |

The three profile services each contain a PUBLICATIONS table (for simplicity, information such as PKEY or SCN columns are not shown below).

For $PSID_1$ this looks like:

| $PSID_1$ PUBLICATIONS Table | | | | | |
| --- | --- | --- | --- | --- | --- |
| POID | PINST | SOID | SINST | SSID | ROLE |
| $POID_{11}$ | 1 | $SOID_{11}$ | 1 | $SSID_1$ | friend |
| $POID_{11}$ | 1 | $SOID_{12}$ | 1 | $SSID_1$ | associate |
| $POID_{12}$ | 1 | $SOID_{21}$ | 2 | $SSID_2$ | other |

And for $PSID_2$ this looks like:

| $PSID_2$ PUBLICATIONS Table | | | | | |
| --- | --- | --- | --- | --- | --- |
| POID | PINST | SOID | SINST | SSID | ROLE |
| $POID_{21}$ | 1 | $SOID_{11}$ | 1 | $SSID_1$ | friend |
| $POID_{22}$ | 1 | $SOID_{12}$ | 1 | $SSID_1$ | associate |
| $POID_{22}$ | 1 | $SOID_{21}$ | 2 | $SSID_2$ | friend |
| $POID_{22}$ | 1 | $SOID_{22}$ | 1 | $SSID_2$ | friend |

Finally for $PSID_3$ this looks like:

| $PSID_3$ PUBLICATIONS Table | | | | | |
| --- | --- | --- | --- | --- | --- |
| POID | PINST | SOID | SINST | SSID | ROLE |
| $POID_{31}$ | 1 | $SOID_{11}$ | 1 | $SSID_1$ | associate |
| $POID_{31}$ | 1 | $SOID_{13}$ | 1 | $SSID_1$ | other |
| $POID_{32}$ | 2 | $SOID_{21}$ | 2 | $SSID_2$ | friend |
| $POID_{32}$ | 2 | $SOID_{22}$ | 1 | $SSID_2$ | associate |

Updating Subscription Map

If during an update interval on $SSID_1$ document $SOID_{11}$/instance1 adds links to the documents $POID_{12}$/instance1 and $POID_{32}$/instance2 and deletes the link from $POID_{11}$/instance1, while $SOID_{12}$/instance1 deletes the link from $POID_1$/instance1 the contents of the SUBSCRIPTIONS_QUEUE for $SSID_1$ is:

| $SSID_1$ SUBSCRIPTIONS_QUEUE | | | | | | |
| --- | --- | --- | --- | --- | --- | --- |
| SOID | SINST | POID | PINST | PSID | OPERATION | SCN |
| $SOID_{11}$ | 1 | $POID_{12}$ | 1 | $PSID_1$ | TRUE | 0 |
| $SOID_{11}$ | 1 | $POID_{32}$ | 2 | $PSID_3$ | TRUE | 0 |
| $SOID_{11}$ | 1 | $POID_{11}$ | 1 | $PSID_1$ | FALSE | 0 |
| $SOID_{12}$ | 1 | $POID_{11}$ | 1 | $PSID_1$ | FALSE | 0 |

When processed this will generate two different updateSubscriptionMap requests that are sent to the two affected myProfile services. $PSID_1$ is sent:

```
<updateSubscriptionMap topic="####">
    <addToSubscriptionMap subscriber="SOID11" instance="1"
            scn="0">
        <subscription publisher="POID12" instance="1"/>
    </addToSubscriptionMap>
    <deleteFromSubscriptionMap subscriber="SOID11"
            instance="1" scn="0">
        <subscription publisher="POID11" instance="1"/>
    </deleteFromSubscriptionMap>
    <deleteFromSubscriptionMap subscriber="SOID12"
            instance="1" scn="1">
        <subscription publisher="POID11" instance="1"/>
    </deleteFromSUbscriptionMap>
</updateSubscriptionMap>
```

And $PSID_3$ is sent:

```
<updateSubscriptionMap topic="####">
    <addToSubscriptionMap subscriber="SOID11"
            instance="1" scn="0">
        <subscription publisher="POID32" instance="2"/>
```

-continued

```
</addToSubscriptionMap>
</updateSubscriptionMap>
```

After receiving these messages each myProfile service updates the contents of their PUBLICATIONS table as follows (with the TOPIC and SCN columns not shown).

For $PSID_1$ the resulting table looks like:

PSID₁ PUBLICATIONS Table

| POID | PINST | SOID | SINST | SSID | ROLE |
|---|---|---|---|---|---|
| $POID_{12}$ | 1 | $SOID_{21}$ | 2 | $SSID_2$ | Other |
| $POID_{12}$ | 1 | $SOID_{11}$ | 1 | $SSID_1$ | associate |

And for $PSID_3$ the resulting table looks like:

PSID₃ PUBLICATIONS Table

| POID | PINST | SOID | SINST | SSID | ROLE |
|---|---|---|---|---|---|
| $POID_{31}$ | 1 | $SOID_{11}$ | 1 | $SSID_1$ | associate |
| $POID_{31}$ | 1 | $SOID_{13}$ | 1 | $SSID_1$ | Other |
| $POID_{32}$ | 2 | $SOID_{11}$ | 1 | $SSID_1$ | Other |
| $POID_{32}$ | 2 | $SOID_{21}$ | 2 | $SSID_2$ | Friend |
| $POID_{32}$ | 2 | $SOID_{22}$ | 1 | $SSID_2$ | associate |

Assuming from the original configuration that document $POID_{11}$/instance1 changes the contents on his or her profile. So $PSID_1$ constructs the following updateSubscriptionData message to $SSID_1$:

```
<updateSubscriptionData topic="####">
    <updateData publisher="POID₁₁" instance="1"
            changeNumber="###">
        <subscription subscriber="SOID₁₁" instance="1"/>
        <subscriptionData>friend-info</subscriptionData>
    </updateData>
    <updateData publisher="POID₁₁" instance="1"
            changeNumber="###">
        <subscription subscriber="SOID₁₂" instance="1"/>
        <subscriptionData>associate-info</subscriptionData>
    </updateData>
</updateSubscriptionData>
```

Note that the message is split between two updateData blocks because of different roles being assigned. If $POID_{22}$/instace1 was to change his profile information this would result in $PSID_2$ sending out two updateSubscriptionData messages to $SSID_1$ and $SSID_2$.

```
<!-- to SSID₁ -->
```

```
<updateSubscriptionData topic="####">
    <updateData publisher="POID₂₂" instance="1"
            changeNumber="###">
        <subscription subscriber="SOID₁₂" instance="1"/>
        <subscriptionData>associate-info</subscriptionData>
    </updateData>
</updateSubscriptionData>
<updateSubscriptionData topic="####">
```

```
<!-- to SSID₂ -->
```

```
<updateSubscriptionData topic="####">
    <updateData publisher="POID₂₂" instance="1"
            changeNumber="###">
        <subscription subscriber="SOID₂₁" instance="2"/>
        <subscription subscriber="SOID₂₂" instance="1"/>
        <subscriptionData>friend-info</subscriptionData>
    </updateData>
</updateSubscriptionData>
```

Note in this case the message to $SSID_2$ only contains one copy of the data optimizing for identical roles.

As described herein, SSCP is a robust protocol which is able to handle many different kinds of failure scenarios, including:

1) Publisher fails
2) Subscriber fails
3) The link between publisher and subscriber goes down before the subscriber can respond (after it has received a request)
4) The link between publisher and subscriber goes down before the publisher can respond (after it has received a request)
5) Publisher loses the subscription map
6) Subscriber loses published data These failure scenarios are handled by the protocol via message retries and idempotency.

In the following explanation, it is assumed that the publisher sends the request message, however this applies equally well when the subscriber sends the request message.

When the publisher sends a request message, SSCP follows the following algorithm:

1) Publisher sends a message from the PUBLICATIONS_QUEUE.
2) It waits for a response to this message
  a) If it gets a response, it deletes the message from the queue
  b) Otherwise, it keeps the message in the queue and resends it the next time the Update Interval timer goes off.
3) As explained herein, the number of times a message is resent is bounded by a maximum after which the subscriber is considered dead. It is tested for alive-ness after a "long time" and the process begins all over.
4) This method ensures that the subscriber does not miss an updateSubscriptionData message.

As described above, retry attempts should idempotent, i.e., multiple retries of a request should behave as if the request had been sent only once. Idempency is achieved by keeping track of the change number, or PCN (which is a column in the PUBLICATIONS and SUBSCRIPTIONS tables). Note that the underlying service implementation has change number data, and keeps track of it, independent of SSCP. As used herein such changed numbers are logically reflected as an integer sequence, however in general, the PCNs need not be sequential, but instead may be whatever the service has, as long as it increases or decreases monotonically. Note also that the smallest unit of change is a .NET blue node, wherein currently a blue node is the smallest query-able, cacheable, unit of data in .NET.

Change numbers generally work as follows:

When a fresh subscription is created, the publisher adds a row into the PUBLICATIONS table, with PCN being set to 0 to indicate that no data has yet been exchanged. The subscriber also keeps track of the value of this PCN in its SUBSCRIPTIONS table. Whenever the publisher sends an updateSubscriptionData request to the subscriber, it includes the value of PCN that it currently has for this (e.g., blue) node. It records this PCN in the PUBLICATIONS table. On receiving the updateSubscriptionData message, the subscriber updates its copy of the PCN (present in the PCN field of SUBSCRIPTIONS table) to the new value. If, due to a transient network failure, the publisher fails to receive the response message from the subscriber, it resends the request message again at the next update interval. On receiving this request, the subscriber inspects the PCN; it knows that it has already processed this message because the publisher's change number in the message is the same as the PCN that it has, and thus treats this as a no-op and sends back a response. The publisher deletes this message from the message queue, and the net result is, any message received multiple times by the subscriber is processed exactly once—i.e., retries are idempotent.

The subscriber achieves idempotency is by the following rules: when a publisher receives a request to add a preexisting entry to its subscription map, it should treat this as a no-op and not return an error. When the publisher receives a request to delete a non-existent entry from its subscription map, it should treat this as a no-op and not return an error. As can be appreciated, multiple add or delete from subscription map requests behave as if there of only one such request.

The SCN field is required to ensure correctness in cases where the user adds/deletes the same subscription multiple times—for example, the user adds a subscription, and then deletes it or deletes a subscription and then adds it—before the original request was sent to, and a response received from, the publisher. In such cases, each change of mind on the part of such a user is treated as a change, and is assigned a change number. Change numbers are monotonically increasing. Here is how change numbers (SCN) are treated with in the publisher and subscriber algorithms:

A) Whenever a user adds or deletes a subscription, the subscriber looks at its subscription queue to see if there exists a pending request in queue from this user/instance pair to the corresponding publishing document.
  I) If there exists such a pending request, then the subscriber replaces the request with the new one.
  II) If a pending request does not exist, then the subscriber inserts the new request.
  III) In either case, the SCN is updated to a new increased value.
B) The net result of the above is: at any given point, the subscription queue contains only the last request made by the user; but the change number has increased every time the user changes his mind.
C) The updateSubscriptionMap request includes the current value of the change number from the queue for each add or delete entity present in the request.
D) When the publisher receives an updateSubscriptionMap request, it does the following for every add/delete entity in the request:
  I) If the entity is add, then:
    i) If this subscription is already present in the publications table and then:
      (1) if the SCN in the message is greater than the SCN that it has, then it updates to the higher value of SCN
      (2) Otherwise it is ignored.
    ii) Otherwise it inserts this subscription into the publications table, records the SCN.
  II) If the entity is delete, and if this subscription is present in the publications table then:
    i) It is deleted if the SCN in the message is greater than the SCN that the publisher has, it deletes the subscription from its publications table.
    ii) Otherwise it is ignored.
  In any case, it sends the SCN that it received as part of the response message.
E) When a subscriber receives an updateSubscriptionMapResponse from the publisher, it does the following for each entity in the response:
  I) If there is no entry in the subscription queue corresponding to this entity, then it is ignored
  II) Otherwise:
    i) If the SCN in the entity is less than the SCN in the queue, then it is ignored.
    ii) Otherwise, the corresponding entry in the queue is removed.

To see why this algorithm works, consider the following cases:
1) In an ordinary case (happens large majority of the time), when a User does an add (or a delete)
  a) The add (delete) is stored in the queue with SCN=2
  b) (Assume) This subscription does not exist (exists) at the publisher.
  c) At the next update interval, the subscriber sends an updateSubscriptionMap message with an add (delete) entity for which SCN=2
  d) The publisher receives this request; it adds it to (deletes it from) the publication table with SCN=2, and sends back a response with SCN=2
  e) The subscriber compares the SCN in the response finds that it is the same as what is in the queue, and purges the queue.
  f) Net effect: the subscription is added (deleted).
In extraordinary cases:
2) User does an Add followed by a delete within the same update interval:
  a) The add is stored in the queue with SCN=2
  b) The delete request overwrites the add request, and the SCN is updated to 3.
  c) (Assume) This subscription does not exist at the publisher.
  d) At the next update interval, the subscriber sends an updateSubscriptionMap message with a delete entity for which SCN=3
  e) The publisher receives this request; since the subscription does not exist, it does nothing, and sends back a response with SCN=3
  f) The subscriber compares the SCN in the response finds that it is the same as what is in the queue, and purges the queue.
3) Same as above, but add and delete happen within different update intervals
  a) Add is stored in the queue with SCN=2
  b) When update interval timer goes off, an updateSubscriptionMap is sent with an add entity for which SCN=2.
  c) Three cases are generally possible:
    i) The message reaches the publisher and it sends a response which reaches the subscriber. Call this SUCCESS case.
    ii) The message reaches the publisher and it sends back a response which does not reach the subscriber. Call this PARTIAL case
    iii) The message does not reach the publisher. Call this the FAILURE case.

d) In the SUCCESS case:
   i) The process of addition takes place at the publisher as explained in case (1). An SCN of 2 is stored in the publication table.
   ii) The user now asks that the subscription be deleted, which causes a delete to be stored in the queue with SCN=3.
   iii) During the next update interval, an updateSubscriptionMap message is sent with a delete entity for which SCN=3.
   iv) The process of deletion takes place as explained in case (1)
e) In the PARTIAL case:
   i) Since the publisher has received the add message, the process of addition takes place at the publisher as explained in case (1). An SCN of 2 is stored in the publication table.
   ii) The subscriber has not received a response for the add, so the add remains in the queue.
   iii) The user now asks that the subscription be deleted, which causes a delete to be stored in the queue with SCN=3. The add has been over-written.
   iv) During the next update interval, an updateSubscriptionMap message is sent with a delete entity for which SCN=3.
   v) A delete is performed as explained in case (1)
   vi) If, for some reason, the original response that the publisher sent for the add message now reaches the subscriber, the subscriber simply ignores it since there is no entity in the subscription queue that corresponds to this response.
f) With respect to the subscriber, the FAILURE case is logically equivalent to the PARTIAL case and is handled identically; with respect to the publisher, the only difference between PARTIAL and FAILURE is: in the FAILURE case, the delete request is a no-op since the publisher never received the add request.

The cases above have considered an add followed by a delete. Clearly, a delete followed by an add also works similarly. Furthermore, a series of adds/deletes by the user (in any order and in any interval and in any combination of the success/partial/failure cases) will also work and the right things will happen. However, there is are cases that are particularly problematic:

4) A trick case: requests arrive at the publisher out of sequence.
   a) The user does an add. This request is kept in the queue with an SCN=2.
   b) At the next update interval, an updateSubscriptionMap request is sent to the publisher with an add entity and SCN=2.
   c) Next the user does a delete of the same subscription. This request is kept in the queue with an SCN=3.
   d) At the next update interval, an updateSubscriptionMap request is sent to the publisher with an add entity and SCN=3.
   e) For some strange reason, the delete request arrives at the publisher before the add request.
   f) The publisher processes the delete request by removing this subscription (if it exists), and sends a response with SCN=3.
   g) The subscriber deletes the corresponding entity from the queue.
   h) Now the publisher receives the add request with SCN=2. According to the algorithm, it adds the subscription to its publication queue. And it sends back a response with SCN=2.
   i) The subscriber ignores this response since there is no entity in the subscription queue corresponding to this response.

The net of this is, there now exists a subscription in the publisher which shouldn't be there. The net result of the trick case is that it is possible for a rogue subscription to exist at the publisher; the subscriber has no record of this subscription in its subscription table. As a result, it is possible for the subscriber to receive an updateSubscriptionData message for a subscription that does not exist. When this happens, the subscriber does the following:
   A) It checks its subscription queue to see if the queue has a delete or an add message for this subscription. If there is one, then it does nothing.
   B) If there isn't a delete message in the queue already, it inserts a message in the queue with an incremented SCN
   C) At the next update interval, an updateSubscriptionMap message is sent to the publisher.
   D) When the publisher receives this message:
      I) it checks its publication queue to see if there are any pending messages to be sent to this subscription in its publication queue. If there is, these pending messages are removed.
      II) It deletes the subscription from its publications table and sends a response back.

The cases above have considered an add followed by a delete, but note that a delete followed by an add also works similarly. Furthermore, a series of adds/deletes by the user (in any order and in any interval and in any combination of the success/partial/failure cases) will also work and the right things will happen. However, another case is particularly problematic:

5) A trick case: requests arrive at the publisher out of sequence.
   a) The user does an add. This request is kept in the queue with an SCN=2.
   b) At the next update interval, an updateSubscriptionMap request is sent to the publisher with an add entity and SCN=2.
   c) Next the user does a delete of the same subscription. This request is kept in the queue with an SCN=3.
   d) At the next update interval, an updateSubscriptionMap request is sent to the publisher with an add entity and SCN=3.
   e) For some strange reason, the delete request arrives at the publisher before the add request.
   f) The publisher processes the delete request by removing this subscription (if it exists), and sends a response with SCN=3.
   g) The subscriber deletes the corresponding entity from the queue.
   h) Now the publisher receives the add request with SCN=2. According to the algorithm, it adds the subscription to its publication queue. And it sends back a response with SCN=2.
   i) The subscriber ignores this response since there is no entity in the subscription queue corresponding to this response.

The net of this is, there now exists a subscription in the publisher which shouldn't be there. The net result of the trick case is that it is possible for a rogue subscription to exist at the publisher; the subscriber has no record of this subscription in its subscription table. As a result, it is possible for the subscriber to receive an updateSubscriptionData message for a subscription that does not exist. When this happens, the subscriber does the following:

E) It checks its subscription queue to see if the queue has a delete or an add message for this subscription. If there is one, then it does nothing.
F) If there isn't a delete message in the queue already, it inserts a message in the queue with an incremented SCN
G) At the next update interval, an updateSubscriptionMap message is sent to the publisher.
H) When the publisher receives this message:
I) it checks its publication queue to see if there are any pending messages to be sent to this subscription in its publication queue. If there is, these pending messages are removed.
II) It deletes the subscription from its publications table and sends a response back.

Thus, this unusual case simply means that there will exist one or more rogue subscriptions at the publisher until such time that the data subscribed by these rogue subscriptions change. At this point, the protocol logic takes over and deletes the rogue subscription. Note that the vast majority of the time, the simple case (1) is what takes place, and the other cases occur only very rarely.

When the publisher fails, the publisher will not be able to respond to subscriber requests to update the subscription map, which is handled by resending the message until a response is received. Long-term or catastrophic failures are handled by having a limit on the number of retries and waiting for a "long time" before starting all over. The publisher will also not receive any responses that the subscriber may have sent to its updateSubscriptionData requests. From the point of view of the subscriber, this is logically indistinguishable from the case where the link between subscriber and publisher fails.

When the subscriber fails, it is very similar to what happens when the publisher fails. The subscriber continues to resend the updateSubscriptionMap requests until it receives a response from the publisher. As in the publisher case, the non-reception of responses by the subscriber is the same as a link failure.

A failure case can occur when the subscriber has sent an updateSubscriptionMap message, and the publisher has processed this message and sent a response, but the link between the publisher and subscriber fails. As a result, the subscriber does the not receive the response. As described in the section "Message retries", this causes the subscriber to resend the message. Thus the publisher receives a duplicate updateSubscriptionMap message from the subscriber. Since retries are idempotent, the publisher simply sends back a response to the subscriber. When the subscriber to publisher link fails, it is handled similarly.

Occasionally, POID/INSTANCE is deleted from the publisher, and the subscriber usually does not get notified of this event. Thus, when the subscriber sends an updateSubscriptionMap request concerning a POID/INSTANCE that no longer exists in the publisher, the publisher comes back with an <unknownPID> entity in the response. This tells the subscriber to update its image of the subscription map.

Occasionally, a SOID/INSTANCE is deleted at the subscriber; in general, the publisher has no way of knowing it. On data change, the publisher sends an update request to the deleted SOID/INSTANCE; when this happens, the subscriber sends a <deleteFromSubscriptionMap> entity in its response to notify the publisher of the SOID/INSTANCE deletion. This tells the publisher to update its subscription map.

One catastrophic form of failure is when a publisher loses its subscription map or the subscriber loses its subscription data. This can cause various levels of data loss. For example, if the publisher has experienced a catastrophic failure, such as disk crash, the publisher needs to revert to data from a back up medium such as tape. As a result, its subscription map is out of date. For the subscriber, a similar situation makes its subscribed data out of date. In such an event, the service that experienced the loss sends a message requesting an update. The publisher's subscription map can be brought up to date by the information stored in subscriptions table in the subscriber, while a subscriber's data can be made up to date by the subscription map and the change number stored in the publications table.

In general, the service that experienced the loss has enough knowledge to send a message requests an update. The publisher's subscription map can be brought up to date by the information stored in SUBSCRIPTIONS table in the subscriber. A subscriber's data can be made up to date by the subscription map and the publisher's change number stored in the PUBLICATIONS table.

The following describes the pseudo code for implementing key aspects of publisher and subscriber protocol handlers. Note that to avoid repetition and for brevity, separate flow diagrams are not provided to secondarily represent this pseudocode.

When the service or cluster starts up or is going through an orderly shutdown it sends out status messages to all connected services.

```
ServiceStartup( )
{
    serviceStatusRequest request;
    request.entity = "<startup/>";
    ## SELECT SID FROM CONNECTIONS
    for (each SID in result set)
    {
        Send(SID,request);
    }
}
ServiceShutdown( )
{
    serviceStatusRequest request;
    request.entity = "<shutdown/>";
    ## SELECT SID FROM CONNECTIONS
    for (each SID in result set)
    {
        Send(SID,request);
    }
}
```

When the update interval timer goes off at the subscriber or publisher, it takes actions implied by the following pseudocode. Note that the ProcessQueue routine is implemented differently by subscribers and publishers:

```
OnIntervalTimer( )
{
    // get a list of all live connections
    ## SELECT SID, RETRY FROM CONNECTIONS
    for (each SID in result set)
    {
        if (RETRY < RetryCount)
        {
            // more retries left. process messages in the queue
            // for this SID. The topics collection is stored in the
            // standard XML system configuration document
            for (TOPIC in TOPICS)
                ProcessQueue(SID, TOPIC);
        }
        else if (RETRY < ResetInterval)
        {
            // retry count exceeded; see if it's time to check for alive-
```

```
            ness
            ## UPDATE CONNECTIONS
            ## SET RETRY = RETRY + 1
            ## WHERE SID = %SID%
        }
        else
        {
            // check for alive-ness by starting another series of retries
            ## UPDATE CONNECTION
            ## SET RETRY = 0
            ## WHERE SID = %SID%
        }
    }
}
```

Service Status Messages

When a publisher or a subscriber receives a ServiceStatusMessage the following code is executed:

```
OnServiceStatus(SID, requestMessage)
{
    serviceStatusResponse response;
    // if serviceStatus is online
    if (requestMessage.entity == "<online/>")
    {
        // reset retry count to zero
        ## UPDATE CONNECTIONS
        ## SET RETRY = 0
        ## WHERE SID = %SID%
        response.entity = "<online/>";
        Send(SID, response);
    }
    else if (requestMessage.entity == "<offline/>")
    {
        // resent retry count to maximum
        ## UPDATE CONNECTIONS
        ## SET RETRY = %RetryCount%
        ## WHERE SID = %SID%
    }
}
```

When the data changes occur in the publisher, actions implied by the following pseudo-code are taken:

```
OnDataChanged(PUID, PINST, PCN, TOPIC)
{
    // PUID/PINST is the user id whose data was changed. Query the
    // publications table for all SUIDs that are affected, and insert this
    // data into the PUBLICATIONS_QUEUE, if it does not exist already.
    ## SELECT PKEY FROM PUBLICATIONS
    ## WHERE POID = %POID%
    ## AND PINST = %PINST% AND TOPIC = %TOPIC%
    for (each PKEY in the result)
    {
        ## IF NOT EXISTS (
        ##     SELECT * FROM PUBLICATIONS_QUEUE
        ##     WHERE PUBLICATIONS.PKEY= %PKEY%)
        ##     INSERT INTO PUBLICATIONS_QUEUE
        ##     (PKEY, PCN) VALUES (%PKEY%, %PCN%)
        ## ELSE
        ##     UPDATE PUBLICATIONS_QUEUE SET PCN=%PCN%
        ##     WHERE PUBLICATIONS_QUEUE.PKEY = %PKEY%
    }
}
```

When the update interval timer goes off at the publisher, it takes actions implied by the following pseudo-code:

```
ProcessQueue(SSID, TOPIC)
{
    UpdateSubscriptionDataRequest request;
    // select requests in the queue for this SSID; group them by
    // PUID followed by ROLE. The rows in each group will result
    // in one updateSubscriptionData message
    ## SELECT POID, PINST, SOID, SINST, ROLE, PCN
    ## FROM PUBLICATIONS_QUEUE PQ JOIN PUBLICATIONS P
    ## ON PQ.PKEY = P.PKEY
    ## WHERE SSID = %SSID AND PQ.TOPIC = %TOPIC%
    ## GROUP BY POID, PINST, ROLE
    for (each group of rows in the result set)
    {
        // gather up data for the per-topic part of this message
        data = GenerateTopicData(POID, PINST, ROLE, TOPIC)
        // generate an updateSubscriptionData message
        request += GenerateMessage(group, data);
    }
    // Send request to the subscriber
    Send(SSID, request);
    // Assume the worst and age the connection
    ## UPDATE CONNECTIONS
    ## SET RETRY = RETRY + 1
    ## WHERE SID = %SSID%
}
```

When a publisher receives an UpdateSubscriptionMap message, actions implied by the following pseudo-code are taken:

```
OnUpdateSubscriptionMap(SSID, requestMessage)
{
    UpdateSubscriptionMapResponse      response;
    // Mark this connection as live
    ## UPDATE CONNECTIONS
    ## SET RETRY = 0
    ## WHERE SID = %SSID%
    // the request can have multiple entities. Loop for each
    for (each entity in requestMessage)
    {
        // See if the POID, PINST of the <publisher> is known
        if (LookUpUser(POID, PINST))
        {
            // new subscription
            if (entity == "<addToSubscriptionMap>")
            {
                addToSubscriptionMap(SSID, entity, response, TOPIC);
            }
            else if (entity == "<deletedFromSubscriptionMap>")
            {
                deleteFromSubscriptionMap(SSID, entity, response, TOPIC);
            } // deleteFromSubscriptionMap
        }
        else
        {
            // append an "unknown PUID entity to response
            response+="<unknownPUID publisher='"+POID+"'
instance='"+PINST+"'/>";
        }
    }
    Send(SSID, response);
}
// Helper routine to handle add subMessage
addToSubscriptionMap(SSID, subMessage, response, TOPIC)
{
    response += "<addedToSubscriptionMap ";
    response += "subscriber='"+SOID+"' instance='"+SINST+"'/>";
    // the request can have multiple entities. Loop for each
    // determine role of the subscriber
    for (sub in subMessage)
    {
        ROLE = FindRole(POID, PINST, SOID);
        ## IF NOT EXISTS
        ## (SELECT PKEY
        ## FROM PUBLICATIONS
```

-continued

```
WHERE
SOID = %SOID% AND SINST = %SINST% AND
POID = %POID% AND PINST = %PINST% AND
SSID = %SSID% AND TOPIC = %TOPIC%)
BEGIN
INSERT INTO PUBLICATIONS VALUES
(%POID%, %PINST%, %SOID%, %SINST%, %SSID%,
                    %SCN%, %ROLE%, %TOPIC%)
        // set an initial message to update this subscriber
INSERT INTO PUBLICATIONS_QUEUE VALUES
(@@IDENTITY, %PCN%)
END
ELSE
BEGIN
UPDATE PUBLICATIONS SET SCN = sub.SCN
WHERE
SOID = %SOID% AND SINST = %SINST% AND
POID = %POID% AND PINST = %PINST% AND
SSID = %SSID% AND TOPIC = %TOPIC% AND
SCN < sub.SCN
END
    response += "<subscription publisher='"+POID+"'
instance='"+PINST+"'/>";
    }
    // append to the response message
    response += "</addedToSubscriptionMap>";
    }
// Helper routine to handle delete subMessage
deleteFromSubscriptionMap(SSID, subMessage, response, TOPIC)
{
    response += "<deletedFromSubscriptionMap ";
    response += "subscriber='"+SOID+"' instance='"+SINST+"'/>";
    // the request can have multiple entities. Loop for each
    for (sub in subMessage)
    {
        // delete from PUBLICATIONS table. If a non-existent
        // row is asked to be deleted, the delete will simply
        // return without deleting anything
        ## SELECT SCN AS STORED_SCN FROM PUBLICATIONS
        ## WHERE
        ## SOID = %SOID% AND SINST = %SINST% AND
        ## POID = %POID% AND PINST = %PINST% AND
        ## SSID = %SSID% AND TOPIC = %TOPIC%)
        ##
        ## IF (result is not empty or STORED_SCN < %SCN%)
        ##      DELETE PUBLICATIONS
        ##      WHERE
        ##          SOID = %SOID% AND SINST = %SINST% AND
        ##          POID = %POID% AND PINST = %PINST% AND
        ##          SSID = %SSID% AND TOPIC = %TOPIC%)
        // NOTE: Are assuming cascade delete on PKEY is set up
        response += "<subscription publisher='"+POID+"'
instance='"+PINST+"'/>";
    }
    // append to the response message
    response += "</deletedFromSubscriptionMap>";
}
```

When a publisher receives an UpdateSubscriptionDataResponse message, actions implied by the following pseudo-code are taken:

```
OnUpdateSubscriptionDataResponse(SSID, response)
{
    // Mark this connection as live
    ## UPDATE CONNECTIONS
    ## SET RETRY = 0
    ## WHERE SID = %SSID%
    // The response has one entity for each SOID
    for (each entity in response)
    {
        if (entity == "<updatedData>")
        {
            updatedData(SSID, entity, TOPIC);
        }
```

```
        if (entity == "<deleteFromSubscriptionMap>")
        {
            // subscriber did not find SOID/SINST in its SUBSCRIPTIONS
            // table publisher should update its subscription map
            ## DELETE FROM PUBLICATIONS
            ## WHERE SOID=%SOID% AND SINST=%SINST%
        }
    }
}
// Helper routine to handle the update subMessage
updatedData(SSID, subMessage, TOPIC)
{
    for (sub in subMessage)
    {
        // publisher needs to check the change number returned in the
        // response message and verify if it is valid; if it is, then
        // everything is cool; if not, then the subscriber has sent a
        // spurious response for a previous request, and so this
        // message is ignored
        ## DELETE FROM PUBLICATIONS_QUEUE
        ## WHERE PKEY = %PKEY% AND PCN <= %subMessage.PCN%
    }
}
```

When a subscription is added, the actions implied by the following pseudo-code are taken:

```
{
    // check if the publisher has an entry in the CONNECTIONS table for
    // this PSID
    if (UnknownServiceID(PSID))
    {
        // no entry exists; send an addSubscription message immediately to
        // the publisher.
        UpdateSingleSubscriptionMap(SOID, SINST, POID, PINST, PSID,
            TOPIC, SCN);
    }
    else
    {
        // see if row exists in the subscriptions queue
        ## IF EXISTS (
        ##      SELECT SKEY FROM SUBSCRIPTIONS_QUEUE
        ##      WHERE SOID = %SOID% AND SINST = %SINST%
        ##          AND POID = %POID% AND PINST = %PINST%
        ##          AND PSID = %PSID% AND TOPIC = %TOPIC%)
        ## BEGIN
        ##      UPDATE SUBSCRIPTIONS_QUEUE
        ##      SET OPERATION = TRUE, SCN = %SCN%
        ##      WHERE SOID = %SOID% AND SINST = %SINST%
        ##          AND POID = %POID% AND PINST = %PINST%
        ##          AND PSID = %PSID% AND TOPIC = %TOPIC%
        ## ELSE
        ## BEGIN
            // row does not exist; insert into the queue
        ##      INSERT INTO SUBSCRIPTION_QUEUE
        ##      VALUES (%SOID%, %SINST%, %TOPIC%, %POID%,
                                  %PINST%, TRUE, %SCN%)
        ## END
    }
}
```

AddSubscription(SOID, SINST, POID, PINST, PSID, TOPIC, SCN)

When a subscription is removed, the subscriber takes actions implied by the following pseudo-code:

```
RemoveSubscription(SOID, SINST, POID, PINST, PSID, TOPIC, SCN)
{
    // see if row exists in the subscriptions queue
    ## IF EXISTS (
```

```
SELECT SKEY FROM SUBSCRIPTIONS_QUEUE
WHERE SOID = %SOID% AND SINST = %SINST%
AND POID = %POID% AND PINST = %PINST%
AND PSID = %PSID% AND TOPIC = %TOPIC%)
BEGIN
UPDATE SUBSCRIPTIONS_QUEUE
SET OPERATION = FALSE, SCN = %SCN%
WHERE SOID = %SOID% AND SINST = %SINST%
AND POID = %POID% AND PINST = %PINST%
AND PSID = %PSID% AND TOPIC = %TOPIC%
END
ELSE
BEGIN
    // row does not exist; insert into the queue
INSERT INTO SUBSCRIPTION_QUEUE
VALUES (%SOID%, %SINST%, %TOPIC%, %POID%,
%PINST%, FALSE, %SCN%)
END
}
```

When the update interval timer goes off at the subscriber, it takes actions implied by the following pseudo-code:

```
ProcessQueue(PSID, TOPIC)
{
  UpdateSubscriptionMap request;
  // select requests in the queue for this PSID; order them by
  // PUID then by OPERATION. The rows in each group will result
  // in addSubscription and deleteSubscription subMessage
  ##  SELECT * FROM PUBLICATION_QUEUE
  ##  WHERE PSID = %PSID% AND TOPIC = %TOPIC%
  ##  ORDER BY POID, PINST, OPERATION
  request += GenerateMessage( );
  // Send request to the publisher
  Send(PSID, request);
  // Assume the worst and age the connection
  ##  UPDATE CONNECTIONS
  ##  SET RETRY = RETRY + 1
  ##  WHERE SID = %SSID%
}
```

When a subscriber receives a request, the actions implied by the following pseudo-code are performed:

```
OnUpdateSubscriptionData(PSID, request)
{
  UpdateSubscriptionDataResponse response;
  // Mark this connection as live
  ## UPDATE CONNECTIONS
  ## SET RETRY = 0
  ## WHERE SID = %PSID%
  // request may contain multiple entities
  for (each entity in request)
  {
    for (sub in entity)
    {
      // check to see if this is a known subscriber
      if (LookUpUser(sub.SOID, sub.SINST))
      {
        // is this a duplicate request message? I can find this by looking
        // at change numbers
        ## SELECT PCN AS STORED_PCN
        ## FROM SUBSCRIPTIONS
        ## WHERE POID = %POID% AND PINST = %PINT%
        ##  AND SOID = %SOID% AND SINST = %SINST%
        ## AND TOPIC = %TOPIC% AND PSID = %PSID%
        // result set empty means subscriber does not have
        // a subscription on publisher's document
        if (result set is empty)
        {
          // do not send a response for this request.
```

```
        // send prepare for an unsub request instead
        ## IF NOT EXISTS (
        ##    SELECT * FROM SUBSCRIPTIONS_QUEUE
        ##    WHERE POID = %POID% AND PINST =
        ##    %PINST% AND SOID = %SOID% AND
        ##    SINST = %SINST% AND TOPIC = %TOPIC%
        AND %PSID% = %PSID%)
        ##    BEGIN
                              RemoveSubscription(%SOID%,
%SINST%, %POID%, %PINST%,
                %PSID%, %TOPIC%, %SCN%);
        ## END
      }
      // pcn is the change number present in the message
      else
      {
      if (entity.PCN > STORED_PCN)
      {
         // This function updates subscribed data
         UpdateData(entity);
         // update the change number
         ## UPDATE SUBSCRIPTIONS
         ## SET PCN = entity.PCN
         ## WHERE POID = %POID% AND PINST = %PINT%
         ##  AND SOID = %SOID% AND SINST = %SINST%
         ## AND TOPIC = %TOPIC% AND PSID = %PSID%
      }
      // append to response
      response += "<updatedData>";
      }
      }
      else
      {
         // subscriber is unknown; signal publishing service to delete it
         response += "<deleteFromSubscriptionMap ";
         response += "subscriber='"+SOID+"' instance='
         "+SINST+"'/>";
      }
    }
  }
  Send(SSID, response);
}
```

When a subscriber receives an UpdateSubscriptionMap-Response message, the actions implied by the following pseudo-code are performed:

```
OnUpdateSubscriptionMapResponse(PSID, request)
{
  // Mark this connection as live
  ## UPDATE CONNECTIONS
  ## SET RETRY = 0
  ## WHERE SID = %PSID%
  // The response has one entity for each row in subscription queue
  for (each entity in response)
  {
    if (entity == "<addedToSubscriptionMap>")
    {
      for (sub in entity)
      {
        // publisher successfully added its subscription map
        // subscriber now adds to its subscriptions
        table
        ## IF EXISTS (
        ##   SELECT * FROM SUBSCRIPTIONS_QUEUE
        ##   WHERE POID = %POID% AND PINST = %PINT%
        ##   AND SOID = %SOID% AND SINST = %SINST%
        ##   AND TOPIC = %TOPIC% AND PSID = %PSID%
        ##   AND SCN = %SCN%)
        ## BEGIN
        ##   INSERT INTO SUBSCRIPTIONS
        ##       VALUES (%SOID%, %SINST%, %POID%,
                                             %PINST%, %PSID%, 0,
                              ## %TOPIC%)
        // since request has received the proper response,
```

```
            // it can be deleted from the subscriptions queue
      ##    DELETE FROM SUBSCRIPTIONS_QUEUE
      ##    WHERE POID = %POID% AND PINST =
                            %PINT%
      ##    AND SOID = %SOID% AND SINST =
                            %SINST%
      ##    AND TOPIC = %TOPIC% AND PSID =
                            %PSID%
AND OPERATION = 1
AND SCN = %SCN%
END
      }
    }
  }
  if (entity == "<deletedFromSubscriptionMap>")
  {
    for (sub in entity)
    {
        // publisher successfully deleted from its subscription
        // map subscriber now deletes from its subscriptions
        table
IF EXISTS (
SELECT * FROM SUBSCRIPTIONS_QUEUE
WHERE POID = %POID% AND PINST = %PINT%
AND SOID = %SOID% AND SINST = %SINST%
AND TOPIC = %TOPIC% AND PSID = %PSID%
AND SCN = %SCN%)
BEGIN
      ##    DELETE FROM SUBSCRIPTIONS
      ##    WHERE POID = %POID% AND PINST =
                            %PINT%
      ##    AND SOID = %SOID% AND SINST =
                            %SINST%
      ##    AND TOPIC = %TOPIC% AND PSID =
                            %PSID%
        // since request has received the proper response,
        // it can be deleted from the subscriptions queue
      ##    DELETE FROM SUBSCRIPTIONS_QUEUE
      ##    WHERE POID = %POID% AND PINST =
                            %PINT%
      ##    AND SOID = %SOID% AND SINST =
                            %SINST%
      ##    AND TOPIC = %TOPIC% AND PSID =
                            %PSID%
      ##    AND SCN = %SCN%
      ## END
    }
  }
}
```

Figure 22:
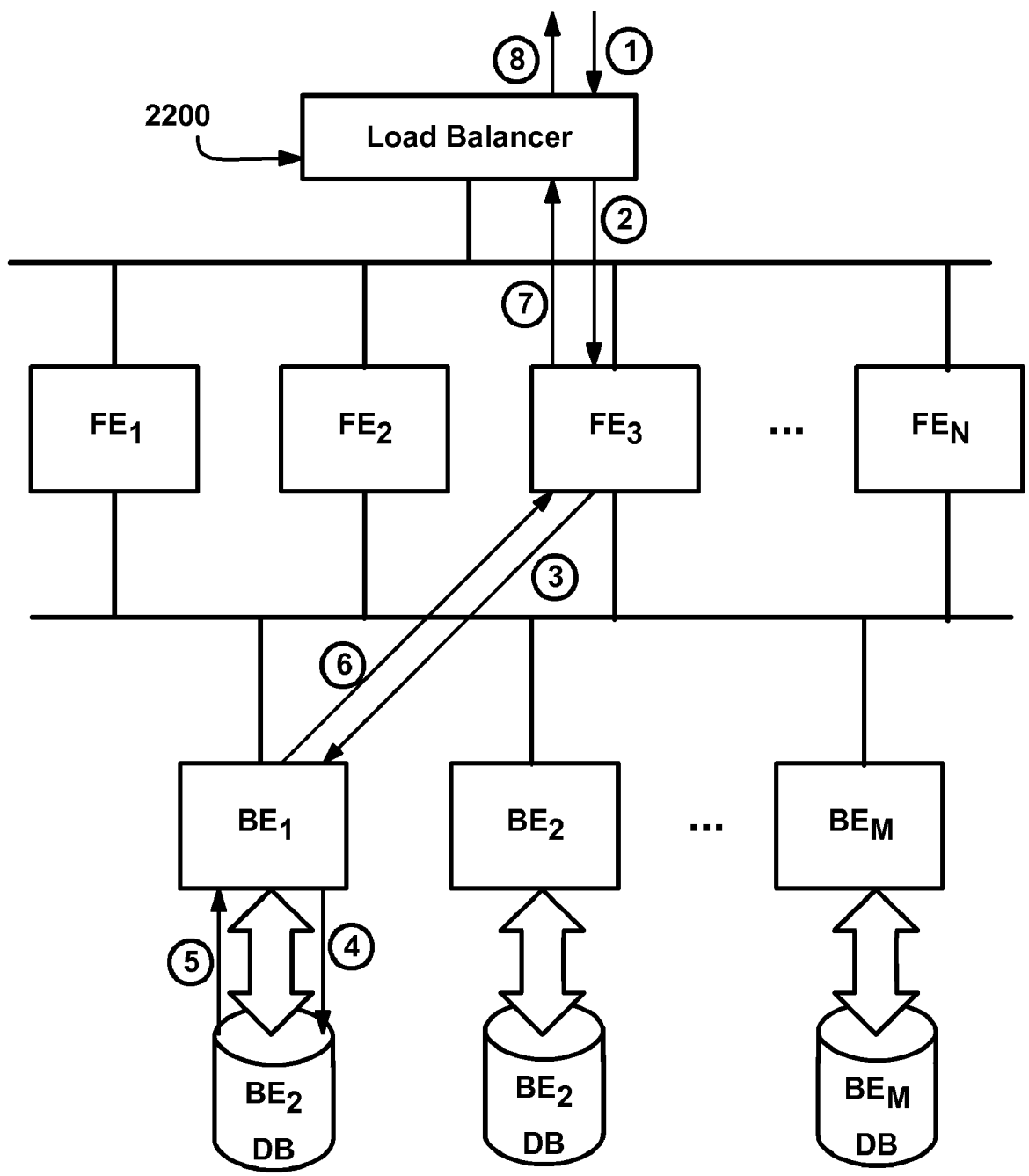
FIGS. 22-23 are block diagram generally representing models in which the service-to-service communication protocol may be implemented, in accordance with an aspect of the present invention.

Eventually .NET services are expected to handle hundreds of millions of users. As a result, the implementation should be extremely scalable and fault-tolerant. One way in which this may be achieved is by having multiple clusters, with each cluster having front-end servers and backend servers. In one architecture, every backend server will handle the data for a subset of users. FIG. 22 represents one such cluster architecture.

As represented in FIG. 22, when a request comes in, the load balancer redirects the request to a front end server (FE), based on load balancing and fault-tolerance considerations. The FE does some preliminary processing on the request, locates the back-end server (BE) servicing this user, and forwards the request to the back end server. The BE returns with a response, which the FE puts into an appropriate message format (e.g., .NET data language) and sends it off to its destination. Note the as a result from this architecture, the FEs are stateless; they carry no memory of previous .NET data language requests. As a result, any FE can handle any given request. Thus, two messages bound for the same BE can be processed by two different FEs. Further, because FEs are stateless, the load-balancer, on an incoming request, can distribute load by choosing an FE which is not busy. The same property allows the load balancer to be fault-tolerant when an FE fails. The BE is stateful; when required by the semantics of a service, the BE remembers history. Moreover, each BE services a subset of the users of the entire service, and while the choice of an FE is arbitrary, a given request always corresponds to one specific BE—the one which stored the user's data.

In FIG. 22, the arrows labeled with circled numerals one (1) through eight (8) represent the data flow on a typical request, with (1), a request comes to the service's load balancer 2200. Then, the load balancer determines that $FE_3$ is the right front-end to handle this request (based on load and failover considerations), and (2) provides the request to $FE_3$ which processes the request. $FE_3$ determines the user identity, and locates the BE that services this user, which in the present example, is $BE_1$. $FE_3$ determines what data is needed from the backend, and FE3 sends database requests to $BE_1$ (arrow labeled three (3)).

In turn, $BE_1$ retrieves the required data from the database (arrows labeled four (4) and five (5)), and $BE_1$ sends data back to $FE_3$, in the form of database response (arrow six (6)). Then, $FE_3$ returns the data back into an appropriate response and sends the message off to its destination (arrows labeled seven (7) and eight (8)).

The model represented in FIG. 22 works fine for handling incoming SSCP requests. For example, when an updateSubscriptionMap request comes into a publisher, it is processed in the general manner described above. However, for outgoing requests, such as when the publisher needs to send the updateSubscriptionData message, an enhanced model is provided, generally because in the SSCP protocol, a publisher or a subscriber processes its queue every time the interval timer goes off, and for the protocol to function correctly, a single reader should drain the queue, and also because in the model described in the previous section, the BE has no reason to initiate a request message; its job is to process a request and generate an appropriate response. However, SSCP requires that the participating services generate requests when the interval timer goes off:

a) A publisher sends updateSubscriptionData messages b) A subscriber sends updateSubscriptionMap messages This is handled as below, wherein for the purposes of this description, the word "service" refers to either the publisher or the subscriber, and the word "queue" refers to either the publication queue or the subscription queue. To enhance the model, the FEs run code for inbound SSCP messages, just as they do for other inbound .NET data language messages. This means that the FEs run code for updating subscription data (on the subscribing side), code for updating subscription maps (on the publishing side), and processing SSCP responses (both subscriber and publisher).

The BEs run code for outbound SSCP messages. This code runs every time the interval timer goes off. This code handles the publication queue and generating updateSubscriptionData messages (publisher), handling subscription queue and generating updateSubscriptionMap messages (subscriber). The process generally works as follows:

1) Each BE stores a slice of the persistent SSCP data. Taking the example of a publishing service, if BE1 manages $user_{11}$ and $user_{12}$, and $BE_2$ manages $user_{22}$ and $user_{22}$ then $BE_1$ stores PUBLICATIONS and PUBLICATIONS_QUEUE and CONNECTION tables which handle the subscription/publication requirements for data from $user_{11}$ and $user_{12}$. $BE_2$ stores PUBLICATIONS and PUBLICATIONS_QUEUE and CONNECTION tables which handle the sub/pub requirements for data from $user_{22}$ and $user_{22}$.

2) When the interval timer goes off at a service, each BE wakes up to process its queue.
3) If the queue is not empty, then the BE constructs the appropriate message(s)—such as updateSubscriptionData, or updateSubscriptionMap. For each message:
   a) The BE picks an FE (e.g., at random) and sends the message to it.
   b) The FE simply forwards the message along to its destination—i.e., it acts as a proxy.
   c) A response is handled in the usual way (since incoming SSCP messages don't require any changes)

Figure 23:
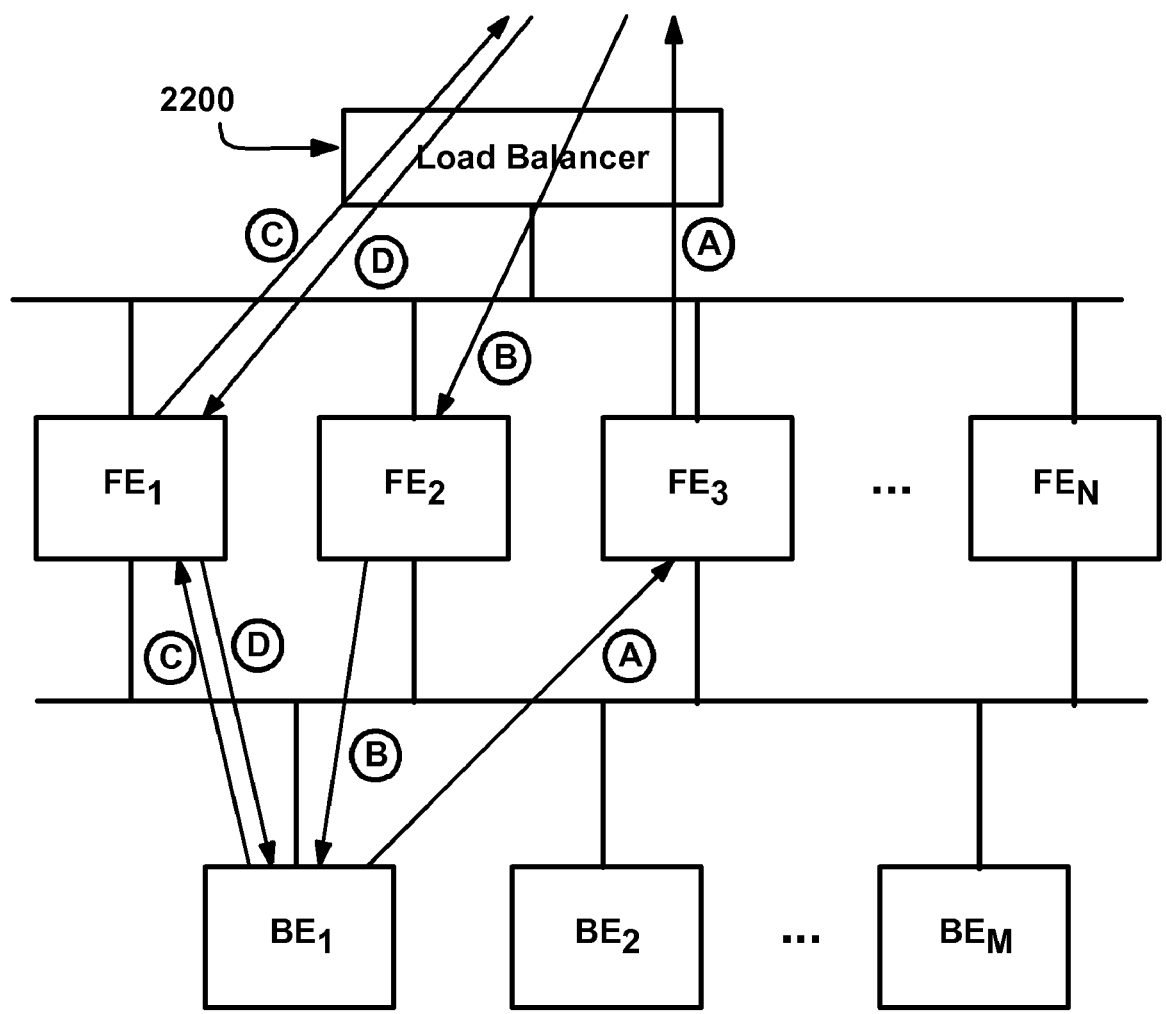

FIG. 23 generally represents this model when the interval timer goes off and the following things happen at BE1 (similar things also happen at other BEs). Assume that BE1 has to send two requests, request1 and request2, as a result of processing its queue during this interval timer event. In the arrows labeled (A), BE1 sends request1 through FE3, which is randomly picked. The arrows labeled (B) represent a response arriving from a destination service through FE2, which is picked by the load balancer according to its algorithms. The arrows labeled (C) represent BE sending request2 through randomly picked FE1. The arrows labeled (D) represent a response arriving from a destination service through FE1 (which is picked by the load balancer according to its algorithms).

As can be seen from the foregoing detailed description, there is provided a set of schema-based services that provide users with access to centrally stored data. The set of services control access to the data with defined methods, regardless of the application program and/or device. When accessed, the data for each service is structured in a defined way that complies with defined rules for that data, regardless of the application program or device that is accessing the data. The schemas have extensibility defined therein.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for providing identity-centric services to end users over a distributed computer network, the method comprising:
   providing a core set of identity-centric services to end users, each of the core set of identity-centric services operable to control access to centrally-stored data;
   maintaining identity-centric data of the centrally-stored data relating to the end users of the core services; and
   providing one or more optional identity-centric services to the end users in addition to the core services;
   wherein the identity-centric data in the data store is accessible by the core set of services and by the optional services with access to the identity-centric data being controlled by the core set of services and by the optional services based on an identification and a role and a scone of the role of a requesting user of the end users, the method being performed by one or more computing devices.

2. The method of claim 1 wherein a provider of the core services also provides the one or more optional identity-centric services.

3. The method of claim 1 wherein at least one of the one or more optional identity-centric service is provided by a different entity than a provider of the core set of services.

* * * * *